United States Patent
Hashimoto et al.

(10) Patent No.: US 7,397,977 B2
(45) Date of Patent: Jul. 8, 2008

(54) WAVE TRANSMISSION MEDIUM AND WAVEGUIDE CIRCUIT

(75) Inventors: Toshikazu Hashimoto, Yamato (JP); Ikuo Ogawa, Atsugi (JP); Takeshi Kitagawa, Yokohama (JP); Senichi Suzuki, Mito (JP); Masahiro Yanagisawa, Isehara (JP); Tomohiro Shibata, Tokyo (JP); Masaki Koutoku, Isehara (JP); Hiroshi Takahashi, Atsugi (JP); Ryou Nagase, Tokyo (JP); Masaru Kobayashi, Isehara (JP); Shuichiro Asakawa, Atsugi (JP); Yoshiteru Abe, Zama (JP); Tsutomu Kitoh, Atsugi (JP); Takaharu Ohyama, Yao (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 29 days.

(21) Appl. No.: 10/540,734

(22) PCT Filed: Dec. 25, 2003

(86) PCT No.: PCT/JP03/16725

§ 371 (c)(1),
(2), (4) Date: Jan. 23, 2006

(87) PCT Pub. No.: WO2004/059354

PCT Pub. Date: Jul. 15, 2004

(65) Prior Publication Data

US 2006/0126992 A1   Jun. 15, 2006

(30) Foreign Application Priority Data

| Dec. 26, 2002 | (JP) | 2002-378514 |
| Sep. 26, 2003 | (JP) | 2003-336527 |
| Nov. 5, 2003 | (JP) | 2003-375986 |
| Nov. 20, 2003 | (JP) | 2003-391495 |

(51) Int. Cl.
*G02B 6/12* (2006.01)

(52) U.S. Cl. ......................................... 385/14; 385/129

(58) Field of Classification Search .................. None
See application file for complete search history.

(56) References Cited

U.S. PATENT DOCUMENTS 5,822,475 A * 10/1998 Hirota et al. .................. 385/24

(Continued)

FOREIGN PATENT DOCUMENTS

CA        2490768 A1     1/2004

(Continued)

OTHER PUBLICATIONS

M.L. Masanovic et al. Multimode interference-based two-stage 1x2 light splitter for compact photonic integrated circuits. IEEE Photonics Technology Letters, 15(5):706, May 2003.*

(Continued)

*Primary Examiner*—Sung Pak
*Assistant Examiner*—Mike Stahl
(74) *Attorney, Agent, or Firm*—Workman Nydegger

(57) ABSTRACT

A wave transmission medium includes an input port 3-1 and an output port 3-2. A field distribution 1 and a field distribution 2 are obtained by numerical calculations. The field distribution 1 is a field distribution of the propagation light (forward propagation light) launched into the input port 3-1. The field distribution 2 is a field distribution of the phase conjugate light (reverse propagation light) resulting from reversely transmitting from the output port side an output field that is expected to be output from the output port 3-2 when an optical signal is launched into the input port 3-1. According to the field distributions 1 and 2, a spatial refractive index distribution is calculated such that the phase difference between the propagation light and reverse propagation light is eliminated at individual points (x, z) in the medium.

55 Claims, 70 Drawing Sheets

U.S. PATENT DOCUMENTS

| | | | |
|---|---|---|---|
| 6,144,480 | A | 11/2000 | Li et al. |
| 6,175,671 | B1* | 1/2001 | Roberts ........................ 385/14 |
| 6,542,682 | B2* | 4/2003 | Cotteverte et al. .......... 385/125 |
| 7,006,732 | B2* | 2/2006 | Gunn et al. .................... 385/37 |
| 2004/0101264 | A1* | 5/2004 | McAlexander et al. ...... 385/132 |
| 2005/0111775 | A1* | 5/2005 | Fridman et al. ............... 385/14 |
| 2006/0051022 | A1* | 3/2006 | Levner et al. .................. 385/37 |
| 2006/0072871 | A1* | 4/2006 | Uchida ........................ 385/14 |

FOREIGN PATENT DOCUMENTS

| | | |
|---|---|---|
| JP | 53-100848 | 9/1978 |
| JP | 10-123350 | 5/1998 |
| JP | 10-186184 | 7/1998 |
| WO | WO 02/075411 A1 | 9/2002 |

OTHER PUBLICATIONS

M.M. Spuhler et al. A very short planar silica spot-size converter using a nonperiodic segmented waveguide. Journal of Lightwave Technology, 16(9):1680, Sep. 1998.*

A. Hakansson et al. Inverse designed photonic crystal demultiplex waveguide coupler. Optics Express, 13(14):5440, Jul. 2005.*

Yoshinori Hibino, *Passive Optical Devices for Photonic Networks*, IEICE Trans. Commun., vol. E83-B, No. 10, Oct. 2000, pp. 2178-2190.

T.W. Mossberg, *Planar Holographic Optical Processing Devices*, Optics Letters, vol. 26, No. 7, Apr. 1, 2001, pp. 414-416.

K. Okamoto, *Fundamentals of Optical Waveguides*, Chapter 9, Planar Lightwave Circuits, Academic Press, 2000, pp. 346-379.

K. Okamoto et al., *Flat Spectral Response Arrayed-Waveguide Grating Multiplexer with Parabolic Waveguide Horns*, Electronic Letters, vol. 32, No. 18, Aug. 29, 1996, pp. 1661-1662.

Hongling Rao et al., *A Bidirectional Beam Propagation Method of Multiple Dielectric Interfaces*, IEEE Photonics Technology Letters, vol. 11, No. 7, Jul. 1999, pp. 830-832.

Toshihiko Baba et al., *Dispersion and Radiation Loss Characteristics of Antiresonant Reflecting Optical Waveguides-Numerical Results and Analytical Expressions*, IEEE Journal of Quantum Electronics, vol. 28, No. 7, Jul. 1992, pp. 1689-1700.

Charls Kettel ed., *Introduction to Solid State Physics* $6^{th}$, Chapter 2, John Wily & Sons, Inc., New York, 1986, pp. 30-37.

Senichi Suzuki, *Design Simulation of Silica-Based Planar Lightwave Circuits*, 1999 Transactions of the Institute of Electronic and Information Communication Engineers (IEICE), Electronics 1, Mar. 8, 1999, pp. 510-511.

W.A. Crossland et al., *Holographic Optical Switching: The "ROSES" Demonstrator*, Journal of Lightwave Technology, vol. 18, No. 12, Dec. 2000, pp. 1845-1854.

T. Kitoh et al., *Low Chromatic-dispersion Flat-top Arrayed Waveguide Grating Filter*, Electronics Letters, vol. 39, No. 15, Jul. 24, 2003, pp. 1116-1118.

Yabu Tetsuro et al., *New Design Method for Low Loss Y-Branch Waveguides*, Papers of Technical Meeting on Electromagnetic Theory, EMT, IEE Japan, EMT-00-29-40, May 19, 2000, pp. 65-71.

* cited by examiner

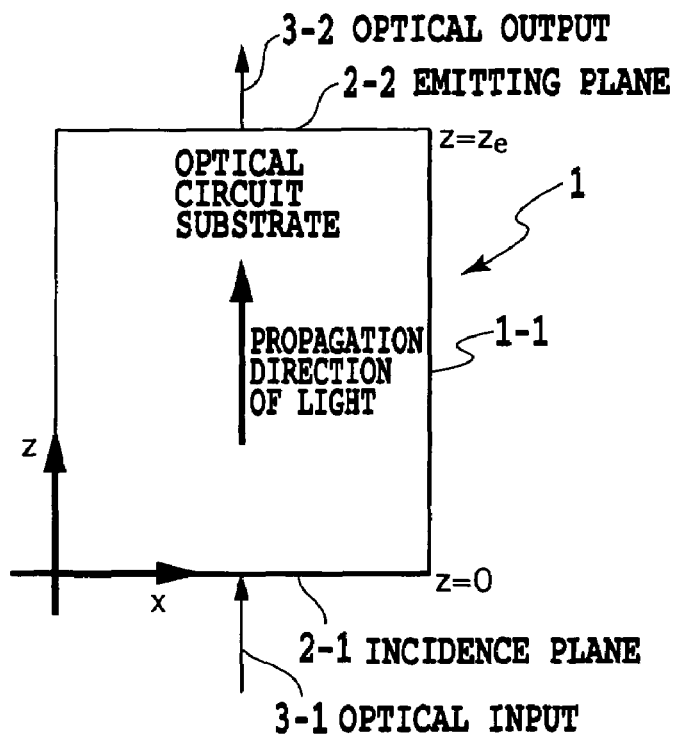
FIG.5A
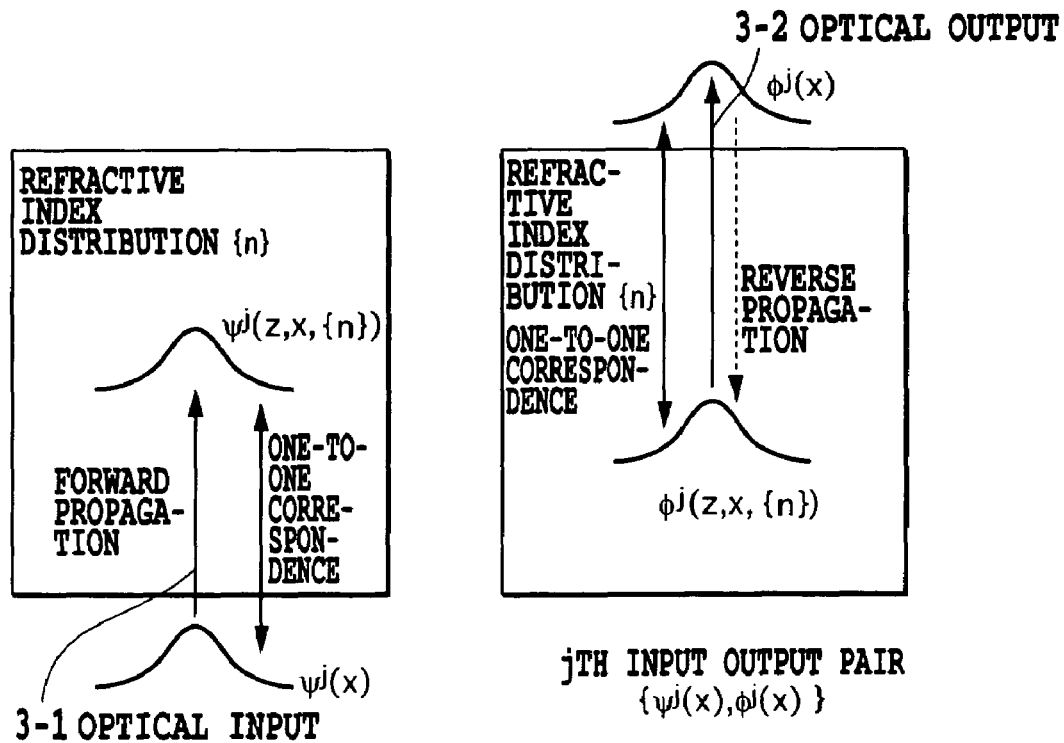
FIG.5B  FIG.5C

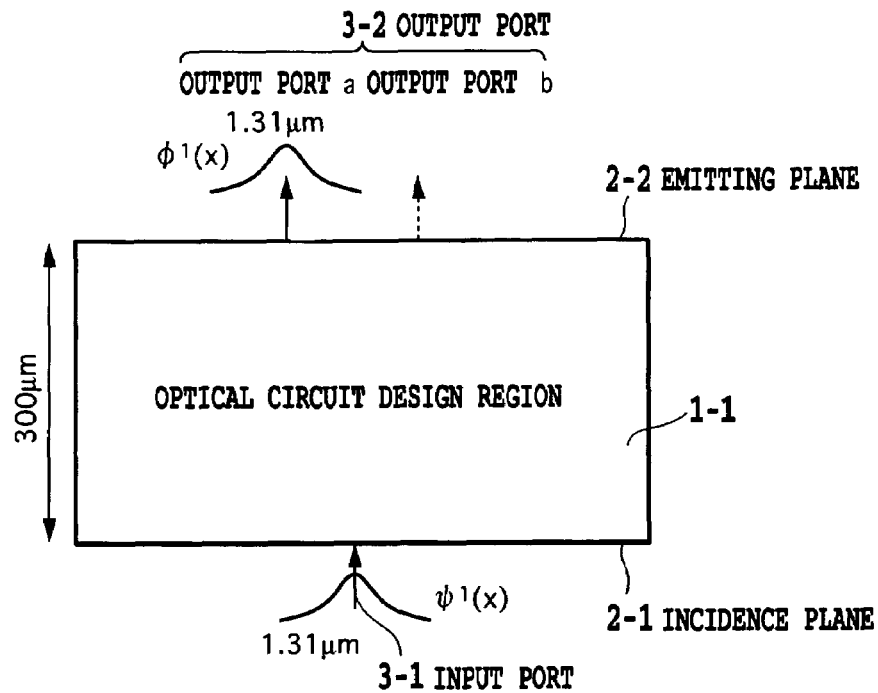
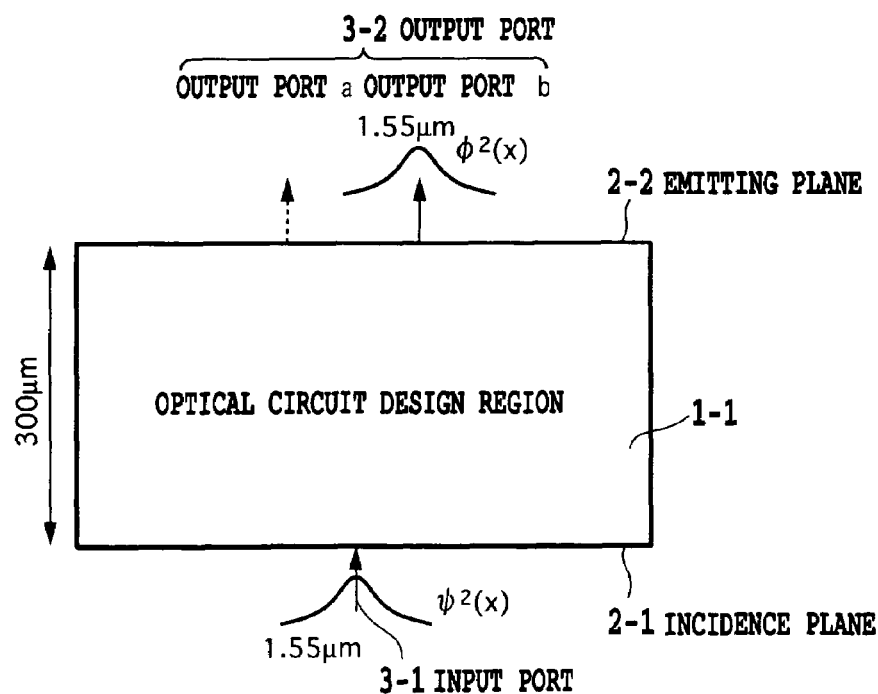

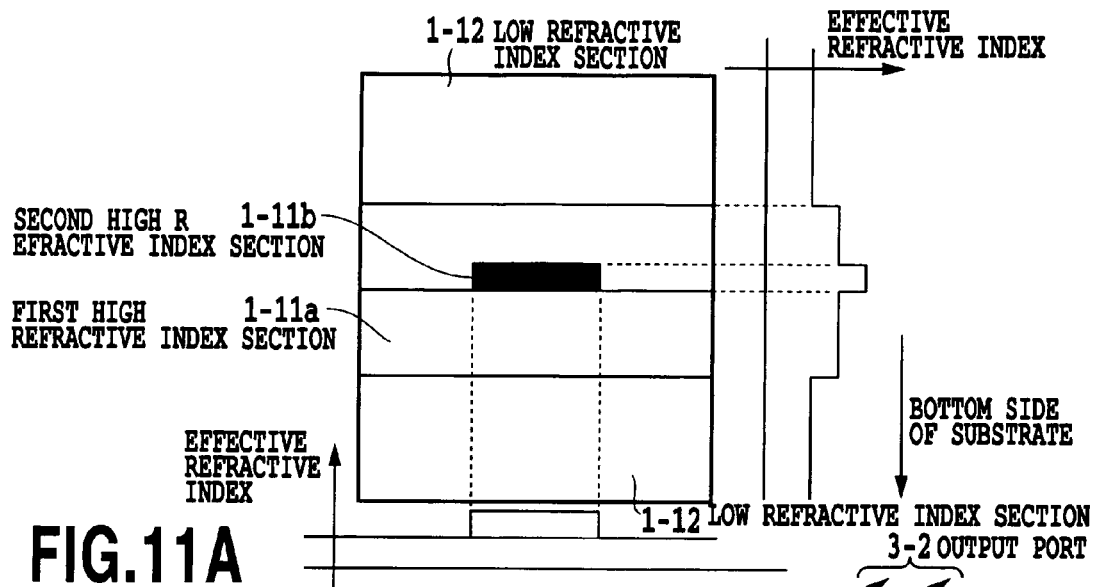
FIG.11A
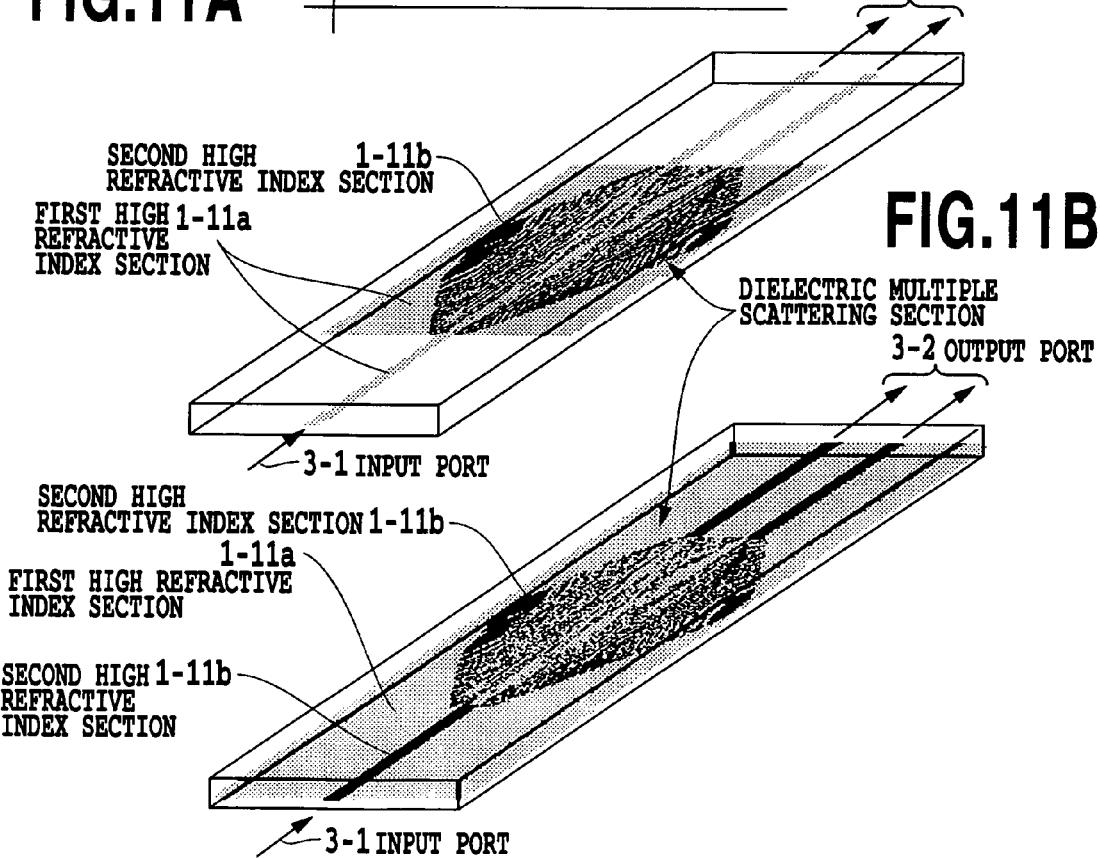
FIG.11B
FIG.11C

SPECTRA IN SETUP OF SIMPLE BANDPASS FILTER

SPECTRA IN SETUP INCLUDING DUMMY
PORT C FOR BAND SHAPING

SETUP OF OUTPUT PORT OF BANDPASS FILTER

TRANSMISSION SPECTRA

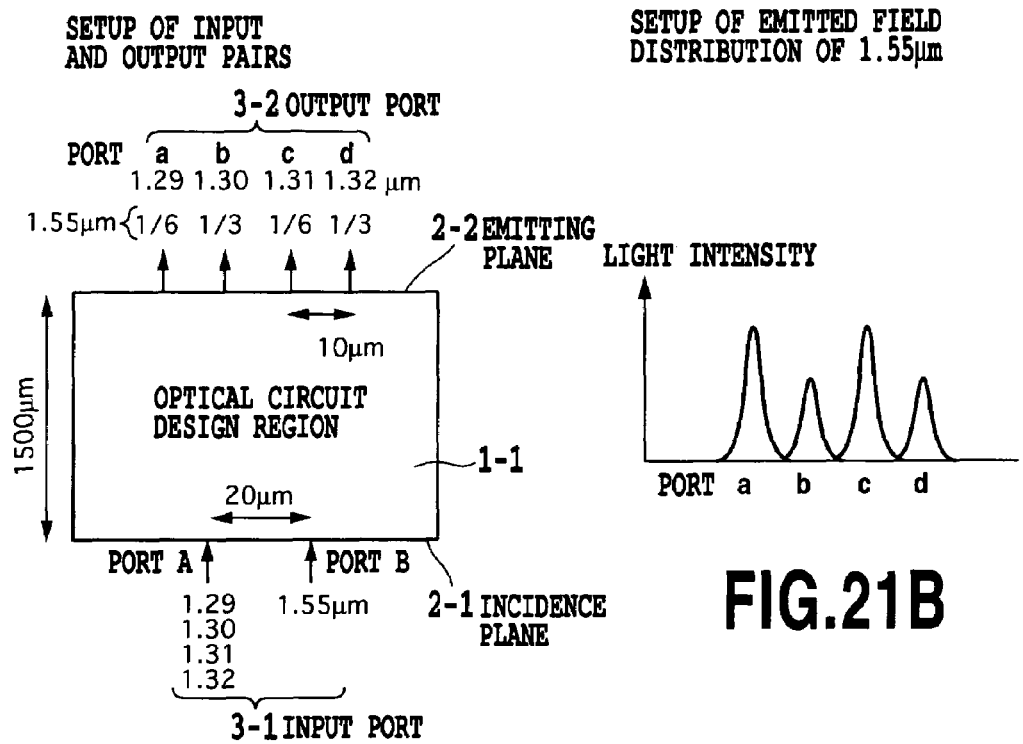
FIG.21A
FIG.21B
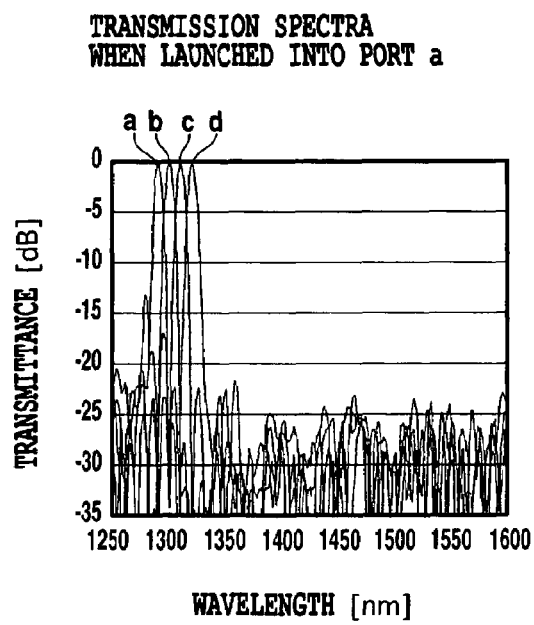
FIG.21C
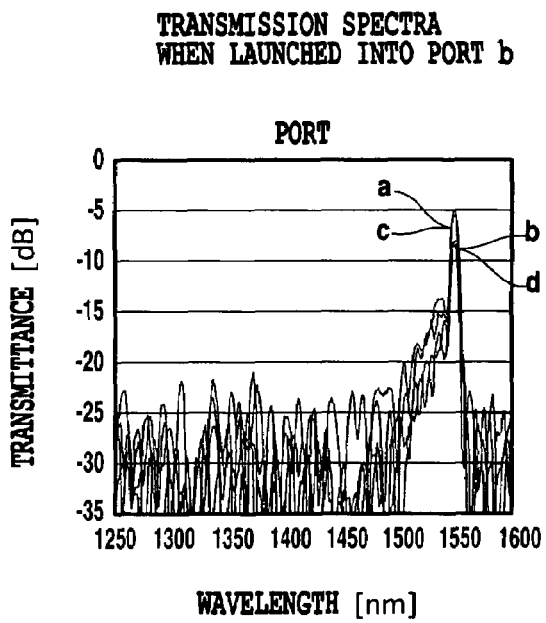
FIG.21D

BEHAVIOR OF REFRACTIVE
INDEX DISTRIBUTION

420 μm × 1800 μm
Δ=0.75%
PIXEL SIZE=3 μm × 3 μm

BEHAVIOR OF
OPTICAL TRANSMISSION

1800 μm

TRANSMISSION LOSS
OF EACH PORT

THEORETICAL LOSS 12 dB

REFRACTIVE INDEX DISTRIBUTION

BEHAVIOR OF FIELD PROPAGATION

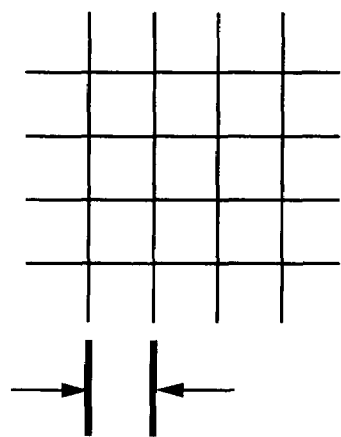
NORMAL PIXEL
ARRANGEMENT
FIG.34A
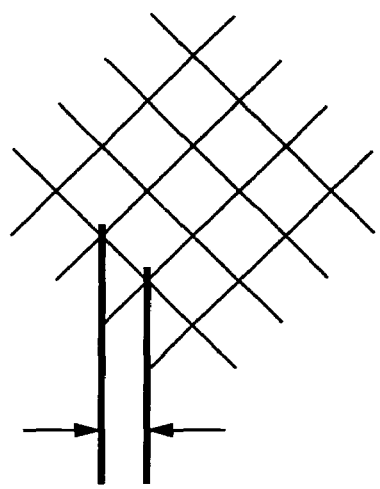
PIXEL ARRANGEMENT
IN THIS EMBODIMENT
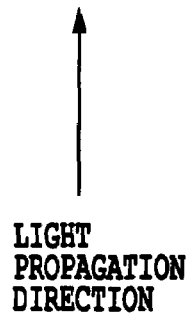
LIGHT
PROPAGATION
DIRECTION
FIG.34B

POSITION IN LATERAL
DIRECTION IS ARBITRARY
AS FAR AS PATTERN
SATISFIES MINIMUM PATTERN RULE

CORE LAYER
SUBSTRATE

CORE LAYER
SUBSTRATE

CROSS SECTION

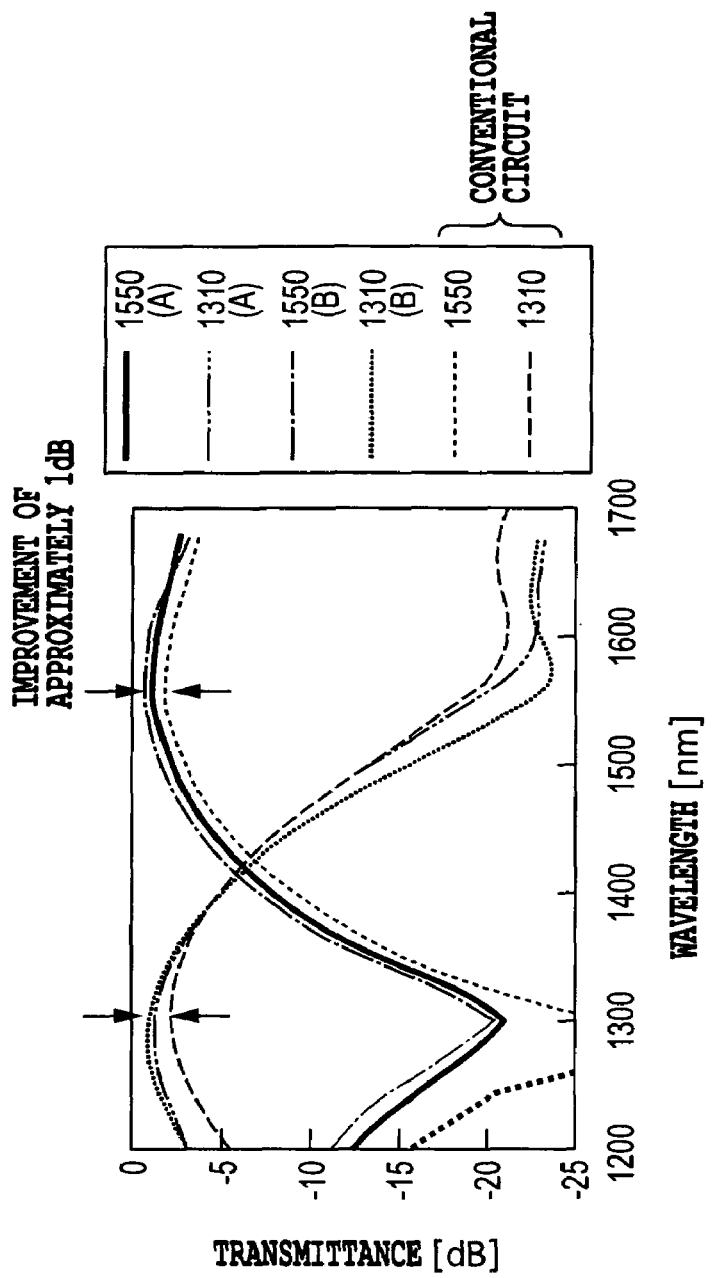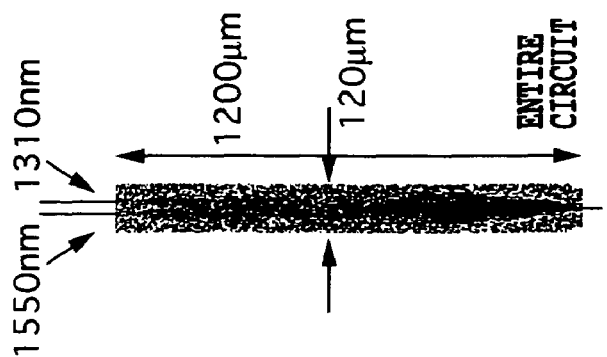
FIG.46

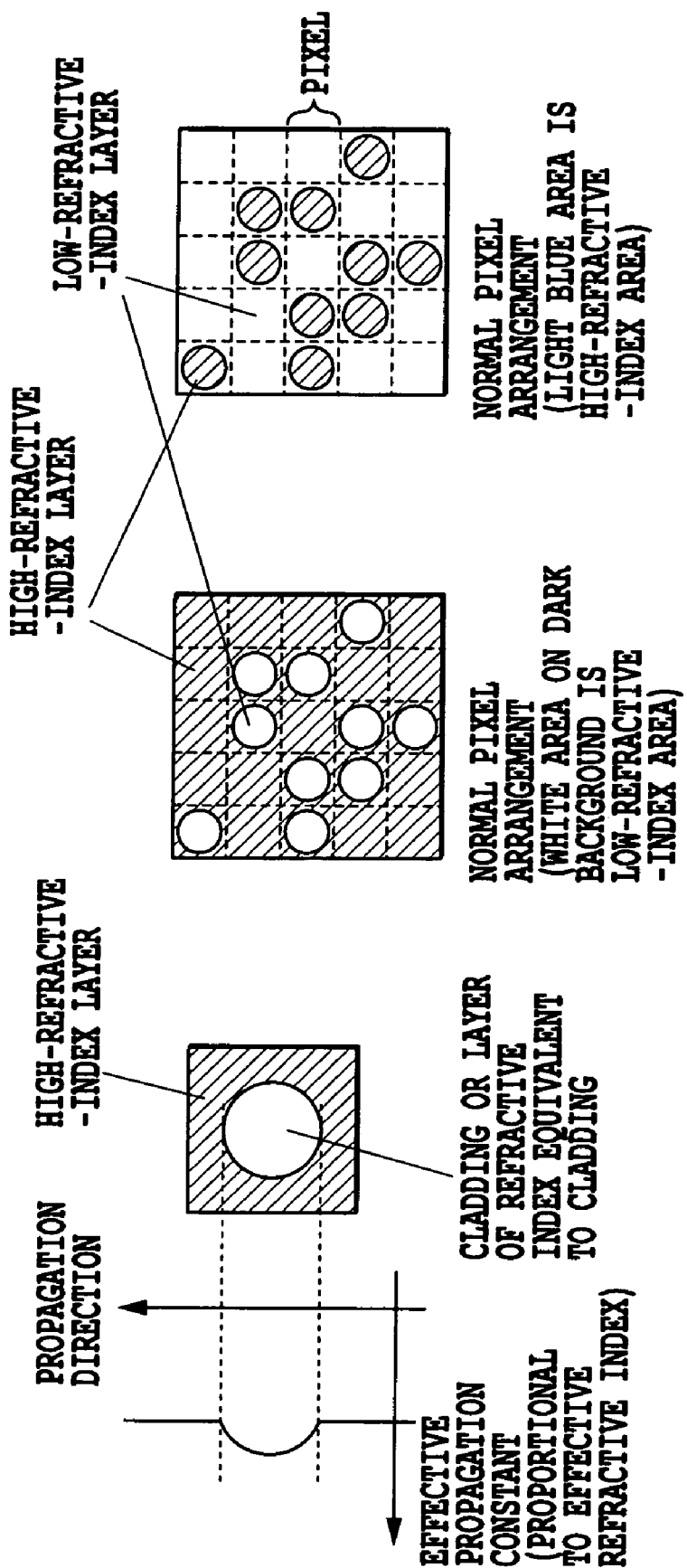

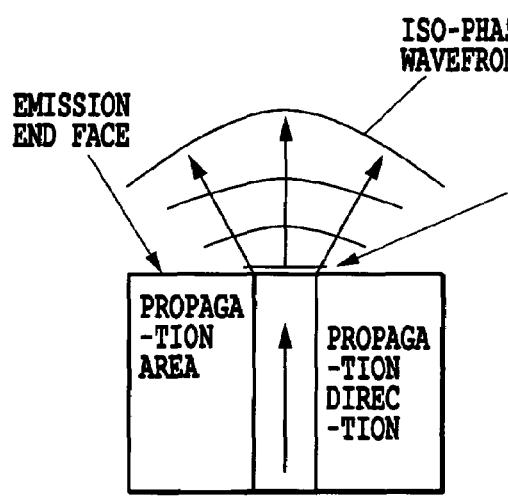
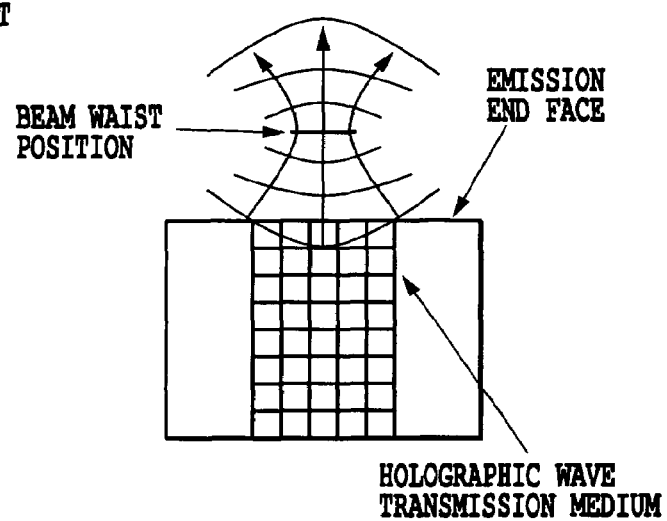
FIG.64A  FIG.64B

WAVE TRANSMISSION MEDIUM AND WAVEGUIDE CIRCUIT

TECHNICAL FIELD

The present invention relates to a wave transmission medium and a waveguide circuit using it, and a fabrication method thereof, and more particularly to a medium for transmitting waves using multiple scattering in accordance with two-dimensional refractive index distribution and a waveguide circuit configured using it, and to a fabrication method thereof.

BACKGROUND ART

In a technical field such as optical communication, integrated optical components utilizing an optical waveguide structure have been developed to construct optical circuits for easily implementing optical splitting and interference. The integrated optical components utilizing the property of waves make it to adjust optical path length and to facilitate fabrication of interferometers. In addition, applying the semiconductor circuit processing technique enables integration of optical components.

However, since these optical waveguide circuits construct individual components of optical circuits using an "optical confinement structure" that carries out the spatial optical confinement of light propagating through an optical waveguide by utilizing the spatial distribution of refractive index, a cascaded circuit design using optical wiring is required. Consequently, it is inevitable that optical path length of the optical waveguide circuit becomes longer than the optical path length required for bringing about interference in the optical circuit. This presents a problem of sharply increasing the size of the optical circuit.

For example, take a typical arrayed waveguide grating as an example. The light including a plurality of wavelengths ($\lambda_j$) input to an input port repeats demultiplexing/multiplexing through star couplers using slab waveguides, and demultiplexed optical waves are output from an output port. In this case, an optical path length required to demultiplex the optical waves at a resolution of an order of one thousandth of the wavelength becomes several tens of thousands of the wavelength of the light propagating through the waveguide. Furthermore, it is necessary not only to carry out waveguide patterning of the optical circuit, but also to perform such processing as providing a wave plate for correcting the circuit characteristics that depend on the polarization state (see, for example, Y. Hibino, "Passive optical devices for photonic networks", IEIC Trans. Commun., Vol. E83-B No. 10, (2000)).

In addition, since it is necessary to closely confine the light within the waveguide to miniaturize the optical circuit, the optical waveguide must have a very large refractive index difference to control the optical confinement state by the spatial distribution of the refractive index. For example, a conventional step-index optical waveguide is designed such that it has the spatial distribution of the refractive index that will make the refractive index difference greater than 0.1%. The optical confinement utilizing such a large refractive index difference presents a problem of reducing the flexibility of a circuit configuration. In particular, when implementing the refractive index difference in optical waveguide by local ultraviolet irradiation, thermooptic effect or electrooptic effect, the amount of change in the resultant refractive index is about 0.1% at best. Accordingly, to change the propagation direction of light, it must be gradually varied along the optical waveguide. Thus, the optical circuit inevitably becomes long, which makes it difficult to miniaturize the optical circuit.

Furthermore, an optical circuit including a grating-like circuit in addition to an optical waveguide circuit is built on a basis of a periodic structure that is substantially parallel to the propagation direction of light, or of the periodic variation in a dielectric refractive index. In addition, in an actual design, the characteristics of the optical circuit are usually achieved by a strictly periodic structure evaluable by Fourier transform, or by a chirped structure that distorts the periodicity slightly. Consequently, the optical circuit has a substantially uniform structure for a wavefront, thereby making it difficult to control the light in the direction perpendicular to the propagation direction (in the direction of the wavefront). For example, an optical circuit disclosed in T. W. Mossberg, "Planar holographic optical processing", Optics Letters, Vol. 26, No. 7, pp. 414-416 (2001) cannot utilize the light that propagates through the optical circuit without reflection as signal light because it spreads in the circuit. In addition, as for a circuit that varies a spot position sharply in a direction perpendicular to the propagation direction, such as a branching circuit, since the optical field must be greatly expanded in the direction perpendicular to the propagation direction, the size of the circuit inevitably becomes large. Furthermore, in the actual circuit design, only a design method is applicable which is nearly equivalent to the design method of a conventional linear grating circuit such as a fiber grating. Thus, the design is limited to a circuit with a strictly periodic structure (that is, an optical circuit depending on the wave number in the propagation direction). This increases the circuit scale, makes the circuit sensitive to the wavelength, and has the input/output positions distributed sequentially in accordance with the wavelengths, thereby presenting a problem of limiting the design to circuits with little flexibility.

On the other hand, optical wavelength division multiplexing communication systems using a plurality of optical wavelengths have been developed actively to increase communication capacity. Such an optical wavelength division multiplexing communication system employs an arrayed waveguide grating type optical multi/demultiplexing circuit as an optical wavelength multi/demultiplexing circuit for multiplexing optical signals with a plurality of wavelengths at a transmitter side, and for demultiplexing the plurality of optical signals propagating through an optical fiber to different ports at a receiver side.

FIG. 1 is a diagram illustrating a configuration of a conventional arrayed waveguide grating type optical multi/demultiplexing circuit (see, for example, K. Okamoto, "Fundamentals of Optical Waveguides", Academic Press (2000)). The circuit comprises on a substrate 100 an input waveguide 101, a first slab waveguide 102, arrayed waveguides 103, a second slab waveguide 104 and output waveguides 105, which are connected in this order.

The light launched into the input waveguide 101 is expanded by the first slab waveguide 102, and is demultiplexed to the arrayed waveguides 103 composed of waveguides configured based on individual wavelengths. Then, the outputs of the arrayed waveguides 103 are multiplexed by the second slab waveguide 104 again to be led to the output waveguides 105. Here, the optical field pattern projected to the end of the first slab waveguide 102 on the side of the arrayed waveguides 103 is basically reproduced (copied) at the end of the second slab waveguide 104 on the side of the arrayed waveguides 103. However, since the arrayed waveguides 103 are designed such that the optical path lengths of their adjacent optical waveguides differ by $\Delta L$, the optical field has an inclination depending on the wavelength of the input light. The inclination causes the positions of the focuses the optical field forms on the end of the second slab waveguide 104 on the side of the output waveguides 105 to be changed for the respective wavelengths, thereby enabling the wavelength demultiplexing.

Such an arrayed waveguide grating type optical multi/demultiplexing circuit has become an indispensable optical component for an optical multiplexing communication system that transmits an optical signal with a plurality of wavelengths through a single optical fiber. In addition, a variety of extended-passband arrayed waveguide grating type optical multi/demultiplexing circuits have been proposed which increase the transmission wavelength bandwidth of the arrayed waveguide grating type optical multi/demultiplexing circuit as shown in FIG. 1.

FIGS. 2A and 2B are diagrams illustrating a configuration of a conventionally proposed extended-passband arrayed waveguide grating type optical multi/demultiplexing circuit (see, for example, K. Okamoto and A. Sugita, "Flat spectral response arrayed-waveguide grating multiplexer with parabolic waveguide horns", Electronics Letters, Vol. 32, No. 18, pp. 1661-1662 (1996)).

As shown in FIG. 2A, the circuit is configured by adding to the circuit as shown in FIG. 1 a parabolic waveguide 106 as illustrated in FIG. 2B, which is placed between the input waveguide 101 and the first slab waveguide 102. In FIG. 2B, z denotes the propagation direction of light.

FIGS. 3A and 3B are diagrams illustrating optical field distribution at an interface between the parabolic waveguide 106 and slab waveguide 102a in the configuration of FIG. 2A, in which z denotes the propagation direction of light, and x denotes the direction of a cross section of the waveguide perpendicular to the z direction. As shown in FIG. 3B, the optical field distribution has a double-peak profile. The double-peak optical field is regenerated at the output waveguide side of the second slab waveguide 104, and is coupled to the output waveguides 105, thereby implementing the extended transmission wavelength band.

The extended-passband arrayed waveguide grating type optical multi/demultiplexing circuit with the above-mentioned conventional configuration, however, has a large chromatic dispersion value due to the phase distribution in the parabolic waveguide as illustrated in FIG. 4. Since the chromatic dispersion provides different delay times to signal spectral components, the conventional extended-passband arrayed waveguide grating type optical multi/demultiplexing circuit with the large chromatic dispersion has a problem of bringing about considerable optical pulse degradation.

DISCLOSURE OF THE INVENTION

The present invention is implemented to solve the foregoing problems. An object of the present invention is to provide an optical (wave) transmission medium for implementing an optical circuit that is smaller in size than an optical circuit using the conventional optical waveguide circuit or plane holographic circuit, that can arrange the input/output of light as flexibly as possible, and that enables sufficiently highly efficient optical signal control even with mild refractive index distribution (with small undulations), thereby implementing a highly efficient, compact waveguide circuit, and providing an arrayed waveguide grating type optical multi/demultiplexing circuit with small chromatic dispersion.

To accomplish the foregoing object, according to a first aspect of the present invention, there is provided a wave transmission medium for outputting incident light that is launched into an input side port (input port) to a desired output side port (output port), said port being defined as a location of a circuit at which a cross section having desired optical input/output is given, the wave transmission medium comprising: a spatial refractive index distribution determined such that the incident light launched into the input port propagates through the wave transmission medium with scattered multiple times, wherein local positions in the wave transmission medium are designated by virtual pixels defined by a virtual mesh; and the spatial refractive index distribution of the wave transmission medium is formed by refractive indices of the individual pixels.

The refractive index distribution of the wave transmission medium can be set such that a phase of a forward propagating field of the incident light launched into the input port matches a phase of a reverse propagating field of emitted light phase conjugation of at individual points of the wave transmission medium.

The refractive indices the pixels can take can be one of a low refractive index ($n_L$) or a high refractive index ($n_H$), and the refractive index distribution can be given by spatially placing pixels with the low refractive index ($n_L$) and pixels with the high refractive index ($n_H$).

The pixels with the low refractive index ($n_L$) can have an existing probability of equal to or less than 30% in a propagation direction of the incident light in the wave transmission medium.

The pixels can take a finite number of refractive indices between a lower limit refractive index and an upper limit refractive index, and the refractive index distribution can be given by spatially placing pixels with the refractive indices selected from among the finite number of refractive indices.

The refractive index distribution can be determined such that the incident light launched into the input port is split to different output port locations at a desired ratio.

The incident light launched into the input port can be wavelength division multiplexed light composed of a plurality of wavelengths, and the refractive index distribution can be determined such that the optical waves are demultiplexed to different output port locations depending on the individual wavelengths of the wavelength division multiplexed light.

The incident light launched into the input port can be wavelength division multiplexed light composed of a plurality of wavelengths, and the refractive index distribution can be determined such that the wavelength division multiplexed light are demultiplexed and split to different output port locations at a desired ratio.

The incident light launched into the input port can be polarization multiplexed light with a TE mode and TM mode, and the refractive index distribution can be determined such that the polarization multiplexed light is demultiplexed to different output port locations depending on individual polarized waves of the polarization multiplexed light.

The incident light launched into the input port can be polarization multiplexed light with a TE mode and TM mode, and the refractive index distribution can be determined such that individual polarized waves of the polarization multiplexed light are demultiplexed and split to different output port locations at a desired ratio.

The wave transmission medium can be composed of a dielectric.

According to a second aspect of the present invention, there is provided a fabrication method of the wave transmission medium in accordance with the present invention, the fabrication method comprising: a first step of obtaining, in the wave transmission medium with an assumed initial refractive index distribution, a field distribution 1 of the incident light and a field distribution 2 resulting from the emitted light virtually transmitted from the output port in a reverse direction; a second step of determining the refractive index distribution such that a phase difference between the field distribution 1 and the field distribution 2 is reduced at the individual points of the wave transmission medium; and a third step of carrying out, at the output port locations, successive approximation of the refractive index distribution by repeating the first step and the second step until an error between the field distribution 1 and the field distribution of the emitted light becomes less than a desired value.

The second step can determine the refractive index distribution by a steepest descent method using individual refractive indices of the pixels as variables.

According to a third aspect of the present invention, there is provided a fabrication method of the wave transmission medium in accordance with the present invention, the fabrication method comprising: a first routine and a second routine for carrying out successive approximation of the refractive index distribution, the first routine including: a first step of obtaining, in the wave transmission medium with an assumed initial refractive index distribution, a field distribution 1 of the incident light and a field distribution 2 resulting from the emitted light virtually transmitted from the output port in a reverse direction; a second step of revising the refractive index distribution such that the phase of the field distribution 2 matches the phase of the field distribution 1 at the locations in the wave transmission medium; a third step of reobtaining the field distribution 2 at the locations using the revised refractive index distribution; a fourth step of redefining the locations as new locations by shifting the locations by a predetermined distance in the reverse propagation direction; and a fifth step of carrying out successive approximation of the refractive index distribution by repeating first to fourth steps, and the second routine including: a sixth step of obtaining, in the wave transmission medium with the assumed refractive index distribution determined in the first routine, a field distribution 1 of the emitted light (incident light) and a field distribution 2 resulting from the emitted light virtually transmitted from the output port in a reverse direction; a seventh step of revising the refractive index distribution such that the phase of the field distribution 1 matches the phase of the field distribution 2 at the locations in the wave transmission medium; an eighth step of reobtaining the field distribution 1 at the locations using the revised refractive index distribution; a ninth step of redefining the locations as new locations by shifting the locations by a predetermined distance in the forward propagation direction; and a tenth step of carrying out successive approximation of the refractive index distribution by repeating sixth to ninth steps.

The second step can use: as the field distribution 2, a field distribution obtained by forwardly transmitting through the refractive index distribution before the successive approximation a field distribution resulting from transmitting the emitted light to an incidence plane through the refractive index distribution before the successive approximation; and as the field distribution 1, a field distribution obtained by reversely transmitting through the refractive index distribution before the successive approximation a field distribution resulting from transmitting the incident light to an emitting plane through the refractive index distribution before the successive approximation.

The fabrication method can further comprise a third routine of repeating the first routine and the second routine sequentially until an error between the field distribution 1 and the emitted light field distribution at the output port locations becomes less than a desired value.

The field distribution 1 and the field distribution 2 can each incorporate reflected light components of the incident light and reverse propagation light through the wave transmission medium.

The initial refractive index distribution can be assumed to be a random distribution.

The incident light launched into the input port can be wavelength division multiplexed light consisting of optical waves with a plurality of wavelengths, or polarization multiplexed light consisting of polarized waves with a TE mode and a TM mode; the successive approximation of the refractive index distribution can be carried out sequentially using the field distribution 2 that is defined for each of the optical waves with the individual wavelengths or for each of the individual polarized waves of the multiplexed light; and the refractive index distribution can be determined such that the optical waves constituting the multiplexed light are demultiplexed to different output port locations at a desired ratio.

According to a fourth aspect of the present invention, there is provided a waveguide circuit that is configured by two-dimensional placement of the wave transmission medium in accordance with the present invention on a substrate.

A multimode interference circuit can be configured using the waveguide circuit.

According to a fifth aspect of the present invention, the following optical circuits are configured using the waveguide circuit in accordance with the present invention.

That is, an optical bending circuit configured using the waveguide circuit in accordance with the present invention; an optical circuit, the refractive index distribution of which is implemented by local refractive index variations of the waveguide circuit based on electrooptic effect; and an optical circuit, the individual refractive indices of the pixels of which are determined such that the light is confined in a direction perpendicular to the substrate.

The virtual mesh can be composed of configuration elements of a unit cell that form the waveguide region in periodic repetition.

The unit lattice can have a quasi-periodic structure.

The pixels can take one of two refractive index values of a high refractive index ($n_H$) and a low refractive index ($n_L$).

The pixels with the high refractive index can have a size equal to or less than a wavelength of the light propagating through the waveguide region.

A value given by the following expression can be equal to or less than 0.1, $$\frac{\lambda q}{\pi n a}$$

where $\lambda$ is the wavelength of the propagation light, n is the refractive index ($n_H$) of the pixels with the high refractive index, a is the height of the pixels with the high refractive index, and q is a coefficient given by $q=(z/a)$ where z is an average distance of radiation components of the field distribution of the propagation light.

The pixels with the high refractive index can have a shape of a polygon with n sides, where n is an integer equal to or greater than three, wherein the pixels can be placed such that the sides each have an inclination with respect to the propagation direction of the light propagating through the waveguide region.

The shape of a polygon can be a square, and an angle of the inclination can be 45 degrees.

The pixels can each have a desired size equal to or greater than the region defined by the virtual mesh, and some of the pixels can be placed at locations deviated from lattice locations defined by the virtual mesh.

The pixels with the high refractive index ($n_H$) can comprise a waveguiding section including a first high refractive index layer and a second high refractive index layer which are stacked sequentially, the second high refractive index layer having a refractive index lower than the first high refractive index layer; and the pixels with the low refractive index ($n_L$) can comprise a waveguiding section composed of the second high refractive index layer, wherein a center of a diameter of the optical field propagating through the waveguiding section of the pixels with the high refractive index ($n_H$) and a center of a diameter of the optical field propagating through the waveguiding section of the pixels with the low refractive index ($n_L$) can be both placed on a same plane parallel to a surface of the substrate.

The waveguide region can be composed of a dielectric material that has an optical loss function or optical amplification function.

The dielectric material can have a complex refractive index depending on the wavelength of light.

The waveguide region can have a structure comprising a first low refractive index layer, a high refractive index layer constituting the waveguide section and a second low refractive index layer, which are stacked sequentially, wherein the light can be confined in the high refractive index layer by the first and second low refractive index layers.

The high refractive index layer can have, on its one of surface, relief-like patterning formed by creating concave portions, wherein the spatial refractive index distribution can be implemented by employing the concave portions as the low refractive index section, and regions other than the concave portions as the high refractive index section.

The relief-like patterning can be formed on both surface of the high refractive index layer.

The relief-like patterns formed on both sides of the high refractive index layer can have patterns different from each other.

The concave portions of the relief-like patterns formed on both sides of the high refractive index layer can have a same depth.

The pixels can be each divided into a plurality of virtual sub-pixels having one of the high refractive index ($n_H$) and the low refractive index ($n_L$), and the refractive index distribution of the pixels can be implemented by arrangement of the sub-pixels with the two refractive indices.

In the pixels, a refractive index difference can be varied over a distance equal to or greater than one wavelength as a rate of change of the refractive index difference, as a rate of spatial change of a propagation constant in the proceeding direction of a wavefront of the propagation light.

The pixels or the sub-pixels can each have a circular cross section in a direction parallel to the substrate.

The pixels or the sub-pixels can each have a cross section with a shape of smoothly varying curve in a direction perpendicular to the substrate.

At least one of the first and second low refractive index layers can be formed by stacking a plurality of layers with different refractive indices.

The optical circuit can consist of an optical circuit with a mutual broadcast delivery/broadcast reception configuration having at least three input/output ports, wherein the spatial refractive index distribution can be established such that phases of signals output from the input/output ports are perpendicular to each other.

The optical circuit can consist of an optical circuit with a mutual broadcast delivery/broadcast reception configuration having at least three input/output ports, wherein the spatial refractive index distribution can be established such that when phases of signals output from the input/output ports are not perpendicular to each other, overlaps of the output signals become minimum.

A branching ratio of the optical circuit can be asymmetric.

The foregoing optical circuits can comprise an amplification function.

The optical circuit can include a plurality of input ports, and be configured such that input optical signals launched into the plurality of input ports are output from a same emitting plane, wherein the spatial refractive index distribution can be established such that the individual optical signals output from the plurality of input ports have their phases adjusted to be aligned with each other, in order to shape a profile of the output optical field.

There is provided an optical circuit having the optical circuit as defined the above placed at an input side slab of an arrayed waveguide grating circuit, wherein mutual phase differences between the plurality of input ports are given by circuit lengths of the optical waveguides of said optical circuit; and a repetition period (free spectrum range) of the phase differences given by the circuit lengths of said optical waveguides agrees with a wavelength spacing of outputs of said arrayed waveguide grating circuit, and centers of fields of the outputs of said optical circuit vary periodically to cancel out chromatic dispersion characteristics of said arrayed waveguide grating circuit periodically at the wavelength spacing of the outputs.

The spatial refractive index distribution can be established such that it implements a field profile and phase distribution that enable spot size conversion of the output light.

According to a sixth aspect of the present invention, there is provided an arrayed waveguide grating type optical multi/demultiplexing circuit configured using the waveguide circuit in accordance with the present invention, the arrayed waveguide grating type optical multi/demultiplexer comprising: an input waveguide, a first slab waveguide, arrayed waveguides, a second slab waveguide and output waveguides, which are connected sequentially on a planar substrate; and a plurality of scattering points with a refractive index higher than a refractive index of the input waveguide, the scattering points being placed in a connecting region between the input waveguide and the first slab waveguide.

The scattering points can be disposed such that an optical field distribution formed at an output end of the input waveguide has an iso-phase wavefront without distortion, and an amplitude with double peaks.

The scattering points can have in the input waveguide a two-dimensional configuration that has nearly line symmetry with respect to a line extending to the propagation direction of light.

The scattering points can each have a side equal to or greater than 0.2 µm.

The planar substrate can consist of a silicon substrate, and the optical waveguides can consist of silica-based glass optical waveguides.

According to the present invention, the optical (wave) transmission medium is provided that is smaller in size than the conventional optical circuit using the optical waveguide circuit or plane holographic circuit; that can set up the optical input/output as flexibly as possible; and that implements a waveguide circuit enabling highly efficient optical signal control even with a mild refractive index distribution (small undulations of the refractive index difference). Thus, it can implement a highly efficient, compact optical circuit.

In addition, the arrayed waveguide type optical multi/demultiplexer in accordance with the present invention has a plurality of scattering points placed in the input waveguide in accordance with the spatial refractive index distribution. Thus, it controls the phase and intensity of the propagation light simultaneously, thereby being able to provide a low dispersion arrayed waveguide type optical multi/demultiplexer that can reduce the chromatic dispersion.

BRIEF DESCRIPTION OF THE DRAWINGS

FIGS. 5A-5C are diagrams illustrating a basic concept and basic structure underlying a wave transmission medium in accordance with the present invention;

FIGS. 9A and 9B are diagrams illustrating setups in the optical circuit design in an embodiment 1;

FIGS. 11A-11C are diagrams illustrating an optical circuit of the embodiment 1, which has a refractive index distribution like a planar optical wave circuit, and enables optical confinement in the direction perpendicular to a substrate;

FIG. 21A is a diagram illustrating setups of input/output pairs of the optical circuit of an embodiment 6;

FIG. 21B is a graph illustrating setups of a 1.55 µm emitted field distribution of the optical circuit of the embodiment 6;

FIG. 21C is a graph illustrating transmission loss spectra of the output light when launching input light into a port a of the optical circuit of the embodiment 6;

FIG. 21D is a graph illustrating transmission loss spectra of the output light when launching input light into a port b of the optical circuit of the embodiment 6;

FIG. 34A illustrates an optical circuit in which pixels according to Embodiment 15 are arranged in the light propagation direction;

FIG. 34B illustrates an optical circuit in which pixels according to Embodiment 15 are arranged tilted with respect to the light propagation direction;

FIG. 46 illustrates a loss characteristic (transmittance) of each (1×2) branch circuit of 1.31 µm/1.55 µm having the structure shown in FIGS. 45A to 45C;

FIG. 52A is a conceptual diagram to illustrate an effective refractive index distribution in a unit pixel when a pixel is circle-shaped;

FIG. 52B and FIG. 52C are top conceptual views of part of a circuit constructed using circular pixels;

FIG. 64A illustrates an iso-phase wavefront of an outgoing radiation field from a waveguide in a conventional configuration;

FIG. 64B illustrates an iso-phase wavefront of an outgoing radiation field from a waveguide in a circuit configuration of the present invention;

BEST MODE FOR CARRYING OUT THE INVENTION

Figure 1:
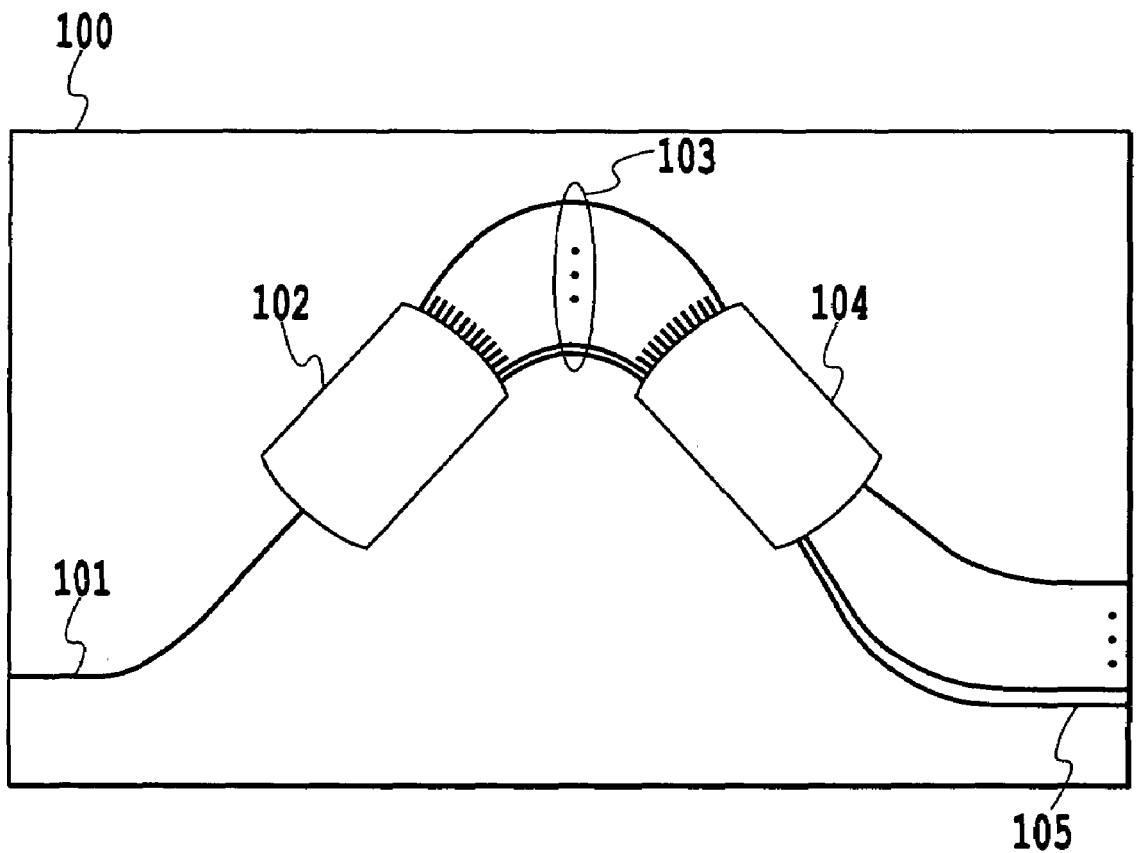
FIG. 1 is a diagram illustrating a configuration of a conventional arrayed waveguide grating type optical multi/demultiplexing circuit.

The embodiments in accordance with the invention will now be described with reference to the accompanying drawings, in which the components having the same or like functions are designated by the same reference numerals, and their duplicate description will be omitted. In addition, the same reference numeral can designate the input light and input port, or the output light and output port at the same time.

[BASIC CONCEPT: Basic Concept of Wave Transmission Medium in Accordance with Present Invention]

The basic concept of the wave transmission medium in accordance with the present invention will now be described. For simplicity's sake, it is assumed in the following description that the "wave" propagating through the wave transmission medium is "light", and that the wave transmission medium is used as an optical circuit. The theory on which the present invention is based, however, specifies the characteristics of the medium according to general wave equations, and hence holds true for general waves in principle. Therefore the present invention is applicable not only to media in general that can transmit "electromagnetic waves" in a broad sense by multiple scattering, but also to electron waves that can neglect the many-body effect or to electron waves that has coherence macroscopically. Accordingly, although a wave signal that has coherence such as laser light is referred to as an optical signal in the following description, the wave signal can include other signals such as electromagnetic waves or electron waves besides the optical signal.

Furthermore, the wave transmission medium in accordance with the present invention is not only applicable to optical circuits in a narrow sense, but also widely usable as components of demultiplexers or multiplexers as well as components of holographic optical devices such as holographic filters and holographic lenses. Consequently, the term "optical circuit" is used to facilitate understanding of the characteristics of the wave transmission medium in accordance with the present invention, and hence can be assumed to refer to the wave transmission medium itself (or waveguide circuits in general) as well.

In the following description, the term "refractive index" specifies one of the properties of the wave transmission medium. The term "refractive index" means to the letter a ratio of refracting a wave (ratio of deflecting the direction of a plane wave) in the propagation of an ordinary plane wave, thereby specifying one of the properties of the medium for the wave signal. For example, it is mainly determined by a dielectric constant for the optical signal, and by an electric field or magnetic field for the electron wave signal physically.

Furthermore, the wave transmission medium in accordance with the present invention can also be called "holographic" wave transmission medium. In this case, the term "holographic" wave transmission medium means that the global holographic control of the entire circuit based on the wave transmission medium is carried out by the local holographic control and its collection (multiple scattering controlled). More specifically, to output a desired optical pattern by inputting a coherent optical pattern, the wave transmission medium in accordance with the present invention implements the global holographic control by placing refractive indices such that the phase difference between the forward propagation light and reverse propagation light propagating through the medium becomes small all over the medium, and by repeating local holographic control multiple times.

FIGS. 5A-5C are diagrams illustrating a basic concept and basic structure of the wave transmission medium in accordance with the present invention. First, technical terms will be described with reference to FIG. 5A. The reference numeral 1 of FIG. 5A designates an optical circuit substrate, and 1-1 designates a design region of an optical circuit comprising the wave transmission medium in accordance with the present invention. A first end face of the optical circuit constitutes an incidence plane 2-1 onto which input light 3-1 is launched. The input light 3-1 propagates through the optical circuit, which is composed of the wave transmission medium and has spatial refractive index distribution, with repeating multiple scattering, and is output from a second end face constituting an emitting plane 2-2 as output light 3-2. It is assumed in the present embodiment that the wave transmission medium is composed of a dielectric, and that the spatial refractive index distribution is implemented by setting the local refractive indices of the dielectric constituting the medium according to a theory that will be described later.

The "field" (input field) formed by the input light 3-1 is modulated in accordance with the spatial distribution of the refractive index of the wave transmission medium constituting the optical circuit, and is converted to the "field" (output field) formed by the output light 3-2. In other words, the wave transmission medium in accordance with the present invention is an (electromagnetic) field converter for correlating the input field with the output field according to the spatial refractive index distribution. As for the input field and output field, the optical field in a cross section (cross section along the x axis of FIG. 5A) perpendicular to the propagation direction (the direction of the z axis of FIG. 5A) in the optical circuit is called a (forward) propagation image (propagation field or propagation light) at the location (x,z) (see, FIG. 5B). The coordinates z in FIG. 5A are coordinates in the propagation direction of light, where z=0 is the incidence plane and $z=z_e$ is the emitting plane. On the other hand, the coordinates x are coordinates in the horizontal direction perpendicular to the propagation direction of light.

The term "field" generally refers to an electromagnetic field or vector potential field of the electromagnetic field. The control of the electromagnetic field in the present embodiment corresponds to consider the spatial refractive index distribution in the optical circuit, that is, the distribution of the dielectric constant. Although the dielectric constant is given by a tensor, its scalar wave approximation using only one component of the electromagnetic field usually gives a good approximation because the transition between polarization states is rather small. Accordingly, the present specification handles the electromagnetic field as a complex scalar wave. Since the optical "state" includes an energy state (wavelength) and a polarization state, using the "field" to represent the optical state, it contains the optical wavelength and polarization state at the same time.

As for the optical circuit that does not make any amplification nor attenuation of the propagation light, specifying the spatial distribution of the refractive index determines the image of the input light 3-1 (input field) corresponding to the image of the output light 3-2 (output field) uniquely except for the focus. Such an optical field from the emitting plane 2-2 side to the incidence plane 2-1 side is referred to as a reverse propagation image (reverse propagation field or reverse propagation light) (see, FIG. 5C). Such a reverse propagation image can be defined for each location in the optical circuit. In other words, when considering the optical field at an arbitrary location in the optical circuit, it is possible to assume the reverse propagation image for the image of the output light 3-2 at that location by considering the location as a virtual starting point of the "input light". In this way, the reverse propagation image can be defined for each location of the optical circuit. As for a single optical circuit, in particular, if the emitted field constitutes the propagation field of the incident field, the propagation field agrees with the reverse propagation field at any points of the optical circuit. Incidentally, although the field is usually a function defined on the entire target space, the term "incident field" or "emitted field" means a cross section of the field on the incidence plane or emitting plane. Likewise, as for the term "field distribution", when a particular cross section is discussed, it means the cross section of the field.

To explain a decision method of the refractive index distribution, the following symbols are used to represent individual quantities because the symbols give better prospects. Here, since the light (field) is not limited to single state light in the present invention, the individual states are represented in general by attaching affixes j to the light to represent light composed of the superposition of light with a plurality of states.

$\psi^j(x)$: jth incident field (complex vector-valued function, which is determined by the intensity distribution and phase distribution specified on the incidence plane, and by the wavelength and polarization).

$f^j(x)$: jth emitted field (complex vector-valued function, which is determined by the intensity distribution and phase distribution specified on the emitting plane, and by the wavelength and polarization).

As for $\psi^j(x)$ and $f^j(x)$, the sum total of their optical intensities is the same (or has only a negligible loss) as long as no intensity amplification, wavelength conversion or polarization conversion is carried out in the circuit, and their wavelength and polarization are the same. Consequently, $\{\psi^j(x), f^j(x)\}$: an input/output pair (a pair of the input/output fields), which is determined by the intensity distribution and phase distribution and by the wavelength and polarization on the incidence plane and emitting plane.

$\{n_q\}$: refractive index distribution (a set of values all over the optical circuit design region).

Since the optical field is determined when a set of refractive index distributions is provided to the given incident field and emitted field, it is necessary to consider the field for the entire refractive index distribution given by qth iterative calculation. Although the entire refractive index distribution can be represented by $n_q(x, z)$, where (x, z) are indefinite variables, it is represented by $\{n_q\}$ to distinguish it from the value $n_q(x, z)$ of the refractive index at the location (x, z).

$n_{core}$: a symbol representing a value of the refractive index of a region such as a core of an optical waveguide, which is higher than the refractive index in the surroundings.

$n_{clad}$: a symbol representing a value of the refractive index of a region such as a cladding of an optical waveguide, which is lower than $n_{core}$.

$\psi^j(z, x, \{n_q\})$: the value of the field at the location (x, z) when the jth incident field $\psi^j(x)$ propagates through the refractive index distribution $\{n_q\}$ to z.

$f^j(z, x, \{n_q\})$: the value of the field at the location (x, z) when the jth emitted field $f^j(x)$ reversely propagates through the refractive index distribution $\{n_q\}$ to z.

The decision method of the refractive index distribution in the present embodiment provides a method of obtaining such $\{n_q\}$ that can implement the state in which $\psi^j(z_e, x, \{n_q\})=f^j(x)$ holds for all j or a state close to that state.

The terms "input port" and "output port" mean a "region" in which the fields on the incident end face and emitted end face are concentrated, and to which an optical fiber can be connected to enable the optical intensity to propagate through the fiber. As for the intensity distribution and phase distribution of the field, it is possible to design such that the jth and kth of them have different values. Thus, the incident end face and emitted end face can each include a plurality of ports. Furthermore, considering a pair of the incident field and emitted field, the phase caused by the propagation between them can vary depending on the optical frequencies. Accordingly, as for the light with different frequencies, that is, the light with different wavelengths, it is possible to establish different ports regardless of whether the field profile including the phase is identical or perpendicular to each other. As for the symbols, capital letters A, B, C, . . . are assigned to the incident port side, and small letters a, b, c, . . . are assigned to the emitting port side.

Other letters such as a, γ, g and w are appropriate coefficients for numerical calculations, and the orders of magnitude of them will be mentioned in the following description. For example, they are subjected to fine adjustment in actual numerical calculations according to "Discussion on scheme stability" used in ordinary numerical hydrodynamics.

The propagation direction is represented by z, and the direction perpendicular to the propagation direction is represented by x. The value z is zero on the incidence plane 2-1 and $z_e$ on the emitting plane 2-2. As will be described later, sequential numbers are assigned to distinguishable optical states of interest. In this case, the jth incident field and the desired emitted field corresponding to it are designated by $\psi^j(x)$ and $f^j(x)$, respectively. It is assumed here that the electromagnetic field is a real number vector-valued field, and has the wavelength polarization state as parameters. The components of the electromagnetic field are represented by a complex number that can be handled easily mathematically to denote the roots of the electromagnetic waves. In addition, it is assumed in the following calculations that the intensity of the entire field is normalized to one. The jth incident field and emitted field mean optical pair components that are sequentially numbered and have attributes distinguishable by the intensity distribution and phase distribution of the field, or by the wavelength or polarization.

As illustrated in FIGS. 5B and 5C, concerning the jth incident field $\psi^j(x)$ and output field $f^j(x)$, the propagation field and reverse propagation field are denoted by $\psi^j(z, x, \{n\})$ and $f^j(z, x, \{n\})$ as complex vector-valued functions of the location. Since the values of the functions vary depending on the refractive index distribution $\{n\}$, the refractive index distribution $\{n\}$ becomes a parameter. According to the definition of the symbols, $\psi^j(x)=\psi^j(0, x, \{n\})$, and $f^j(x)=f^j(z_e, x, \{n\})$. The values of the functions can be easily calculated by a known method such as a beam propagation method when the incident field $\psi^j(x)$, emitted field $f^j(x)$ and refractive index distribution $\{n\}$ are given. The behavior of the individual fields will be described below by way of example of more concrete example.

Figure 6:
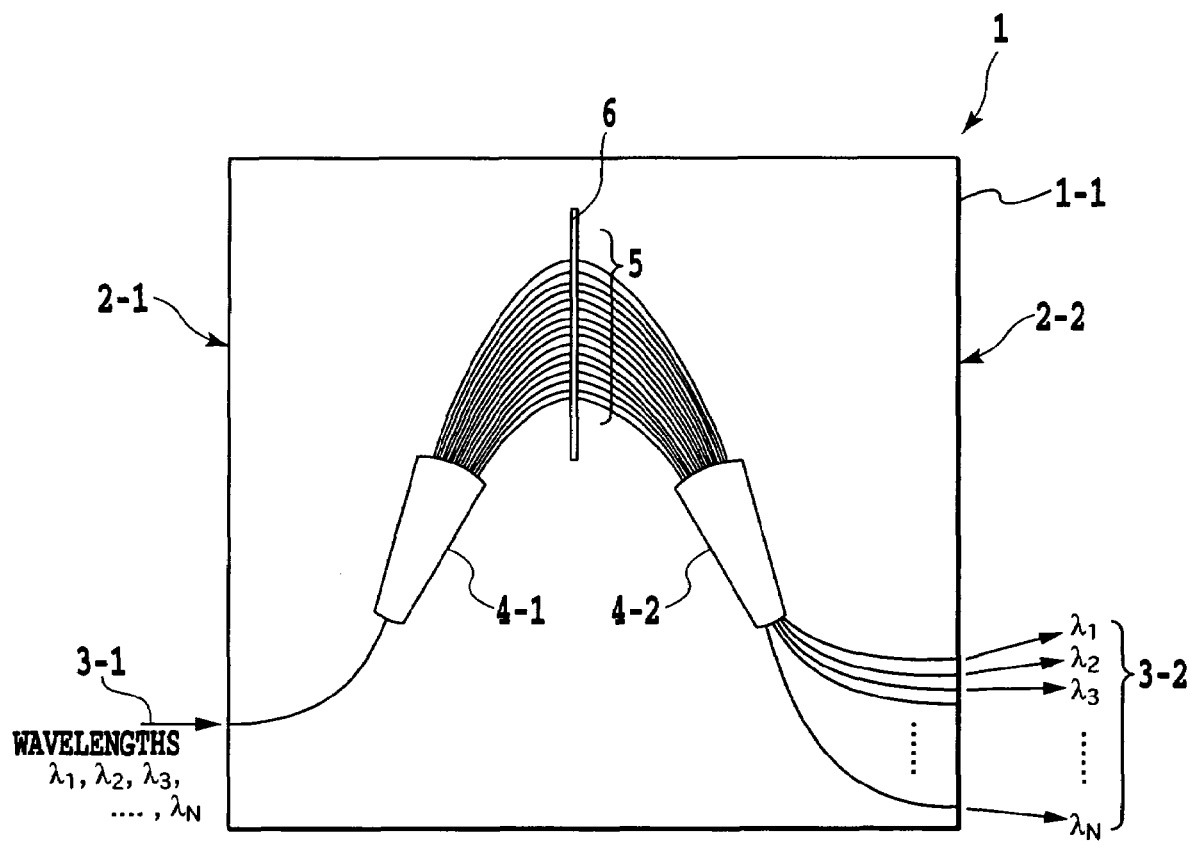
FIG. 6 is a diagram illustrating a configuration of a conventional arrayed waveguide grating circuit.

FIG. 6 is a diagram illustrating a configuration of a conventional arrayed waveguide grating circuit. In the optical circuit design region 1-1, are formed arrayed waveguides 5 between two star couplers (optical multi/demultiplexers) 4-1 and 4-2 and a wave plate 6 inserted into the center of the arrayed waveguides 5. Consider a 1×N wavelength demultiplexer in the wavelength division multiplexing communication as illustrated in FIG. 6, where N is the number of the wavelengths. For example, consider a case where N different signals, which have incident fields with substantially equal field intensity and phase distribution, and have numbered wavelengths $\lambda_1, \lambda_2, \lambda_3, \ldots,$ and $\lambda_N$, are launched into a single input port 3-1, and the light with the jth wavelength is output from a desired output port 3-2. In this case, to demultiplex the light, it is necessary for the optical intensity and phase distribution of the jth wavelength on the cross section of the emitting plane of the waveguide to have an independent emitted field pattern, which is called a jth emitted field. Consider the case where the demultiplexed light is output from the optical fiber. In this case, the field patterns to be output consist of a set of fields, in which the independent individual emitted fields have spatially different locations. Incidentally, to configure an optical circuit for outputting a given set of incident fields at desired emitted fields, the pattern of the incident fields or emitted fields may have the same intensity and phase distribution at the jth and kth wavelengths.

A general algorithm for determining the spatial refractive index distribution will be described below.

Figure 7:
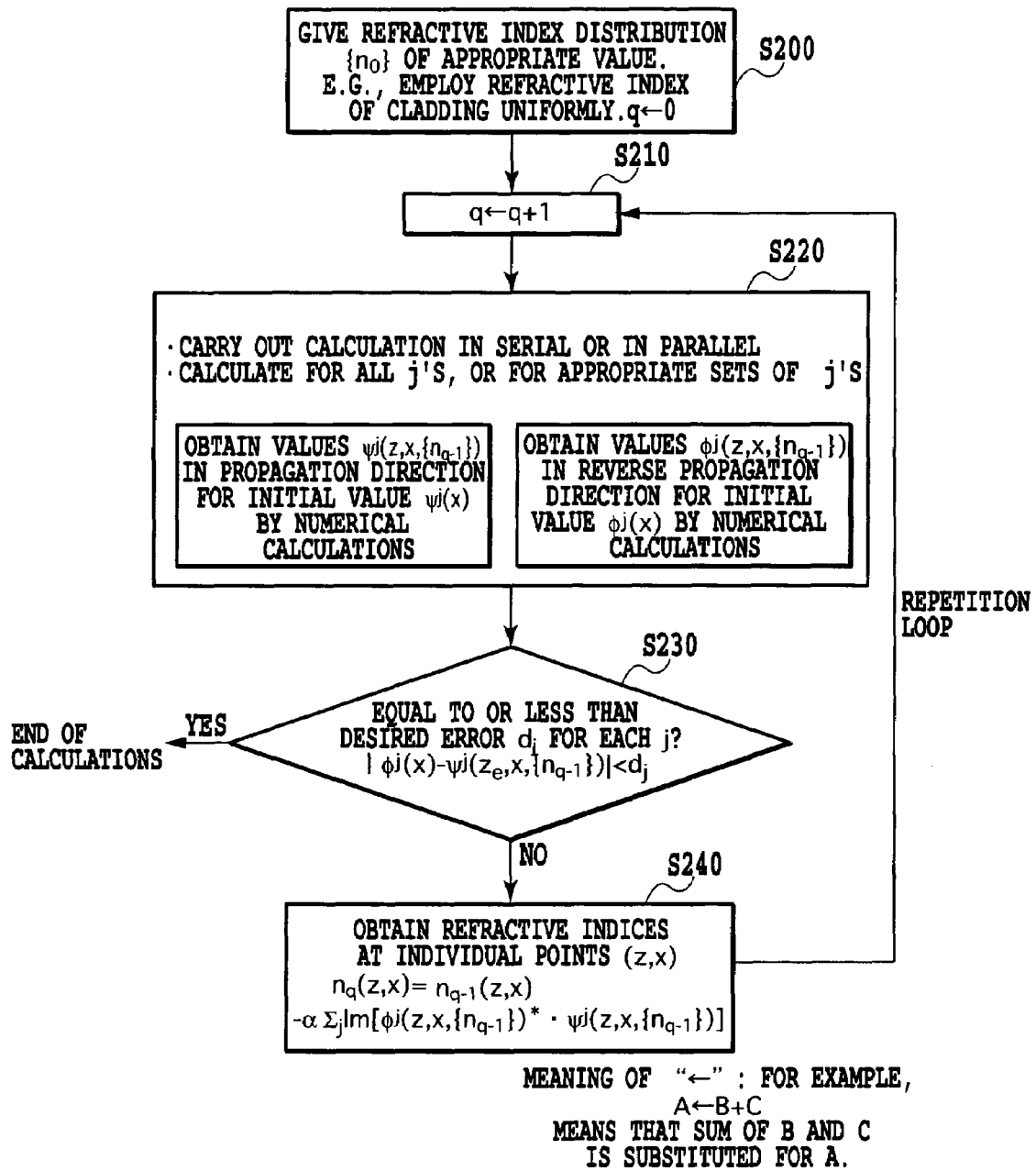
FIG. 7 is a flowchart illustrating a calculation procedure for determining a spatial refractive index distribution in the wave transmission medium in accordance with the present invention.

FIG. 7 is a flowchart illustrating a calculation procedure of determining the spatial refractive index distribution of the wave transmission medium in accordance with the present invention. Since the calculation is carried out repeatedly, the number of repetitions is denoted by q. FIG. 7 illustrates the procedure of the qth calculation carried out when the calculation up to the (q−1)th calculations have been completed.

From the refractive index distribution $\{n_{q-1}\}$ obtained by the (q−1)th calculation, the propagation field and reverse propagation field as to the jth incident field $\psi^j(x)$ and emitted field $f^j(x)$ are calculated by the numerical calculations, and the results are denoted as $\psi^j(z, x, \{n_{q-1}\})$ and $f^j(z, x, \{n_{q-1}\})$, respectively (step S220).

Then, the refractive indices $n_q(z, x)$ at individual locations (z, x) are calculated from the results by the following expression (step S240).

$$n_q(z, x) = n_{q-1}(z, x) - aS_j \text{Im}[f^j(z, x, \{n_{q-1}\})^* \cdot \psi^j(z, x, \{n_{q-1}\})] \quad (1)$$

where the symbol "·" in the second term on the right side denotes an inner product, and Im[ ] denotes the imaginary part of the result of the field inner product within the brackets [ ]. In addition, the symbol "*" denotes a complex conjugate. The coefficient a is a value obtained by dividing a number less than a fraction of $n_q(z, x)$ by the number of sets of the field, which is a positive small value. The symbol $S_j$ denotes the sum with respect to the affix j.

If the absolute value of the difference between the value $\psi^j(z_e, x, \{n\})$ of the propagation field on the emitting plane and the emitted field $f^j(x)$ becomes less than a desired error $d_j$ by repeating the steps S220 and S240 (YES at step S230), the calculations are completed.

The ground for obtaining the refractive index $n_q(z, x)$ according to the foregoing expression (1) is as follows, which corresponds to calculating the refractive index distribution by the steepest descent method.

First, in order to minimize the difference between the field $\psi^j(z_e, x, \{n_{q-1}\})$ resulting from the incident light propagating through the refractive index distribution $\{n_{q-1}\}$ and the finally desired output $f^j(x)$, the residual $R=S_j|f^j(x)-\psi^j(z_e, x, \{n^{q-1}\})|^2$ must be minimized, where $f^j(x)$ or the like represents a function of x rather than a coordinate of a particular x. Although the individual pairs can be assigned different weights, the same weight is used to calculate the sum for simplicity's sake.

Here, a superposable region of the optical fields is considered, and the inner product is defined by the overlap integral of the field. The superposition of the optical fields has finite energy, and the field to be handled is limited to a spatially finite range. Accordingly, the field mentioned here constitutes a Hilbert space, and the optical propagation is defined by a unitary transformation having the following properties.

More specifically, the following expression holds:

$$\psi^j(z, x, \{n_{q-1}\}) = U(z, z_0, \{n_{q-1}\})\psi^j(z_0, x, \{n_{q-1}\}) \quad (2)$$

where U is a unitary operator from $z_0$ to z. If it is assumed here that the reflection is negligible, the following expression is obtained because of the additivity of the propagation process.

$$U(z, z_0, \{n_{q-1}\}) = U(z, z_1, \{n_{q-1}\})U(z_1, z_0, \{n_{q-1}\}) \quad (3)$$

Furthermore, because it has unitarity for the inner product defined by the overlap integral, the following expression holds:

$$U(z, z_0, \{n_{q-1}\})^* U(z, z_0, \{n_{q-1}\}) = U(z, z_0, \{n_{q-1}\})^{-1} U(z, z_0, \{n_{q-1}\}) \quad (4)$$
$$= |U(z, z_0, \{n_{q-1}\})|^2$$
$$= 1$$

where $U(z, z_0, \{n_{q-1}\})^*$ is a self-adjoint operator of the operator $U(z, z_0, \{n_{q-1}\})$, and $U(z, z_0, \{n_{q-1}\})^{-1}$ is an inverse operator of $U(z, z_0, \{n_{q-1}\})$, that is, an operator that gives propagation in the reverse direction.

Within a range where the difference |z'−z| between z' an z is small enough, $U(z', z, \{n_{q-1}\})$ can be considered as a matrix that provides transformation of just one step in the beam propagation method, and $U(z, z_0, \{n_{q-1}\})$ and the like can be considered to be obtained by dividing the propagation direction appropriately and by repeating the operation.

Rewriting the residual R using the foregoing results gives:

$$R = S_j|f^j(x) - U(z_e, z', \{n_{q-1}\})U(z', 0, \{n_{q-1}\})\psi^j(x)|^2 \quad (5)$$
$$= S_j|U(z_e, z', \{n_{q-1}\})|^2|U(z_e, z', \{n_{q-1}\})^{-1}f^j(x) -$$
$$U(z', 0, \{n_{q-1}\})\psi^j(x)|^2$$
$$= S_j|U(z_e, z', \{n_{q-1}\})^{-1}f^j(x) -$$
$$U(z', z, \{n_{q-1}\})U(z, 0, \{n_{q-1}\})\psi^j(x)|^2$$
$$= S_j|f^j(z', x, \{n_{q-1}\}) - U(z', z, \{n_{q-1}\})\psi^j(z, x, \{n_{q-1}\})|^2$$

The variation $(d_x U(z', z, \{n_{q-1}\}))$ of $U(z', z, \{n_{q-1}\})$ at a particular location x on the x coordinate has the following relationship with the variation $(d_x n_{q-1}(z, x))$ of $n_{q-1}(z, x)$ at the particular location x on the x coordinate at the limit of $|z'-z|\to 0$.

$$d_x U(z', z, \{n_{q-1}\}) = -i\kappa d_x n_{q-1}(z, x) \quad (6)$$

where $\kappa$ is a positive coefficient with a value of an order of the propagation constant in vacuum. Since it is combined with other coefficients in the calculation, it will not be described here in more detail.

From the foregoing results, the variation $(d_x R)$ of the residual R at the particular location x on the x coordinate, the following expression is obtained.

$$d_x R = S_j\{-i\kappa dn_{q-1}(z,x)f^j(z',x,\{n_{q-1}\})^*\psi^j(z,x,\{n_{q-1}\}) + c.c.\} \quad (7)$$
$$= 2\kappa dn_{q-1}(z,x)\text{Im}[S_j f^j(z',x,\{n_{q-1}\})^*\psi^j(z,x,\{n_{q-1}\})]$$

In this case, if the following expression holds, $$dn_{q-1}(z,x) = -a\text{Im}[S_j f^j(z',x,\{n_{q-1}\})^*\psi^j(z,x,\{n_{q-1}\})]$$
$$(a>0) \quad (8)$$

$d_x R < 0$ is obtained, which means that the variation in this direction leads toward a local minimum. This is the reason for varying the refractive index distribution in the direction of the foregoing expression (1).

In the foregoing calculation, the initial value $\{n_0\}$ of the refractive index distribution can be set at an appropriate value. However, the closer the initial value $\{n_0\}$ to the expected refractive index distribution, the faster the calculation converges (step S200). Furthermore, as for the calculation of $f^j(z, x, \{n_{q-1}\})$ and $\psi^j(z, x, \{n_{q-1}\})$ for the individual j, a computer capable of carrying out parallel calculations can calculate them for each j (for each $f^j(z, x, \{n_{q-1}\})$ and $\psi^j(z, x, \{n_{q-1}\})$), thereby being able to improve the efficiency of the calculation using a cluster system or the like (step S220). In addition, when the computer includes a comparatively small memory, it can select appropriate affixes j for the individual q in the sum with respect to j in the foregoing expression (1), calculate only $f^j(z, x, \{n_{q-1}\})$ and $\psi^j(z, x, \{n_{q-1}\})$ only for the affixes j selected, and repeat the subsequent calculations (step S220).

In the operation above, if the value $f^j(z, x, \{n_{q-1}\})$ and the value $\psi^j(z, x, \{n_{q-1}\})$ are close to each other, the term $\text{Im}[f^j(z, x, \{n_{q-1}\})^* \cdot \psi^j(z, x, \{n_{q-1}\})]$ in expression (1) takes a value corresponding to the phase difference so that reducing its value can provide the desired output.

Figure 8:
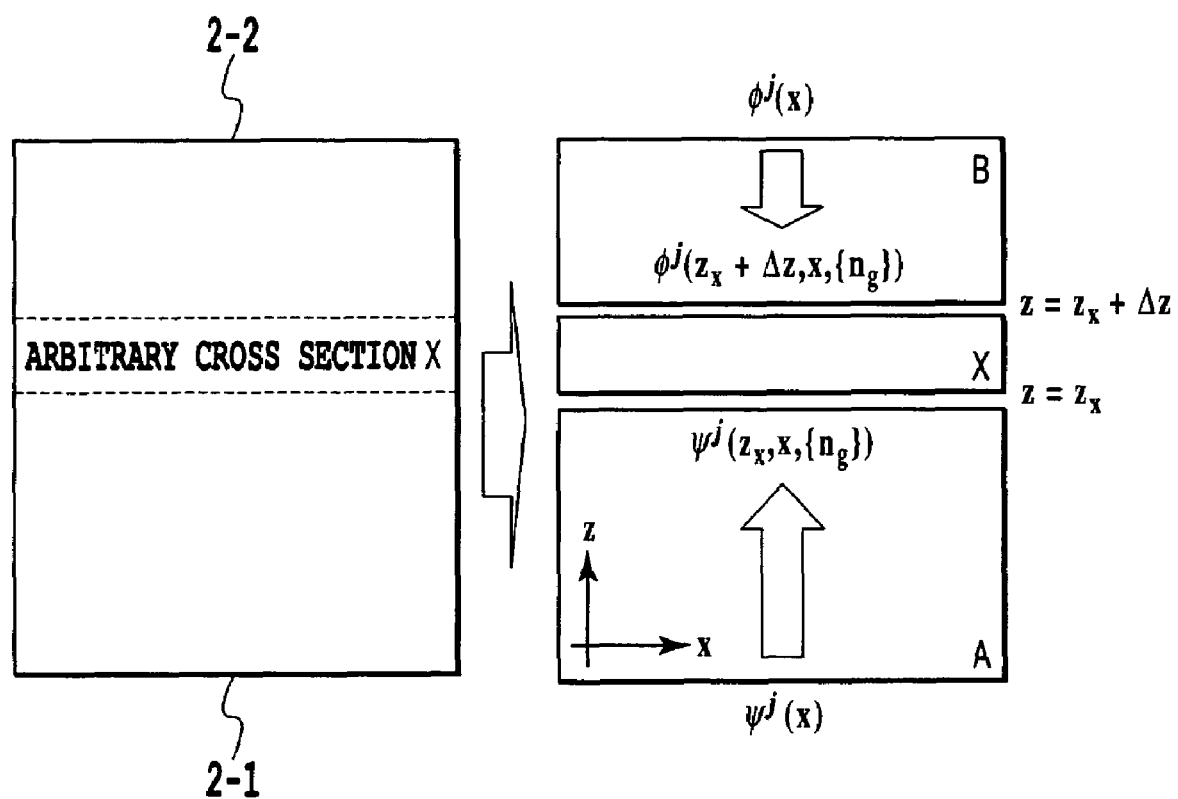
FIG. 8 is a diagram illustrating an example of a field in the wave transmission medium to facilitate understanding of the calculation procedure.

FIG. 8 is a diagram illustrating the behavior of a field in the wave transmission medium to facilitate understanding of the above-mentioned calculation procedure. At any given position (x, z) in the optical circuit design region 1-1 composed of the wave transmission medium in accordance with the present invention, a minute region is assumed which is substantially parallel to the wavefront of the propagating light, and has a substantially negligible width ($\Delta z$). The cross section of the minute region is called X. The term "substantially negligible width" refers to such a distance that when the light propagates across the distance $\Delta z$ through the medium without the refractive index distribution, the propagation light has substantially the same phase as that of the previous wavefront. The cross section X constitutes an interface between an A circuit and a B circuit, where the A circuit is an optical circuit on the side of the incidence plane 2-1 with respect to the cross section X, and the B circuit is an optical circuit on the side of the emitting plane 2-2.

Consider desired sets of input/outputs, and assume that the individual sets are each assigned a number from j=1 to N, and jth set has the incident field $\psi^j(x)$ and emitted field $f^j(x)$. When the incident field $\psi^j(x)$ is input to the A circuit and transmitted through the circuit, the sum of the individual fields of the guided wave, diffraction wave and scattered wave at the interface X is the field $\psi^j(z_x, x, \{n_q\})$. In addition, as for the emitted field $f^j(x)$ propagating through the B circuit in the opposite direction as the optical phase conjugate of the light propagating through the A circuit, the sum of the fields of the guided wave, diffraction wave and scattered wave of the emitted field $f^j(x)$ is the field $f^j(z_x+\Delta z, x, \{n_q\})$. Subsequently, the average value (or weighted average value) P of the phase differences between the field $\psi^j(z_x, x, \{n_q\})$ and the field $f^j(z_x+\Delta z, x, \{n_q\})$ are calculated for the individual sets, and the refractive index distribution on the interface X is determined such that the phase difference P is canceled as much as possible in the range of the desired refractive index. Since such refractive index distribution is determined for each interface X, the refractive index distribution of the entire wave transmission medium can be determined by carrying out the operation with varying the position of the interface X from zero (incidence plane) to $z_e$ (emitting plane) on the z axis.

The determination of the spatial distribution of refractive index in accordance with the present invention can be expressed in different words that it covers the wave transmission medium with a virtual mesh, and decides the refractive index for each minute region (pixel) provided by the mesh. Although such local refractive indices can each take a desired value location by location in principle, the simplest system consists of pixels with a low refractive index ($n_L$) and pixels with a high refractive index ($n_H$), and the spatial distribution of the two types of the pixels decides the entire refractive index distribution. In this case, it is possible to consider the locations in which the low refractive index pixels in the medium are present as the interstices of the high refractive index pixels, or reversely to consider the locations in which the high refractive index pixels in the medium are present as the interstices of the low refractive index pixels. In other words, the wave transmission medium in accordance with the present invention can be expressed as the medium with a uniform refractive index, the desired locations (pixels) of which are replaced by the pixels with different refractive index.

The operation for deciding the refractive index distribution described above is summarized as follows. The medium (dielectric in the case of light) enabling the holographic wave transmission is provided with an input port and output port, and the numerical calculations are used to obtain the field distribution 1 of the propagation light that is launched into the input port (forward propagation light) and the field distribution 2 of the phase conjugate light (reverse propagation light). The reverse propagation light is achieved by reversely transmitting from the output port side the output field that is expected to be output when the optical signal launched into the input port is output from the output port. Then, the spatial refractive index distribution in the medium is obtained from the field distributions 1 and 2 such that the phase difference between the propagation light and the reverse propagation light is canceled at individual points (x, z). Employing the steepest descent method as a method of calculating the refractive index distribution can reduce the difference between the two fields by varying the refractive index according to expression (1) by varying the refractive index in the direction obtained by the steepest descent method using the refractive indices of the individual points as variables. Then, applying such a wave transmission medium to an optical component that emits the light launched into the input port from a desired output port can increase the effective optical path length by the interference due to the multiple scattering caused between the propagating waves in the medium, thereby being able to configure an optical circuit with high optical signal controllability even with mild refractive index variation (distribution).

Optical circuits configured using the foregoing wave transmission medium will now be described below by way of embodiments. Unless otherwise noted, it is assumed in the following embodiments that optical circuits have the same refractive index distribution as a silica-based buried optical waveguide formed on a substrate in the vertical direction of the substrate, and that the thickness of the optical circuit (layer thickness) is approximately equal to that of the single mode optical waveguide. Furthermore, the substrate consists of a silicon substrate. Then, a layer, the refractive index of which is regulated by adding dopants to the silica, is deposited on the substrate, and the pattern of the optical circuit is formed by the microprocessing used in the fabrication process of the semiconductor. Thus, the pattern of the optical circuit is two-dimensional, and is formed in the horizontal direction of the substrate to achieve the function of the optical circuit.

However, when the circuit, which includes the high refractive index section and low refractive index section, is formed on the substrate two-dimensionally, and if the low refractive index section is simply assumed to have no region corresponding to the core of the optical waveguide, a loss occurs in the optical circuit. Accordingly, it need scarcely be said that the optical circuit must be designed considering the vertical direction of the substrate even though the optical circuit itself is two-dimensional.

As described above, the optical circuit in accordance with the present invention is fabricated by applying the semiconductor microprocessing. Accordingly, the refractive index distribution of the optical circuit has a binary pattern unless otherwise noted. In the pattern on the substrate, a region with a high refractive index is called a high refractive index section, and a region with a low refractive index is called a low refractive index section. In addition, since the refractive index variation is given by the deposition of the layer whose refractive index is regulated, a region with a high refractive index in the vertical direction of the substrate is referred to as a high refractive index layer, and a region with a low refractive index is called a low refractive index layer. In the case where no special problem is present, the high refractive index section is called a "core", and the low refractive index section is called a "cladding" in accordance with the custom of the optical waveguide structure. Furthermore, to discuss a pattern in a horizontal plane on the substrate, the basic unit of the pattern is called a "pixel", and a set of the "pixels" combined in a block constitutes a macro pattern. In the simplest case, the pixels are placed on periodic lattice points with a pixel size which are determined by a virtual mesh, and the high refractive index section and the low refractive index section constitute the pattern. It is not necessary, however, to place the pixels on the lattice points. For example, they can be placed intentionally on points displaced from the lattice points to achieve the desired refractive index distribution.

EMBODIMENT 1

As for the so-called step-index optical circuit, it is not self-evident as to whether an optical circuit can be designed according to the foregoing expression (1) because the value the refractive index can take is limited. However, even in the case where the value the refractive index can take is limited, it is possible to adjust the optical phase globally by repeating adjustment of the local refractive indices. Therefore it is possible to design the optical circuit by assuming a steplike refractive index distribution that has an upper limit of the refractive index of the dielectric constituting the optical circuit and a finite number of refractive indices reaching the upper limit, and by calculating the refractive index distribution of the optical circuit using the refractive indices as a limit value. The present embodiment designs the optical circuit based on such an idea.

In the present embodiment, the idea is applied to an optical waveguide that has the same structure as a step-index planar optical waveguide, and has a structure in which the core of the waveguide is patterned in dots in the optical circuit design region. Thus, a wavelength division filter of 1.31 μm and 1.55 μm was designed.

The present embodiment supposes a silica optical waveguide. In addition, it is assumed in the calculation of the spatial distribution of refractive index that only two types of refractive indices—the refractive index of the core (high refractive index section) and the refractive index of the cladding (low refractive index section)—are considered, and that the refractive index distribution is calculated which is obtained by distributing the two types of the refractive indices in the optical circuit design region.

Furthermore, although it is assumed that the refractive index values which are the parameters can take any values in the algorithm of computing the refractive index distribution described in connection with FIG. 7, the present embodiment obtains the refractive indices here by calculating values $v_q$ according to the following expression (9), and by applying the following expressions (10) and (11) to the values $v_q$:

$$v_q(z, x) = v_{q-1}(z, x) - aS_j \text{Im}[f^j(z, x, \{n_{q-1}\})^* \cdot \psi^j(z, x, \{n_{q-1}\})] \quad (9)$$

$$n_q(z, x) = n_{core} \text{ when } v_q(z, x) > (n_{core} + n_{clad})/2, \text{ and} \quad (10)$$

$$n_q(z, x) = n_{cladd} \text{ when } v_q(z, x) < (n_{core} + n_{clad})/2 \quad (11)$$

where $n_{core}$ is the refractive index corresponding to the core, and $n_{clad}$ is the refractive index corresponding to the cladding. Consequently, the refractive index distribution in the optical circuit design region is achieved by spatially distributing the two types of the refractive indices. Generally, the relationship $n_{core} > n_{clad}$ holds. Even such calculation enables the design of the optical waveguide that can produce a desired optical output enough as will be described below. Furthermore, for simplicity's sake, the calculation is carried out by considering that the refractive index ($n_{core}$) corresponding to the core pattern among the two types of the refractive indices is an effective refractive index, and that both the propagation direction and the lateral direction are each one dimensional.

FIGS. 9A and 9B diagrams illustrating setups in the optical circuit design in the present embodiment. First, it is assumed that polarization multiplexed light launched into an input port 3-1 is output from an output port 3-2. Then by adjusting the refractive index distribution, are established a pair of incident field $\psi^1(x)$ and emitted field $f^1(x)$ with the wavelength of 1.31 μm (that is, j=1 in terms of the foregoing symbol) as illustrated in FIG. 9A, and a pair of incident field $\psi^2(x)$ and emitted field $f^2(x)$ with the wavelength of 1.55 μm (that is, j=2 in terms of the foregoing symbol) as illustrated in FIG. 9B. Although the fields are defined all over the incidence plane 2-1 and emitting plane 2-2, only regions at which the field intensity is concentrated are illustrated in FIGS. 9A and 9B. Such a pair of incident/emitted fields $\{\psi^j(x), f^j(x)\}$ are referred to as an input/output pair from now on.

Figure 10A:
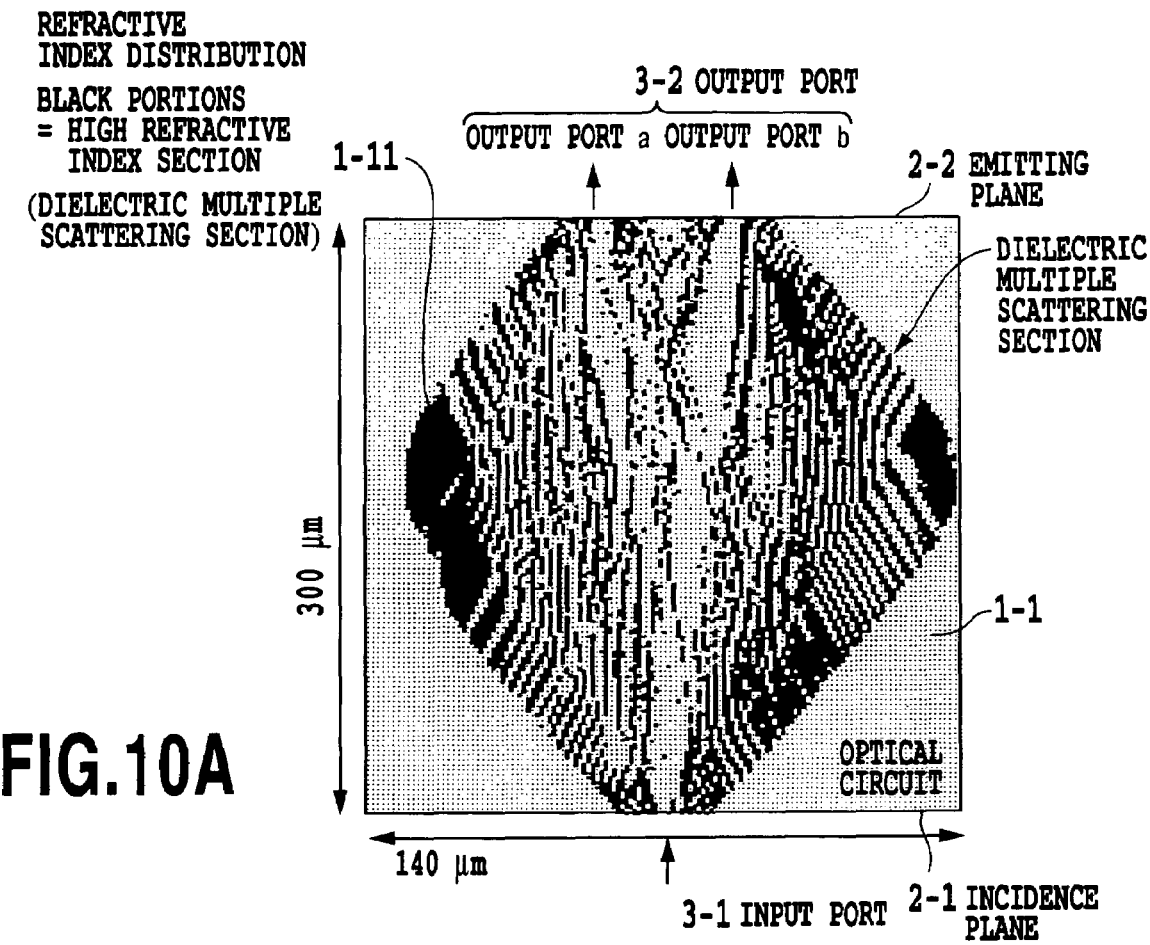
FIGS. 10A and 10B are diagrams illustrating the refractive index distribution (FIG. 10A) and transmission spectra (FIG. 10B) in the embodiment 1.
Figure 10B:
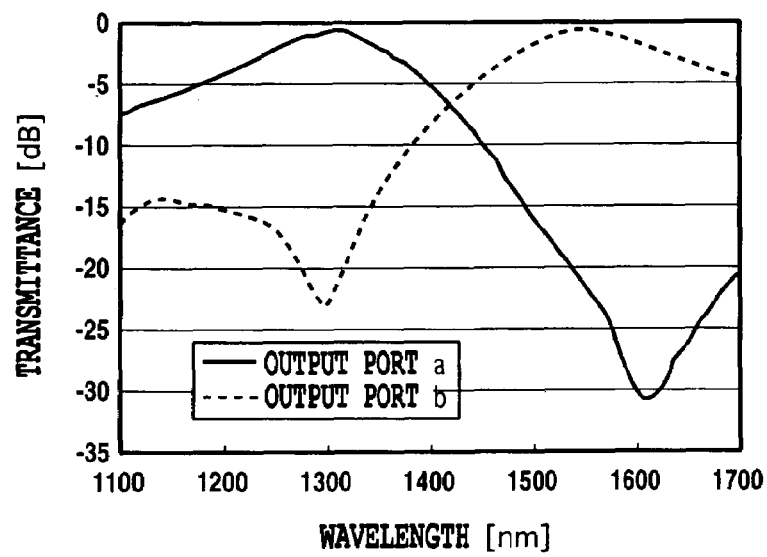

FIGS. 10A and 10B are diagrams illustrating the refractive index distribution (FIG. 10A) and transmission spectra (FIG. 10B) in the present embodiment 1. By repeating the foregoing algorithm of calculating the refractive indices about 200 times, the optical circuit with the refractive index distribution as illustrated in FIG. 10A is obtained. Here, black regions 1-11 in the optical circuit design region 1-1 of FIG. 10A are the high refractive index section (dielectric multiple scattering section) corresponding to the core, and regions other than the black regions are the low refractive index section corresponding to the cladding. The refractive index of the cladding is assumed to be equal to that of the silica glass, and the refractive index of the core is assumed to be higher than that of the silica glass by 1.5%. The optical circuit is 300 μm long by 140 μm wide.

The mesh used for calculating the refractive index distribution has 140×300(=42000) cells. Accordingly, the number of parameters of the refractive index distribution is 42000, and the parameters must be optimized. If the parameters are to be optimized by obtaining one numerical differentiation for each of the parameters by simply applying the steepest descent method, it is necessary to calculate 42000 propagations of light for each step calculation. In contrast with this, the present embodiment can complete the calculation by computing the optical propagation twice, thereby enabling the design of the optical circuit in a short time presenting no problem in practice.

FIG. 10B illustrates the transmission spectra of the optical circuit thus designed. It illustrates the characteristics of light with the wavelength of 1.31 μm which is output from an output port a, and of light with the wavelength of 1.55 μm which is output from an output port b. In other words, it is seen that the demultiplexer is formed in terms of the wavelength. Incidentally, the input and output directions of the light as shown in FIGS. 9A and 9B can be reversed so that the waves with the two wavelengths are launched into the output ports a and b, multiplexed, and output from the incidence plane 2-1. Accordingly, the optical circuit can operate as a multiplexer. Thus, the optical circuit described in the present embodiment can operate as the multi/demultiplexer in terms of the optical wavelength.

To secure the function of the optical circuit, the light propagating through optical circuit must be sufficiently confined within the optical circuit. As for the refractive index distribution as illustrated in FIG. 10A, the core, that is, the high refractive index section is distributed in dots in the optical circuit design region, thereby causing concern that the optical confinement in the thickness direction of the substrate can become insufficient.

In view of this, the optical circuit is assumed to have a structure in which the high refractive index section is composed of two high refractive index sections (first high refractive index section and second high refractive index section), and the high refractive index sections are sandwiched between low refractive index sections from its top and bottom. Then, the refractive index distribution of the optical circuit is calculated.

FIG. 11A is a schematic cross-sectional view of an optical circuit that has a planar optical wave circuit-like refractive index distribution, and can carry out the optical confinement in the direction perpendicular to the substrate. The high refractive index section 1-11 of the optical circuit is composed of the two high refractive index sections (first high refractive index section 1-11a and second high refractive index section 1-11b), and the second high refractive index section 1-11b has a refractive index greater than the first high refractive index section 1-11a. The high refractive index section 1-11 is sandwiched between the low refractive index sections 1-12 at the top and bottom, thereby configuring the optical circuit. In the optical circuit, the second high refractive index section 1-11b acts as the so-called "core", whereas the first high refractive index section 1-11a is provided to confine the light propagating through the core in the thickness direction of the substrate (direction perpendicular to the substrate). In FIG. 11A, the calculations are made by assuming that the refractive index difference between the low refractive index section 1-12 and the first high refractive index section 1-11a, and the refractive index difference between the first high refractive index section 1-11a and the second high refractive index section 1-11b are each 1.5%. At the right-hand side of FIG. 11A, an effective refractive index profile of the optical circuit in the vertical direction is shown, and at the bottom of FIG. 11A, an effective refractive index profile of the high refractive index section 1-11 in the horizontal direction is shown.

The optical circuit with such a structure can easily carry out the optical confinement in the thickness direction of the substrate by the first high refractive index section 1-11a provided around the second high refractive index section 1-11b constituting the core.

When providing the optical circuit with the optical input/output sections, two cases are possible: a first case has the first high refractive index section 1-11a guide the light (FIG. 11B); and a second case has the second high refractive index section 1-11b guide the light (FIG. 1C). In addition, the optical coupling with optical fibers can be optimized by adjusting the field radius by optimizing the shapes of the first high refractive index section 1-11a and second high refractive index section 1-11b and by combining them.

Since the output field is calculated in a complex number, the phase of the output field can also be obtained. Consequently, the foregoing calculation procedure of the optical field is also applicable to the case where the optical phase adjustment is necessary such as fabricating an external resonator laser by combining the foregoing optical circuit with a semiconductor optical amplifier provided with an antireflection coating.

Although the beam propagation method is used to calculate the foregoing optical fields, this is not essential. For example, a finite difference time-domain method (FDTD) can be used when the memory capacity for the computer used for the operation is enough. Generally speaking, since the beam propagation method calculates the optical output in a linear direction, the position of the output port is limited. For example, the present embodiment employs the plane opposite to the incidence plane as the emitting plane. In contrast with this, since the calculation using the finite difference time-domain method enables the position of the output port to be selected flexibly, it is not difficult to design an optical circuit including an optical path with a sharp bending. This holds true for the following embodiments. In addition, to implement such a circuit by combining directional couplers, even only the directional coupler region requires an optical circuit region of a few hundred micrometers long. In contrast with this, the foregoing method can construct the optical circuit with a size of a fraction of that, thereby being able to miniaturize the optical circuit.

EMBODIMENT 2

The present embodiment designs the same optical circuit as that of the embodiment 1 in accordance with the following calculation method of the refractive index distribution. The outline of the optical circuit will be briefly described with reference to FIG. 5, again. First, an arbitrary refractive index distribution {n} is given, and the field distribution 1, $\psi^j(z, x, \{n\})$, of the input light corresponding to the distribution {n} is calculated. Then, the reverse propagation light (field distribution 2, f'(z, x, {n})) with the field expected to be output from the output port as the output light is successively calculated by virtually transmitting the reverse propagation light toward the incidence plane 2-1.

Take an example of FIG. 8. First, the refractive index distribution is changed such that the phase of the cross section $\psi^j(z_x, x, \{n\})$ of the field distribution 1 at a location $z=z_x$ matches the phase of the cross section $f^j(z_x+\Delta z, x, \{n\})$ of the field distribution 2 at that location. Second, using the refractive index distribution after the change, the cross section $f^j(z, x, \{n\})$ $(z=z_x+\Delta z \text{ to } z_x)$ of the field distribution 2 is recalculated from $(z_x+\Delta z)$ to $z_x$. Then, the same operation is successively repeated after placing $(z_x-\Delta z)$ at $z_x$. At the time when the cross section of the field distribution 2 reaches the incidence plane 2-1, the cross section of the field distribution 1 of the input light is reversely transmitted in the propagation direction virtually. Then, matching the phase of the cross section of the field distribution 1 to that of the cross section of the field distribution 2, the refractive index distribution is successively decided. The calculation is carried out until the cross section of the field distribution 1 arrives at the emitting plane 2-2.

The procedure, which constitutes one routine, is repeated so that the refractive index distribution is calculated successively with transmitting the field distribution 2 and field distribution 1 alternately in the reverse and forward directions. The foregoing calculation is repeated until the error between the desired emitted field and the emitted field f'(x), which is output when the incident field $\psi^j$ reaches the emitting plane 2-2, becomes less than a desired error.

As will be described later, the procedure can reduce the time period required for the design of the optical circuit, thereby enabling the design of a large-scale optical circuit in practical time and effort.

First, the algorithm will be described.

Figure 12:
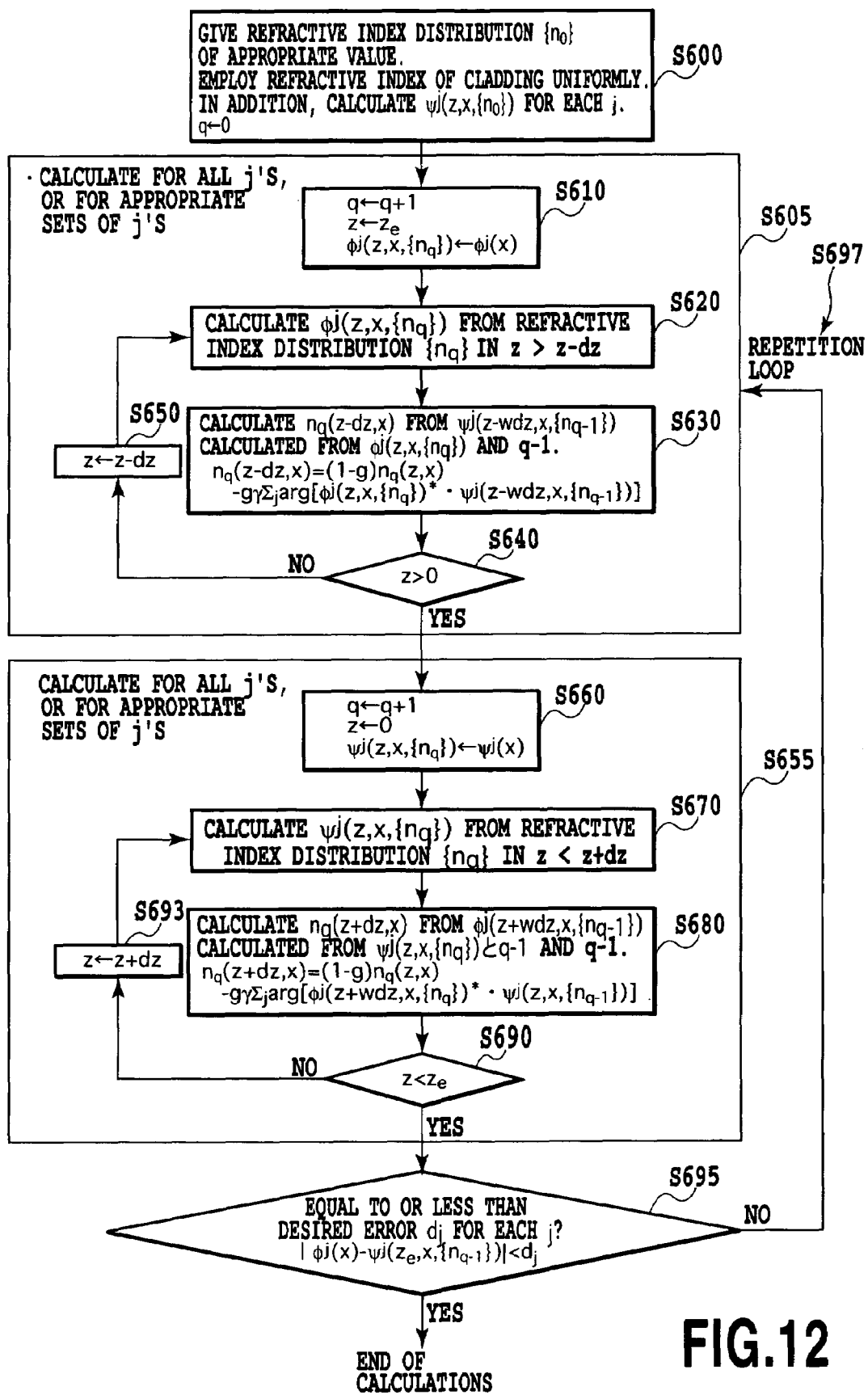
FIG. 12 is a flowchart illustrating a general flow of the optical circuit design of an embodiment 2.

FIG. 12 is a flowchart illustrating a general flow of the optical circuit design of the present embodiment 2. Using the same symbols as those of expression (1), the following expressions are obtained.

$$n_q(z+dz, x) = -\Upsilon S_j \arg[f^j(z+dz, x, \{n_{q-1}\})^* \cdot \psi^j(z, x, \{n_q\})] \quad (1')$$

$$n_{q+1}(z-dz, x) = -\Upsilon S_j \arg[f^j(z, x, \{n_{q+1}\})^* \cdot \psi^j(z-dz, x, \{n_q\})] \quad (1'')$$

where the coefficient $\gamma$ is obtained by dividing a value of an order of $(2 k_0 dz)^{-1}$ by the number of input/output pairs, and $k_0$ is the wave number in vacuum, which is on the order of the average wave number of the input signal considered here. The wave number "on the order" means that there are variations on the order of the relative effective refractive index.

The foregoing expressions (1') and (1") mean that the term $\text{ImS}_j f^j(z', x, \{n_{q-1}\})^* \psi^j(z, x, \{n_{q-1}\})$ of expression (1) has no phase difference at a local minimum point, and that the refractive indices are placed according to this fact so that the term $\arg[f^j(z', x, \{n_{q-1}\})^* \psi^j(z, x, \{n_{q-1}\})]$ is reduced. In particular, when the phase difference is small, since the term $\text{ImS}_j f^j(z', x, \{n_{q-1}\})^* \psi^j(z, x, \{n_{q-1}\})$ becomes equivalent to the term $\arg[f^j(z', x, \{n_{q-1}\})^* \psi^j(z, x, \{n_{q-1}\})]$ except for the amplitude, the term $\arg[f^j(z', x, \{n_{q-1}\})^* \psi^j(z, x, \{n_{q-1}\})]$ can be replaced by $\text{ImS}_j f^j(z', x, \{n_{q-1}\})^* \psi^j(z, x, \{n_{q-1}\})$, which corresponds to changing the refractive index by weighting it with the intensity of the field of each location. In the following description $\arg[f^j(z', x, \{n_{q-1}\})^* \psi^j(z, x, \{n_{q-1}\})]$ is used for simplicity's sake.

Expression (1') means that when $f^j(z, x, \{n_{q-1}\})$ is given in the entire region, the term $\psi^j(z, x, \{n_q\})$ is calculated from $n_q(z, x)$ obtained (step S670), and that $n_q(z+dz, x)$ at the point $(z+dz)$, the coordinate z plus the minute distance dz, is determined from $\psi^j(z, x, \{n_q\})$ (step S680) (step S655). Here, the symbol "·" represents the inner product operation, arg[ ] represents its argument, and the symbol "*" denotes the complex conjugate.

Expression (1") means that when $\psi^j(z, x, \{n_q\})$ is given in the entire region, the term $f^j(z, x, \{n_{q+1}\})$ is calculated from $n_{q+1}(z, x)$ obtained (step S620), and that $n_{q+1}(z-dz, x)$ at the point $(z-dz)$, the coordinate z minus the minute dz, is obtained (step S630) (step S605).

By repeating the computation of expression (1') (step S655) and the computation of expression (1") (step S605) alternately (step S697), the calculation of the refractive index distribution is carried out until the calculation is completed (YES at step S695).

In the calculation of the present embodiment, the phase matching is established between the cross section of the field distribution 1 and the cross section of the field distribution 2 in the minute distance dz, which will cause oscillation with a short period in the actual calculation, thereby bringing about considerably large calculation error. Considering this, the coefficient γ is multiplied by an arbitrary rare number g so that their product (g·γ) becomes less than a fraction of $(2 k_0 dz)^{-1}$. In addition, as for the position of the field, it need not accord with z+dz completely, but take an intermediate value, or it may agree with a position (z+wdz) ($0 \leq w \leq 2$) at which $n_q(z+dz, x)$ takes the center value of the refractive indices at the location z and location z+2dz. By such handling, the foregoing expressions (1') and (1") are revised as follows.

$$n_q(z+dz, x) = (1-g)n_{q-1}(z+dz, x) - \\ g\Upsilon S_j \arg[f^j(z+wdz, x\{n_{q-1}\})^* \cdot \psi^j(z, x, \{n_q\})] \quad (1''')$$

$$n_{q+1}(z-dz, x) = (1-g)n_q(z-dz, x) - \\ g\Upsilon S_j \arg[f^j(z, x, \{n_{q+1}\})^* \cdot \psi^j(z-wdz, x, \{n_q\})] \quad (1'''')$$

Thus, the short periodic oscillation is prevented by the weighted average using the rare number g in the range $0 < g \leq 1$ as the parameter. In the present embodiment, they are set at w=1 and g=0.25. In addition, the refractive index distribution is assumed to be a step-index type as in the embodiment 1, and is subjected to the same discrete processing. The optical circuit of the present embodiment is the same as that of the embodiment 1.

Figure 13A:
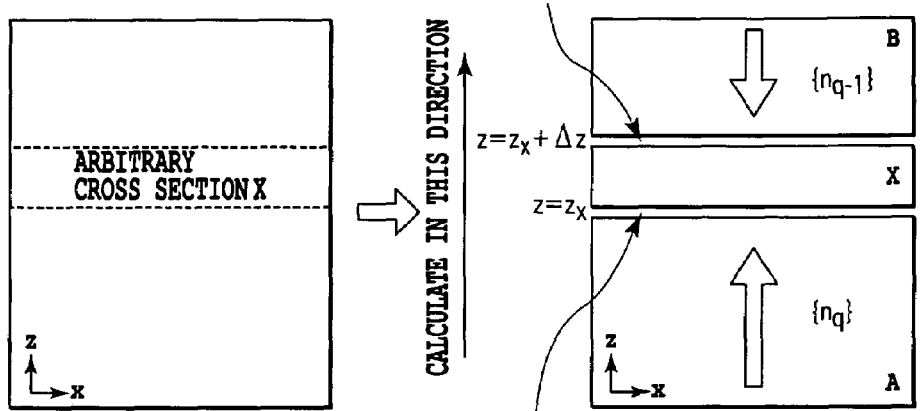
FIGS. 13A-13C are diagrams illustrating data in a field for carrying out algorithm as illustrated in FIG. 12.
Figure 13B:
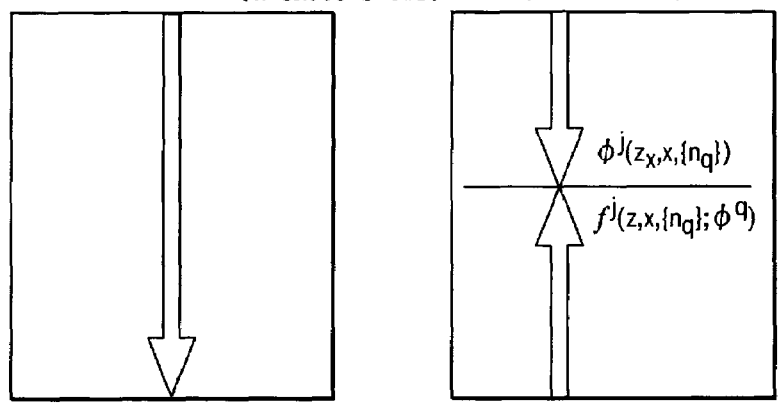

To carry out the calculation according to the algorithm, data about the previous fields are needed as illustrated in FIG. 13A, and a large capacity of memory is required to store the data on the fields previously transmitted. For example, to calculate a 1000 μm×1000 μm region using a mesh with a uniform pitch of 0.1 μm, even a simple pair of fields requires $2 \times 8 \times 10^8 = 1.6$ Gbytes in the form of complex number values representing double-precision real number values, thereby making the calculation difficult. The difficulty is circumvented by enabling the memory to store only the wavefront region by utilizing a fact that propagating the once transmitted field in the reverse direction as illustrated in FIG. 13B brings about the same state in which the field is transmitted to an intermediate location.

Figure 13C:
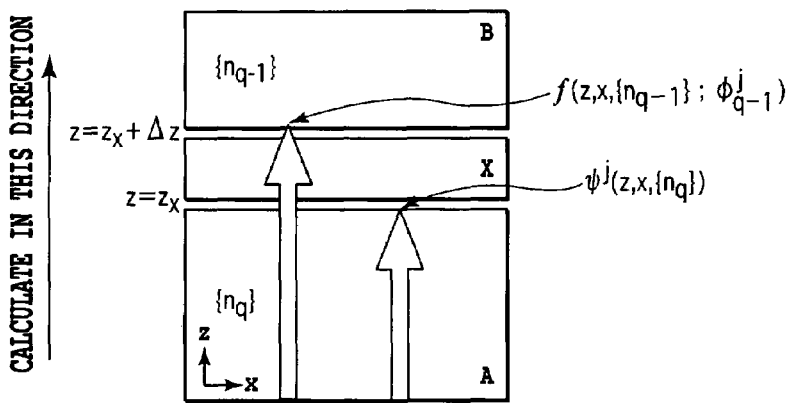

More specifically, the calculation is carried out using a memory for only two wave fronts as follows. First, the field f'(z=0, x, {n_{q-1}}), which results from transmitting the output field in the reverse direction as illustrated in FIG. 13C, is transmitted in the forward direction as an initial value, thereby obtaining $f(z, x, \{n_{q-1}\}; f'_{q-1})$ which is used as the value $f'(z, x, \{n_{q-1}\})$. Likewise, the field $\psi^j(z=z_e, x, \{n_{q-1}\})$ is transmitted in the reverse direction as the initial value, thereby obtaining $g(z, x, \{n_{q-1}\}; \psi'_{q-1})$ which is used as the value $\psi^j(z, x, \{n_{q-1}\})$. Thus, the memory for only two wavefronts enables the calculation. The calculation is performed as to the fields up to both the ends of the calculation region as shown in the algorithm of FIG. 12. Thus, the calculation results can be transmitted in the reverse direction as the initial values. Although the method doubles the calculation amount, and hence delays the calculation, it can be used properly in isolation or together with the method that stores the data once in the memory depending on the conditions.

Figure 14A:
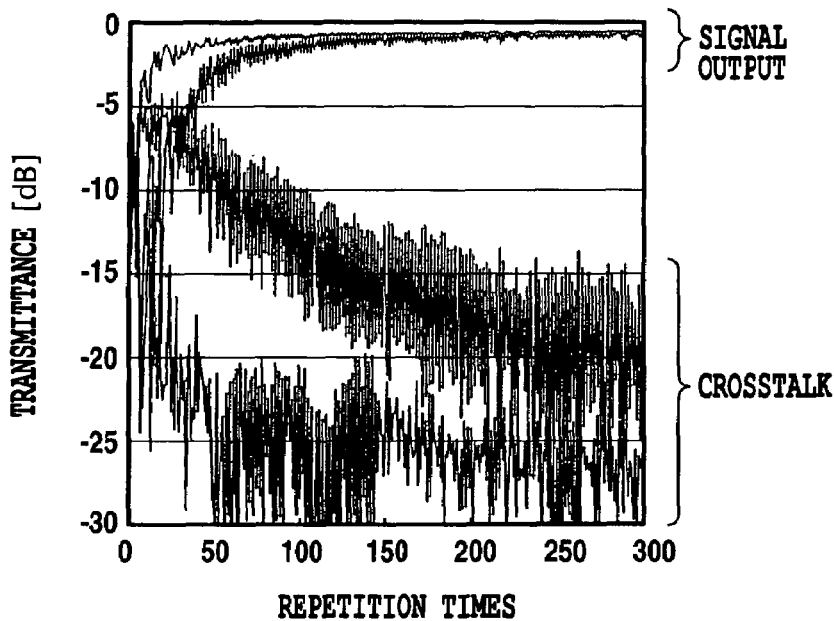
FIG. 14A is a graph illustrating behavior of the convergence of the calculation in the embodiment 1.
Figure 14B:
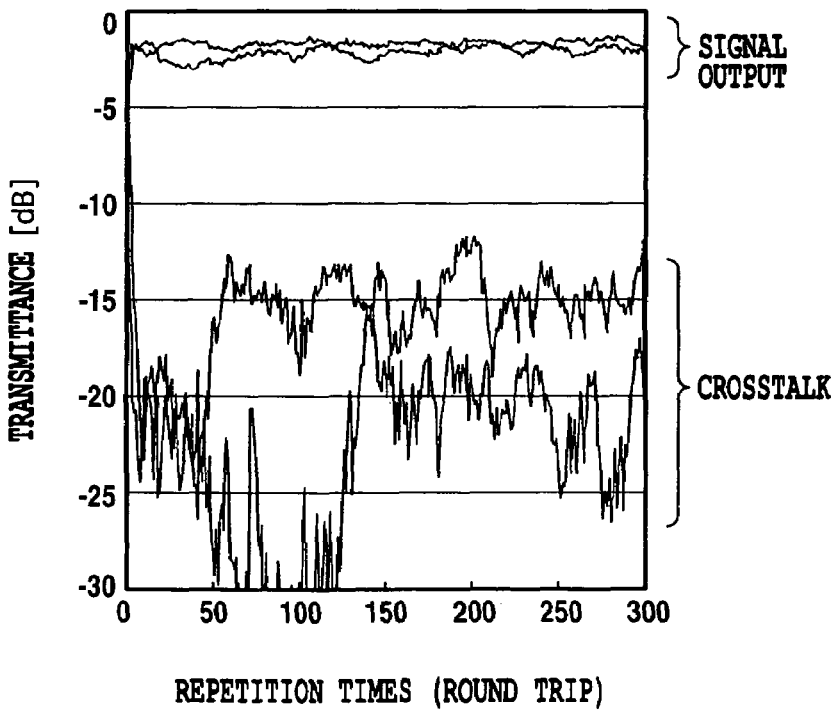
FIG. 14B is a graph illustrating behavior of the convergence of the calculation in the embodiment 2.

FIGS. 14A and 14B are graphs illustrating behavior of the convergence of the calculations in the embodiments 1 and 2. FIGS. 14A and 14B each illustrate transmittance (dB) to the desired output port and crosstalk (dB) into other output ports against the number of repetitions of the calculations in the embodiments 1 and 2. The numbers of repetitions of the calculations correspond to the numbers of repetitions of the loop as illustrated in FIGS. 7 and 12, the calculation amounts of which are substantially equal.

It is seen by comparing FIG. 14A with FIG. 14B that although the calculation method the embodiment 1 employs requires repetitions of about 200 times until the convergence, the calculation method the embodiment 2 employs can converge the calculation by repetitions of several times. In other words, the calculation method of the embodiment 2 can converge the calculation several tens of times faster than the calculation method of the embodiment 1. Consequently, the calculation method of the embodiment 2 is applicable to the design of a rather large-scale optical circuit.

Figure 15A:
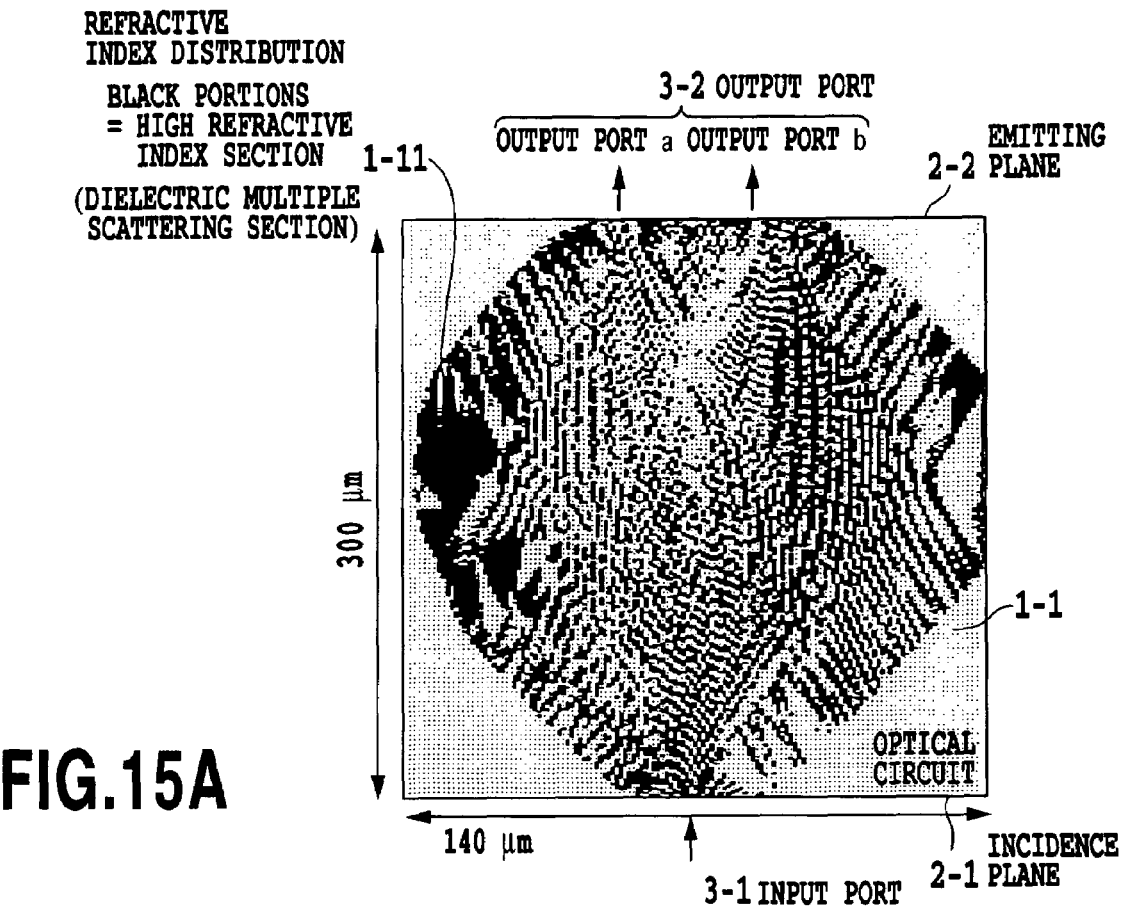
FIG. 15A is a diagram illustrating the refractive index distribution of the optical circuit of the embodiment 2.
Figure 15B:
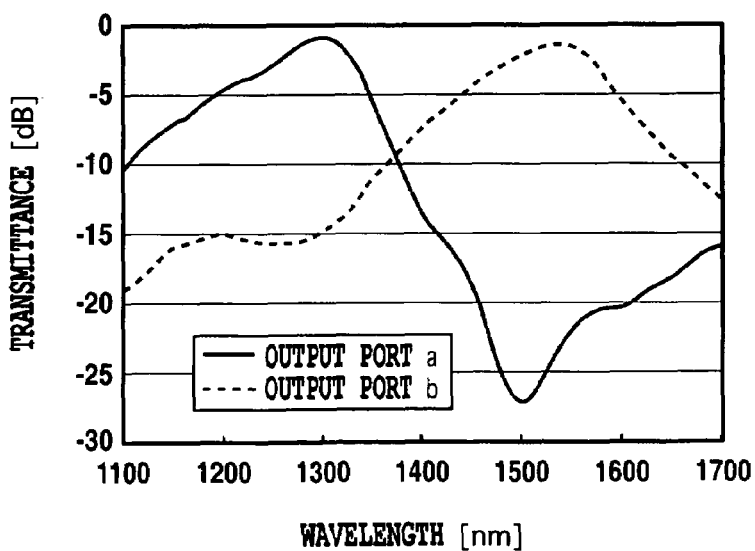
FIG. 15B is a diagram illustrating transmission spectra of the optical circuit of the embodiment 2.

FIGS. 15A and 15B are diagrams illustrating the refractive index distribution (FIG. 15A) and transmission spectra (FIG. 15B) of the optical circuit in the present embodiment. As shown in FIG. 10B, the transmission spectra of the optical circuit illustrate the characteristics of light with a wavelength of 1.31 μm which is output from the output port a, and of light with a wavelength of 1.55 μm which is output from the output port b. In other words, it is seen that the demultiplexer (and multiplexer) is formed in terms of the wavelength.

As compared with the refractive index distribution of the optical circuit of the embodiment 1 illustrated in FIG. 10A, the refractive index distribution of the optical circuit of the present embodiment illustrated in FIG. 15A has a comparatively uniform distribution of the high refractive index section 1-11. As a result, the effective refractive index increases its uniformity, thereby increasing the uniformity of the effective refractive index in the thickness direction of the substrate in the optical circuit design region 1-1, and reducing the unevenness of the optical confinement in that direction. In other words, it becomes possible to prevent the optical scattering in the thickness direction of the substrate. As a result, the single high refractive index section 1-11 can by itself implement the optical circuit capable of optical confinement without setting up the refractive index distribution using the pair of high refractive index sections as illustrated in FIG. 11A.

In particular, setting the refractive indices of the individual pixels of the mesh in a spatially random distribution as the initial refractive index distribution for calculating the refractive index distribution, the final refractive index distribution obtained by the calculation has a more random distribution. Thus, the refractive index distribution can be implemented which is suitable for the optical circuit with the structure including only the single high refractive index section.

EMBODIMENT 3

In the present embodiment, a design method will be described of a wavelength division multi/demultiplexing circuit for demultiplexing and/or multiplexing four wavelengths 1.53 μm, 1.54 μm, 1.55 μm and 1.56 μm.

Figure 16A:
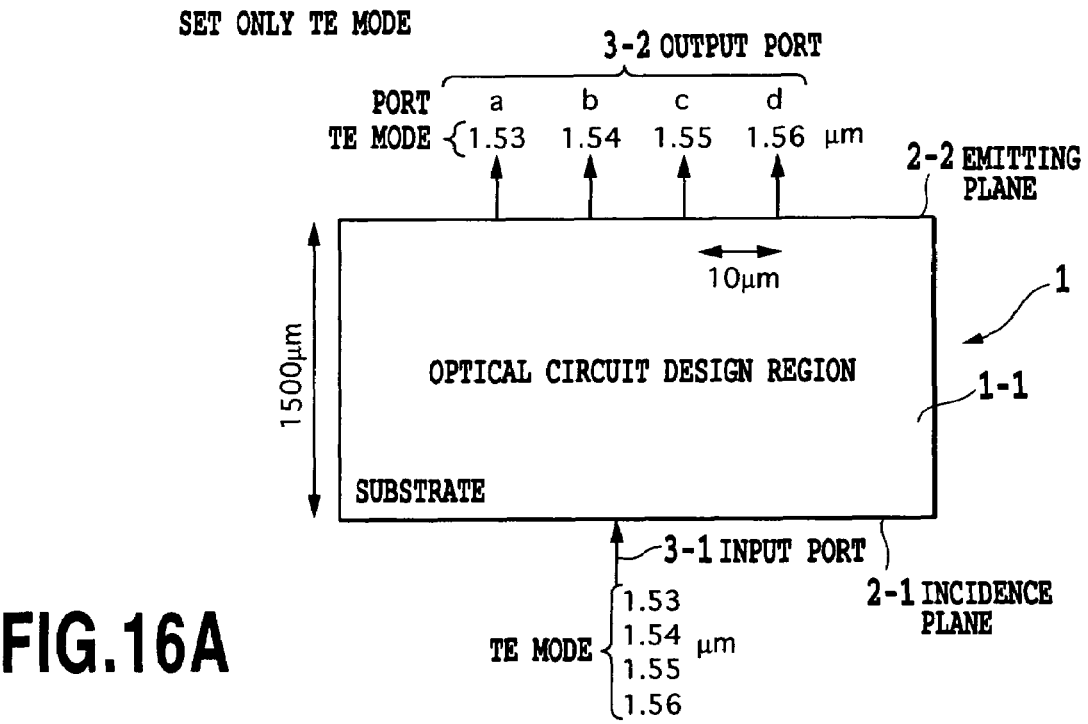
FIGS. 16A and 16B are diagrams illustrating condition settings for optical circuit design of a four-wavelength demultiplexer of an embodiment 3.
Figure 16B:
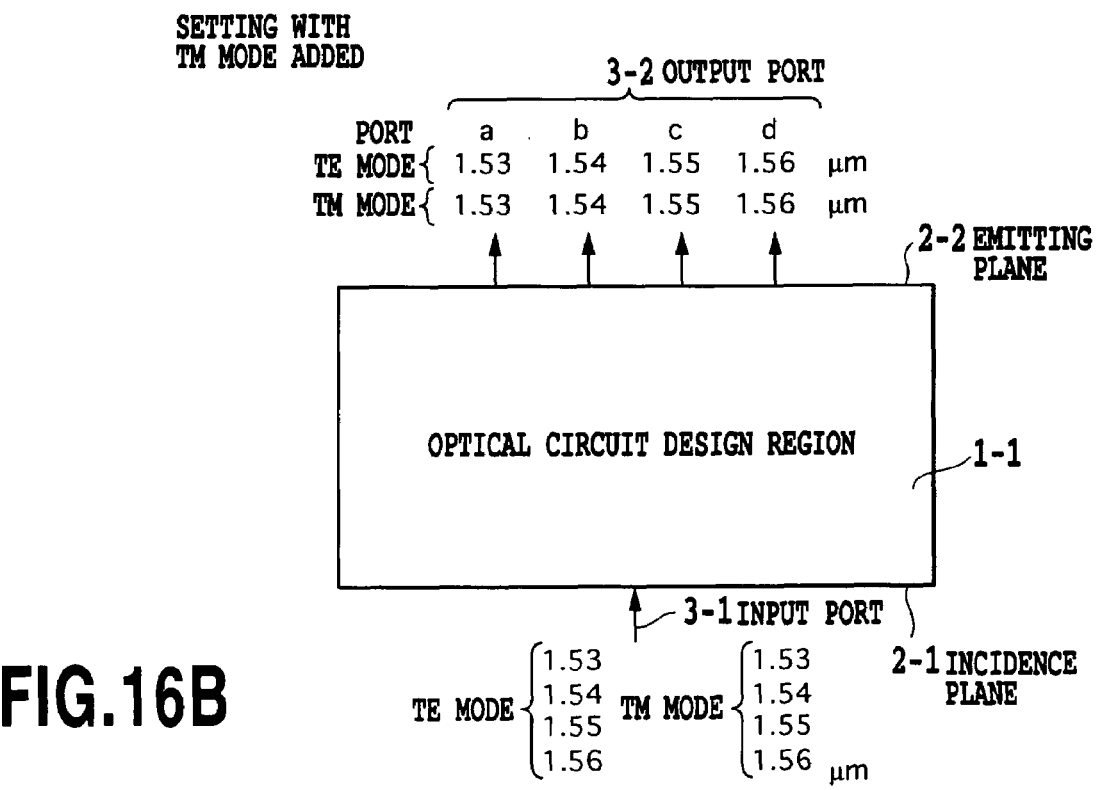

FIGS. 16A and 16B are diagrams illustrating condition settings for the optical circuit design of the four-wavelength demultiplexer of the present embodiment: FIG. 16A illustrates the case where only a TE mode is set as the polarization state of the input light; and FIG. 16B illustrates the case where a TM mode in addition to the TE mode is set as the polarization state of the input light.

First, in the case of setting only the TE mode, wavelength division multiplexed light is input to the input port 3-1, and optical waves with different wavelengths are emitted from the individual ports of the output port 3-2 as illustrated in FIG. 16A. The incidence plane 2-1 includes one input port 3-1, and the emitting plane 2-2 includes four ports a, b, c and d. The light including the four wavelengths 1.53 μm, 1.54 μm, 1.55 μm and 1.56 μm multiplexed is launched into the input port 3-1, and the optical waves with the wavelengths 1.53 μm, 1.54 μm, 1.55 μm and 1.56 μm are output from the port a, port b, port c and port d of the output port 3-2. Accordingly, the combinations of the fields for calculating the refractive index distribution consist of the four combinations of the multiplexed input light field with the optical fields with the wavelengths of 1.53 μm, 1.54 μm, 1.55 μm and 1.56 μm output from the four output ports (a, b, c and d).

Figure 17A:
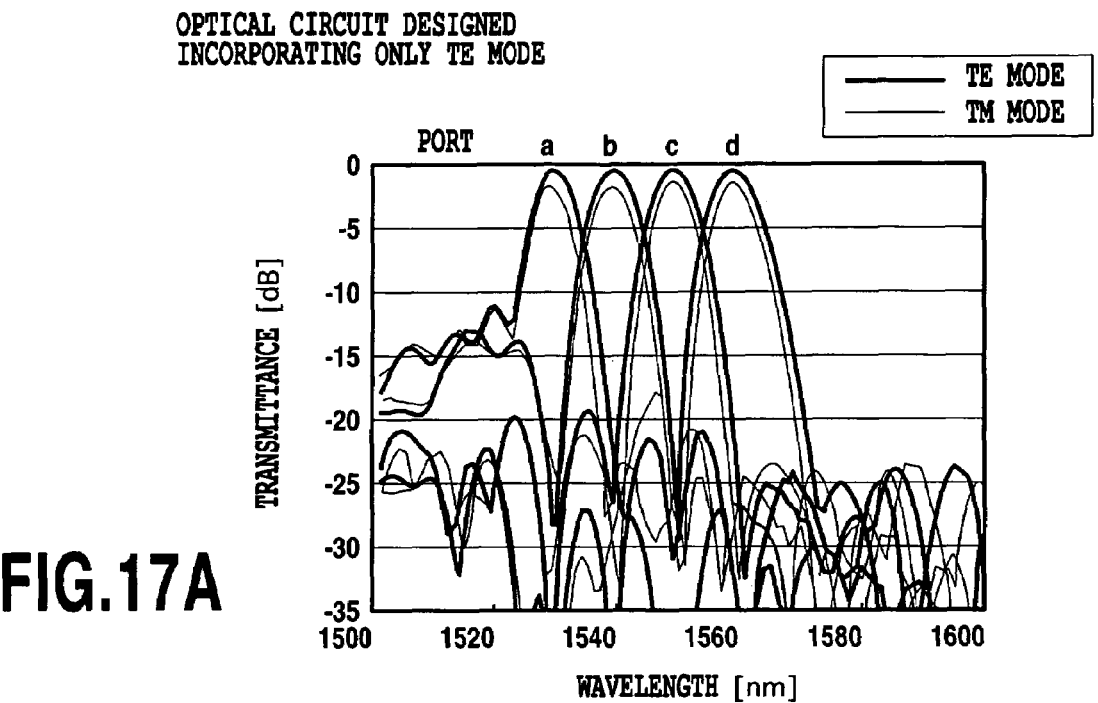
FIG. 17A is a graph illustrating transmission loss spectra (transmittance (dB)) of the optical circuit calculated in embodiment 3.
Figure 17B:
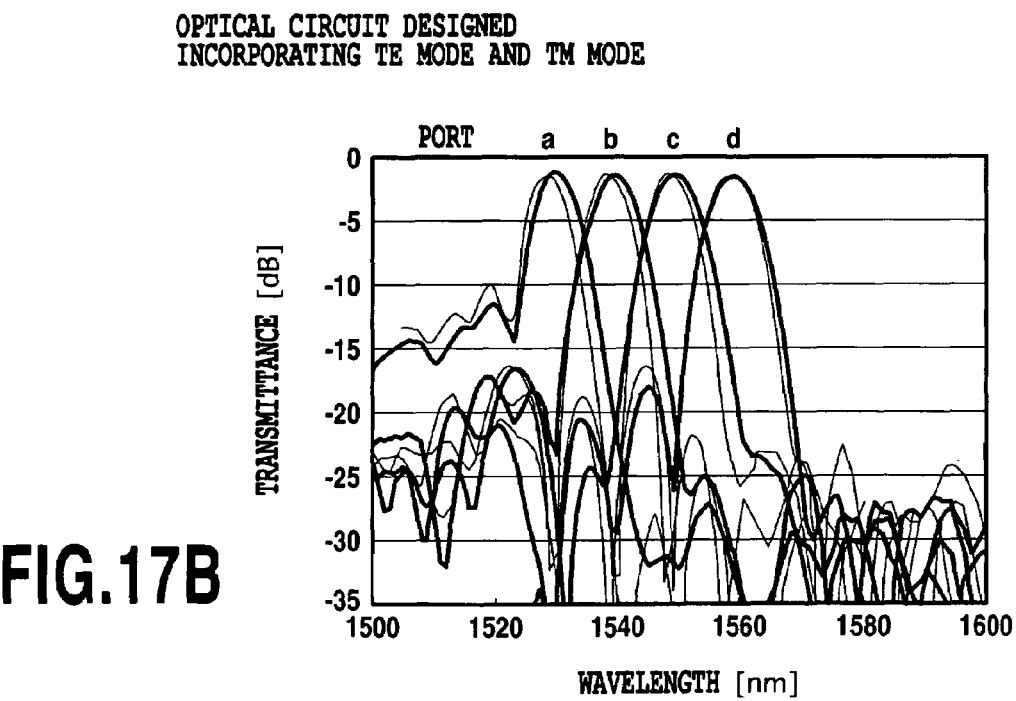
FIG. 17B is a graph illustrating transmission loss spectra (transmittance (dB)) of the optical circuit calculated in embodiment 3.

FIGS. 17A and 17B are graphs illustrating transmission loss spectra (transmittance (dB)) of the optical circuit calculated in the present embodiment: FIG. 17A is the case where only the TE mode is set as the polarization state of the input light (corresponding to the conditions of FIG. 16A); and FIG. 17B is the case where the TM mode in addition to the TE mode is set as the polarization state of the input light (corresponding to the conditions of FIG. 16B).

The spectra of the optical waves emitted from the output port 3-2 become as illustrated in FIG. 17A, when the condition settings are made such that the field of the input light has the TE mode as the polarization state for the substrate 1. In FIGS. 17A and 17B, the TE mode is represented by bold lines, and the TM mode, the polarization state normal to the TE mode, is represented by thin lines. The reason for calculating the spectra for each polarization state is that the effective refractive index the light propagating through the optical circuit undergoes is slightly different in the TE mode and TM mode. Therefore, the present embodiment carries out the design of the wavelength division multiplexing demultiplexing circuit as follows. First, the optical waves of the four wavelengths launched into the input port 3-1 are each assumed to be polarization multiplexed light having the TE mode and TM mode. Second, the optical waves with the same wavelength but having the TE mode light and TM mode, respectively, are output from the same output port (a, b, c or d). Thus, the total of eight input/output pairs are set by subdividing, in accordance with the two polarization states, the four pairs of the fields which are divided in terms of the wavelengths, thereby adjusting refractive index distribution (FIG. 16B).

The method can reduce the differences in the transmission losses due to the difference in the polarization states as illustrated in FIG. 17B. Although not shown in a drawing, as a variation of the design conditions illustrated FIG. 16B, it is possible to adjust the refractive index distribution such that the polarization multiplexed light launched into the input port is output from different designated output ports for the individual polarizations.

As described above, setting up the pairs of the incident/emitted fields using the wavelengths and polarization states as the parameters enables the flexible design of a polarization-independent optical circuit or polarization-dependent optical circuit. In addition, using the birefringence of the substrate in the calculation as a parameter can eliminate the polarization-dependence.

To configure an optical circuit having equivalent functions by using the conventional arrayed waveguide grating including the silica-based optical waveguides, even the star couplers alone must occupy an area of several millimeters long to provide a sufficient number of arrayed waveguides, and besides, the arrayed waveguides must be bent. Accordingly, it is inevitable that the size of the optical circuit becomes greater than a few square millimeters (typically, greater than one square centimeter). Furthermore, it is sometimes necessary to insert a wave plate into the optical circuit to eliminate the polarization-dependence. In contrast with this, according to the optical circuit design of the present embodiment, it is possible to configure an optical circuit that is equivalent to the conventional optical circuit in the functions, and has a size less than one hundredth of the conventional circuit.

EMBODIMENT 4

The present embodiment is an example of configuring an optical wavelength band transmission circuit.

Figure 18A:
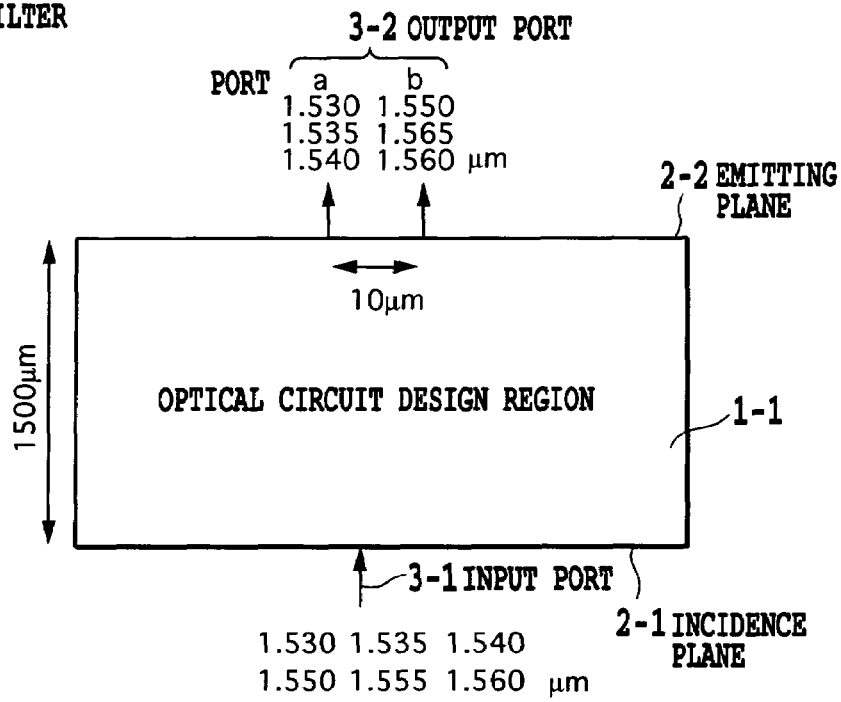
FIG. 18A is a diagram illustrating condition settings for the optical circuit design of an embodiment 4, in which a plain bandpass filter is set up.
Figure 18B:
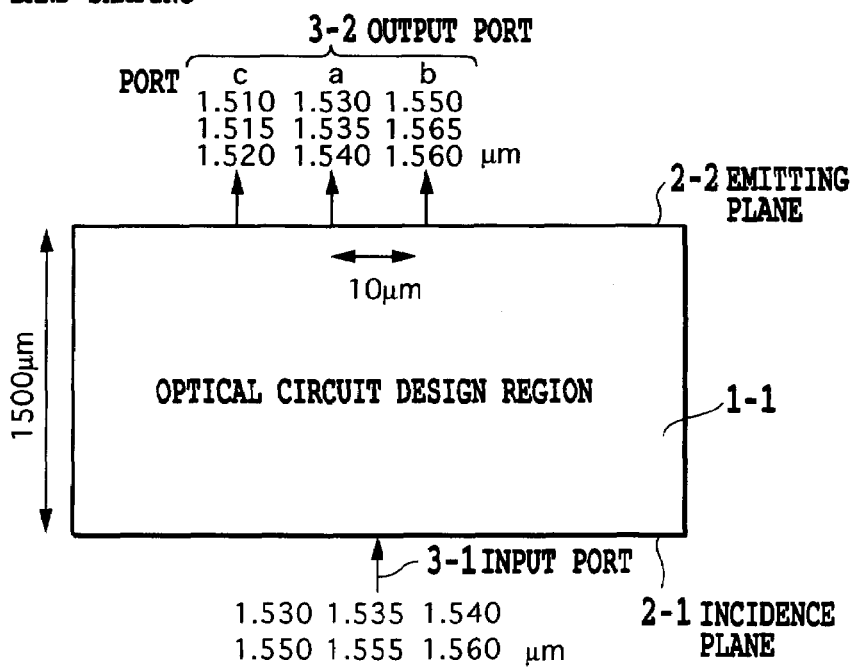
FIG. 18B is a diagram illustrating condition settings for the optical circuit design of an embodiment 4, in which adding a band-shaping dummy port is set up.

FIGS. 18A and 18B are diagrams illustrating condition settings for the optical circuit design of the present embodiment: FIG. 18A illustrates the case where a plain bandpass filter is set; and FIG. 18B illustrates the case where a dummy port for band shaping is set. The total length of these optical circuits is 1500 μm.

Figure 19A:
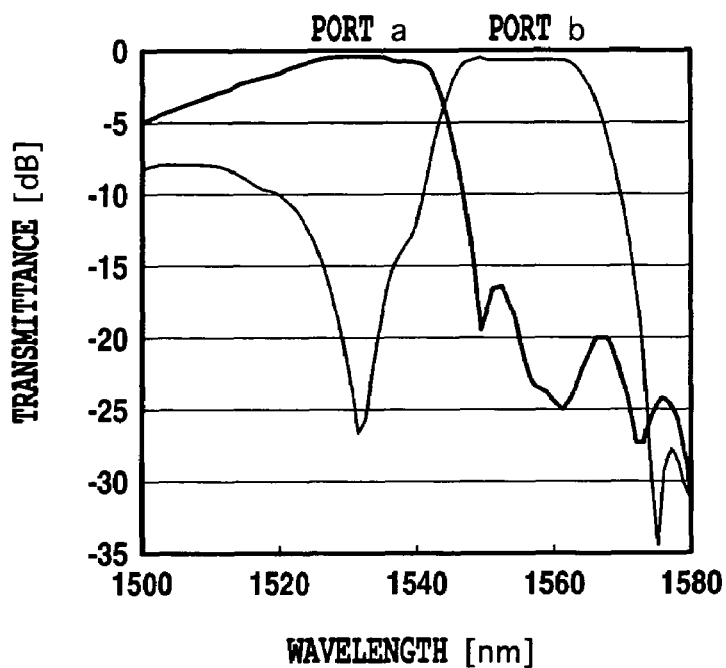
FIG. 19A is a graph illustrating spectra of the transmission loss of the output light produced from the output port of the optical circuit adjusted under the condition settings as illustrated in FIG. 18A.
Figure 19B:
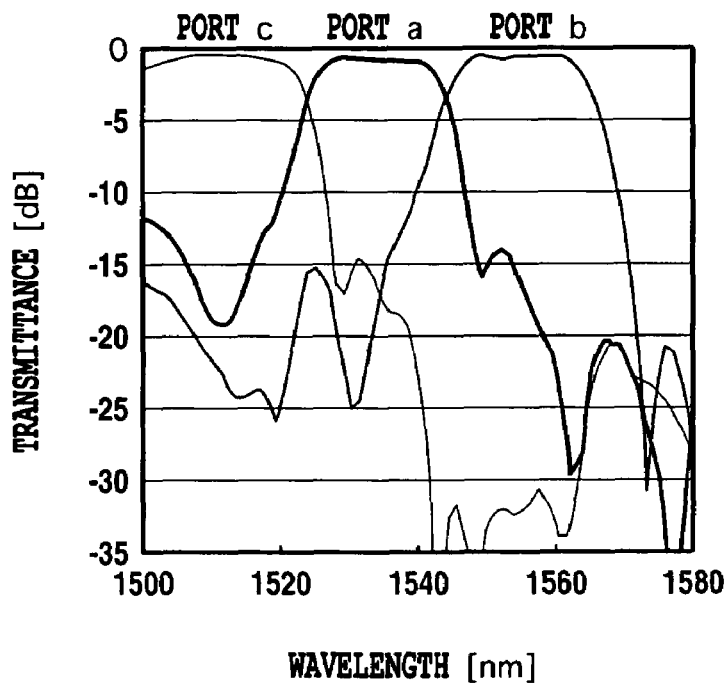
FIG. 19B is a graph illustrating spectra of the transmission loss of the output light produced from the output port of the optical circuit adjusted under the condition settings as illustrated in FIG. 18B.

In addition, FIGS. 19A and 19B are graphs illustrating spectra of transmission losses of the output optical waves emitted from the output ports of the optical circuit adjusted under the condition settings as illustrated in FIGS. 18A and 18B, respectively.

In the condition settings illustrated in FIG. 18A, the light including six wavelengths 1.530 μm, 1.535 μm, 1.540 μm, 1.550 μm, 1.555 μm and 1.560 μm is launched into the input port 3-1 as the wavelength division multiplexed light, and desired dispersion characteristics are implemented by adjusting the phases of the optical waves with the above-mentioned wavelengths so that the two output ports (a and b) of the output port 3-2, which are separated apart by 10 μm, produce 1.530-1.540 μm band light from the port a, and 1.550-1.560 μm band light from the port b.

The present embodiment employs the calculation method as described in the embodiment 2, and assumes the same resolution and circuit scale as the embodiment 3. In this case, as illustrated in FIGS. 17A and 17B, the 3 dB-attenuation wavelength bandwidth is about 5 nm on one side when a pair of the fields is set for each wavelength. Thus, the wavelength spacings are set at 5 nm, and are uniformly distributed across the transmission band in which the six pairs of the fields of the wavelengths are to be obtained. Although the transmission loss spectra calculated by the foregoing calculation method are substantially rectangular as illustrated in FIG. 19A, the transmission in the shorter wavelength region is not suppressed sufficiently. Thus, as illustrated in FIG. 18B, another port (port c) is provided on the output side with a spacing of 10 μm from the port a. The port c is used as a band-shaping dummy port, and the calculation is carried out under the assumption that a set of optical signals with the wavelengths of 1.510 μm, 1.515 μm and 1.520 μm is output from the dummy port.

The dummy port can produce the transmission spectra as illustrated in FIG. 19B, which can suppress the optical transmission sufficiently even in the shorter wavelength region. As a result, the transmission filter is implemented that enables the individual spectra output from the port a and port b (and port c) to take a rectangular shape.

EMBODIMENT 5

The present embodiment relates to a configuration of an optical wavelength band transmission circuit as the embodiment 4. The parameters such as the wavelengths and size of the region differ from those of the embodiment 4 (the total length of the optical circuit is 600 μm). In addition, although the foregoing embodiments 1-4 handle the input field and output fields as the real number vector functions of the locations (the positions in the optical circuit design region), the present embodiment calculates them as complex number vector functions. More specifically, the present embodiment carries out the condition settings in such a manner that the optical circuit includes a plurality of output ports (port a, port b and dummy port c), and that when plane-wave-like fields (that is, fields with uniform phase distribution) are to be produced from the output ports, the optical waves (output fields) produced from the adjacent output ports have different phases. In other words, the fields output from the port a and port b are set such that they have the same complex value, but has different phases.

Figure 20A:
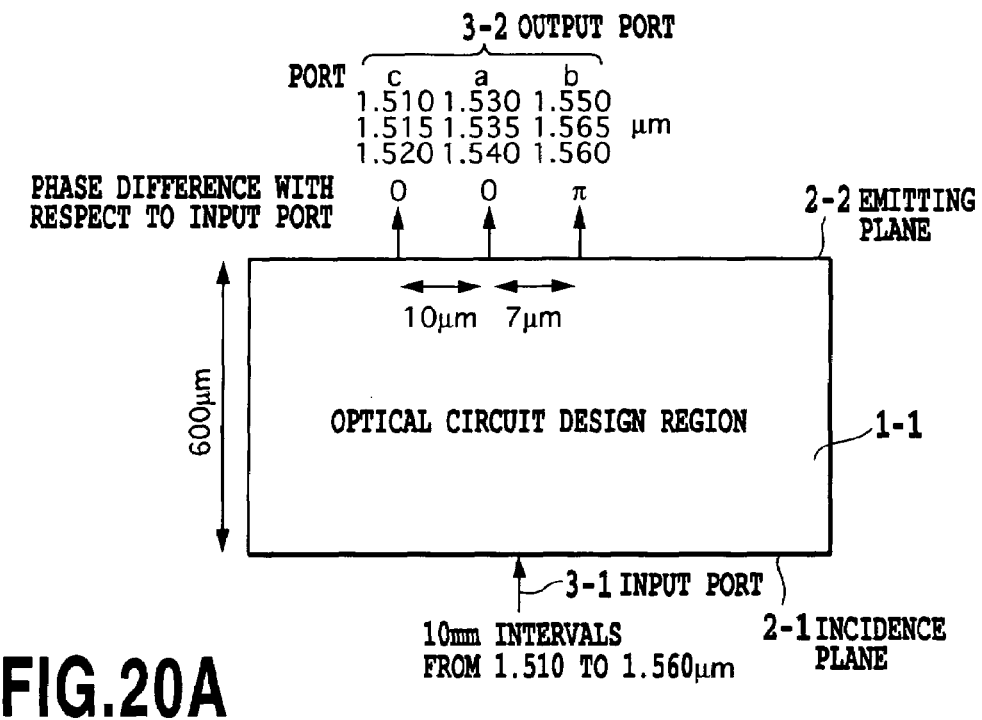
FIG. 20A is a diagram illustrating setting conditions of the optical circuit of an embodiment 5.
Figure 20B:
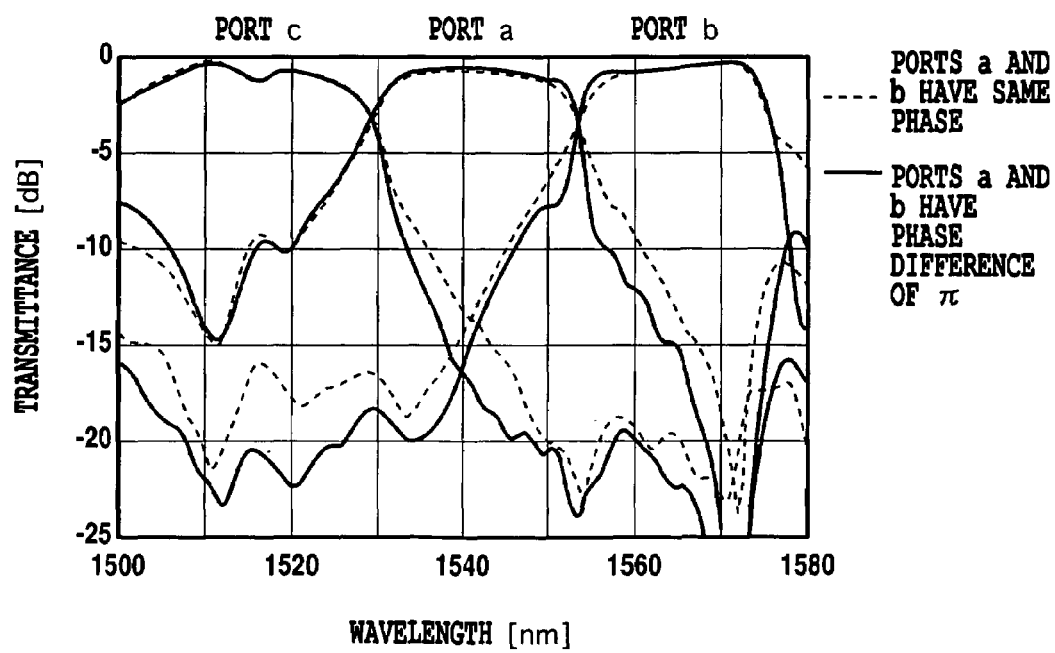
FIG. 20B is a graph illustrating spectra of the transmission loss of the optical circuit of the embodiment 5.

FIGS. 20A and 20B are diagrams illustrating setting conditions and spectra of the transmission losses of the optical circuit of the present embodiment. As illustrated in FIG. 20A, optical waves spaced 10 nm apart (wavelength spacings of 10 nm) in a wavelength range from 1.510 to 1.560 μm are launched into the input port 3-1, and the optical waves of 1.530 μm, 1.535 μm and 1.540 μm are produced from the output port a, the optical waves of 1.550 μm, 1.555 μm and 1.560 μm are produced from the output port b, and the optical waves of 1.510 μm, 1.515 μm and 1.520 μm are produced from the dummy port c. Incidentally, the port a and port b are spaced 7 μm apart, and the port a and dummy port c are spaced 10 μm apart.

It is further set that the optical waves launched into the input port 3-1 have the phase difference of zero with the optical waves output from the port a, and the phase difference of p with the optical waves output from the port b. In addition, the spacing between the port a and port b is extremely narrowed to 7 μm. This makes it possible to suppress the crosstalk of the light to be output from the port a into the port b, or vice versa. The reason for this is as follows. When the optical waves output from the port a and port b have the same phase difference with respect to the optical waves launched into the input port 3-1, the crosstalk wave and non-crosstalk wave have nearly the same phase at the port a and port b. Accordingly, the crosstalk waves are gathered just as the signal light, thereby increasing the crosstalk. In contrast, when the optical waves output from the port a and port b have a phase difference with respect to the optical waves launched into the input port 3-1 as in the present embodiment, the crosstalk waves interfere with each other, thereby preventing the crosstalk waves from being gathered to the individual ports.

In FIG. 20B, solid lines represent spectra when the phase difference between the fields output from the port a and port b is p, and broken lines represent spectra when the phase difference between the fields output from the port a and port b is zero. As illustrated in FIG. 20B, both the cases can implement a transmission filter that outputs rectangular optical spectra from the port a and port b. However, the transmission filter that has the phase difference p between the fields output from the port a and port b can suppress the crosstalk more and implement a sharper rectangular filter than the transmission filter that has no phase difference as described above.

The results of the present embodiment indicate that the phase control of the output light is carried out by only setting the phase parameters for the individual channels. Since such phase relationships can be established not only between the output ports, but also between the input ports, the phase control between these ports enables a Mach-Zehnder (MZ) interferometer or the like to be configured by combining the present optical circuit with other external waveguide circuits.

EMBODIMENT 6

FIGS. 21A-21D are diagrams illustrating a setup of the input/output pairs of the optical circuit of the present embodiment (FIG. 21A); a setting of 1.55 μm emitted field distribution (FIG. 21B); and transmission loss spectra of individual output optical waves when optical waves are launched into the port A and port B (FIGS. 21C and 21D).

The optical circuit of the present embodiment includes two ports (port A and port B) as the input port 3-1 as illustrated in FIG. 21A. The port A receives wavelength division multiplexed light including four wavelengths of 1.29 μm, 1.30 μm, 1.31 μm and 1.32 μm, and the light is demultiplexed and output from the four ports (a, b, c and d) provided as the output port 3-2. On the other hand, the port B receives light of 1.55 μm, and the light is demultiplexed and output from the four output ports (a, b, c and d).

Such an optical circuit can be used for the following applications. Suppose a case where one base station is connected via optical fibers to four terminals placed at locations different in delivery distance, and where optical waves with the wavelengths of 1.29 μm, 1.30 μm, 1.31 μm and 1.32 μm are used for data communication, and an optical wave of 1.55 μm is used for broadcasting. In such a case, the four terminals with different delivery distances can receive at nearly equal optical signal intensity by distributing the optical wave of 1.55 μm in accordance with the losses of the individual optical fibers rather than by distributing the optical wave equally to the optical fibers connected.

Supposing such conditions, the present embodiment distributes optical wave of 1.55 μm to the port a and port c by 1/6 each in the intensity ratio, and to the port b and port d by 1/3 each as illustrated in FIG. 21B. More specifically, the intensity distribution of the emitted field on the emitting plane 2-2 is calculated by superimposing the field distributions of the four ports (a, b, c and d) with different intensities, and the calculation is carried out using the procedure as described in the embodiment 2. As for the optical waves with the wavelengths of 1.29 μm, 1.30 μm, 1.31 μm and 1.32 μm, the total of four field pairs are established in correspondence to the individual wavelengths as in the embodiment 3.

It is seen from the spectra illustrated in FIG. 21C that the wavelength division multiplexed light launched into the input port A is demultiplexed in accordance with the individual wavelengths, and the optical waves are produced from the four output ports (a, b, c and d).

In addition, it is seen from the spectra illustrated in FIG. 21D that the optical wave with the wavelength 1.55 μm launched into the input port B is distributed to the port a and port c by the ratio of about 1/6 (=8 dB), and to port b and port d by the ratio of about 1/3 (=5 dB).

In this way, using the circuit design method of the present embodiment can facilitate the design of the optical distribution circuit. Incidentally, it is obvious that the optical circuit can achieve optical multiplexing by launching light into it from the reverse direction. This means that the design of the optical multiplexing circuit is also possible.

Furthermore, the optical circuit of the present embodiment implements a circuit achieving two functions as a wavelength demultiplexer and optical distributor by providing the optical circuit design region with one refractive index distribution. Thus, according to the present invention, the single optical circuit design region can have different functions (or a region having different functions). This can greatly facilitate the integration of the circuit.

EMBODIMENT 7

In the present embodiment, a design method of the optical circuit considering the propagation light reflection will be described. The light in the optical circuit includes not only propagation waves that progress with repeating multiple scattering, but also reflection waves. Accordingly, setting the fields considering the existence of the reflection waves can implement an optical circuit with better characteristics.

The propagation of the field considering the reflection phenomenon can be described by a "propagation matrix". The propagation matrix is given in a matrix of incident (wave) components and reflection (wave) components, and a structure of the matrix is described in "A bidirectional beam propagation method for multiple dielectric interfaces" (H. Rao, et. al, IEEE PTL Vol. 11, No. 7, pp 830-832(1999)), for example. The propagation matrix corresponds to the "unitary transformation" which has been described already (in the basic concept).

Figure 22:
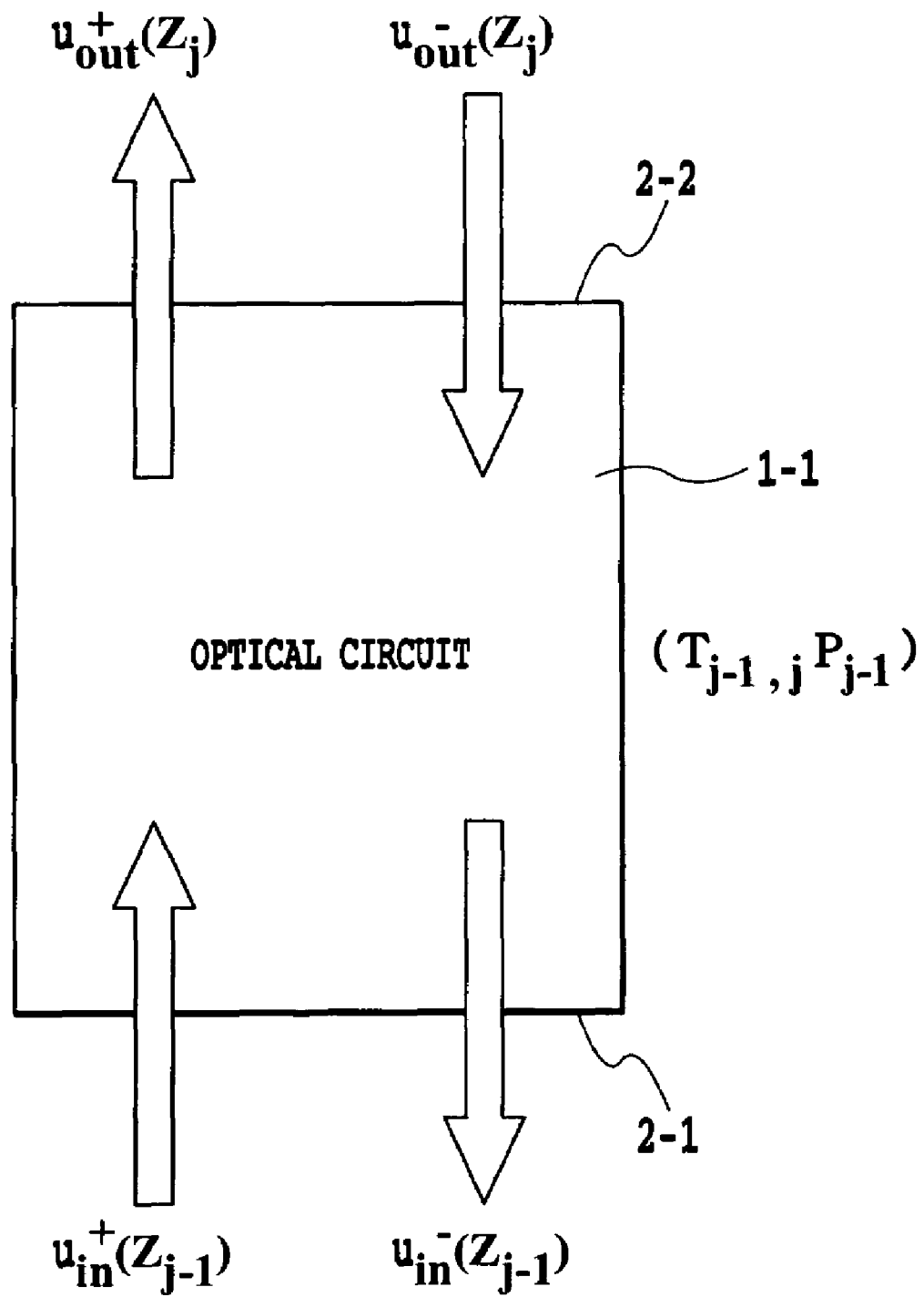
FIG. 22 is a diagram illustrating an outline of handling a propagation matrix when considering reflection component in an embodiment 7, which is drawn with paying attention only to minute portion of the optical circuit.

FIG. 22 is a diagram illustrating an outline of handling the propagation matrix when considering the reflection components, which is drawn by focusing on only a minute portion in the optical circuit.

According to H. Rao, et al., "A bidirectional beam propagation method for multiple dielectric interfaces", IEEE PTL Vol. 11, No. 7, pp. 830-832 (1999), a partial differential equation about the refractive index n(x, z) at a location (x, z) is given by the following expression (12).

$$\delta^2/\delta z^2 = -(\delta/\delta \vec{x})^2 - k_0^2 n(\vec{x},z)^2 \tag{12}$$

Then, it is solved formally, and the following operator is defined.

$$\delta/\delta z = \pm iL(z) \tag{13}$$

Subsequently, the operator defined by the following expression (14) is given as the operator of the jth z location.

$$L_j \tag{14}$$

Using the operator, the propagation matrix of the following expression (16) is given by expression (15).

$$\begin{bmatrix} u_{out}^+ \\ u_{out}^- \end{bmatrix} = M \begin{bmatrix} u_{in}^+ \\ u_{in}^- \end{bmatrix} \tag{15}$$

$$M \tag{16}$$

The symbols $u_{in}$ and $u_{out}$ in expression (15) refer to fields on the input plane 2-1 and output plane 2-2 of the minute portion in the optical circuit illustrated in FIG. 22. The symbol $z_j$ or $z_{j-1}$ means that the minute portion of the optical circuit is placed at the z location of the jth or (j−1)th layer defined by the mesh that virtually covers the entire optical circuit design region. Thus, it should be noted that the input plane 2-1 and output plane 2-2 in FIG. 22 are the input plane and output plane of the minute region rather than the input plane and output plane of the entire optical circuit. The suffix + or − denotes the incident component (+) or reflection component (−) of the fields.

Here, the following relationships hold.

$$M = P_n T_{n-1,n} \cdots P_2 T_{1,2} P_1 \tag{17}$$

$$P_j = \begin{bmatrix} e^{iL_j dz} & 0 \\ 0 & e^{-iL_j dz} \end{bmatrix} \tag{18}$$

$$T_{j+1,j} = \frac{1}{2}\begin{bmatrix} 1 + L_{j+1}^{-1}L_j & 1 - L_{j+1}^{-1}L_j \\ 1 - L_{j+1}^{-1}L_j & 1 + L_{j+1}^{-1}L_j \end{bmatrix} \tag{19}$$

In the present invention, the reflection components are assumed to be given in advance, and the following expression (20) is considered.

$$P_{j+1}(P_{j+2}T_{j+1,j+2})^{-1} \cdots (P_n T_{n-1,n})^{-1}\begin{bmatrix} u_{out}^+ \\ u_{out}^- \end{bmatrix} = \tag{20}$$

$$(T_{j,j+1}P_j)(T_{j-1,j}P_{j-1})\cdots(T_{1,2}P_1)\begin{bmatrix} u_{in}^+ \\ u_{in}^- \end{bmatrix}$$

Considering the left side of expression (20) as the reverse propagation light $f(z_{j+1})$ down to the (j+1)th layer, and the right side as the propagation light $\psi(z_{j-1})$ up to the (j−1)th layer, the "refractive index" (operator corresponding to the refractive index) given by the following expression (21) is adjusted to implement the optical circuit having desired functions.

$$(T_{j-1,j}P_{j-1}) \tag{21}$$

For example, when reflections from interfaces between the layers are weak, the following expression (22) holds with a close approximation.

$$L_{j+1}^{-1}L_j = 1 \tag{22}$$

Accordingly, the following approximation is possible.

$$T_{j-1,j} \approx \begin{bmatrix} 1 & 0 \\ 0 & 1 \end{bmatrix} \tag{23}$$

Since the following expression (18) gives the optical propagation in a state in which no reflection is present, the optical circuit design can be performed by the same design method as the two methods described in the foregoing embodiments.

$$P_j = \begin{bmatrix} e^{iL_j dz} & 0 \\ 0 & e^{-iL_j dz} \end{bmatrix} \tag{18}$$

More specifically, an incident wave launched into the input plane and a reflection wave toward the input plane are set, and in addition an output wave produced from the output plane is set. Then the calculation is carried out in the procedure as described in the embodiment 1 by assuming at individual points of the optical circuit design region the field traveling in the propagation direction (that is, in the direction from the input plane 2-1 to the output plane 2-2), and the field traveling in the reflection direction (that is, in the direction from the output plane 2-2 to the input plane 2-1). Incidentally, according to the principle of causality, although the reflection wave toward the output plane does not occur, and hence is zero, the reflection wave components toward the output plane are present on the way in the optical circuit.

Generally, the reflection wave components produced in the optical circuit are nearly negligible in the optical circuit, when the spatial refractive index variation is small. Accordingly, the major effect the refractive index variation has on the light in the optical circuit is as follows: As for the light traveling in the propagation direction, it is the phase variation involved in the propagation in the propagation direction; and as for the light traveling in the reflection direction, it is the phase variation involved in the propagation in the reflection direction. Thus, the combination of the incident wave component traveling in the propagation direction and the reflection wave component traveling in the propagation direction is made one forward propagation wave, and, from a standpoint of the incident light, the combination of the incident wave component traveling in the reflection direction (an output wave traveled in the reverse direction) and the reflection wave component traveling in the reflection direction (the reflection componet pairing the output wave traveled in the reverse direction) is made one reverse propagation wave. Then, assuming two fields corresponding to the two waves, the refractive index distribution is calculated by varying the local refractive indices by the method described in the embodiment 1 or 2.

Figure 23A:
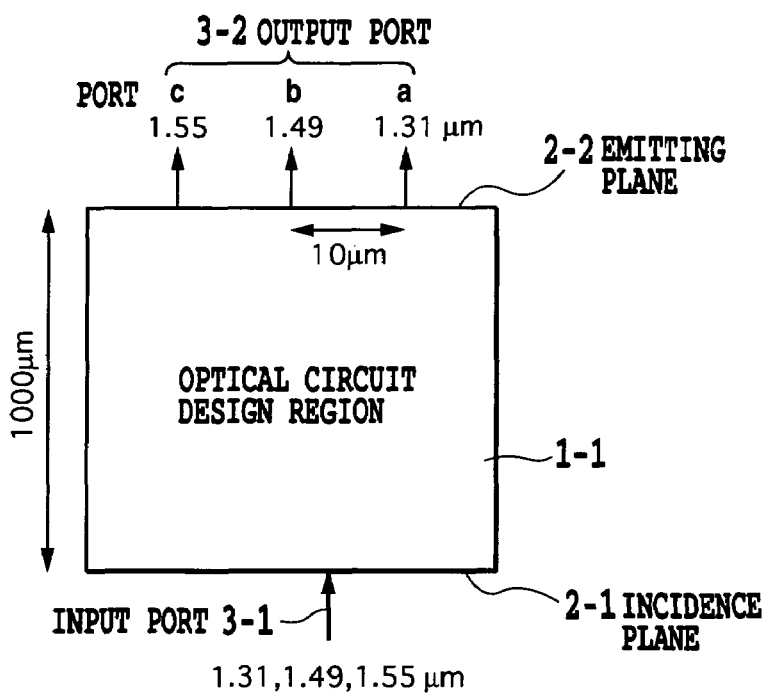
FIG. 23A is a diagram illustrating setting conditions of an optical circuit (wave filter) of the embodiment 7.
Figure 23B:
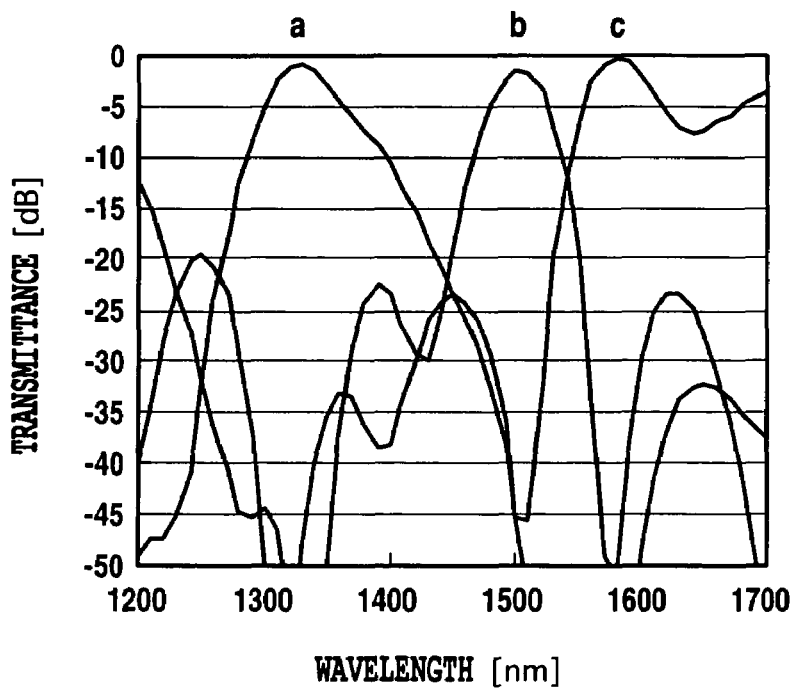
FIG. 23B is a graph illustrating spectra of the transmission loss of the optical circuit (wave filter) of the embodiment 7.

FIGS. 23A and 23B are diagrams illustrating setting conditions of the optical circuit (wave filter) of the present embodiment, and spectra of the transmission losses of the optical circuit. As illustrated in FIG. 23A, the optical circuit operates as a wave filter in which the input port 3-1 receives the wavelength division multiplexed light with the wavelengths of 1.31 μm, 1.49 μm and 1.55 μm, and three ports (port a, port b and port c) provided as the output port 3-2 output three optical waves with these wavelengths. In the present embodiment, the port a, b and c output the optical waves with the wavelengths of 1.31 μm, 1.49 μm and 1.55 μm, respectively. The port spacings are 10 μm each, and the length of the optical circuit is 1 mm (1000 μm).

The optical circuit is a planar optical circuit composed of silica on the silicon substrate. The refractive index distribution of the optical circuit is established by adjusting the local refractive indices of the silica in the optical circuit design region 1-1 such that they constitute the high refractive index section or low refractive index section. The refractive index difference between the high refractive index section and the low refractive index section is 1.5%.

As illustrated in FIG. 23B, the optical circuit produces from the individual output ports the three optical waves with different wavelengths, which have low losses and sharp transmission characteristics, thereby implementing an optical circuit with superior wave filter characteristics. Thus carrying out the circuit design considering the reflection waves in the optical circuit makes it possible to fabricate an optical circuit with excellent filter characteristics.

EMBODIMENT 8

In the present embodiment, an example of a 16-branching optical circuit configured using the wave transmission medium in accordance with the present invention will be described.

Figure 24A:
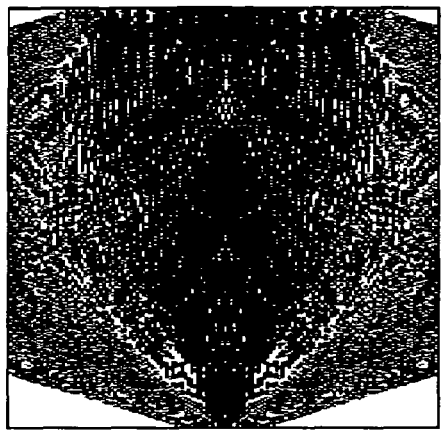
FIG. 24A is a diagram illustrating refractive index distribution of a 16-branching optical circuit of an embodiment 8.
Figure 24B:
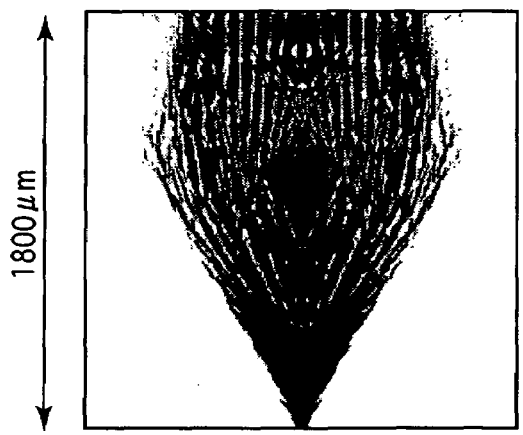
FIG. 24B is a diagram illustrating behavior of the optical propagation in the 16-branching optical circuit of the embodiment 8.
Figure 24C:
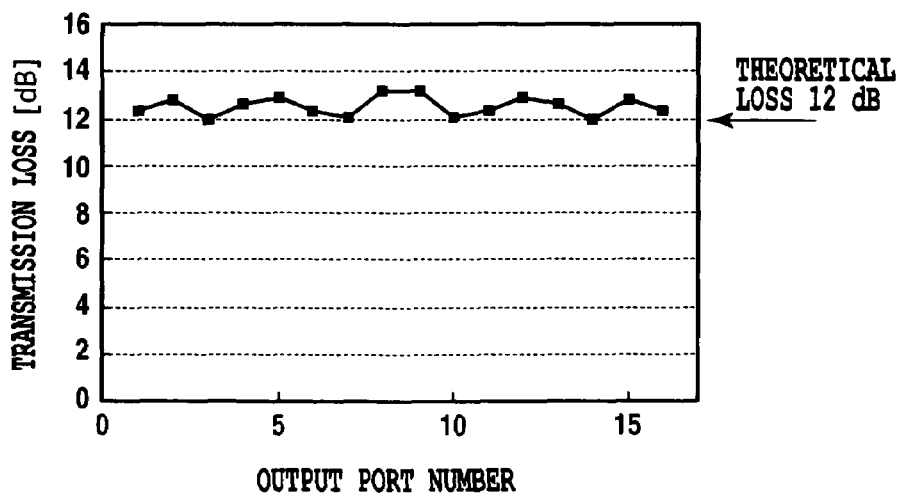
FIG. 24C is a diagram illustrating optical transmission losses (dB) of light output from 16 output ports of the 16-branching optical circuit of the embodiment 8.

FIGS. 24A-24C illustrate the refractive index distribution in the 16-branching optical circuit (FIG. 24A); behavior of the optical propagation (FIG. 24B); and optical transmission losses (dB) of the optical waves emitted from the 16 output ports (FIG. 24C).

The optical circuit is formed by patterning an optical circuit design region by etching. The optical circuit design region is formed by depositing on the silicon substrate, silica whose refractive index difference $\Delta$ between the high refractive index section and low refractive index section is 0.75%. The size of the optical circuit is 420 μm×1800 μm. As illustrated in FIG. 24B, the optical circuit is configured such that the light launched into the center of the incidence plane of the optical circuit (center at the bottom of FIG. 24B) propagates through the optical circuit design region with repeating multiple scattering, and is output from the 16 ports provided on the emitting plane (top of FIG. 24B) of the optical circuit.

FIG. 24A illustrates the refractive index distribution obtained by the method described in the embodiment 2. In FIG. 24A, black regions correspond to the high refractive index section, and white regions correspond to the low refractive index section. The pixel size (corresponding to the pixel defined by the mesh) is 3×3 μm².

In FIG. 24B, which illustrates the numerical calculation results of the behavior of the field when the light is transmitted through the optical circuit, gradations represent the optical intensity distribution. An input light ray is split to 16 light rays in the emitting plane of the optical circuit, and the individual light rays are output from the 16 ports. The 16 ports are numbered (1, 2, . . . , and 16 from the left end), and the results of measuring the transmission losses of the optical rays output from the individual ports are illustrated in FIG. 24C. The losses of the 16 ports are distributed within about 2 dB with reference to the theoretical loss of 12 dB. Thus, it is seen from FIG. 24C that a uniform, low loss optical distribution is implemented.

Thus, the optical circuit design method in accordance with the present invention can carry out the optical division easily with a very short waveguide length of 1800 μm. Considering that the conventional optical circuit requires a waveguide length of about one centimeter to achieve the equivalent functions, it will be understood easily that the present invention can sharply reduce the waveguide length, thereby being able to implement a miniature optical circuit.

EMBODIMENT 9

In the present embodiment, a configuration will be described of a "bending circuit" whose optical waveguide is provided with a desired curvature by using the wave transmission medium in accordance with the present invention.

It is necessary for the optical waveguide composed of a dielectric to avoid a sharp bend in order to circumvent optical radiation from the waveguide. Accordingly, the waveguide of the bending circuit is designed such that it has a small curvature with a radius of curvature greater than a predetermined. For example, as for a conventional bending circuit composed of a silica-based optical waveguide core and cladding with the refractive index difference $\Delta$=1.5%, the circuit is designed such that its radius of curvature becomes about 5 mm to implement an optical bending circuit.

In contrast with this, the optical circuit of the present embodiment can return the light that once leaked out from the optical waveguide to that optical waveguide by the reflection due to multiple scattering. Thus, the optical waveguide can be designed to have a large curvature (small radius of curvature), thereby being able to miniaturize the optical circuit.

Figure 25A:
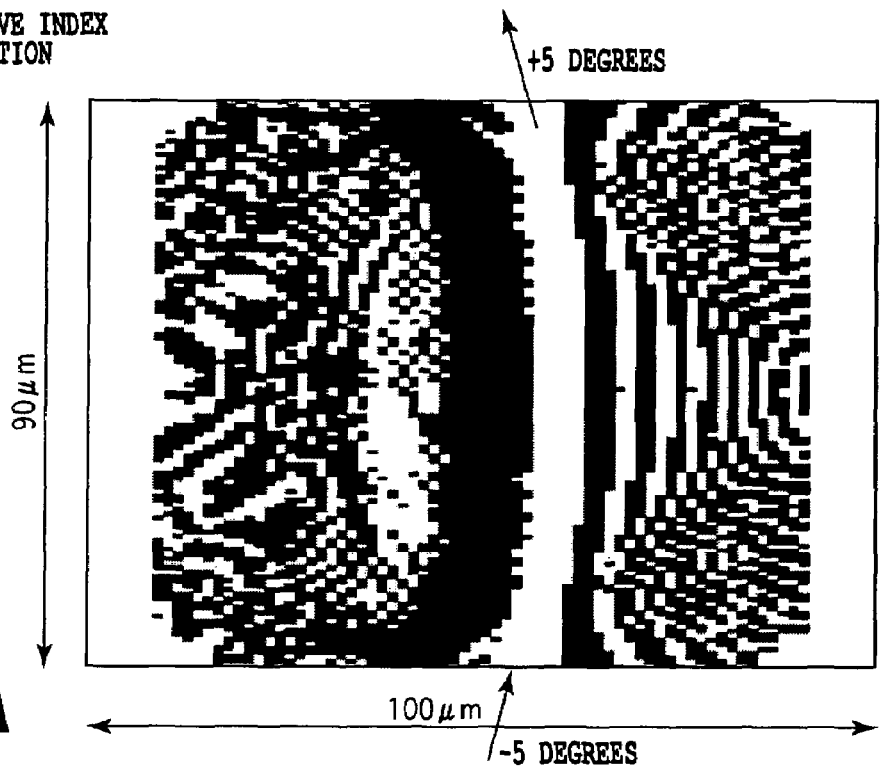
FIG. 25A is a diagram illustrating a refractive index distribution of a bending circuit of an embodiment 9.
Figure 25B:
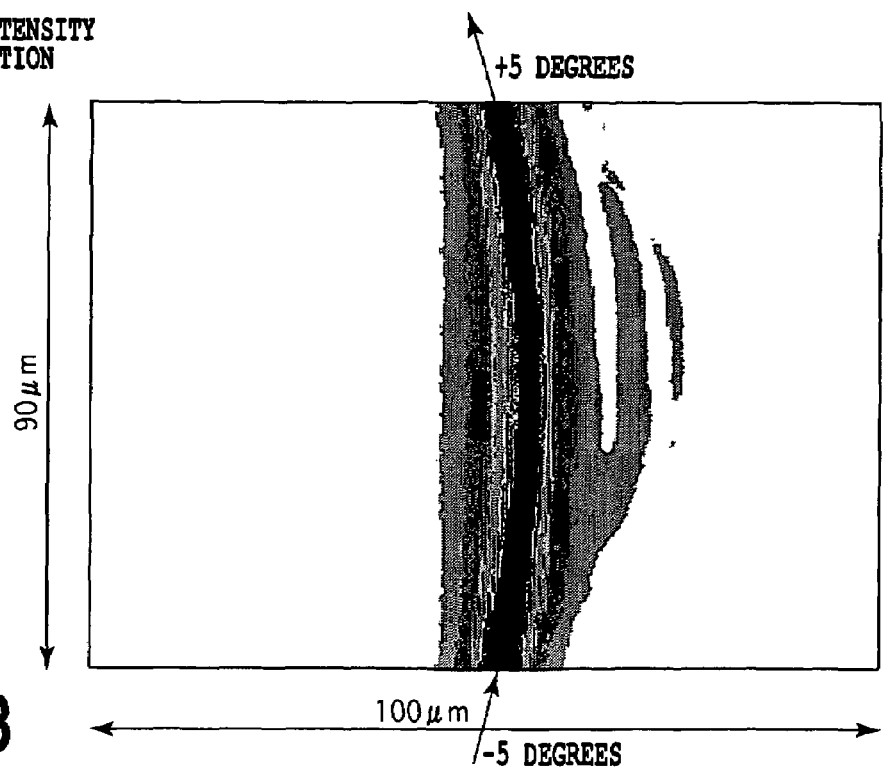
FIG. 25B is a diagram illustrating behavior of optical propagation of the bending circuit of the embodiment 9.

FIGS. 25A and 25B are views illustrating the refractive index distribution of the bending circuit of the present embodiment (FIG. 25A), and behavior of the optical propagation thereof (FIG. 25B).

The optical circuit is formed by patterning an optical circuit design region by etching. The optical circuit design region is formed by depositing on the silicon substrate, silica whose refractive index difference $\Delta$ between the high refractive index section and low refractive index section is 1.5%. The size of the optical circuit is 100 μm×90 μm. As illustrated in FIG. 25B, the optical circuit is configured such that the light launched into the center of the incidence plane of the optical circuit (center at the bottom of FIG. 25B) at an angle of −5 degrees with respect to the incidence plane propagates through the optical circuit design region with repeating multiple scattering, and is output at an angle of +5 degrees with respect to the emitting plane (top of FIG. 25B) of the optical circuit.

FIG. 25A illustrates the refractive index distribution obtained by the method described in the embodiment 2. In FIG. 25A, black regions correspond to the high refractive index section, and white regions correspond to the low refractive index section. The pixel size (corresponding to the pixels defined by the mesh) is 0.7×0.7 μm².

In FIG. 25B, which illustrates the numerical calculation results of the behavior of the field when the light is transmitted through the optical circuit, gradations represent the optical intensity distribution in the optical circuit design region. The light leaking out of the waveguide is returned to the waveguide by the reflection due to the multiple scattering, thereby circumventing the optical leakage from the waveguide due to radiation. In addition, the field profiles at the output side and input side illustrated in FIG. 25B have nearly the same shape. This indicates that the disturbance of the field profile caused by the leakage of light out of the waveguide is restrained by the multiple scattering and the field profile is shaped.

The bending circuit of the present embodiment can implement the bending of 10 degrees between the optical input and output angles by the waveguide length of 90 μm. The bending corresponds to the radius of curvature of about 0.5 mm. Thus, a waveguide with a very small radius of curvature (large curvature) is implemented. In addition, since the optical insertion loss of the bending circuit is less than 0.1 dB, a bend of about 90 degrees, which will be achieved by repeating the bending circuits a plurality of times, has a loss that is expected to be very small of less than 1 dB, thereby being able to implement a very compact bending circuit.

EMBODIMENT 10

In the present embodiment, an example of a multimode interference circuit (MMI) configured by using the wave transmission medium in accordance with the present invention will be described.

In the optical circuit, when the optical field has a large wave number (namely, momentum) in the propagation direction, the wave number in the transverse direction is reduced (that is, the momentum in the transverse direction, the direction perpendicular to the propagation direction, is reduced). As a result, the light is reflected in the transverse direction even in the interface with a comparatively small refractive index difference. Configuring an optical waveguide with a certain width using this phenomenon enables the propagation light field to meander through the optical waveguide with repeating reflection, thereby being able to increasing the effective optical path length. Such an optical propagation phenomenon corresponds to a fact that in an optical circuit in which optical waves of a plurality of modes can exist, these optical waves are propagating with repeating interference with one another. The optical circuit is called a multimode interference circuit (MMI).

In the conventional multimode interference circuit, however, the modes higher than a certain order cannot exist and are radiated to the outside. Thus, it presents a problem in that although an increasing width of the optical circuit can increase the meanders of the light propagating through the optical circuit, and hence can increase the effective optical path length, the light is leaked out of the optical circuit because of the radiation.

To solve the problem, the present embodiment includes the optical circuit in accordance with the present invention in the multimode interference circuit.

Figure 26A:
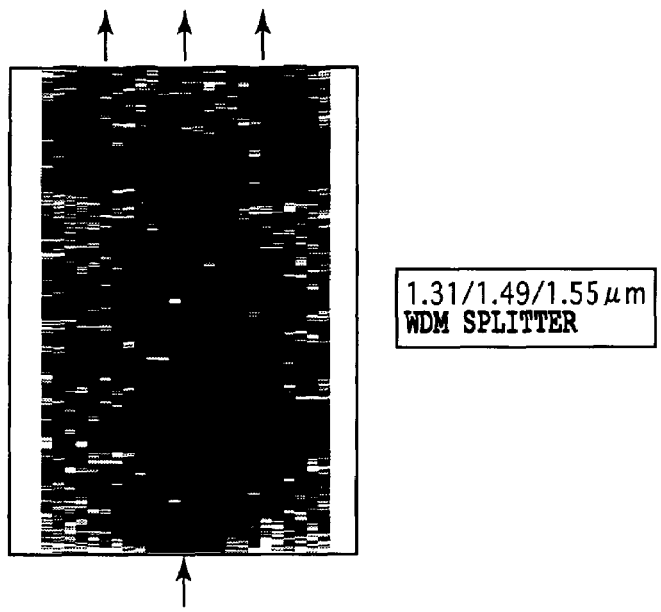
FIG. 26A is a diagram illustrating refractive index distribution in an optical circuit design region in an embodiment 10.
Figure 26B:
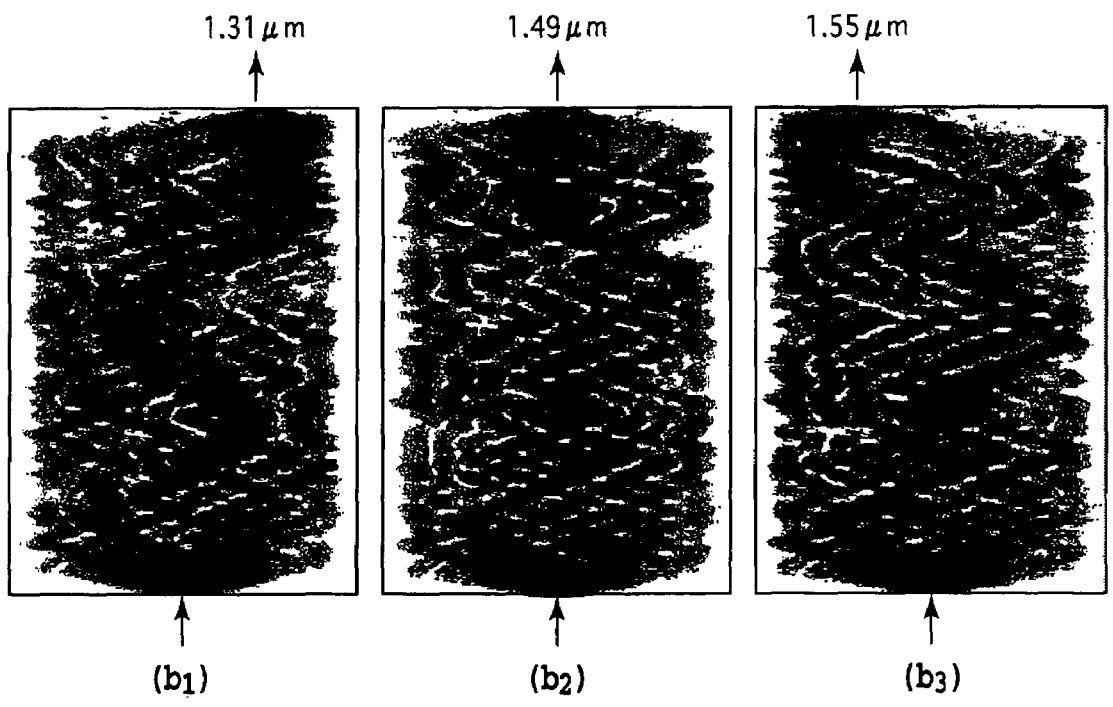
FIG. 26B is a diagram illustrating behavior of the propagation of a field for each optical wavelength of light propagating through the optical circuit of the embodiment 10.

FIGS. 26A and 26B are diagrams illustrating the refractive index distribution in the optical circuit design region of the present embodiment (FIG. 26A), and the behavior of the propagation of the fields of respective optical wavelengths propagating through the optical circuit (FIG. 26B).

The optical circuit is formed by patterning an optical circuit design region by etching. The optical circuit design region is formed by depositing on the silicon substrate, silica whose refractive index difference Δ between the high refractive index section and low refractive index section is 0.75%. The size of the optical circuit is 60 µm wide by 3000 µm long. In FIG. 26A, the bottom corresponds to the incidence plane having one input port into which wavelength division multiplexed light including three wavelengths of 1.31 µm, 1.49 µm and 1.55 µm is launched. The three optical waves each meander through the optical circuit in different fashions corresponding to the wavelengths, and are output from the three output ports provided in the emitting plane at the top of FIG. 25A in accordance with the individual wavelengths. In other words, the optical circuit functions as a wavelength selection filter.

The refractive index distribution illustrated in FIG. 26A is a result obtained by the method described in the embodiment 2. In FIG. 26A, black regions correspond to the high refractive index section, and white regions correspond to the low refractive index section. The pixel size (which corresponds to the pixels defined by the mesh) is 3×3 µm$^2$. The beltlike low refractive index regions extending linearly in the vertical direction in the right and left sides of FIG. 26A are regions which are also seen in the conventional multimode interference circuit. The low refractive index section dispersed in the high refractive index region between the beltlike regions provides the refractive index distribution established in accordance with the present invention.

FIG. 26B illustrates the results of numerical calculations of the behavior of the fields for individual wavelengths when the light propagates through the optical circuit. In FIG. 26B, gradations, which represent the optical intensity distribution in the optical circuit design region, illustrate that the optical waves with any wavelengths meander through the optical circuit, and that the light is nearly negligible which is leaked out of the region of the multimode interference circuit because of the multiple scattering in the optical circuit.

As is seen from the behavior of the optical meander as illustrated in FIG. 26B, the light proceeding through the optical circuit obliquely repeats turns on the side planes of the circuit, and is gathered to the individual output ports. Accordingly, the optical circuit can provide a large optical path length difference in the small area within the optical circuit design region. In addition, it can increase the effect of the individual pixels (refractive indices of the individual pixels) on the propagation field, thereby being able to control the light efficiently. All the individual output ports of the multimode interference circuit of the present embodiment have a propagation loss of about 0.8 dB, and crosstalk of about −20 dB, which are favorable characteristics as the wavelength selection filter.

As described above, the multimode interference circuit of the present embodiment can not only suppress the leakage of the propagation light, but also implement the miniaturization of the circuit and improve optical controllability.

EMBODIMENT 11

The optical circuit of the present embodiment is a planar optical wave circuit for demultiplexing optical wavelength division multiplexed light including two wavelengths of 1.3 µm and 1.55 µm into optical waves of the individual wavelengths. To design such a demultiplexing circuit by the method described in the embodiment 1, the low refractive index section must be distributed in a large portion of the optical circuit design region as illustrated in the right-hand side of FIG. 27A. Accordingly, the optical confinement in the thickness direction of the substrate becomes difficult, thereby requiring a special optical confinement structure as illustrated in FIG. 11 as described before.

In contrast with this, the embodiment 2 makes random the initial values of the refractive index distribution to obviate the need of the special optical confinement structure, and implements the effective optical confinement by the refractive index distribution as illustrated in FIG. 15A.

Figure 27A:
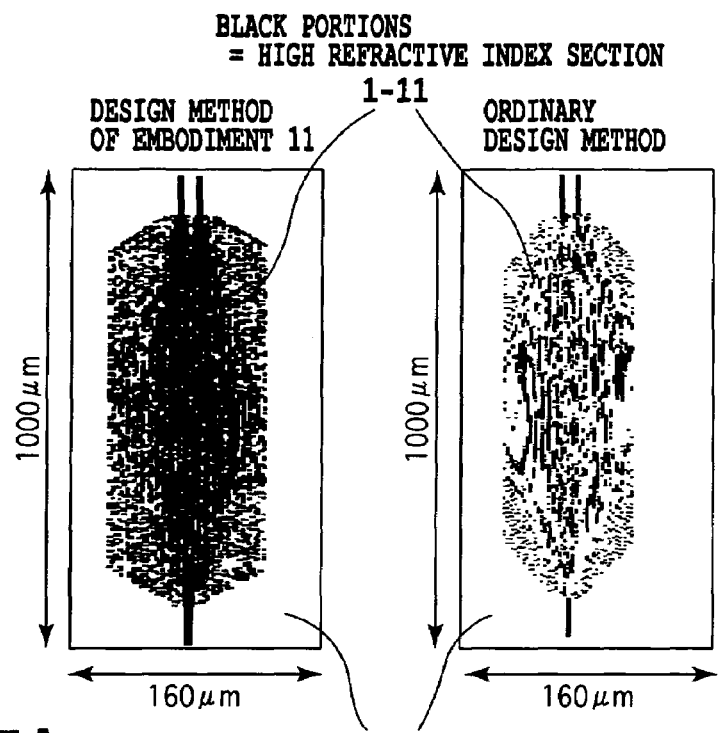
FIG. 27A is a diagram illustrating a refractive index distribution in an optical circuit design region in an embodiment 11.

The present embodiment makes further improvements by distributing the high refractive index section and low refractive index section in such a manner that the high refractive index section becomes as large as possible in deciding the refractive index distribution, and by deciding the refractive index distribution in such a manner that the regions, in which the low refractive index pixels are disposed continuously, become as small as possible (left-hand side of FIG. 27A). It can be said in another way that the refractive index distribution is decided such that the high refractive index pixels are distributed as much as possible so that the continuous distribution of the interstices of the high refractive index pixels becomes as small as possible, when the pixels with the low refractive index are considered to be regions in which no pixels with the high refractive index are present, that is, when the low refractive index pixels are considered to be interstices of the high refractive index pixels.

A concrete method of achieving this is as follows. First, the algorithm described in the embodiment 2 is improved as follows so that the region corresponding to the core of the optical waveguide becomes as large as possible in the refractive index distribution.

Specifically, the following quantity is defined.

$$n_{offset} > 0 \quad (19)$$

Then, assume the following expressions.

$$n_q(z, x) = n_{core}, \text{ when } v_q(z, x) > (n_{core} + n_{clad})/2 - n_{offset} \quad (20), \text{ and}$$

$$n_q(z, x) = n_{cladd}, \text{ when } v_q(z, x) < (n_{core} + n_{clad})/2 - n_{offset} \quad (21)$$

where $n_{core}$ is the refractive index associated with the core, that is, the refractive index of the high refractive index section, and $n_{clad}$ is the refractive index associated with the cladding, that is, the refractive index of the low refractive index section. Therefore the refractive index distribution in the optical circuit design region is obtained by spatially distributing these two types of the refractive indices. Introducing the foregoing $n_{offset}$, the design of the optical circuit including a lot of core regions is possible. The amount $n_{offset}$ can be obtained as follows.

Figure 27B:
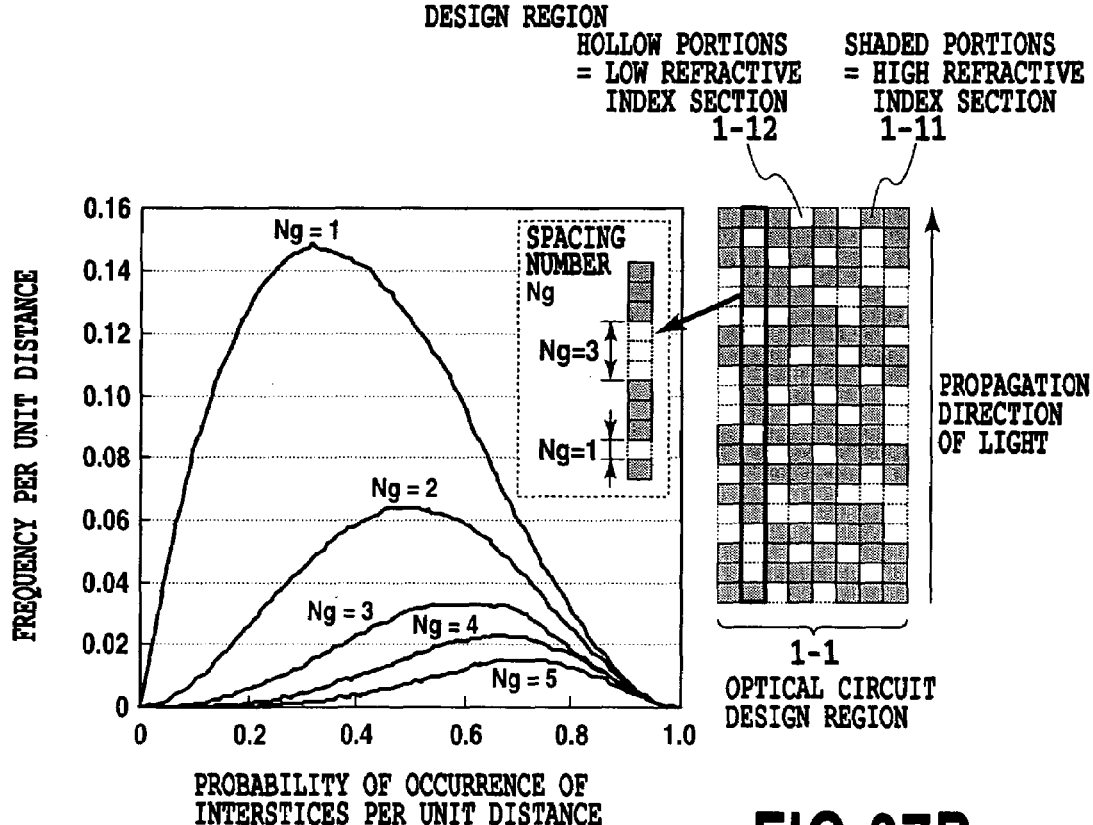
FIG. 27 is a graph illustrating relationships between the probabilities of occurrence of interstices in the waveguide per unit length in the optical circuit design region of the embodiment 11 (horizontal axis), and the frequencies at which interstices of the high refractive index section continue (that is, the low refractive index section continues) for each pixel number $N_g$ (vertical axis)

FIG. 27B is a graph illustrating relationships between the probability of occurrence of the interstices in the waveguide of a unit length (horizontal axis) and the frequencies at which the interstices of the high refractive index section continue (that is, the low refractive index section continues) for each pixel number $N_g$ (vertical axis). They are calculation results by a Monte-Carlo method. Since the difference in the value $N_g$ represents a fashion in which the voids are connected, the frequencies per unit length in the waveguide vary depending on the value $N_g$. The probability of occurrence of the interstices represented by the horizontal axis means the following: The probability of occurrence of zero means that no interstice is present in the waveguide of the unit length; the probability of occurrence of unity means that the waveguide of the unit length is composed of the interstices in its entirety; and the probability of occurrence of 0.5 corresponds to the case where half of the waveguide of the unit length is composed of the interstices. In addition, the frequency per distance of 0.1 for the curve of $N_g=1$, for example, means that when assuming a column consisting of 10 pixels, it includes one empty pixel of $N_g=1$ in probability.

In the calculation, only the vertical direction region of the optical circuit is considered, neglecting the effect the interstices continuing in the transverse direction have on the field. Such handling is valid because it is the propagation direction that the electromagnetic field varies sharply in the circuit through which the light propagates.

The unit length of the interstices equals the mesh spacing of the refractive index distribution of the core. For example, when the mesh spacing is 1 μm, the unit length of the interstices is 1 μm. Accordingly, the spacing between the high refractive index pixels separated apart from each other by the interstices are 0 μm, 1 μm, 2 μm and so on for $N_g=0, 1, 2$ and so on.

In the range of the optical wavelength used by the optical communication, the wavelength becomes about 1 μm in a medium whose refractive index is about 1.5. Accordingly, a spacing of a few micrometers in the optical circuit causes the light to radiate, thereby bringing about a loss. Since the general processing accuracy of the optical circuit is on the order of 1 μm, it is preferable that $N_g=3$ or less assuming that the mesh is established at regular spacings of about 1 μm to decide the refractive index distribution of the optical circuit.

Thus, searching for conditions in which the interstices with $N_g=4$ and more seldom occur and the number is large enough of interfaces between the core and cladding at which the refractive index variations occur, it is seen from FIG. 27B that the probability of occurrence of the interstices of $N_g=1$ is preferably set at about 0.2±0.05. This means that the core regions and cladding regions are distributed nearly at random at the same distribution probability in the refractive index distribution decided in the design conditions of the embodiment 1; that the variation (2 s) of what is on the order of the refractive index difference; and that assuming the normal distribution, the core arrangement parameter is to be set at about 30% of the refractive index difference. In other words, setting $n_{offset}$ at about $n_{offset} = (n_{core} - n_{clad})/3$ makes it possible to include the interfaces at which the refractive index varies by a proper amount, and to configure an optical circuit with the core whose spacings are narrow.

The optical circuit was prototyped by deciding the refractive index distribution according to the algorithm as described above, and its characteristics were examined. The optical loss of the prototype was about 6 dB when the refractive index distribution as shown in FIG. 27B was used, whereas it was about 2.5 dB when the refractive index distribution as shown in FIG. 27A of the present embodiment was used. Thus, a large amount of loss reduction was confirmed.

Although the present embodiment gives $n_{offset}$ as a constant in advance, it is not necessarily a constant. As seen from the fact that the horizontal axis of FIG. 27B represents the probability of occurrence of the interstices per unit distance, the probabilities of occurrence of the interstices can be collected during the calculation, and $n_{offset}$ can be altered successively on the basis of the results, which enables more positive correction. For example, to calculate the frequencies of $v_q(z, x)$ and set it at 50%, $n_{offset}$ can be set at the average of $v_q(z, x)$.

EMBODIMENT 12

Figure 28A:
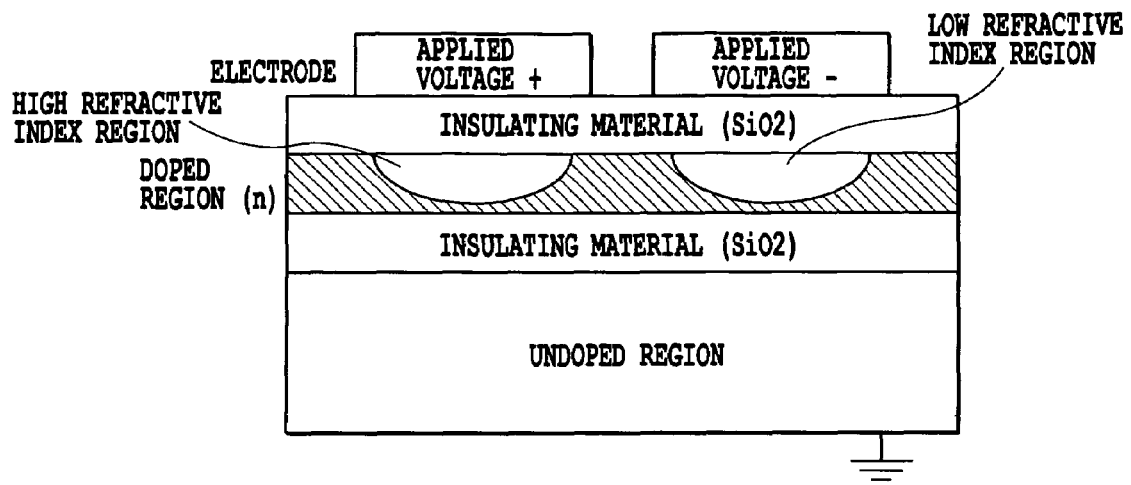
FIG. 28A is a cross-sectional view showing a structure of an electrode of an embodiment 12.
Figure 28B:
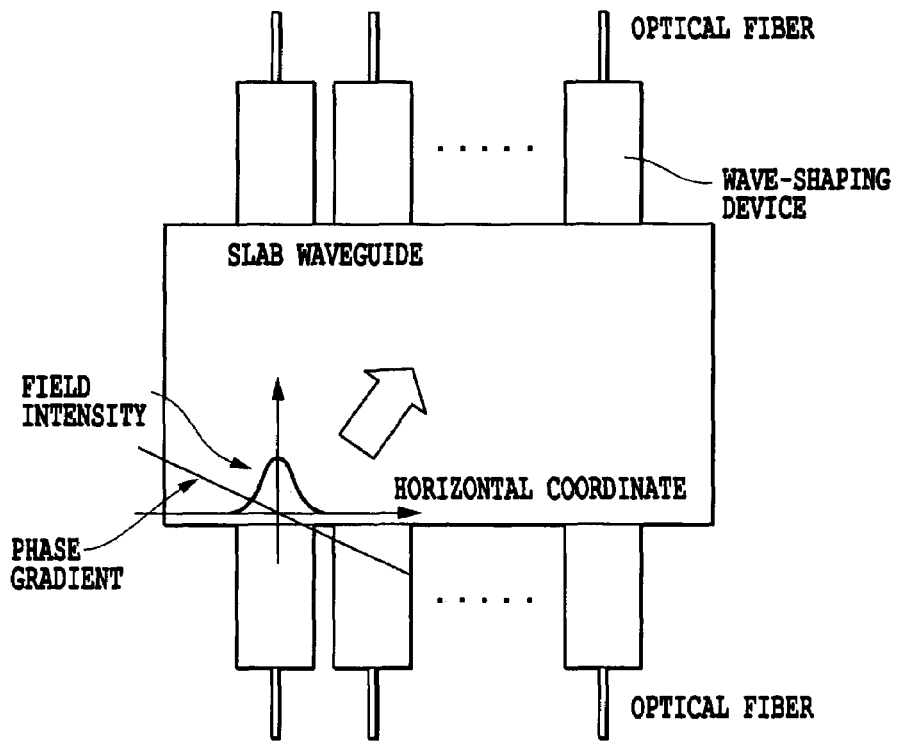
FIG. 28B is a diagram illustrating a configuration of an optical circuit using the device as illustrated in FIG. 28A.

FIG. 28A is a cross-sectional view of an electrode structure of the present embodiment; and FIG. 28B shows a configuration of an optical circuit using the device. As an example of an optical wave-shaping circuit for generating a plurality of sets of the refractive index distributions on the substrate by the electrooptic effect, FIG. 28A shows a configuration of an optical circuit capable of reconfiguring the circuit by electrodes mounted on a silicon substrate in a matrix-like fashion via an optically transparent insulating film (silica glass in this case). The insulating film is about 0.3 μm thick, and a doped region is about 3 μm thick. In the example, the so-called Silicon-On-Insulator (SOI) structure with a glass layer is used as the substrate under the insulating film. Applying a voltage across the electrodes can vary electronic concentration, thereby being able to generate the refractive index difference of an order of $10^{-3}$. Since it has a MOS structure, a fine structure, large-scale optical circuit can be fabricated easily through an ordinary semiconductor process. Generally speaking, since the refractive index difference of $10^{-3}$ can implement an optical waveguide structure with only very weak confinement, it is difficult to construct a practical circuit. However, just as the weak refractive index modulation such as a fiber grating written in the silica glass with UV light can carry out large magnitude of reflection of light, designing the optical circuit by the present embodiment using a broad calculation region enables the configuration of a practical optical circuit.

As described in the foregoing embodiments 1-11, the optical circuit can be configured by designing a pattern of the refractive index distribution, and by generating the voltage distribution in accordance with the refractive index distribution. In particular, the optical circuit can be reconfigured by storing a plurality of refractive index distributions in a semiconductor memory in advance, and by varying the voltage distribution as needed. In addition, since the MOS process is applicable to the circuit, a flash-memory-like configuration can implement a programmable optical circuit. More specifically, a source, drain, floating gate and control gate are provided as part of the circuit, and the optical circuit is configured by abandoning the refractive index control of the source and drain regions, and by varying the refractive index immediately below the floating gate. Since it is enough for the source and drain regions to be supplied with a current only at the reconfiguration of the circuit, the circuit can be configured in the state in which the voltage is not supplied for establishing the refractive index distribution.

According to the embodiment, a wave-shaping circuit was fabricated by disposing a million or so electrodes in a matrix-like fashion on a chip of about a 5-mm square. It expands the field radius to several hundred micrometers against the substrate, and controls the phase distribution. It can carry out the optical multi/demultiplexing for a device that has the same structure and is opposing via slab waveguides linked by butt coupling. The optical components (fibers, the device of the present embodiment and slab waveguides) are joined with an optically transparent adhesive.

FIG. 28B shows an example of an optical circuit using the device of FIG. 28A. The field is expanded, and a uniform phase gradient is provided in the transverse direction to propagate the optical signal from the bottom left corner toward the upper right. Adjusting the phase appropriately enables distribution to a plurality of channels.

EMBODIMENT 13

An optical circuit of this embodiment is a wavelength filter of 1.31 μm/1.55 μm using Rayleigh scattering having low directionality and high wavelength dependency.

Scattering caused by an object having a size on the order of ¹/₁₀ or less of the wavelength of light is generally called Rayleigh scattering, which provides scattering with low directionality and high wavelength dependency (proportional to one biquadrate-th of wavelength). This embodiment realizes a refractive index distribution (dielectric distribution) that satisfies conditions under which Rayleigh scattering occurs and obtains a sufficiently large optical controllability by reducing the pixel size of a high-refractive-index area of a wave transmission medium making up an optical circuit to approximately the length of a wavelength component or below in the direction perpendicular to the propagation direction of light which propagates in the optical circuit.

Figures 29A, 29B:
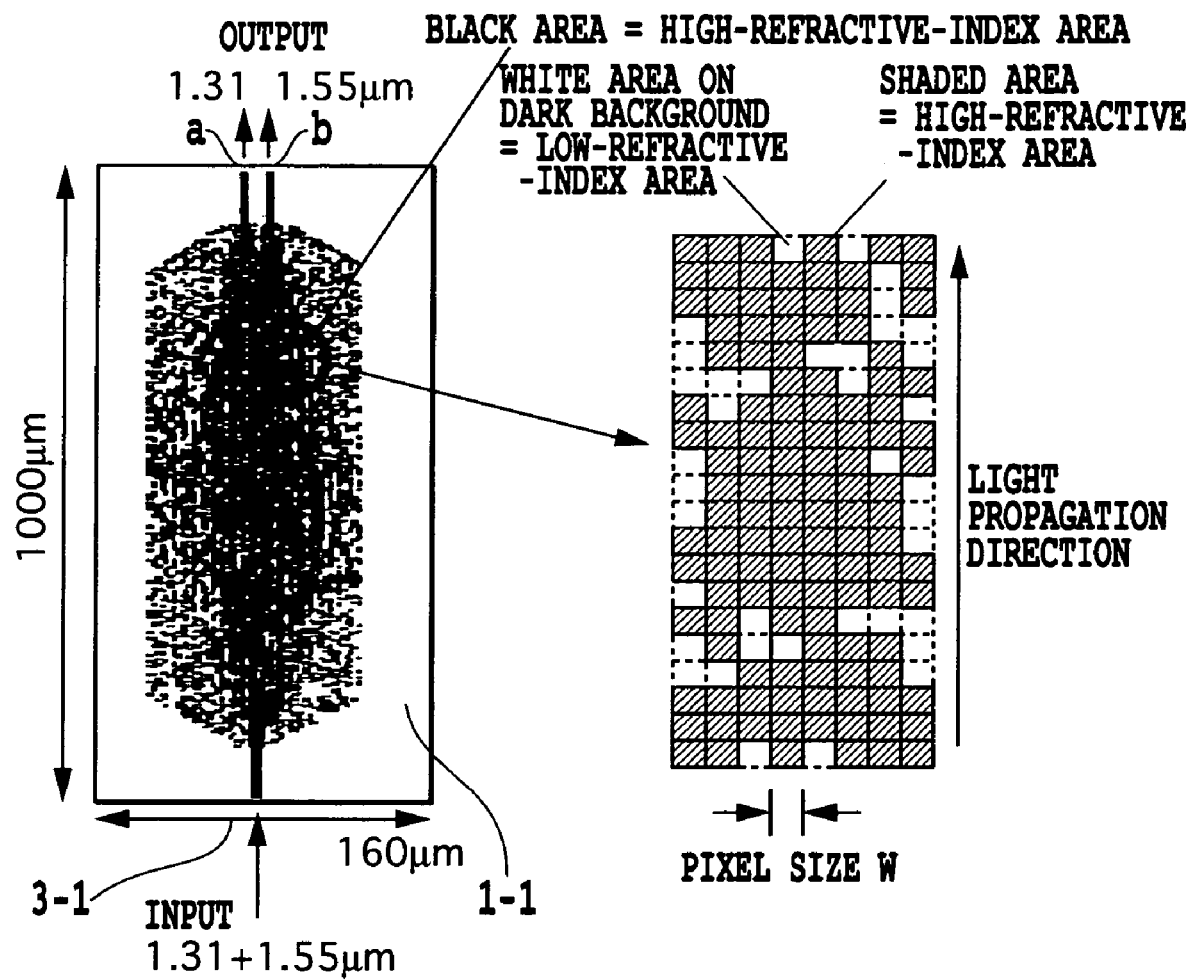
FIG. 29A and FIG. 29B illustrate a configuration example of a wavelength filter of 1.31 µm/1.55 µm according to Embodiment 13.

FIG. 29A and FIG. 29B illustrate a configuration example of the wavelength filter of 1.31 μm/1.55 μm according to this embodiment, FIG. 29A is a plan view of this optical circuit and FIG. 29B illustrates the arrangement of pixels of the high-refractive-index area and pixels of the low refractive index area.

The black area in FIG. 29A means a high-refractive-index area, which inputs light with a wavelength of 1.31 μm and 1.55 μm through an input port 3-1 and outputs light of 1.31 μm through an output port a and light of 1.55 μm through an output port b respectively. The length of this optical circuit in the light propagation direction is 1000 μm and the width is 160 μm. As shown in FIG. 29B, the refractive index distribution of this optical circuit is determined by arranging pixels of the high-refractive-index area (shaded area) and pixels of the low-refractive-index area (white area on a dark background), each pixel having a size of W.

The field radius w of light formed in the waveguide structure (that is, light-confinement structure) constructed of many dielectric pixels of W in size is generally required to satisfy a condition of calculus of variations based on one-dimensional Gaussian approximation:

$$\frac{2k_0^2 n^2 \Delta}{\sqrt{2\pi}} Wwe^{\frac{1}{2}\left(\frac{W}{w}\right)^2} = 1 \tag{22}$$

where $k_0$ is a wave number in vacuum, n is a refractive index, $\Delta$ is a refractive index difference of the pixel area.

Figure 30:
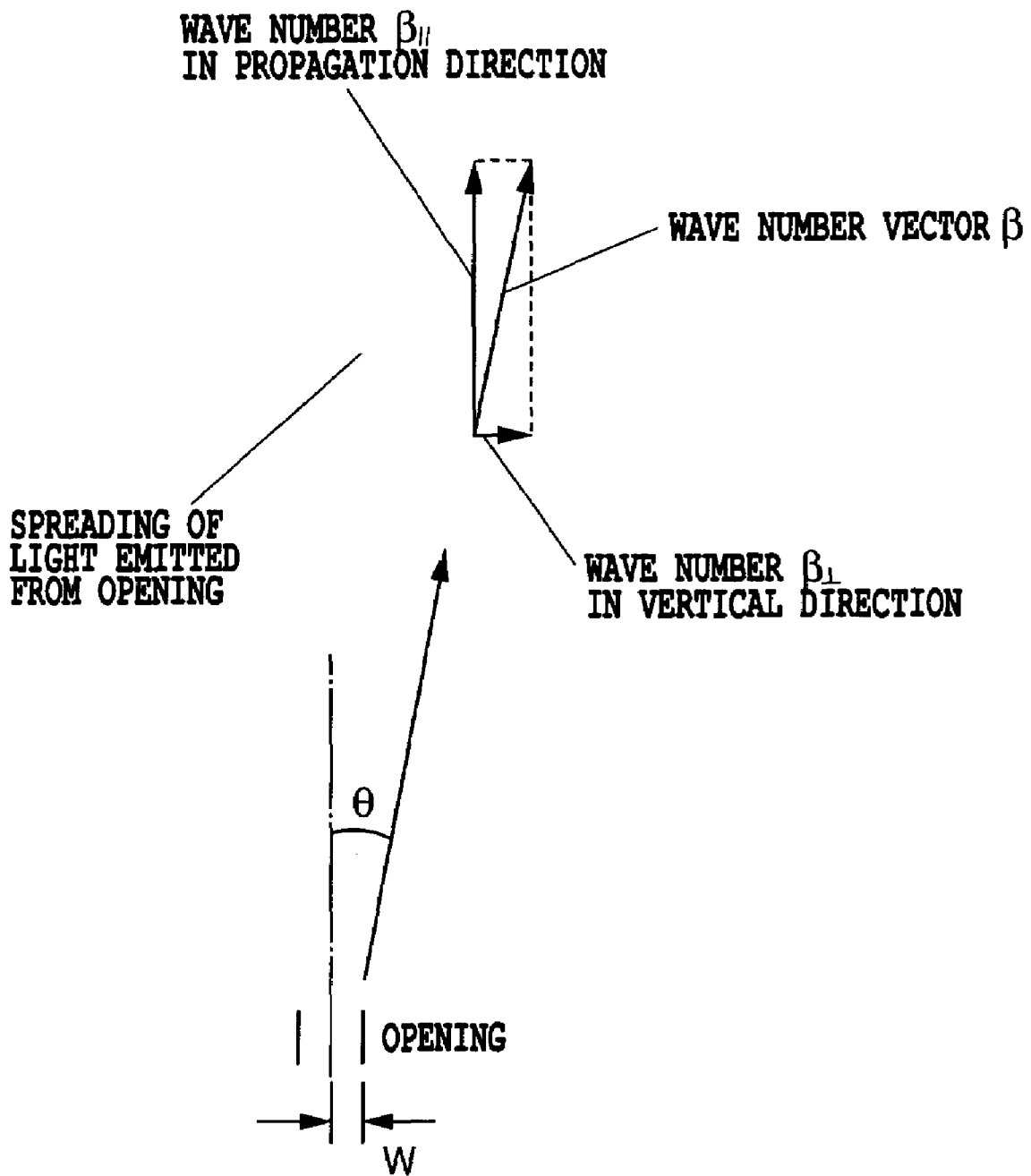
FIG. 30 illustrates how light spreads when a dielectric pixel constructing the optical circuit according to Embodiment 13 is assumed to be a light scattering point.

On the other hand, suppose dielectric pixels making up this optical circuit are light scattering points and the field radius w of this pixel is the opening radius w (FIG. 30). At this time, if the angle of diffraction (far-field-pattern angle) from this opening is $\theta$:

$$\tan\theta = \frac{\lambda}{\pi n w} \tag{23}$$

where $\lambda$ is a wave number in vacuum (FIG. 30). The ratio of the wave number in a direction perpendicular to the light propagation direction in the medium:

$$\beta_\perp$$

to the wave number in the light propagation direction:

$$\beta_\parallel$$

is given by:

$$\frac{\beta_\perp}{\beta_\parallel} = \frac{\lambda_\parallel}{\lambda_\perp} = \tan\theta = \frac{\lambda}{\pi n w} \tag{24}$$

where $$\lambda_\parallel$$

is the wavelength of the component in the light propagation direction, while:

$$\lambda_\perp$$

is the wavelength of the component in the direction perpendicular to the light propagation direction.

Here, assuming that most of the wave number (equivalent to kinetic momentum) of light is concentrated in the light propagation direction, $$\lambda_\parallel \approx \lambda$$

and $$\lambda_\perp = \pi n w \tag{25}$$

are obtained. Since $$\lambda_\perp > 10W$$

is given as a condition of Rayleigh scattering, $$W=W_c$$

and from Expression (25):

$$w = 10 W_c / (\pi n)$$

and if this is substituted into Expression (22) to erase w, then the condition:

$$W_c = \lambda \times \left( \sqrt[4]{\frac{1}{32\pi}} \sqrt{\frac{1}{10n\Delta}} e^{\frac{1\pi^2 n^2}{4 \cdot 10^2}} \right) \quad (26)$$

is obtained.

Of the right side of Expression (26), the portion enclosed by parentheses (coefficients other than λ) is approximately 1 for a silica-based light waveguide (n =1.5, Δ=0.01) or semiconductor waveguide (n=3.5, Δ=0.05), and therefore, if $$W < W_c \sim \lambda$$

this means that the condition of Rayleigh scattering holds true.

Figure 31B:
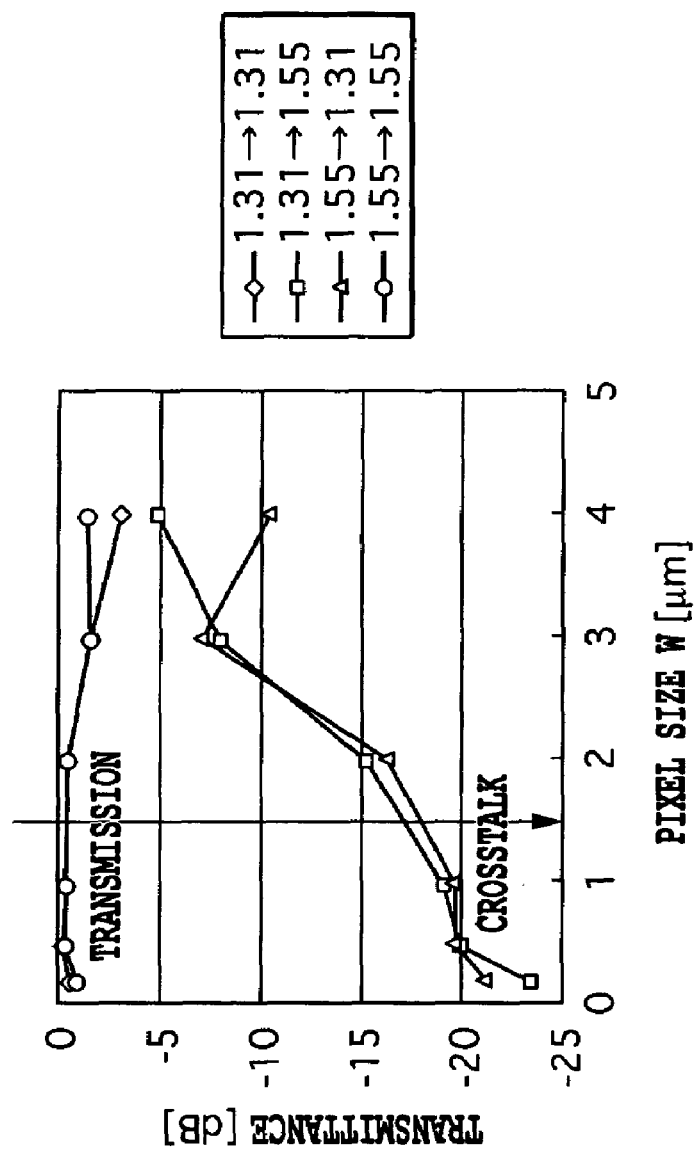
FIG. 31A and FIG. 31B illustrate the pixel size dependency of a transmission-loss characteristic and crosstalk characteristic when an optical circuit of a wavelength filter of 1.31 µm/1.55 µm is constructed by changing pixel size W as a parameter.
Figure 31A:
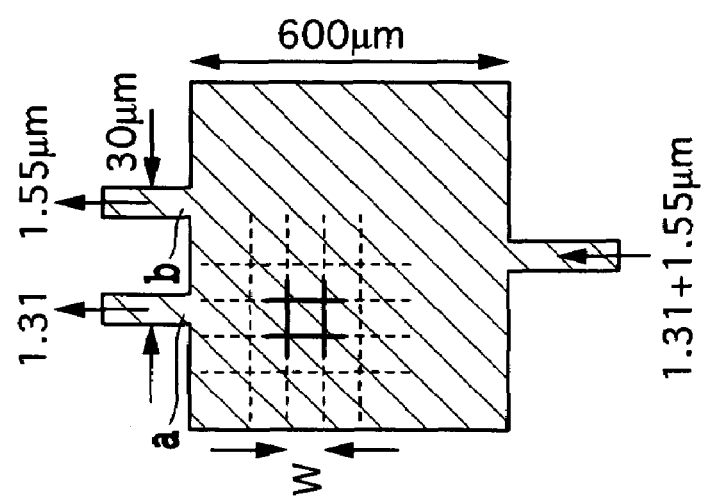

FIG. 31A and FIG. 31B illustrate the pixel size dependency (FIG. 31B) of a transmission-loss characteristic and crosstalk characteristic when an optical circuit of a wavelength filter of 1.31 μm/1.55 μm is constructed by changing pixel size W as a parameter and the length of this optical circuit in the light propagation direction is 600 μm and the distance between the output port a and output port b is 30 μm (FIG. 31A).

It is apparent from the result shown in FIG. 31B that when the pixel size W is at a level of or smaller than the wavelength (indicated in FIG. 31B), crosstalk is suppressed quite efficiently and an excellent transmission-loss characteristic is obtained, and it is effective to set the pixel size W so as to satisfy the Rayleigh scattering condition as has been seen in this embodiment.

EMBODIMENT 14

The optical circuit of this embodiment is an optical circuit that allows optical loss to be suppressed by suppressing optical radiation in the vertical direction of the substrate (direction perpendicular to the surface of the substrate).

In a pixel pattern obtained by binarizing a refractive index distribution of an optical circuit into high-refractive-index areas and low-refractive-index areas, if the low-refractive-index areas are considered to be holes (cavities) in the high-refractive-index areas, the low-refractive-index areas which exist between pixels corresponding to the high-refractive-index areas correspond to radiation parts (gaps between waveguides) to cladding parts in the case of a light waveguide. When an optical circuit is designed, light in the lateral direction of the substrate (direction parallel to the surface of the substrate) can be controlled by multiple scattering. However, in the case of a planar optical circuit, light which leaks in the vertical direction of the substrate is normally emitted as is and causes an (optical) loss.

Figures 32A, 32B:
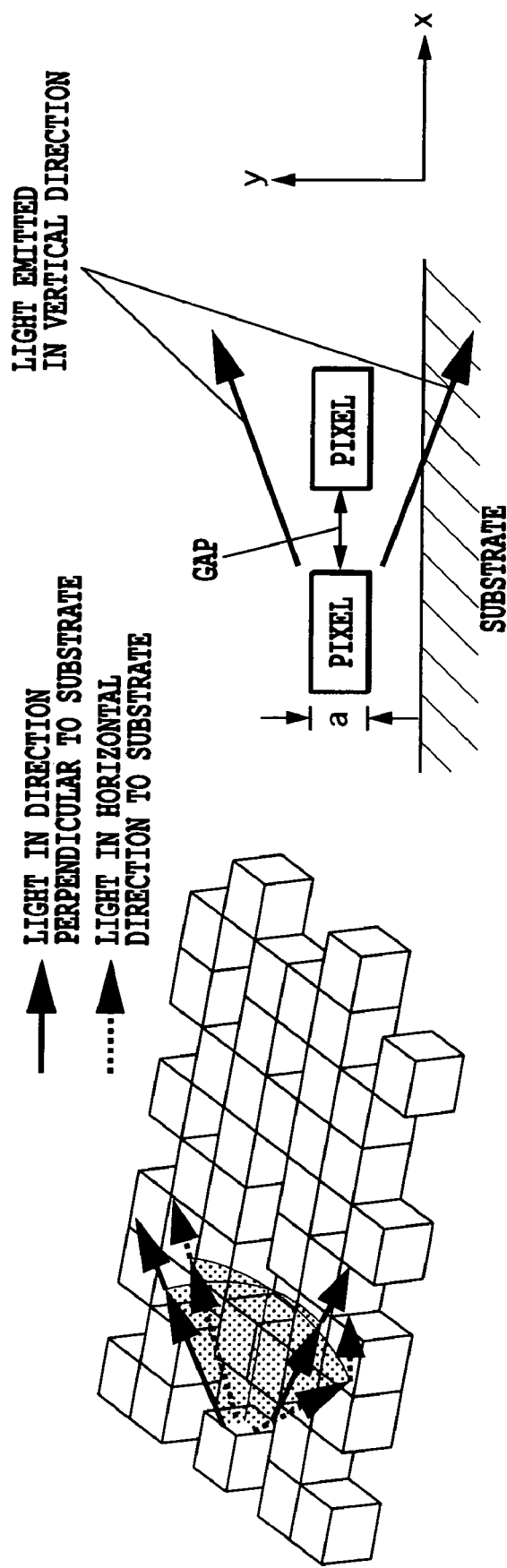
FIG. 32A and FIG. 32B illustrate the level of confinement of light in the vertical direction of a substrate and in the horizontal direction of the substrate in a planar optical circuit according to Embodiment 14.

FIG. 32A and FIG. 32B illustrate the level of confinement of light in the vertical direction of a substrate and in the horizontal direction of the substrate in the planar optical circuit. Solid lines indicate light in the vertical direction of the substrate and dotted lines indicate light in the horizontal direction of the substrate. As shown in this figure, the light spreading in the horizontal direction of the substrate is trapped in the optical circuit while repeating reflection and scattering in the optical circuit, whereas the light in the vertical direction of the substrate is emitted out of the optical circuit as is.

Figure 33:
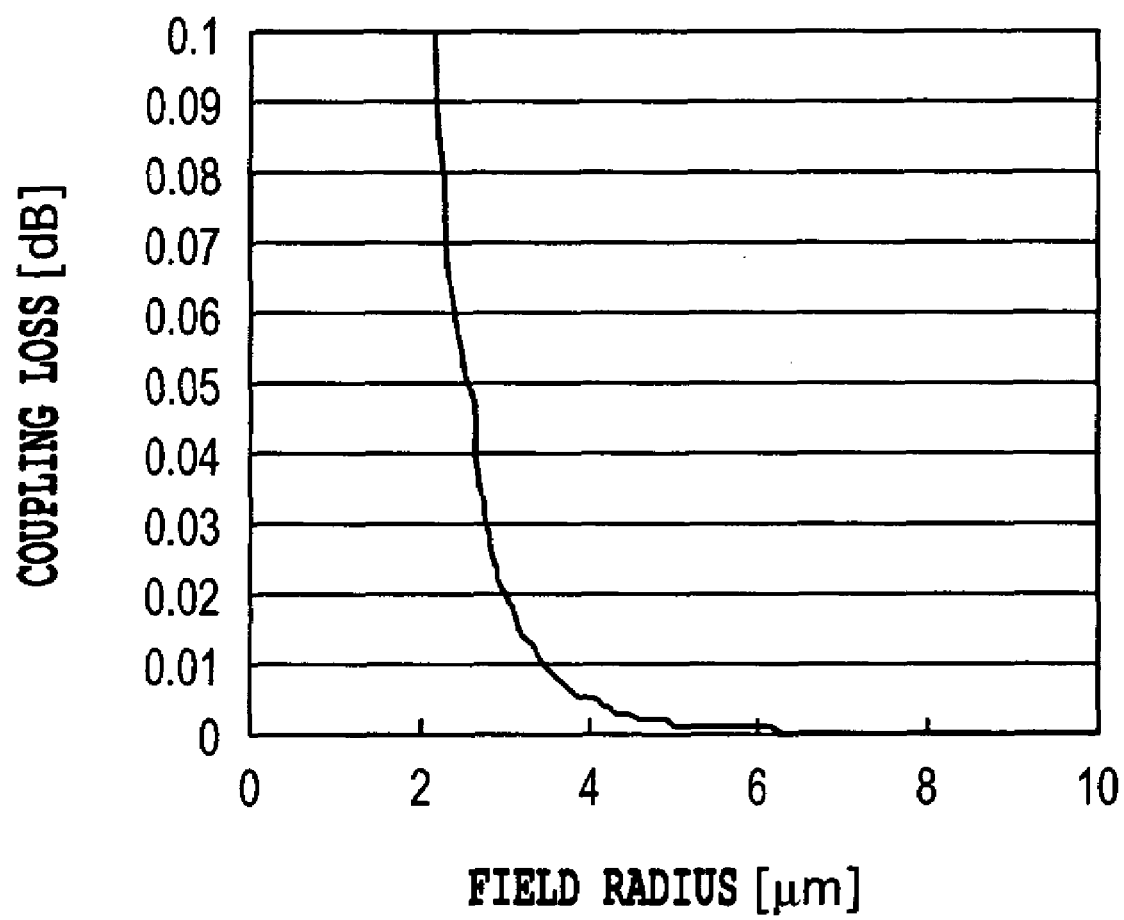
FIG. 33 illustrates the field radius dependency of radiation loss (coupling loss) per point when a minimum pixel unit is assumed to be 3 µm per side.

FIG. 33 illustrates the field radius dependency of a radiation loss (coupling loss) per 1 point when the minimum pixel unit is assumed to be 3 μm per side. As shown in this figure, the light emitted inside the optical circuit strongly depends on the field radius and when the field radius is small, the light generally acquires a large emission angle due to influences of diffraction. On the contrary, it is possible to suppress emission of light by increasing the field radius and thereby suppress loss as the optical circuit. When a circuit size of several thousand μm is supposed, several hundreds of scattering points may be generated, and therefore optical losses at individual scattering points needs to be suppressed to a sufficiently low level to suppress the loss in the optical circuit as a whole.

The field of light propagating through a single mode light waveguide having a weak light-confinement effect such as a silica-based light waveguide can be optimally approximated by a Gaussian distribution. Furthermore, the light field can also be optimally approximated by separating variables of an amplitude distribution F(x,y) of light within the wavefront as F(x,y)=f(x)g(y). Here, assuming that the plane direction of the substrate is x and the vertical direction of the substrate is y, coordinates are expressed by (x,y). That is, if a Gaussian distribution is supposed as the light field, variables are separated into functions in the x-direction and y-direction.

Here, f(x) which is a function in the horizontal direction of the substrate is controlled by multiple scattering and can be trapped into the optical circuit, and therefore there is no problem. On the other hand, with regard to g(y) which is a function in the vertical direction of the substrate, light emitted deviates from the high-refractive-index area and becomes a radiation loss. Therefore, to suppress optical loss at individual scattering points to a sufficiently low level, it is only necessary to consider a method for reducing radiation diffraction loss caused by the g(y) component.

Assuming a Gaussian distribution, g(y) can be expressed as:

$$g(y) = \sqrt[4]{\frac{2}{\pi w^2}} e^{\frac{y^2}{w^2}} \quad (27)$$

where w is a field radius. It is well known that the field radius w can be controlled principally according to the size of the core and refractive index. Therefore, assuming that the parameter w is controlled at a high level, conditions necessary to suppress optical losses at individual scattering points to a sufficiently low level are determined.

If a case where the high-refractive-index areas in FIG. 32B shown as "pixels" are divided is assumed, a gap is produced between high-refractive-index areas. Suppose the existence of this gap causes the light field having a Gaussian distribution to be emitted out of the waveguide. In this case, while the Gaussian distribution of the shape of the light field is maintained, the field radius changes and a curvature is produced on the wavefront. The field distribution in this condition is formally expressed as g(y,z). Here, z is a parameter given as an average value of the distance of the emission part.

Of the light field emitted out of the waveguide by the above gap, the amount of light field re-coupled with the high-refractive-index areas is given by the following overlapping integral:

$$\eta = \left|\int g(y)^{*}g(y,z)dy\right|^{2} = 2\left(4+\left(\frac{\lambda z}{\pi w^{2}n}\right)^{2}\right)^{-1/2} \quad (28)$$

where λ is the wavelength of light and n is a refractive index of the high-refractive-index area.

Here, assuming that the height of the high-refractive-index area of the optical circuit shown in FIG. 32B is a and w=a/2 is assumed considering that the field radius is generally equivalent to this a. Furthermore, assuming that an average value of the distance of the emission part is z=qa with an appropriate coefficient q, an expected value of loss <η>per one gap is expressed by:

$$\langle\eta\rangle = \left(1+\left(\frac{\lambda q}{\pi n a}\right)^{2}\right)^{-1/2} \quad (29)$$

The value of this Expression (29) can be normalized by (λq/na). Since light that propagates through the optical circuit of the present invention repeats scattering about 100 times, assuming that a loss of approximately 1/100 dB is expected, if the condition:

$$\frac{\lambda q}{\pi n a} < 6.8\times 10^{-2} \approx 1/10 \quad (30)$$

is satisfied, it is possible to suppress optical losses at individual scattering points to a sufficiently low level.

FIG. 33 illustrates the result of the field radius dependency of coupling loss calculated by changing the field radius using the thickness a of the high-refractive-index area as a parameter when the gap width is set to 3 μm and q=1, λ=1.55 μm and n=1.45 are assumed. The result shows that a sufficiently low loss is obtained at a point corresponding to the field radius of 3 μm (approximately 6 μm in terms of the film thickness a of the high-refractive-index area).

EMBODIMENT 15

As was also explained in Embodiment 13, there is a large influence of the pixel size in the direction within the plane of an optical circuit on light propagating through the optical circuit. In this embodiment, pixels are arranged tilted with respect to the light propagation direction to allow efficient optical control.

FIG. 34A illustrates an optical circuit in which pixels are arranged in the light propagation direction and FIG. 34B illustrates an optical circuit in which pixels are arranged tilted with respect to the light propagation direction. As shown in FIG. 34B, when pixels are arranged tilted with respect to the light propagation direction, lattice planes are formed in a cycle shorter than the pixel size in the direction perpendicular to the light propagation direction and this allows efficient control of light. Here, if the tilting angle is set to a value smaller (or greater) than 45 degrees, it is possible to form lattice planes in a shorter cycle, but the distance between the central positions of the reflection surfaces making up the lattice planes increases, which deteriorates the function as the reflection surface. Especially, the refractive index changes in several pixel sizes in this circuit, and therefore in order to allow it to function as a Bragg reflection plane in a distance of that level, approximately 45 degrees is appropriate.

EMBODIMENT 16

According to the embodiments described so far, pixels of the high-refractive-index area (or low-refractive-index area) which determine a refractive index distribution are arranged at lattice points delimited by a virtual mesh and the size of each pixel is limited so that the refractive index distribution is reduced to a size in which it is easily patterned, and therefore it is not possible to reduce the distance between lattice points to each pixel size or smaller. For this reason, the optical circuit characteristic may deteriorate due to a digitizing error about pixels and scattering of propagation light at pixel edges. Moreover, the regular periodicity of the refractive index in the direction perpendicular (y-direction: lateral direction with respect to the light propagation direction) to the light propagation direction α-direction) within the plane of the waveguide (within the xy plane) causes a spatial cutoff frequency according to the pixel size, which also causes the controllability of light to be constrained. The optical circuit according to this embodiment sets only a minimum unit of pixel size and a minimum unit of pixel distance as conditions in the lateral direction with respect to the light propagation direction and arranges pixels of the high-refractive-index area (or low-refractive-index area) at arbitrary positions and thereby forms a refractive index distribution.

Figure 35A:
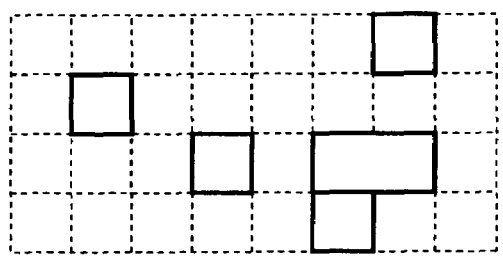
FIG. 35A illustrates an optical circuit according to Embodiment 16 in which pixels are arranged at lattice points delimited by a virtual mesh to form a refractive index distribution.
Figure 35B:
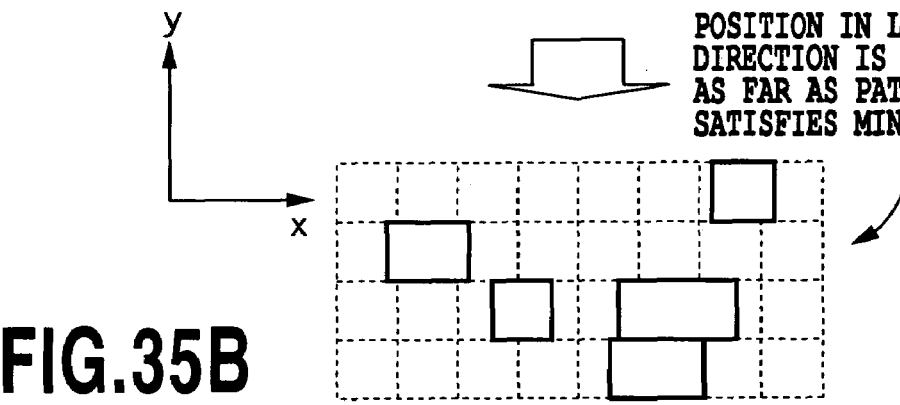
FIG. 35B illustrates an optical circuit according to Embodiment 16 in which pixels are arranged in the y-direction irrespective of the positions of lattice points to form a refractive index distribution.

FIG. 35A illustrates an optical circuit in which pixels are arranged at lattice points delimited by a virtual mesh to form a refractive index distribution and FIG. 35B illustrates an optical circuit in which pixels are arranged in the y-direction irrespective of the positions of lattice points to form a refractive index distribution. In the waveguide shown in FIG. 35A, pixels are arranged at lattice points delimited by a virtual mesh, while in the waveguide shown in this embodiment in FIG. 35B, pixels are arranged at positions of lattice points delimited by a virtual mesh in the light propagation direction (x-direction), but pixels are not (necessarily) arranged at positions of lattice points delimited by the virtual mesh in the direction lateral (y-direction) to the light propagation direction and pixels of the high-refractive-index area or low-refractive-index area are arranged at arbitrary positions.

In the case of this embodiment, the refractive index distribution determined according to pixel arrangement is calculated using the distance sufficiently smaller than the minimum pixel size (distance between lattice points) as the minimum unit of the arrangement parameter. When the distance between pixels is larger than this minimum unit, an appropriate boundary is set and a value of the high-refractive-index area or a value of the low-refractive-index area is given to each pixel so that the value of the refractive index changes on the boundary, while when the distance between pixels is smaller than the minimum unit, an average of the refractive index is calculated within the range of the area and either the value of the high-refractive-index area or the value of the low-refractive-index area, whichever is closer, is adopted.

Figures 36A, 36B:
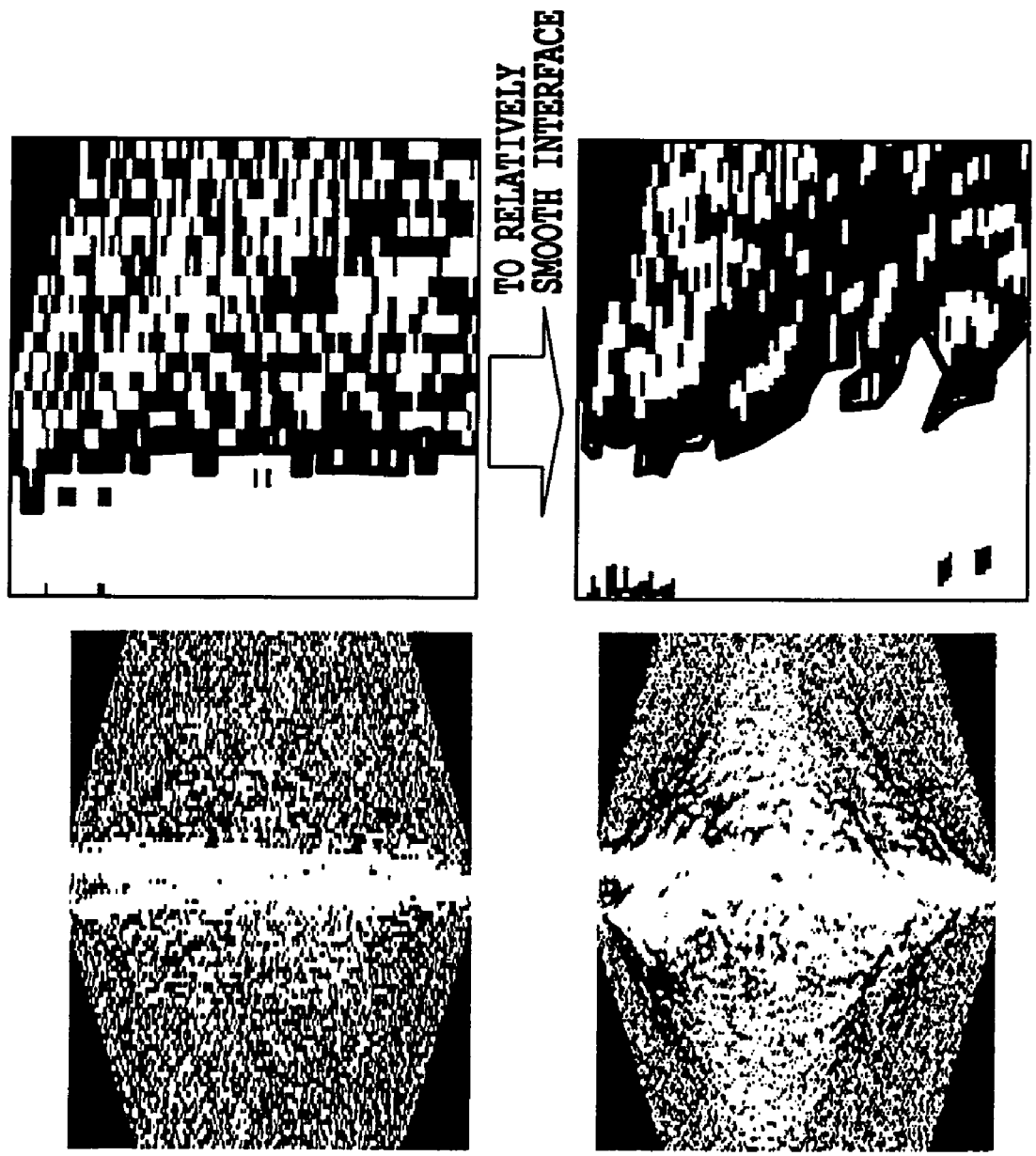
FIG. 36A illustrates a refractive index distribution of an actual optical circuit (wavelength filter of 1.31 µm and 1.55 µm) created in correspondence with the pixel arrangement shown in FIG. 35A.
FIG. 36B illustrates a refractive index distribution of an actual optical circuit (wavelength filter of 1.31 µm and 1.55 µm) created in correspondence with the pixel arrangement shown in FIG. 35B.

FIG. 36A and FIG. 36B illustrate a refractive index distribution of an actual optical circuit (wavelength filter of 1.31 μm and 1.55 μm) created in correspondence with the pixel arrangement shown in FIG. 35A and FIG. 35B and the figures on the left of these figures are images of the entire circuit and the figures on the right are enlarged views of part of the circuit. In these figures, the white area is the high-refractive-index area and the black area is the low-refractive-index area and the refractive index difference is 1.5%. Suppose the circuit length of this optical circuit is 1200 μm and the minimum pattern rule (minimum unit of arrangement parameter) is 3 μm.

A comparison between FIG. 36A and FIG. 36B shows that the refractive index pattern is smoothed in the optical circuit of this embodiment. Furthermore, while there is a loss of 2 dB in the optical circuit with the refractive index distribution shown in FIG. 36A, there is a loss improvement of approximately 0.5 dB in the optical circuit with the refractive index distribution in FIG. 36B. This fact is attributable to the effect that smoothing the refractive index distribution as in the case of the optical circuit of this embodiment has reduced the loss due to strong scattering which has been out of control with the optical circuit having the refractive index distribution as shown in FIG. 36A and improved controllability of propagating light. More specifically, since the optical circuit shown in FIG. 36A, for example, has a rectangular pixel structure having sides substantially perpendicular to the wavefront traveling direction, and therefore strong interference occurs just like light diffracted by a knife edge and the design accuracy of the optical circuit deteriorates and moreover light with a large wave number is generated, preventing the refractive index distribution with a small refractive index difference from controlling light. On the contrary, adopting an optical circuit having a smooth refractive index distribution as in the case of this embodiment has the effect of allowing control of the generation of light with strong interference and a large wave number within the optical circuit.

EMBODIMENT 17

As explained with reference to FIG. 32A, FIG. 32B and FIG. 33, in the optical circuit according to Embodiment 14, the thickness a of the high-refractive-index layer is increased to suppress light emission from the high-refractive-index area to the low-refractive-index area, but when the low-refractive-index area continues over a long span (that is, when the gap interval is long) a large loss is generated in principle. Therefore, the optical circuit of this embodiment even allows the low-refractive-index area to trap light in the direction perpendicular to the substrate and provides a structure of the optical circuit which results in a low loss even when the gap interval is long.

Figure 37A:
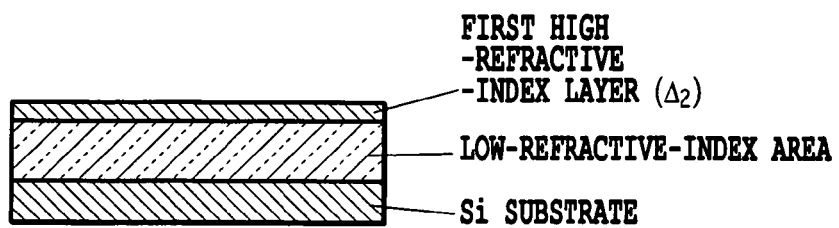
FIGS. 37A to 37C illustrate the procedure for manufacturing an optical circuit according to Embodiment 17.
Figure 37B:
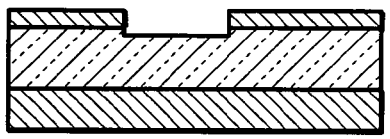
Figure 37C:
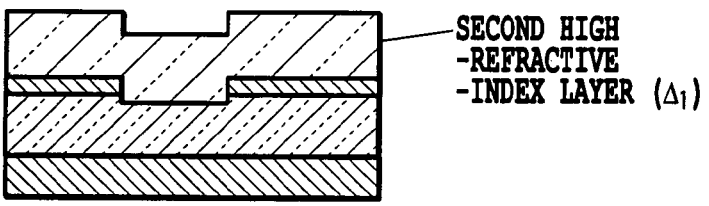

FIGS. 37A to 37C illustrates the procedure for creating the optical circuit of this embodiment. As in the case of creating a normal light waveguide, a cladding (low-refractive-index area) which becomes the lower part of the core is placed on, for example, an Si substrate first and then a first high-refractive-index layer which corresponds to the core is placed on this low-refractive-index area (FIG. 37A). Assuming here that the refractive index of the low-refractive-index area is n, the refractive index of the first high-refractive-index layer is $n(1+\Delta_2)$.

Then, part of the first high-refractive-index layer is patterned by etching (FIG. 37B). This pattern at this time corresponds to the high-refractive-index area or low-refractive-index area of the optical circuit and the portion of the first high-refractive-index layer left by etching becomes the high-refractive-index area of the optical circuit. Here, if that portion is left in such a way that the first high-refractive-index layer includes the waveguide pattern, it is also possible to form a waveguide structure in the remaining portion. In this patterning step, etching is applied up to the surface of the low-refractive-index area right below the first high-refractive-index layer to be removed by etching and etching is stopped at an appropriate height which will be described later in such a way that the low-refractive-index area of the portion in question has a desired thickness.

Furthermore, a second high-refractive-index layer of a certain film thickness is placed and it is also possible to pattern this second high-refractive-index layer as required and form a waveguide, etc., using the second high-refractive-index layer (FIG. 37C). The refractive index of the second high-refractive-index layer is $n(1+\Delta_1)$ and compared to the refractive index $n(1+\Delta_2)$ of the first high-refractive-index layer, this has a relationship of $n(1+\Delta_2) > n(1+\Delta_1)$ (that is, $\Delta_2 > \Delta_1$). Finally, an upper cladding (not shown) is placed and the first and second high-refractive-index layers are embedded.

Through parameter adjustment which will be described later, the optical circuit obtained in this way can have an optical circuit structure with a low loss and without any increase in loss even with an optical circuit including many low-refractive-index areas. Hereinafter, the first high-refractive-index layer will be expressed as "high-refractive-index layer $\Delta_2$" and the second high-refractive-index layer will be expressed as "high-refractive-index layer $\Delta_1$" using the refractive index difference between these high-refractive-index layers. The method of setting parameters will be explained below.

As already explained in Embodiment 14, light can be propagated if the field shapes are the same at different interfaces of pixels in the optical circuit. The following explanations will be focused on only a field distribution of light in the direction perpendicular to the substrate.

Figure 38:
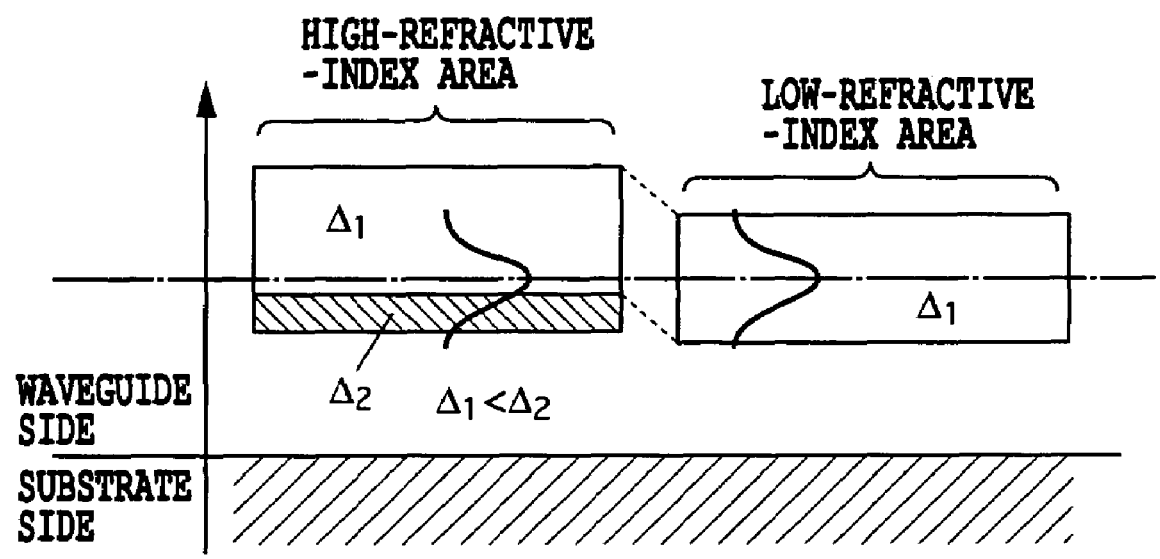
FIG. 38 illustrates a configuration of an optical circuit having an area with a high-refractive-index layer $\Delta_2$ removed by etching as a "low-refractive-index area" and an area with a high-refractive-index layer $\Delta_2$ left without being removed by etching as a "high-refractive-index area"

As shown in FIG. 38, assuming that the area from which the high-refractive-index layer $\Delta_2$ is removed by etching is called a "low-refractive-index area" and the area where the high-refractive-index layer $\Delta_2$ is left without being removed by etching is called a "high-refractive-index area," the thickness of the area corresponding to a "waveguide core" corresponding to the sum of the high-refractive-index layer $\Delta_1$ and the high-refractive-index layer $\Delta_2$ is greater than the thickness of the low-refractive-index area in the high-refractive-index area. Kinetic energy of a light field which propagates through the waveguide being spread over the entire waveguide can be suppressed to a low level. Therefore, the above described high-refractive-index area has an effect of spreading the light field distribution over the entire waveguide and reducing kinetic energy. On the other hand, when focused on potential energy of the light field, the high-refractive-index layer $\Delta_2$ has a higher refractive index than the high-refractive-index layer $\Delta_1$, and therefore the potential energy decreases when the light field is concentrated on the high-refractive-index layer $\Delta_2$ and the light field tends to be concentrated on the high-refractive-index layer $\Delta_2$ as much as possible. This means that the effect of widely spreading the light field over the entire waveguide contends with the effect of concentrating the light field on part of the waveguide. Furthermore, the effect of concentrating the light field on the high-refractive-index layer $\Delta_2$ acts so as to shift the center position of the light field toward the substrate. Using such nature derived from the minimization of energy of the light field, it is possible to adjust parameters so that the light field in the high-refractive-index area has the same field radius and has the same center position as that of the light field in the low-refractive-index area.

Figure 39:
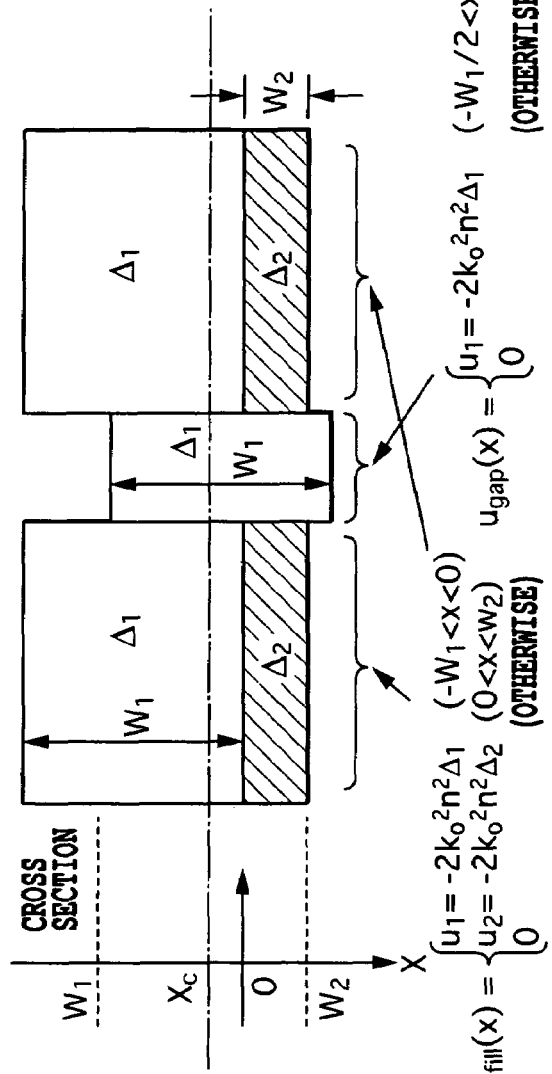
FIG. 39 illustrates a calculation example for adjusting parameters in Embodiment 17.

FIG. 39 illustrates a calculation example for parameter adjustment in this embodiment and the parameters in this case are a film thickness $W_1$ of the high-refractive-index layer $\Delta_1$, film thickness $W_2$ of the high-refractive-index layer $\Delta_2$, distance $x_c$ from the top surface of the high-refractive-index layer $\Delta_2$ to the center position of the field of the low-refractive-index area, field radius w and wavelength of light λ (that is, wave number $k_0=2\pi/\lambda$) in addition to n, $\Delta_1$ and $\Delta_2$ already explained in FIG. 39. Since the refractive index n and wavelength $\lambda$ are normally determined in the design stage of the circuit, the remaining six parameters will be determined. Here, these parameters will be determined using calculus of variations. Furthermore, for convenience' sake, using suffixes "fill" and "gap," a wave function in the high-refractive-index area is expressed as $u_{fill}$, and a wave function in the low-refractive-index area is expressed as $u_{gap}$, etc.

The wave function $u_{fill}$ in the high-refractive-index area is given by the following Expression (31):

$$u_{fill}(x) = \begin{cases} u_1 = -2k_0^2 n^2 \Delta_1 & (-W_1 < x < 0) \\ u_2 = -2k_0^2 n^2 \Delta_2 & (0 < x < W_2) \\ 0 & \text{(otherwise)} \end{cases} \quad (31)$$

On the other hand, the wave function $u_{fill}$ in the high-refractive-index area is given by the following Expression (32).

$$u_{gap}(x) = \begin{cases} u_1 = -2k_0^2 n^2 \Delta_1 & (-W_2/2 < (x - x_c) < W_1/2) \\ 0 & \text{(otherwise)} \end{cases} \quad (32)$$

With respect to a Fresnel equation obtained by approximating the wave equation with paraxial rays:

$$H_j = -\left(\frac{\partial}{\partial x}\right)^2 + u_j(x) (j = \text{fill, gap}) \quad (33)$$

when a variational equation that determines the field radius w and the distance $x_c$ from the top surface of the high-refractive-index layer $\Delta_2$ to the center position of the field of the low-refractive-index area is calculated as follows, three equations are finally derived as shown in Expression (37) below:

$$g(x - x_c) \equiv \sqrt[4]{\frac{2}{\pi \rho^2}} \exp\left[-\left(\frac{x - x_c}{w^2}\right)^2\right] \quad (34)$$

$$R_{gap} \equiv \int_{-\infty}^{\infty} g(x - x_c) H_{gap} g(x - x_c) dx = \frac{1}{w^2} + u_1 \text{erf}\left(\frac{W_1}{\sqrt{2}\,w}\right) \quad (35)$$

$$R_{fill} \equiv \int_{-\infty}^{\infty} g(x - x_c) H_{fill} g(x - x_c) dx \quad (36)$$

$$= \frac{1}{w^2} + \frac{1}{2}\left[u_1 \text{erf}\left(\sqrt{2}\,\frac{W_1 + x_c}{w}\right) + u_2 \text{erf}\left(\sqrt{2}\,\frac{W_2 - x_c}{w}\right) + (u_2 - u_1)\text{erf}\left(\sqrt{2}\,\frac{x_c}{w}\right)\right]$$

$$\frac{\partial R_{gap}}{\partial w} = 0 \quad (37)$$

$$\frac{\partial R_{fill}}{\partial w} = 0$$

$$\frac{\partial R_{fill}}{\partial x_c} = 0$$

This result corresponds to a conditional expression that there is an appropriate center position $x_c$ which has the same field radius w. As a result, giving the three remaining parameters determines the system of the light field.

Figure 40:
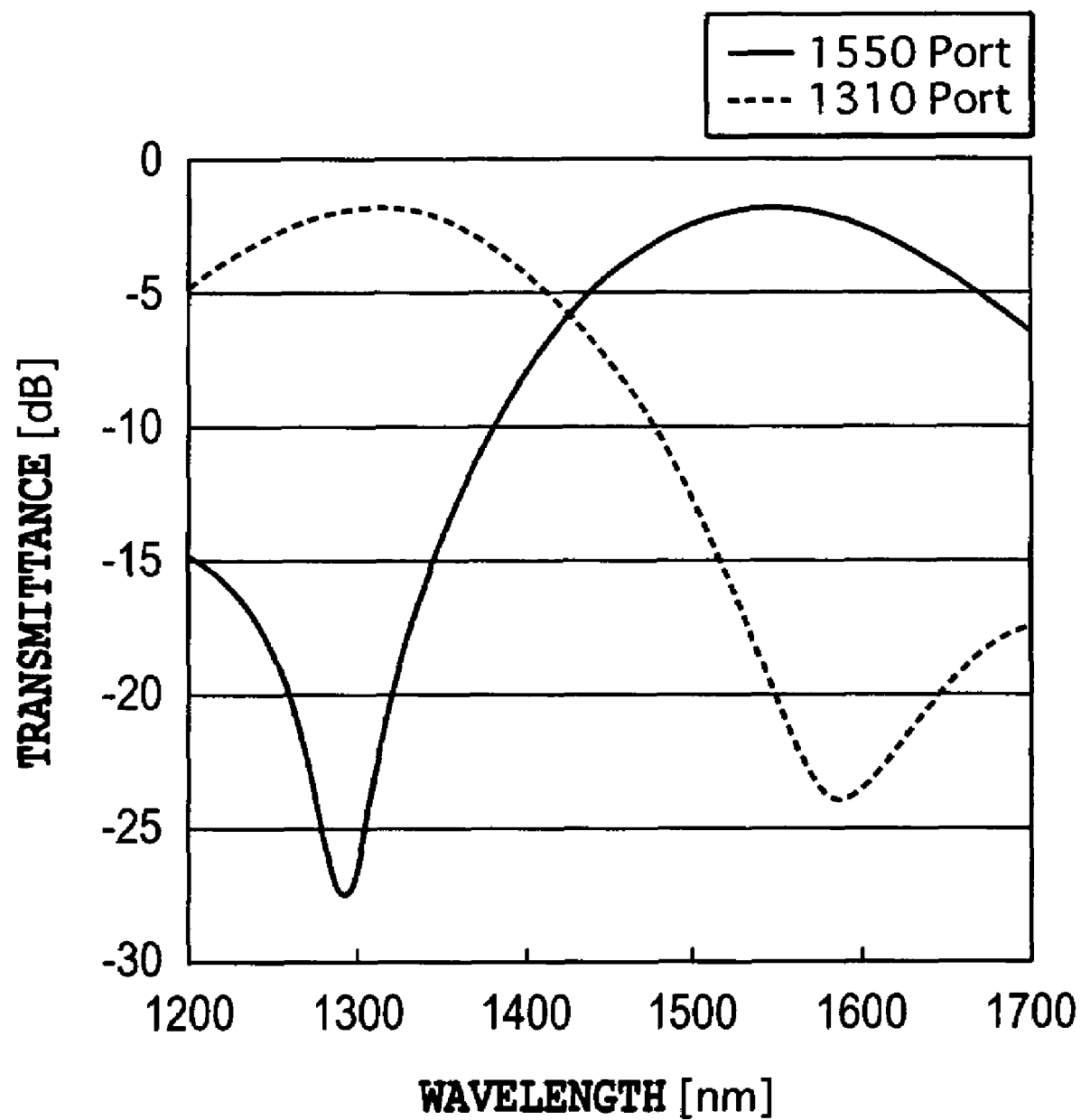
FIG. 40 illustrates a characteristic (wavelength dependency of transmission-loss) of a 1.31/1.55 µm WDM circuit which is the optical circuit according to Embodiment 17.

FIG. 40 illustrates a characteristic (wavelength dependency of transmission-loss) of a 1.31/1.55 μm WDM circuit which is the optical circuit of this embodiment. Here, $\Delta_1$=1.5%, $\Delta_2$=2% and $W_1$=5.5 μm are set. Furthermore, it is assumed that the percentage of low-refractive-index areas in the total area of the circuit is approximately 50% and the circuit length is 1200 μm. Though this is an optical circuit that includes relatively many interfaces between high-refractive-index areas and low-refractive-index areas, and continuous low-refractive-index areas, a satisfactory transmission-loss of approximately 2 dB is obtained as is appreciated from FIG. 40.

EMBODIMENT 18

In manufacturing the optical circuit of the present invention, it is possible not only to use a normal process which is used conventionally and generally but also to apply a technique of changing a refractive index and structure through light irradiation, which is a recently developed technique, to part of the optical circuit manufacturing process. This embodiment will describe several examples of manufacturing an optical circuit using such light irradiation. This embodiment has not only the effect of drastically reducing the number of manufacturing steps compared to a normally used process but also the effect of the ability to manufacture a desired structure easily.

EMBODIMENT 18-1

Figure 41A:
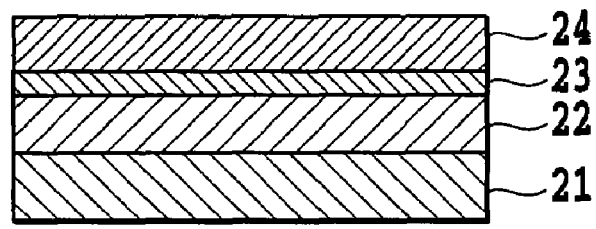
FIG. 41A and FIG. 41B illustrate a method of manufacturing an optical circuit according to Embodiment 18-1.
Figure 41B:
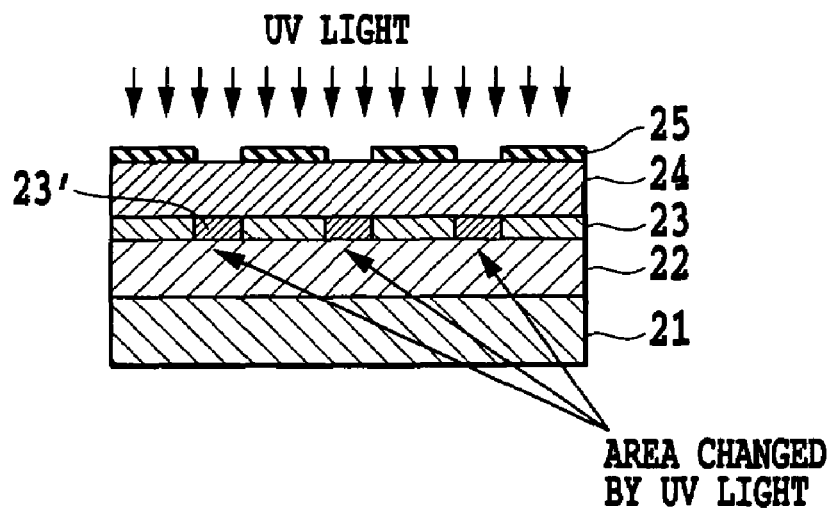

FIG. 41A and FIG. 41B illustrate a method of manufacturing the optical circuit according to a first mode of this embodiment. First, A lower cladding layer 22, a core layer 23 and an upper cladding layer 24 are formed on a silicon substrate 21 one by one using a flame hydrolysis deposition (FHD method) (FIG. 41A). Silica glass ($SiO_2$) based host material doped with oxides of such as B and P is used as the lower cladding layer 22 and upper cladding layer 24. A material doped with an oxide of Ge in addition to the impurities such as oxides of B and P is used as the core layer 23. By selecting such materials, the core layer 24 is set to have a higher refractive index than the lower cladding layer 22 and upper cladding layer 24. Furthermore, the thickness of the lower cladding layer 22 is set to 20 μm, the thickness of the core layer 23 is set to 7 μm and the thickness of the upper cladding layer 24 is set to 10 μm. The upper cladding layer 24 is designed to have a slightly smaller thickness than the structure of a normal optical circuit to suppress diffraction broadening of UV light irradiated thereto.

Then, a silicon thin film 25 as a light-shielding film for light irradiation as shown in FIG. 41B is formed on the upper cladding layer 24. After that a pattern is formed using a photosensitive resist and the silicon film is partially removed through a dry etching process (FIG. 41B). The photosensitive resist is removed after forming the silicon pattern. When forming this light-shielding mask pattern, considering the process dependency and broadening of irradiation light, the design value of the core shape which is obtained without considering such as process dependency, is corrected to a certain degree so as to finally obtain a refractive index pattern required to obtain a desired circuit characteristic.

Then, to improve photosensitivity, hydrogen is diffused into a sample in a high-pressure hydrogen atmosphere. More specifically, a sample is placed in a hermetically sealed container and left standing in a hydrogen atmosphere at 150 atm for a week.

Following this hydrogen diffusion, UV light with a wavelength of 193 nm is irradiated using an ArF excimer laser and the refractive index of the core layer 23 is changed so as to have a larger refractive index than that before irradiation. The shaded area (23') in FIG. 41B is the area where refractive index has changed through the laser irradiation. The irradiation power at this time is 120 mJ and the irradiation time is 10 minutes. After the laser irradiation, the light-shielding film is removed by etching, heat treatment is applied to remove the hydrogen diffused into the sample, and to stabilize the refractive index by canceling the unstable state of glass produced by light irradiation.

Through such a process, it is possible to selectively change the refractive index of the core layer of the area where the light-shielding mask 25 is not formed, and to make the refractive index different from the refractive index of the core layer where the light-shielding mask 25 is formed. The degree of such a change of the refractive index is estimated to be approximately 0.3% from the measurement of a wide irradiation area set as a reference.

Through the above described manufacturing steps, a (1×4) branch circuit was created. Though a large loss characteristic on the order of 2 dB compared to the characteristic expected from the circuit design was observed, a basic branch operation was confirmed. The reason that the loss characteristic was deviated from the design value is estimated to be attributable to the fact that the amount of change in the refractive index was different from the design value.

The above described manufacturing method is only an example. The manufacturing steps must include the steps of forming lower cladding layer 22, core layer 23 and upper cladding layer 24, the step of forming the light-shielding mask layer 25 and the light irradiation step as essential elements, but it goes without saying that it is possible to add various changes to the respective steps including these essential steps. For example, it is possible to use a film forming method such as a CVD method, sputtering method or spin coating method to form the lower cladding layer 22, core layer 23 and upper cladding layer 24. In the example shown in FIG. 41A and FIG. 41B, each layer is assumed to be made up of a material of a single composition, but it is also possible to combine a plurality of glass sheets of different compositions, place them one atop another and handle this resulting multi-layered structure as a single layer.

As the light-shielding mask layer 25, it is possible to use any material other than silicon if it is at least a material having the effect of shielding irradiation light. The method of forming the light-shielding mask on the upper cladding 24 has been quoted as an example of forming the light-shielding mask, but it is also possible to obtain a similar effect by forming a mask on another glass substrate and causing this glass substrate to adhere to the sample and irradiate light. With regard to the technique for improving photosensitivity, in addition to the method of adding hydrogen under a high pressure, it is also possible to use hydrogen processing in a short time at a high temperature or a technique of adding heavy hydrogen. Furthermore, as irradiation light, it is also possible to create an optical circuit structure similar to that described above using light from other lasers such as KrF excimer laser or XeF excimer laser and visible radiation laser light of short pulses, etc., in addition to the 193 nm UV excimer laser light.

EMBODIMENT 18-2

Figure 42A:
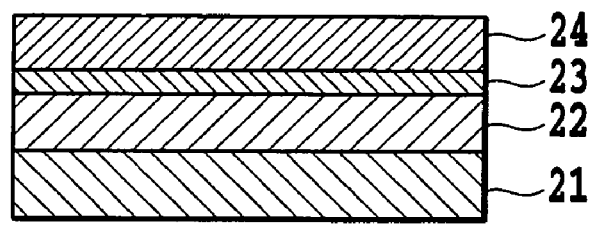
FIG. 42A and FIG. 42B illustrate a method of manufacturing an optical circuit according to Embodiment 18-2.
Figure 42B:
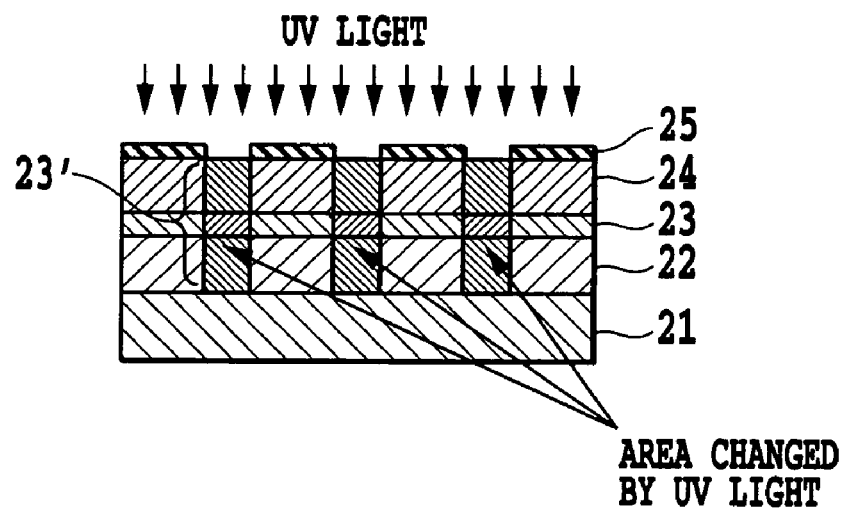

FIG. 42A and FIG. 42B illustrate a method of manufacturing an optical circuit according to a second mode of this embodiment. This mode is substantially the same as the first mode (Embodiment 18-1), and therefore only different parts will be explained. In the first mode, no oxide of Ge is doped into the lower cladding layer 22 and upper cladding layer 24, and therefore there is no refractive index variation in the upper cladding layer 24 and lower cladding layer 22 when light is irradiated or the variation is at a negligible level. On the contrary, in this mode, the upper cladding layer 24 and lower cladding layer 22 are formed of Ge-doped glass so that these layers also become photosensitive layers in the same way as the core layer 23, inducing variations in the refractive index due to light irradiation.

As in the case of the first mode, a lower cladding layer 22, core layer 23 and upper cladding layer 24 are formed one by one (FIG. 42A) and a silicon thin film 25 is formed as a light-shielding film for light irradiation on the upper cladding layer 24 to form a pattern (FIG. 42B). When the area not masked with the light-shielding mask 25 is irradiated with light, not only the core layer 23 but also the upper cladding layer 24 and lower cladding layer 22 are exposed to light and a change of the refractive index takes place according to the amount of doped Ge. The shaded area (23') in FIG. 42B is an area where the change of the refractive index has taken place with laser irradiation. As a result of creating a (1×4) branch circuit in the above described manufacturing steps, it has been confirmed that a better loss characteristic than the branch circuit of the first mode can be obtained.

That is, selecting the composition so that both the core layer 23 and cladding layers (22 and 24) become photosensitive layers makes it possible to reduce the difference in the field distribution in the light propagation direction between the high-refractive-index area and low-refractive-index area formed by light irradiation, and improve the loss characteristic of elements.

EMBODIMENT 18-3

FIGS. 43A to 43D illustrate a method of manufacturing an optical circuit according to a third mode of this embodiment. This mode corresponds to simultaneous use of the first and second modes (Embodiment 18-1 and Embodiment 18-2). Therefore, only steps added to these embodiments will be explained below.

In this mode, a local refractive index variation is produced by UV light irradiation using a phase mask. A (1×2) branch circuit shown in FIG. 43D is created. The UV light irradiation method using a phase mask is used to manufacture a fiber grating, etc., and has the advantage of being able to relatively easily and accurately create a cyclic and fine structure such as a grating structure. Moreover, using a plurality of phase masks makes it relatively easy to manufacture some complicated structures. However, when the structure is complicated as in the case of the optical circuit of the present invention, it is difficult to completely realize a desired refractive index distribution by only UV light irradiation using phase masks, and therefore it is necessary to use the manufacturing method explained in the first and second modes together.

Figure 43A:
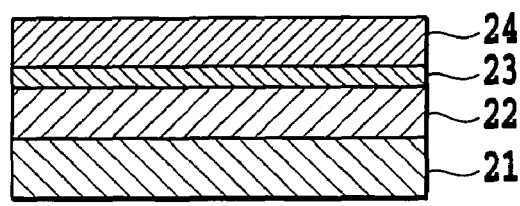
FIGS. 43A to 43D illustrate a method of manufacturing an optical circuit according to Embodiment 18-3.
Figure 43B:
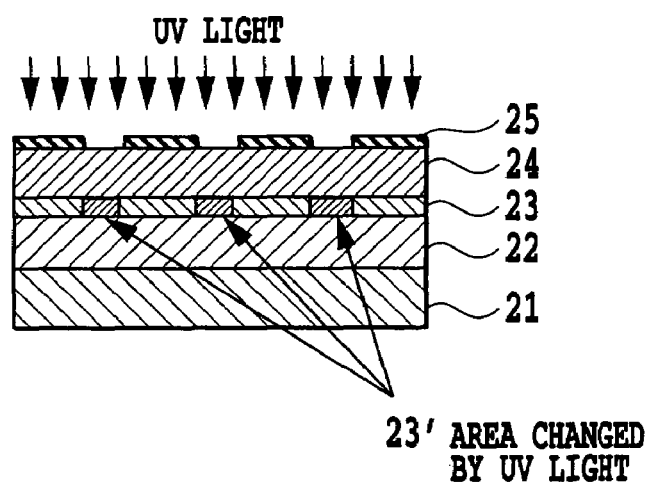
Figure 43C:
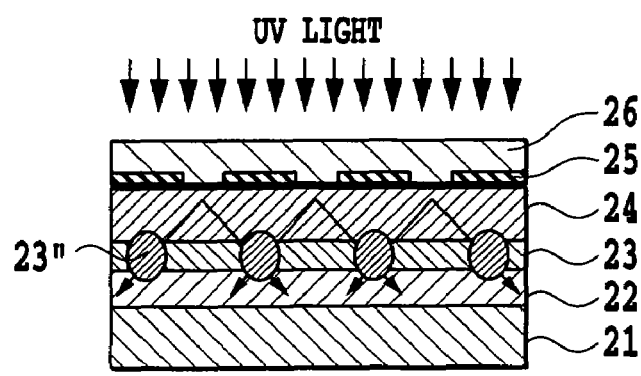
Figure 43D:
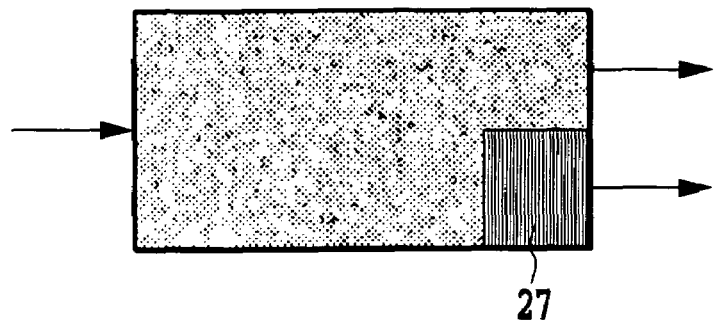

As in the case of the first mode, a lower cladding layer 22, core layer 23 and upper cladding layer 24 are formed one by one (FIG. 43A), a patterned light-shielding mask 25 for light irradiation is formed on the upper cladding layer 24 and irradiated with UV light (FIG. 43B). The shaded area (23') in FIG. 43B is the area where a change has taken place in the refractive index due to UV light irradiation. As shown in FIG. 43D, after removing the light-shielding mask 25, a grating filter is formed in some areas near the output port. More specifically, a patterned phase mask 26 is formed near the output port in the area where the grating filer is to be formed (corresponding to 27 in FIG. 43D) as shown in FIG. 43C, UV is irradiated through this phase mask 26 and a desired area 23"

in the core layer 23 is exposed to light as the grating filter. After this step, heat treatment is applied in the same steps as those in Embodiment 18-1 to remove hydrogen diffused into the sample and to stabilize the refractive index by canceling an unstable state of glass produced by light irradiation.

In the output port (in a area indicated by reference numeral 27 in FIG. 43D) where a grating has been additionally formed, it has been confirmed that the transmission wavelength characteristic changes due to the filter operation. This embodiment allows a UV light irradiation step corresponding to FIG. 43C to put the manufacturing process of Embodiment 18-1 to simplify the manufacturing, but it is also possible to realize the UV light irradiation step corresponding to FIG. 43C after completing all the steps in Embodiment 18-1.

EMBODIMENT 18-4

Figure 44A:
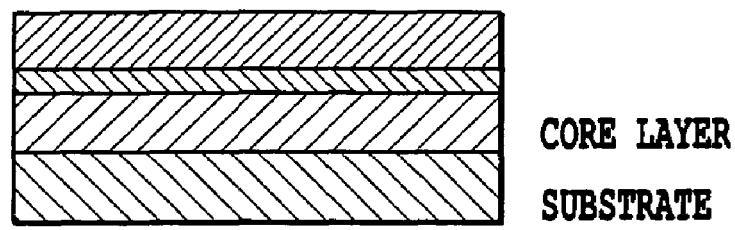
FIG. 44A and FIG. 44B illustrate a method of manufacturing an optical circuit according to Embodiment 18-4.
Figure 44B:
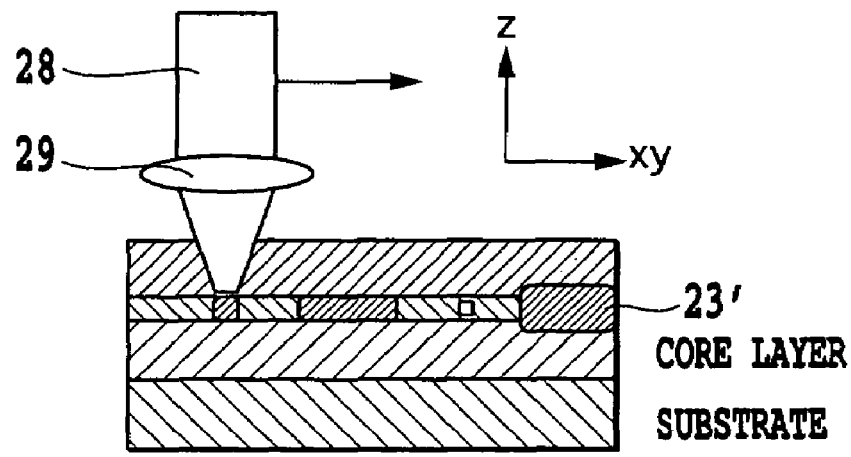

FIG. 44A and FIG. 44B illustrate a method of manufacturing an optical circuit according to a fourth mode of this embodiment and in this mode, too, as in the case of Embodiment 18-1, a lower cladding layer 22, core layer 23 and upper cladding layer 24 are formed on a silicon substrate 21 one by one using a flame hydrolysis deposition (FHD) method (FIG. 44A).

After this, a wafer on which the above described layers are formed is fixed onto a movable stage with three axes of XYZ directions (not shown), laser light 28 is focused near the core by a lens 29 and the refractive index near a radiated point is thereby changed (FIG. 44B). The area (23') indicated by shading in FIG. 44B is the area where a change of the refractive index has taken place by laser irradiation. As shown in this figure, the size of the area where a change has taken place in the refractive index is not fixed and it is possible to determine the size of individual areas so that a desired refractive index distribution is realized.

The spreading in the lateral direction of these areas is determined by the amount of move of the stage on the XY plane during the laser irradiation and the amount of laser power. On the other hand, the spreading (thickness) in the longitudinal direction (Z-direction) is determined by controlling the amount of laser power and the focusing state of laser light 28 according to the amount of driving of the stage in the Z-direction and it is possible to have the same thickness as the core layer 23 or have a thickness of smaller or greater than the core layer 23. Furthermore, the amount of variation in the refractive index of the irradiated area is mainly determined by controlling the amount of laser power. In this embodiment, a femtosecond pulse laser having a wavelength of 775 nm is used as the laser light and the pulse width is 150 fs. In this way, a (1×4) branch circuit is manufactured and a basic branch operation is confirmed.

When laser light is focused and drawn to realize a spatial distribution of the refractive index using the above described technique, there is no need to form masks beforehand, but laser light needs to be irradiated dot by dot, and therefore there is a tendency that manufacturing an optical circuit takes time. For this reason, it is effective to use this technique together with the refractive index distribution formation method using simultaneous drawing which has been explained in the above Embodiment 18-1 or Embodiment 18-2.

Furthermore, the laser light is not limited to the femtosecond laser, but it is also possible to use a UV excimer laser or CW UV laser light, etc. In this case, as explained in Embodiment 18-1, it is effective to increase sensitivity with respect to UV light using hydrogen addition to achieve a large change of the refractive index.

Furthermore, this embodiment has a three-layer structure of the lower cladding layer 22, core layer 23 and upper cladding layer 24, but this technique uses a change in the refractive index near the focusing point of laser light, and therefore this embodiment is applicable to a material of a single composition such as bulk glass.

EMBODIMENT 18-5

An example of manufacturing an optical circuit using the techniques explained in Embodiments 18-1 and 18-2 will be explained.

Figure 45A:
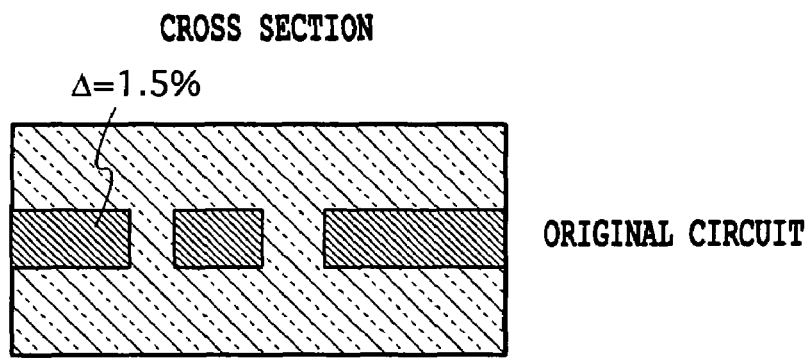
FIGS. 45A to 45C are cross-sectional views of a waveguide to illustrate a refractive index distribution of an optical circuit according to Embodiment 18-5.
Figure 45B:
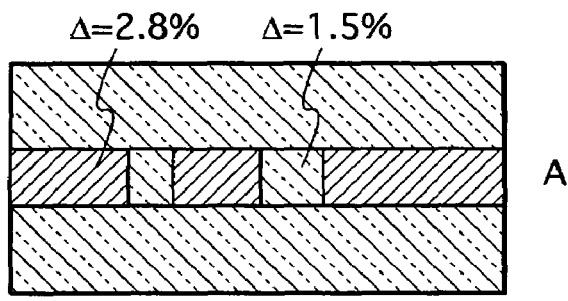
Figure 45C:
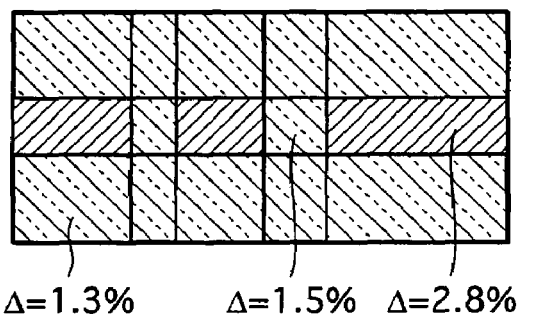

FIGS. 45A to 45C are cross-sectional views of a waveguide to illustrate a refractive index distribution of an optical circuit created, FIG. 45A shows a refractive index distribution before light is irradiated, FIG. 45B shows a refractive index distribution formed using the technique of Embodiment 18-1 and FIG. 45C shows a refractive index distribution formed using the technique of Embodiment 18-2. In these figures, the pixel size of the refractive index distribution is 3×3 μm and the thickness of the core layer is 4.5 μm.

In any refractive index distribution shown in FIGS. 45A to 45C, the high-refractive-index area and low-refractive-index area have equivalent effective refractive index differences (high-refractive-index area: $\Delta=1.5\%$, low-refractive-index area: $\Delta=1.3\%$) and can be compared directly.

FIG. 46 illustrates each loss characteristic (transmittance) of a (1×2) branch circuit of 1.31 m/1.55 μm having the structure shown in FIGS. 45A to 45C. The circuit size is 1200 μm×120 μm. The characteristic of the optical circuit of the structure (conventional structure) corresponding to FIG. 45A is shown by dotted line and the optical circuit characteristics of the structure corresponding to FIG. 45B and FIG. 45C are shown by (B) and (C) respectively.

As is apparent from this figure, the loss characteristic of the optical circuit of the present invention shows an improvement of approximately 1 dB compared to the loss characteristic of the optical circuit of the conventional structure and provides an optical circuit with a good characteristic.

EMBODIMENT 19

This embodiment handles a refractive index as a complex refractive index. The imaginary part of the complex refractive index means a gain or loss of light in a medium. Therefore, suppose that a wave transmission medium has the effect of absorption or amplification. The optical circuit of this embodiment effectively uses the feature that the complex refractive index of a normal material changes depending on the wavelength. As the structure of an optical circuit, suppose an example of the (1×2) splitting circuit of 1.31 μm/1.55 μm explained in Embodiment 2.

Figures 47A, 47B, 47C:
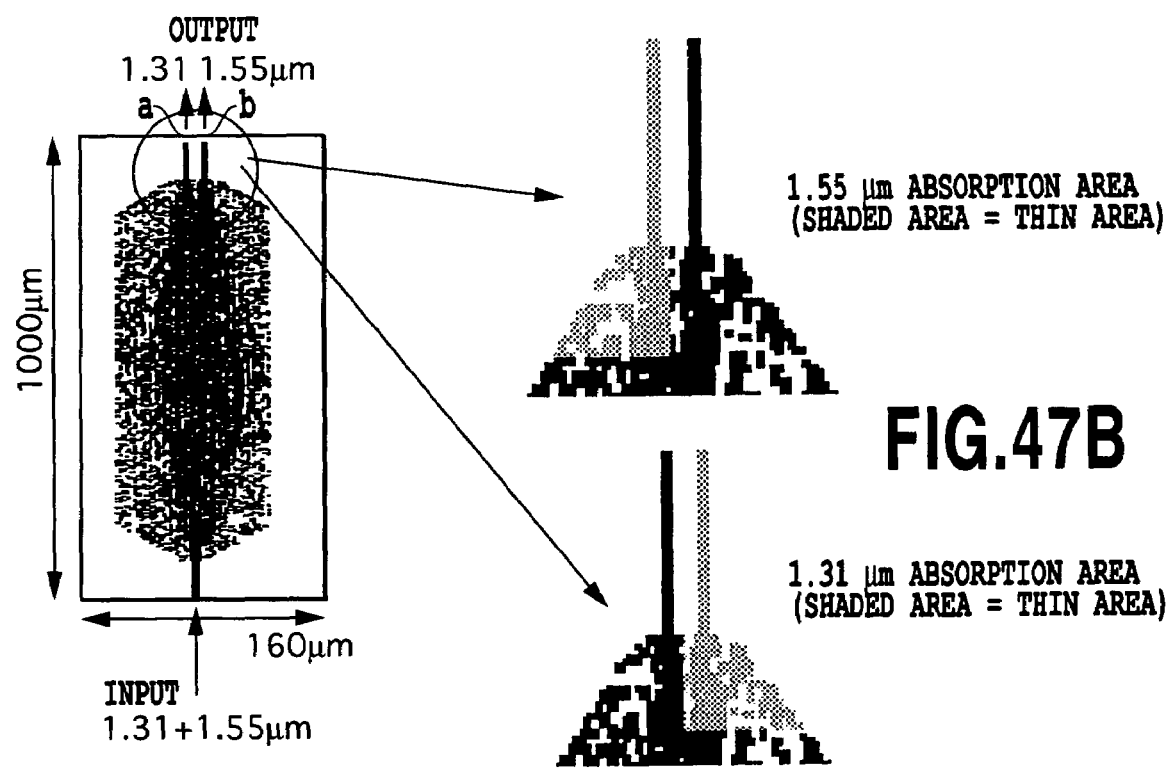
FIGS. 47A to 47C are schematic views to illustrate a configuration of an optical circuit according to Embodiment 19.

FIGS. 47A to 47C are conceptual diagrams to illustrate a configuration of the optical circuit of this embodiment, FIG. 47A is a conceptual diagram of the entire circuit, FIG. 47B and FIG. 47C are conceptual diagrams of a complex refractive index distribution on the output side and these figures each show a complex refractive index distribution close to the 1.31 μm port (a in the figure) and 1.55 μm port (b in the figure).

In addition to a normal circuit design, this optical circuit is designed in such a way that the complex refractive index distribution close to the 1.31 μm output port is substantially transparent for light of the 1.31 μm band and has large loss for light of the 1.55 μm band (FIG. 47B) and at the same time the complex refractive index distribution close to the 1.55 μm output port is substantially transparent for light of the 1.55 μm band and has large loss for light of the 1.31 μm band (FIG. 47C). That is, this optical circuit determines a complex refractive index distribution in such a way that signal light of the wavelength to be output is transparent and unnecessary signal light is absorbed within the optical circuit so as not to output.

Though not illustrated in detail, a complex refractive index distribution having a large loss for both wavelengths is provided between the 1.31 μm output port (a) and 1.55 μm output port (b) so as to prevent crosstalk caused by scattering of unnecessary signal light. As the component material of the optical circuit of this embodiment, a semiconductor-doped glass material is selected, and this drastically reduced crosstalk of signal light of 1.3 μm band with respect to the output port of 1.55 μm compared to the case where an optical circuit is created with only a material which is transparent to light. Furthermore, crosstalk of signal light of the 1.55 μm band with respect to the output port of 1.31 μm was also slightly reduced. On the other hand, there was almost no increase of loss of signal light. When an optical circuit provided with only a real number refractive index distribution and an optical circuit provided with the complex refractive index distribution of this embodiment are compared, this embodiment can shorten the circuit length to obtain the same circuit characteristic.

This embodiment uses a semiconductor material to construct a circuit, but any material can be used if it at least gives a complex refractive index and various materials such as an organic material, metal or dielectric material can be used.

Since the circuit of the present invention uses multiple diffraction/interference phenomena, it has the feature of being able to realize a great variety of functions, but there may be cases where it is difficult to realize a sufficient circuit characteristic with only a real number refractive index distribution. In that case, adopting the design of this embodiment that a complex refractive index distribution is given to part of the circuit or all areas makes it possible to improve the circuit characteristic or create a circuit with short elements.

EMBODIMENT 20

The optical circuit of this embodiment is a circuit that forms a refractive index distribution explained so far by processing a relief-shaped layer in a high refractive index layer to form the high-refractive-index area and low-refractive-index area of the optical circuit.

Figure 48A:
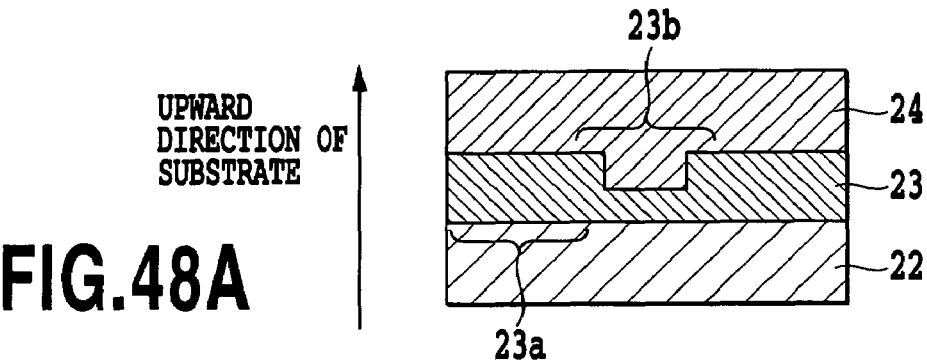
FIGS. 48A to 48C are cross-sectional views to illustrate a configuration of an optical circuit according to Embodiment 20.
Figure 48B:
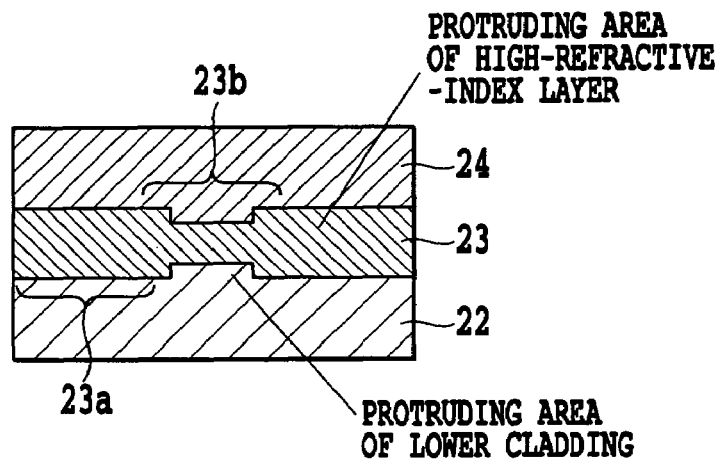
Figure 48C:
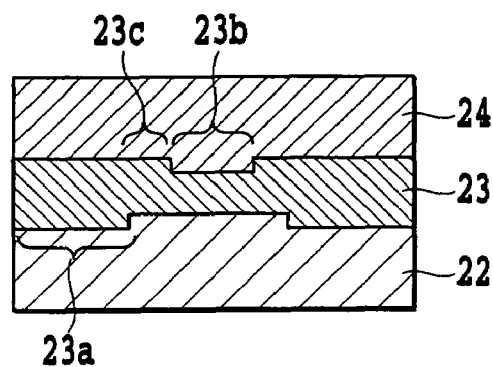

FIGS. 48A to 48C are cross-sectional views to illustrate a configuration of the optical circuit of this embodiment, FIG. 48A shows a basic structure making up this optical circuit which forms a refractive index distribution by removing part of the top of a core layer 23 having a thickness of 5 μm which is a high-refractive-index layer sandwiched by cladding layers (22, 24) which are low refractive index layers by a depth of 2 μm, applying relief-shaped patterning and thereby forming an effective "high-refractive-index area" 23a and "low-refractive-index area" 23b.

Such a pattern can be formed by reactive ion etching. In pattern formation by etching in general, as the processing depth increases, the degree of deformation in the pattern increases and controllability of pattern formation deteriorates, which results in a problem that when deep etching is applied, the size of a pattern that can be formed unavoidably increases. The present inventors have noticed that the pattern size formed by etching in the optical circuit of the present invention is an extremely important parameter. This is because the spatial refractive index distribution determined by the pattern size affects controllability of light and thereby affects the characteristic of the optical circuit itself.

Thus, in order to make it possible to form a smaller size pattern by improving the controllability of the pattern size, a method by means of the described below, a relief-shaped patterning of a relatively small etching depth is used to realize a desired refractive index distribution. FIG. 48B illustrates an example thereof and as opposed to the structure shown in FIG. 48A in which a projection and depression are only formed on one side of the core layer 23 which is a high-refractive-index layer, a projection and depression in the structure shown in this figure are formed on both sides of the core layer 23, which reduces the etching depth applied to individual projection and depression to 1 μm, that is, the half, thus realizing an equivalent refractive index distribution.

In order to fabricate the circuit structure shown in FIG. 48B, first, glass of a low refractive index is placed as the lower cladding portion on a silicon substrate (not shown), and a groove is formed on part thereof by means of reactive ion etching to form a lower cladding layer 22. As will be explained later, this groove corresponds to the high-refractive-index area of the core layer 23 of this optical circuit. Here, assuming that a refractive index difference α with respect to the cladding layers (22, 24) of the core layer 23 which is a high-refractive-index layer is 1.5%, the thickness of the high-refractive-index area of the core layer 23 which is finally obtained is designed to be 5 μm, and therefore a groove of approximately 1 μm is formed so as to obtain sufficient step coverage for this film thickness.

Following the groove formation on the lower cladding layer 22, a glass layer of a high refractive index is placed on the lower cladding layer 22 and heated to a high temperature. This heating causes glass with a high refractive index to fill without space into the area close to both ends (stepped areas) of the groove of the lower cladding layer 22 and also flattens the surface of the high-refractive-index layer. This glass with a high refractive index is placed in such a way that the thickness of the glass layer with a high refractive index on the groove corresponding to the high-refractive-index area of the core layer 23 of this optical circuit is 6 μm.

Here, the reason that the thickness of the high refractive index glass layer is set to 6 μm is to give an "allowance" of 1 μm in the etching in order to form a groove on the upper surface of the high refractive index glass layer by etching and obtain the final core layer 23 of the high-refractive-index area having a thickness of 5 μm.

The groove formed on the surface of the high refractive index glass layer is formed as shown FIG. 48B in such a way that the depression (projection) provided on the lower cladding layer 22 becomes a projection (depression) of the high refractive index glass layer, that is, the low-refractive-index area and high-refractive-index area formed on the front and back of the core layer 23 are provided at positions corresponding to each other. This is based on the knowledge of the inventors. that since the shape of the field of light propagating through the core layer 23 is symmetric with respect to the straight line extending in the light propagation direction, the low-refractive-index area and high-refractive-index area formed on the front and back of the core layer 23 should also be symmetric with respect to the straight line extending in the light propagation direction to avoid extra loss.

After the core layer 23 of such a relief-shaped pattern is formed, the upper cladding layer 24 is formed above the core layer 23 which is the waveguiding area, so that the core layer 23 having the high-refractive-index area 23a and low-refractive-index area 23b is embedded in the upper and lower cladding layers. In this way, a 1.31/1.55 μm WDM optical circuit is constructed as in the case of Embodiment 19 described above.

In the case of a conventional light waveguide having a refractive index difference Δ between the cladding layer and core layer of about 1.5%, the thickness of the core is requires to be about 4.5 µm to ensure a single mode operation in the substrate thickness dimension, which is considerably deep etching compared to the etching depth of approximately 1 µm in a normal semiconductor process of a comparable degree, making it difficult to process fine patterns. On the contrary, adopting a relief-shaped structure like the optical circuit in this embodiment makes it possible to reduce the etching depth to 1 µm and form a fine pattern on the order of 0.5 µm.

In the case of the optical circuit having the structure shown in FIG. 48B, the effective refractive index difference Δ' between the high-refractive-index area and low-refractive-index area of the core layer 23 is estimated to be approximately 20% of the refractive index difference Δ (about 1.5%) between the low refractive index glass forming the cladding and high refractive index glass forming the core. The effective refractive index difference Δ' for forming the spatial refractive index distribution of the optical circuit in this embodiment is as small as approximately 0.3%.

As a result of designing an optical circuit based on this effective refractive index difference Δ' (about 0.3%), even if the pixel size is set to 3 µm, it is possible to make the circuit length within the range as small as 1.5 times that of the optical circuit of Embodiment 1 which has been designed with a refractive index difference Δ of 1.5%. Furthermore, in the case of the optical circuit of this embodiment, it is possible to reduce the pixel size to 0.5 µm and designing an optical circuit with a pixel size of 0.5 µm makes it possible to generate a light field with a large wave number in the lateral direction and make the circuit length approximately half the optical circuit of Embodiment 1.

That is, even if the light propagation area is formed with a low refractive index difference of, for example, approximately 0.3%, the optical circuit of this embodiment can generate relatively large reflection and scattering using multiple scattering by means of a waveguide structure having a relief-shaped pattern and generate optical interference at high efficiency. This can drastically reduce the size of the optical circuit.

The relief shape provided for the core layer 23 can be freely changed according to a desired refractive index distribution, and it is possible, for example, to provide different patterns for the upper and lower surfaces of the core layer 23 and provide an intermediate refractive index area 23c in addition to the high-refractive-index area 23a and low-refractive-index area 23b as shown in FIG. 48C.

As already explained in Embodiment 16, since the optical circuit shown in FIG. 36A has a square pixel structure having the sides substantially perpendicular to the wavefront traveling direction, strong interference is produced just like light diffraction by a knife edge, not only deteriorating design accuracy of the optical circuit but also generating light having a large wave number, which involves a problem that it is no longer possible to control light with a refractive index distribution having a small refractive index difference. However, when the above described relief-shaped pattern is applied to the core layer 23, the presence of pixels having a low refractive index between pixels having a high refractive index effectively smoothes the refractive index pattern and can thereby suppress strong scattering of propagating light.

EMBODIMENT 21

The optical circuit of this embodiment realizes light confinement by constructing cladding with a multilayer made up of multiple films of different refractive indices placed one atop another.

Figure 49:
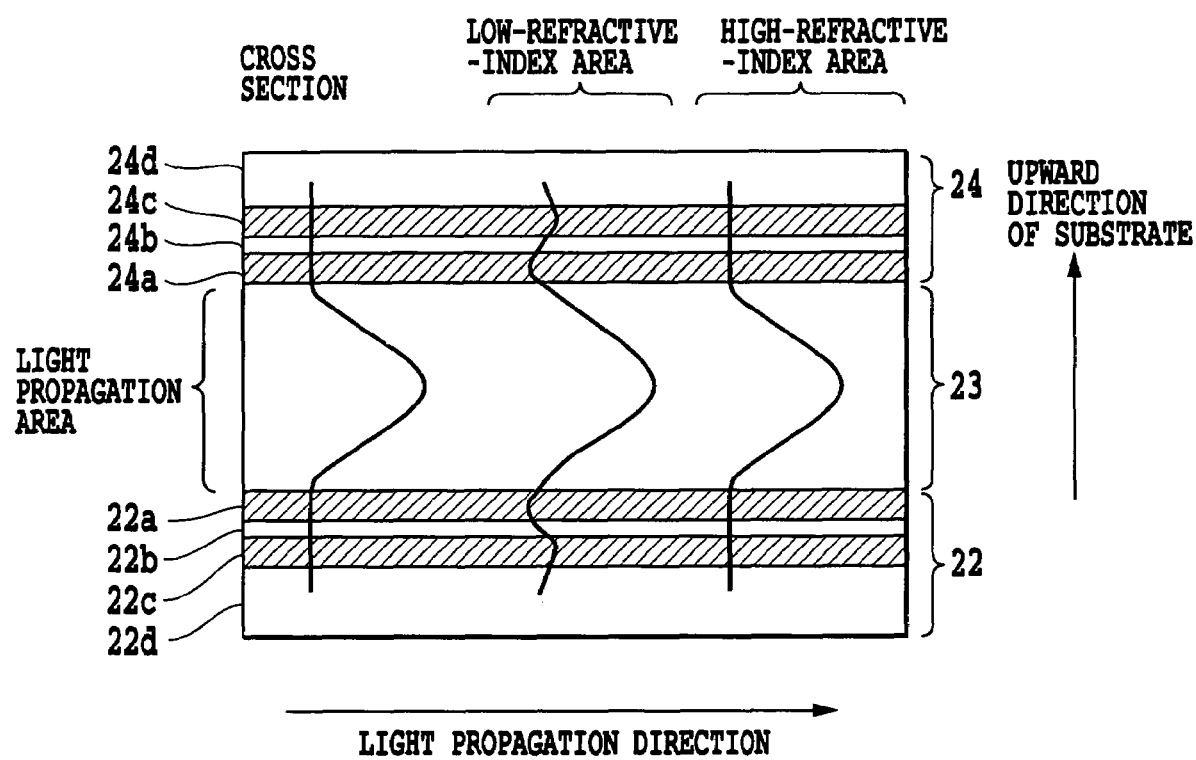
FIG. 49 is a cross-sectional view of the waveguide part of an optical circuit according to Embodiment 21.

FIG. 49 is a cross-sectional view of a waveguide part of the optical circuit of this embodiment and both a lower cladding layer 22 and an upper cladding layer 24 sandwiching a core layer 23 are made up of multiple films of different refractive indices (22a to 22d and 24a to 24d) placed one atop another.

In the optical circuits explained so far, the field pattern of the low-refractive-index area is a radial pattern as in the case of the optical circuit in Embodiment 2 and even adopting the circuit configuration of Embodiment 17 or Embodiment 19 cannot prevent losses from being produced in principle. In order to solve this problem, the optical circuit of this embodiment forms the cladding areas of a multilayer film consisting of multiple films of different refractive indices placed one atop another, and can thereby completely suppress light leaking above or below the substrate. The design method of the optical circuit is the same as that described in "Dispersion and radiation loss characteristics of antiresonant reflecting optical waveguides-numerical results and analytical expressions" (T. Baba and Y. Kokubun, Quantum Electronics, IEEE Journal of Vol. 28 No. 7, pp 1689-1700 July (1992)).

Combining multiple media of different refractive indices into a multilayered structure can realize total reflection and anti-reflection conditions. Especially when the lateral wave number is small, it is possible to form total reflection conditions relatively easily (e.g., see T. Baba and Y. Kokubun, "Dispersion and radiation loss characteristics of antiresonant reflecting optical waveguides-numerical results and analytical expressions", Quantum Electronics, IEEE Journal of Vol. 28 No. 7, pp 1689-1700 July (1992)).

Therefore, it is possible to realize a circuit with sufficiently low loss even with an optical circuit in which low-refractive-index areas and high-refractive-index areas have substantially the same proportion, by constructing the cladding layers of the above described multilayered films and arranging these layers in such a way that total reflection (or sufficiently high reflectivity) is obtained on both the upper side and lower side of the core layer 23 in the low-refractive-index areas.

Since such a circuit configuration can produce effects when Bragg conditions are satisfied only in the vertical direction of a substrate (not shown), it is possible to obtain similar effects by not only adopting the multilayered structure having a cyclic structure only in the vertical direction of the substrate as shown in FIG. 49 but also constructing the upper and lower cladding layers using a photonic crystal.

EMBODIMENT 22

The optical circuit of this embodiment designs a refractive index distribution by dividing one pixel into a plurality of subpixels and thereby realizes an optical circuit with lower loss than the circuit explained in Embodiment 14.

As a rough approximation, when light interacts with an object having a smaller structure than the wavelength of light, it generally perceives a refractive index averaged over an area equivalent in size to the wavelength as an effective refractive index due to a diffraction phenomenon. Therefore, with a plurality of subpixels making up a unit pixel, it is possible to arbitrarily create a unit pixel with a different effective refractive index depending on the way of allocating subpixels having a high refractive index and subpixels having a low refractive index.

Figure 50A:
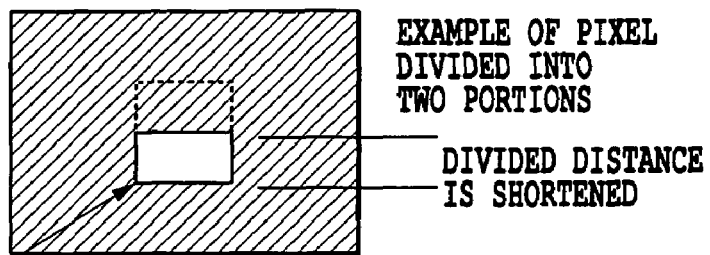
FIGS. 50A to 50C are top views showing examples of subpixels of an optical circuit according to Embodiment 22.
Figure 50B:
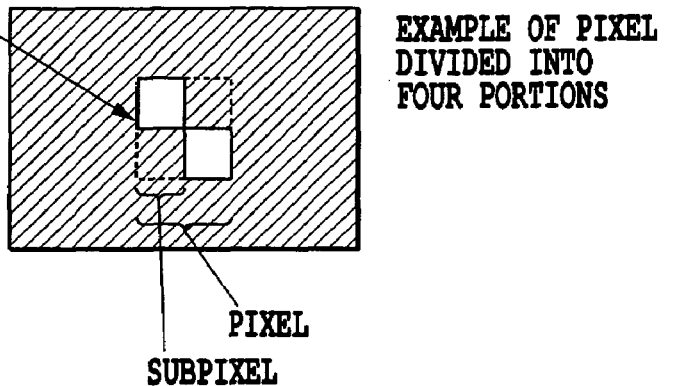
Figure 50C:
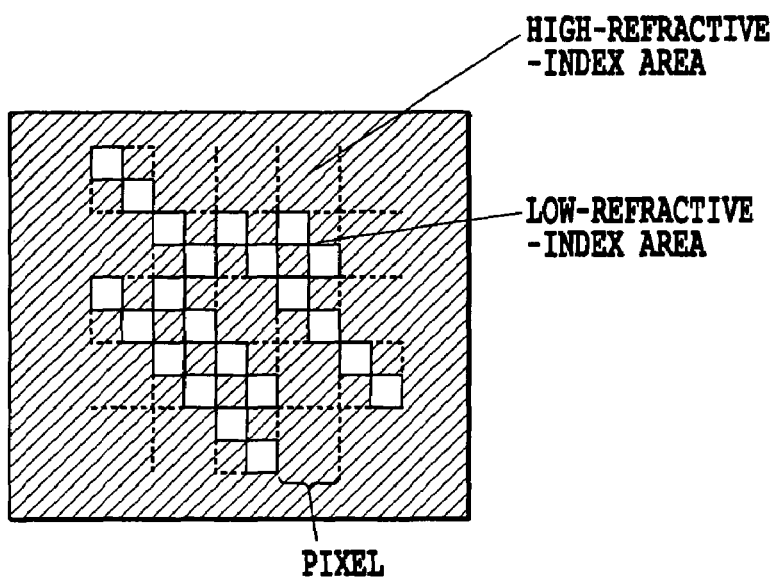

FIG. 50A and FIG. 50B are top views showing examples of subpixels and FIG. 50C is a conceptual top view of part of an optical circuit for which a refractive index distribution is designed using pixels divided into subpixels. A unit pixel has a size of 1 μm per side and a case where this pixel is divided into two portions (FIG. 50A) and another case where it is divided into four portions (FIG. 50B) are illustrated. Through such pixel divisions, the effective value of a gap becomes approximately 0.5 μm (in the case of FIG. 50A) or 0.25 μm (in the case of FIG. 50B) and light that propagates through such a medium hardly perceives the presence of such a gap. Furthermore, also when designing a refractive index distribution, it is possible to reduce the amount of data necessary for calculations to, for example, ½ or ¼, and therefore it is possible to easily form even a large scale circuit of 10,000 pixels×10,000 pixels (corresponding to 1 cm per side in this case).

The optical circuit of this embodiment divides pixels into a plurality of subpixels, but performs calculations in pixel units when designing a refractive index distribution and thereby simplifies calculations of a refractive index distribution. Furthermore, in realizing a fine pattern, frequent use of unit pixels with the same state of division into subpixels for calculations simplifies condition settings in the step of the correction of the diffraction of phase shift masks in the photo process or in the step of etching amount correcting in the process, etc.

EMBODIMENT 23

As already explained in Embodiment 16, the optical circuit shown in FIG. 36A has a problem that the rectangular pixel structure has sides substantially perpendicular to the wavefront traveling direction, and therefore strong interference occurs just like light diffraction by a knife edge and the design accuracy of the optical circuit deteriorates and light with a large wave number is generated, preventing the refractive index distribution with a small refractive index difference from controlling light.

To solve this problem, the optical circuit of this embodiment deforms pixels from their original rectangular shape. Modes of deforming these pixels include a case of deforming pixels in the horizontal direction to the substrate and a case of deforming pixels in the direction perpendicular to the substrate. When calculating a refractive index distribution, it is only necessary to assume two, high and low refractive indices having an effective refractive index difference as in the case of Embodiment 11.

Figure 51A:
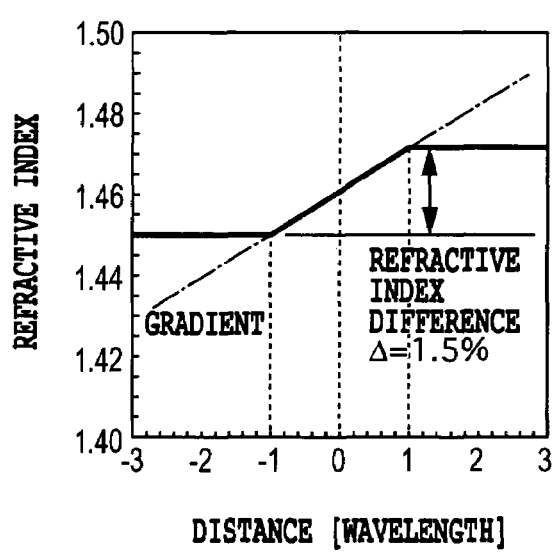
FIG. 51A is a conceptual diagram of a refractive index distribution of a waveguide according to Embodiment 23 having a structure with a refractive index changing in the horizontal direction with respect to the substrate.
Figure 51B:
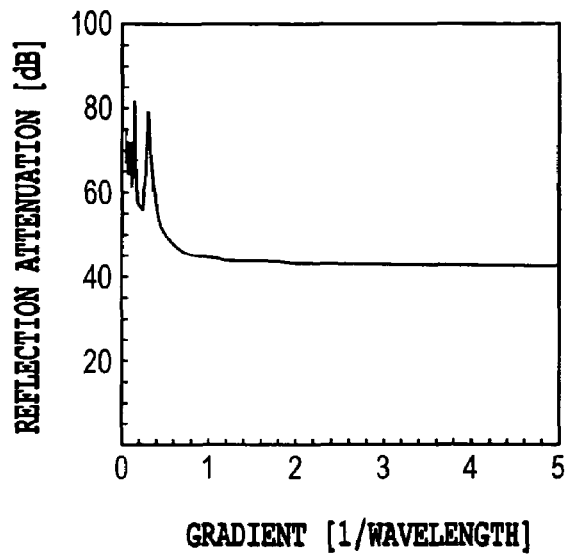
FIG. 51B illustrates how reflection attenuates are when a plane wave is propagated in the refractive index distribution according to Embodiment 23.

FIG. 51A is a conceptual diagram of a refractive index distribution of a waveguide having a structure with a refractive index varying in the horizontal direction to the substrate and FIG. 51B illustrates reflection attenuation when a plane wave propagates in the refractive index distribution shown in FIG. 51A. The horizontal axis of FIG. 51B is a gradient of a refractive index (rate of spatial change of a propagation constant) and the vertical axis is an amount of reflection attenuation due to mismatch of propagation constants. The spatial length is normalized by the wavelength of light in a medium and the refractive index at each position is normalized at a reference refractive index (n=1.45: refractive index of silica-based waveguide at a wavelength of 1.55 μm) to calculate a refractive index difference.

As is apparent from these figures, reducing the gradient of a refractive index below 1 improves the amount of reflection attenuation. That is, the shape of pixels may be changed gradually. For example, assuming pixels with a refractive index distribution of 3 μm per side, this pixel size is approximately 2 wavelengths with respect to light having a wavelength of 1.55 μm in vacuum, and therefore if the refractive index is changed so that the gradient becomes about ½, it is anticipated that scattering can be attenuated by several dB.

FIG. 52A is a conceptual diagram to illustrate a refractive index distribution in unit pixels when the pixel shape is assumed to be circular, FIG. 52B is a conceptual top view of part of the circuit made up of the circular pixels shown in FIG. 52A and FIG. 52C is a conceptual top view of the circuit when the positions the high-refractive-index areas and low-refractive-index areas in FIG. 52B are inverted.

When the degree of broadening of a field is assumed to be equivalent to the pixel size, it is possible to consider that a local effective refractive index changes substantially in proportion to the cross section of a circular pixel. Here, the circular area of approximately 3 μm in diameter is assumed to have the same refractive index as that of the cladding and the area surrounding the circular area is formed of a film having a high refractive index. That is, the circuit shown in FIG. 52B has a structure in which high-refractive-index areas made up of a film having a high-refractive index are uniformly formed and some parts of these high-refractive-index areas are hollowed out in circle and low-refractive-index areas are provided in those parts. On the contrary, the circuit shown in FIG. 52C has a structure in which low-refractive-index areas made up of a film having a low-refractive index are uniformly formed and some parts of these low-refractive-index areas are hollowed out in circle and high-refractive-index areas are filled in those parts.

In the case of a circuit configuration in which a refractive index varies in the direction perpendicular to the substrate, an under cladding is placed on the substrate first and then a film whose refractive index is higher than the cladding is placed. When a core pattern is formed by reactive ion etching using a photoresist as a mask, it is possible to leave a film having a different thickness as the core by spatially changing the thickness of the photoresist which is a mask. For example, after the photoresist is applied, when the resist is overheated to approximately 130° C. and melted, the edge of the pattern is rounded by surface tension and the resist in this condition is used as an etching mask, then the area peripheral to the resist pattern is erased by etching and the circumferential area of the pattern which is to be finally transferred to a high refractive index film is also rounded.

Assuming that, for example, an AZ-based photoresist is used, it is possible to remove the resist having a depth substantially proportional to the amount of exposure of light. Therefore, if different patterns are exposed to light gradually over a plurality of times, it is possible to finally form a desired pattern. In this case, it is also possible to smooth the circumferential area of the finally obtained pattern.

EMBODIMENT 24

The arrangement of pixels making up an optical circuit can be specified by a method of dividing the plane area of the optical circuit. In other words, as is in crystallography, it is possible to consider a unit cell and specify the positions of pixels arranged according to its symmetry. Here, suppose a unit cell consists of one or more pixels. If such approach is used, the circuit as a whole has periodicity similar to that of a crystal. When an ideal plane wave which spreads widely in lateral direction is introduced into such a circuit having periodicity, strong scattering occurs for a specific wave number component. However, media having a low refractive index or high refractive index are properly arranged at the positions at which pixels are arranged, and therefore this periodicity cannot be complete (for more information, see Charls Kittel ed. "Introduction to solid state physics 6th" John Wily & Sons, Inc., New York, U.S.A. (1986)).

In this case, since the optical circuit characteristic changes depending on how a crystallographic orientation of a circuit is set with respect to the pixel size, arrangement and the direction of incidence of light (or emission direction), the direction of incident light and the wave number become important factors to achieve a desired characteristic. Then, if strong scattering is used with respect to the above described specific wave number component, it is possible to reduce the size of the circuit and improve the characteristic.

The simplest unit cell consists of a single pixel and the shape of this pixel can be circular or n-angular (n: integer of 3 or greater).

Figure 53:
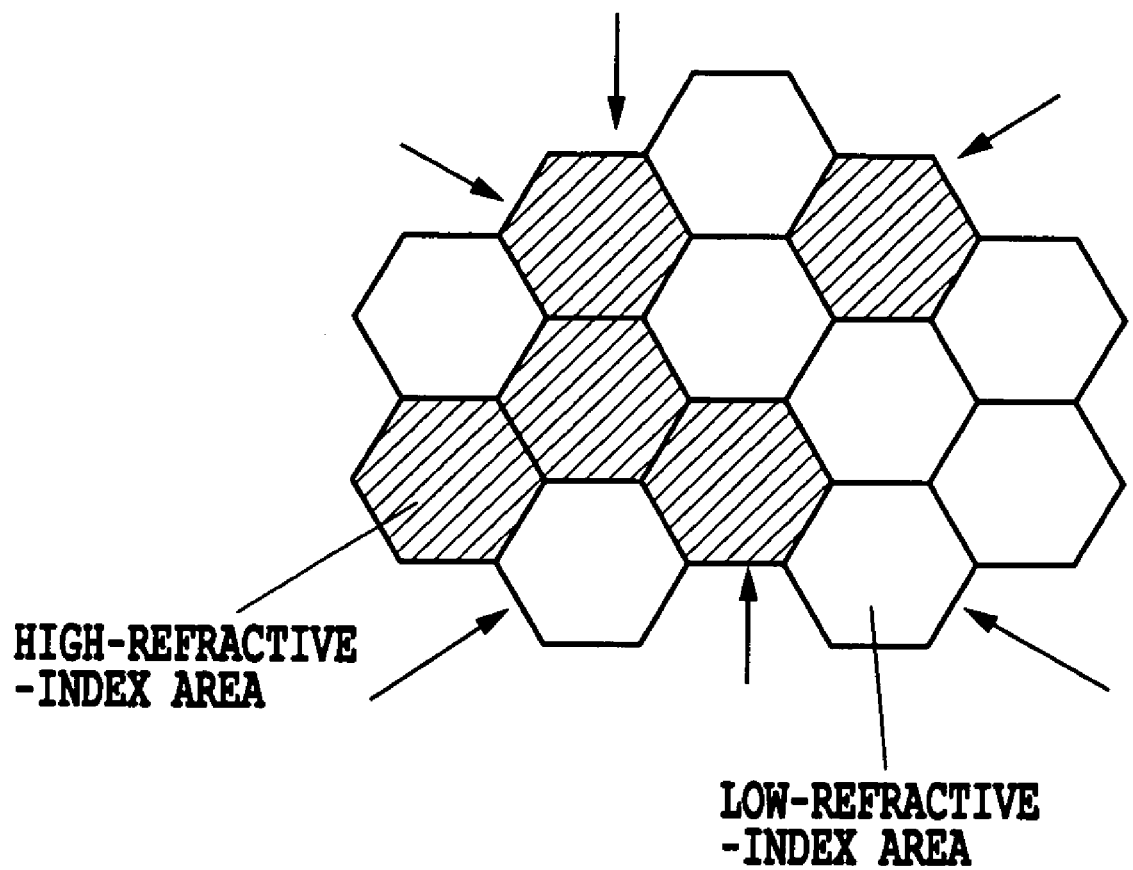
FIG. 53 illustrates a pixel arrangement when pixels are assumed to be honeycomb-shaped.

FIG. 53 illustrates a pixel arrangement when these pixels are honeycomb-shaped and adopting this pixel arrangement can obtain a relatively isotropic grating plane. Therefore, the optical circuit that inputs/outputs light from a plurality of directions as indicated by arrows in the figure can easily generate large reflections in various directions and thereby improve the circuit characteristic.

Furthermore, as shown in FIG. 53, even the same pixel arrangement structure can improve the characteristic by changing the pixel orientation condition.

Figure 54:
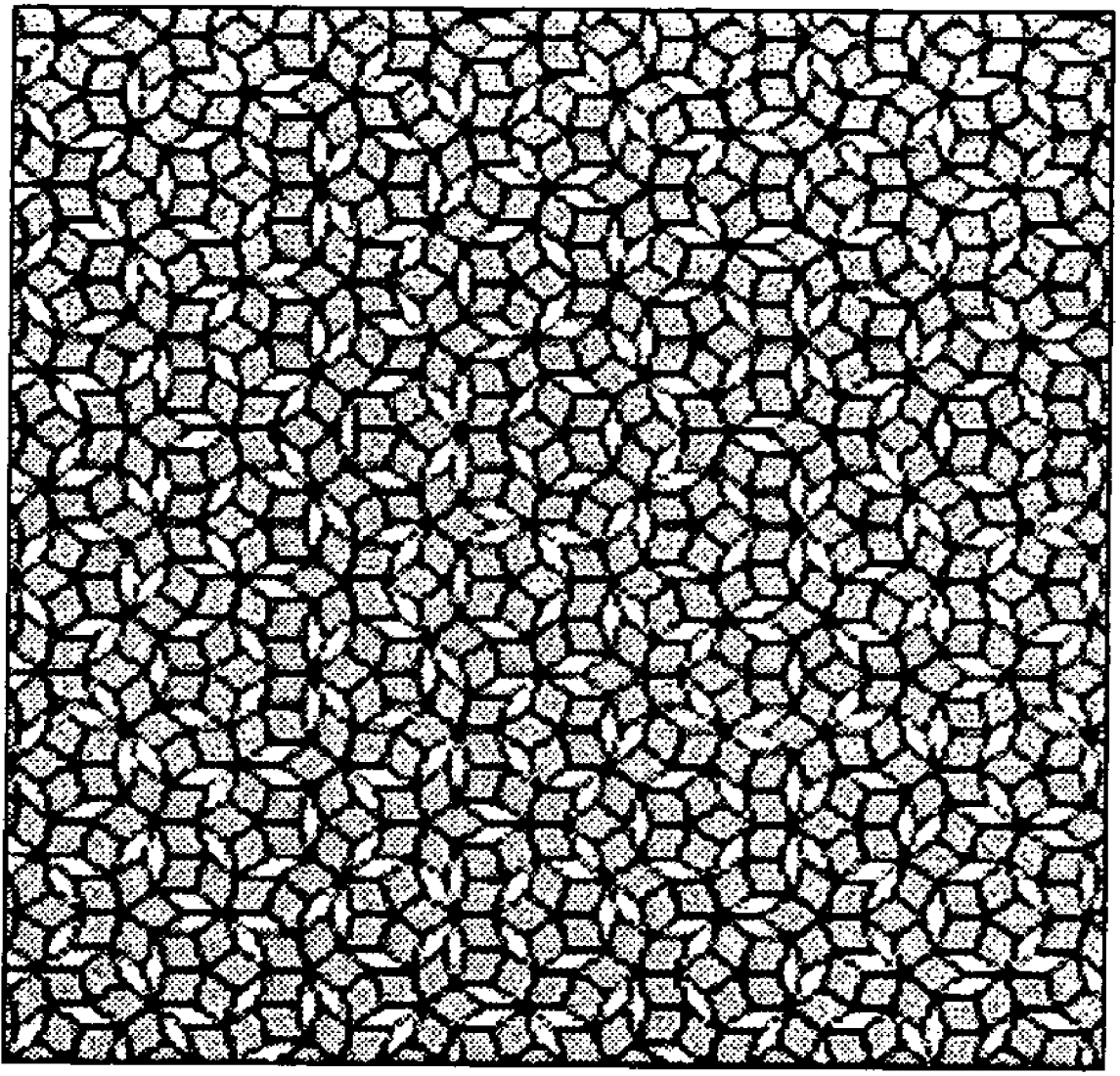
FIG. 54 illustrates an incomplete periodic structure called "quasi-periodic structure"

As shown in FIG. 54, an incomplete cyclic structure called a "quasi-periodic structure" is also known. The diffraction spectrum in this case is fractal and the spectral distribution extends in a relatively wide range, and therefore this structure has the advantage of producing scattering which is convenient for making up a circuit.

EMBODIMENT 25

An optical circuit including a plurality of input/output ports to broadcast signals from each port to other ports and receive a signal from the same port is conventionally provided with as many light combiners/splitters as necessary to simply combine/split optical power. Thus, when a signal is received, if a signal is input from only one port, a circuit provided with N ports has a problem that its optical power is attenuated to 1/N. Such a problem occurs because its circuit design does not take into account phases of light. In contrast, use of the wave transmission medium of the present invention can realize the combining/splitting function including phases and thereby combine/split light without producing any extra loss.

Figure 55:
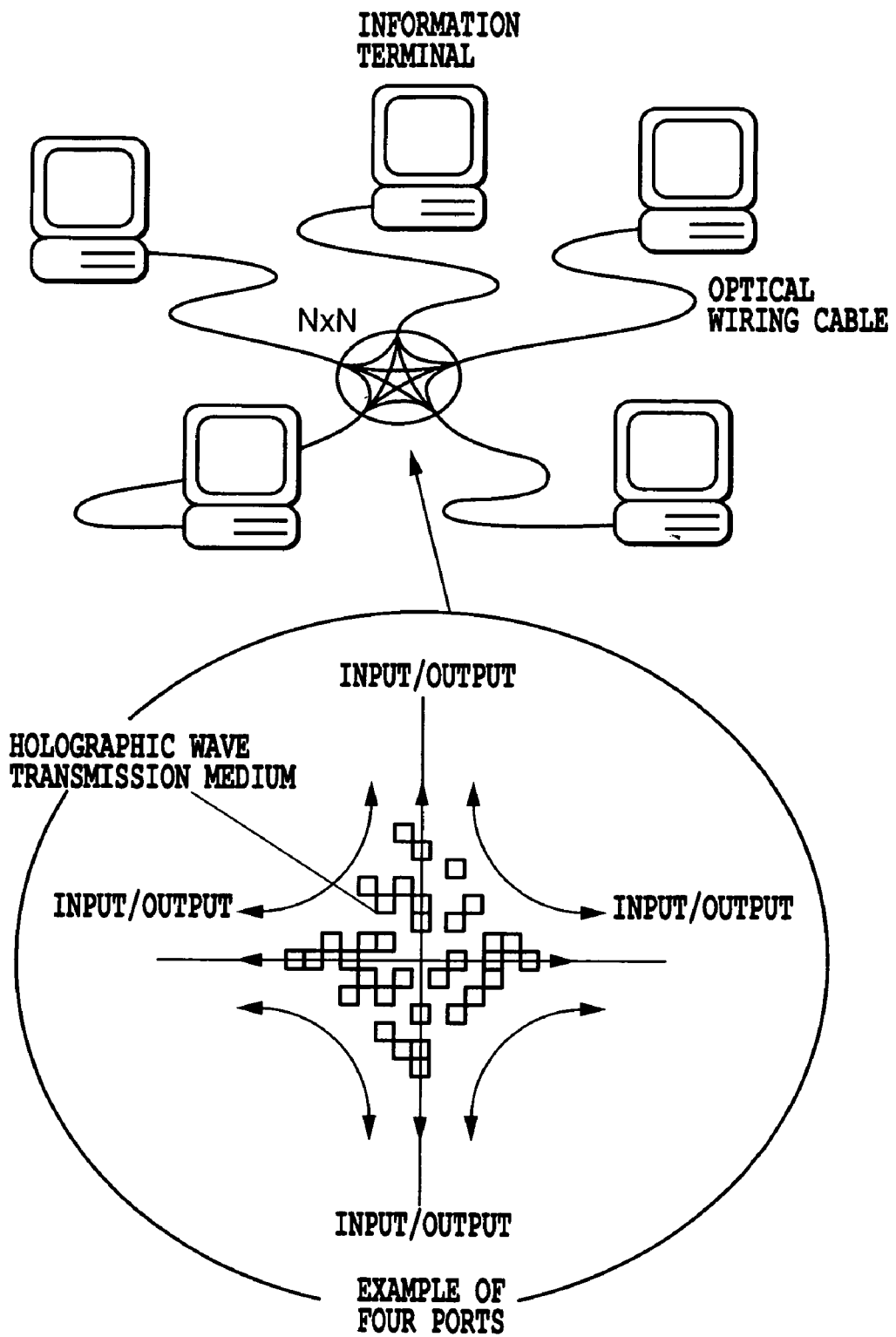
FIG. 55 illustrates a configuration example of an optical circuit with a mutual broadcast transmission/broadcast reception configuration.
Figure 56:
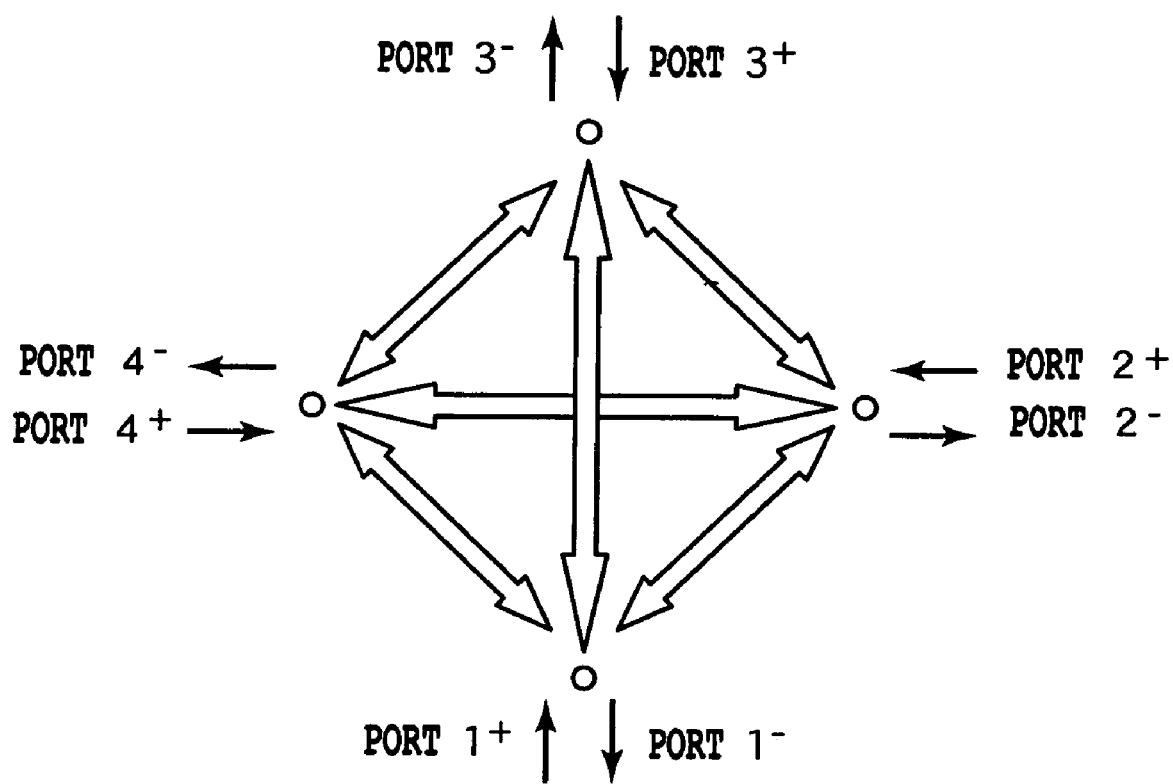
FIG. 56 is a schematic diagram of a signal flow among ports of the optical circuit in FIG. 55.

FIG. 55 illustrates a configuration example of an optical circuit adopting a mutual broadcast transmission/broadcast reception configuration and FIG. 56 is a schematic view of the flow of signals among ports of this optical circuit. This optical circuit has a circuit configuration including four ports, with each port emitting light to other three ports and receiving signals which are output independently from other three ports. When such an optical circuit is created on a substrate, optical fibers are connected to these ports and each port is used, connected to a termination apparatus or a light amplification apparatus, etc.

Figure 57:
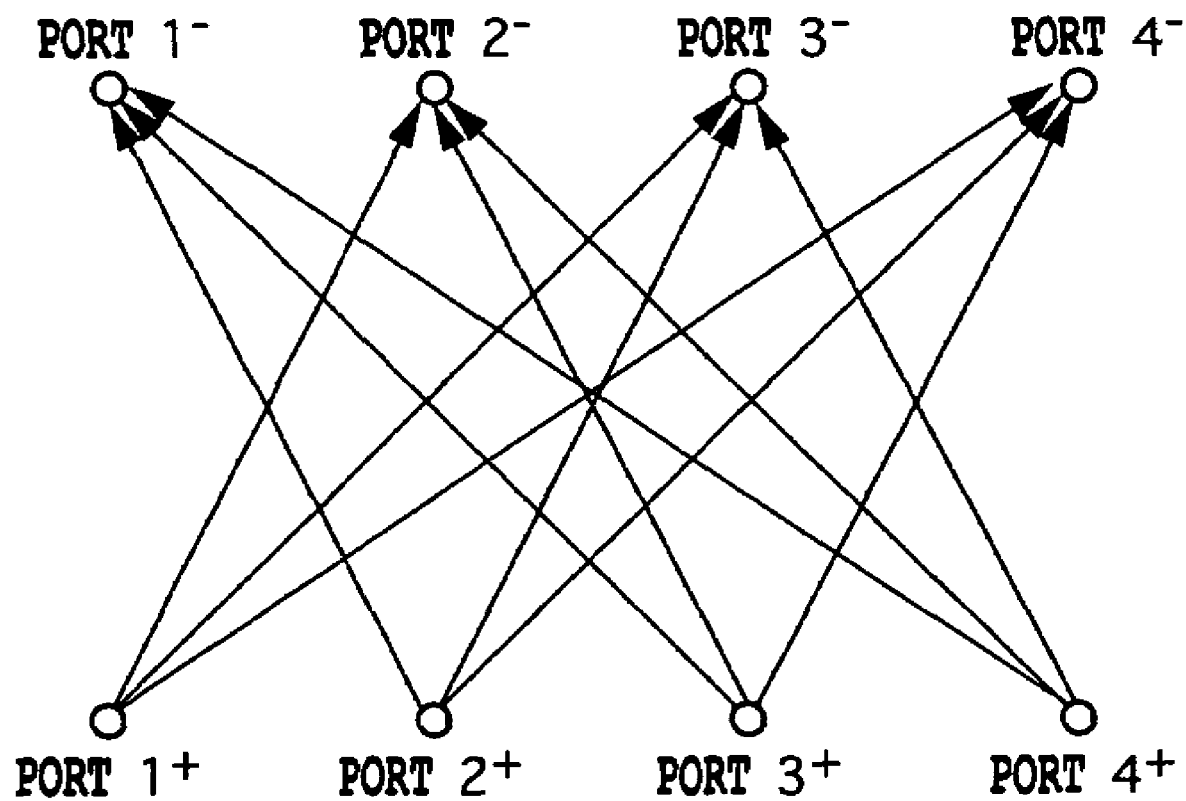
FIG. 57 illustrates the signal flow among ports schematically shown in FIG. 56 modified without changing a logical signal flow.

The flow of signals among various ports which is schematically shown in FIG. 56 can be transformed into the flow in FIG. 57 without altering the logical signal flow. In this figure, the two facing upper and lower ports are actually the same port, but for clarity of the flow of signals, the lower ports are regarded as transmission ports (+) and the upper ports are regarded as reception ports (−) and these are distinguished based on functions. However, since these ports are constructed with the same circuit, this shows no more than a logical configuration.

At this time, in the case of a normal power branch circuit, power is reduced to 1/3 by three branches on the transmitting side, while power is reduced to 1/3 by three combiners on the receiving side, and therefore power is finally reduced to 1/9. That is, loss of as great as 8/9 is produced. Of this loss, the loss on the receiving side is produced because phase-matching light from other two ports is not input. Therefore, it is possible to eliminate the loss if the branching method is modified so as to be able to receive light independently of the light from other two ports. This can be realized by distributing light to each port by also considering the phase of each light ray as will be shown below.

First, the phase of each port is expressed by four sets of numbers (that is, vectors). Here, the amplitude is assumed to be 1. However, when there is no light distribution to any specific port, the component is assumed to be 0. For example, suppose the phase of port 1 is 0, the phase of port 2 is π, the phase of port 3 is π and no light exists at port 4. Then, consider a vector:

$$\frac{1}{\sqrt{3}}(1, -1, -1, 0)$$

Considering such an expression method, an overlapping integral of fields can be calculated as an inner product of vectors, and therefore it is only necessary to find a set of desired vectors using this method.

Now, suppose signals are distributed uniformly from one port to all ports other than the port. Then, it is possible to consider such a field that the component corresponding to the port to which signals are distributed becomes 0 and the absolute value of other ports becomes:

$$1/\sqrt{3}$$

Then, if all vectors become orthogonal to each other by adjusting those phases, each port can receive light independently of signals from other fields and can receive optical signals with only branch loss.

In this case, $$\frac{1}{\sqrt{3}}(0, 1, 1, 1), \frac{1}{\sqrt{3}}(1, 0, 1, -1), \frac{1}{\sqrt{3}}(1, -1, 0, 1), \frac{1}{\sqrt{3}}(1, 1, -1, 0),$$

is actually one of such combinations. This could eliminate a conventional principle loss on the receiving side and could receive optical signals at triple intensity.

Figure 58:
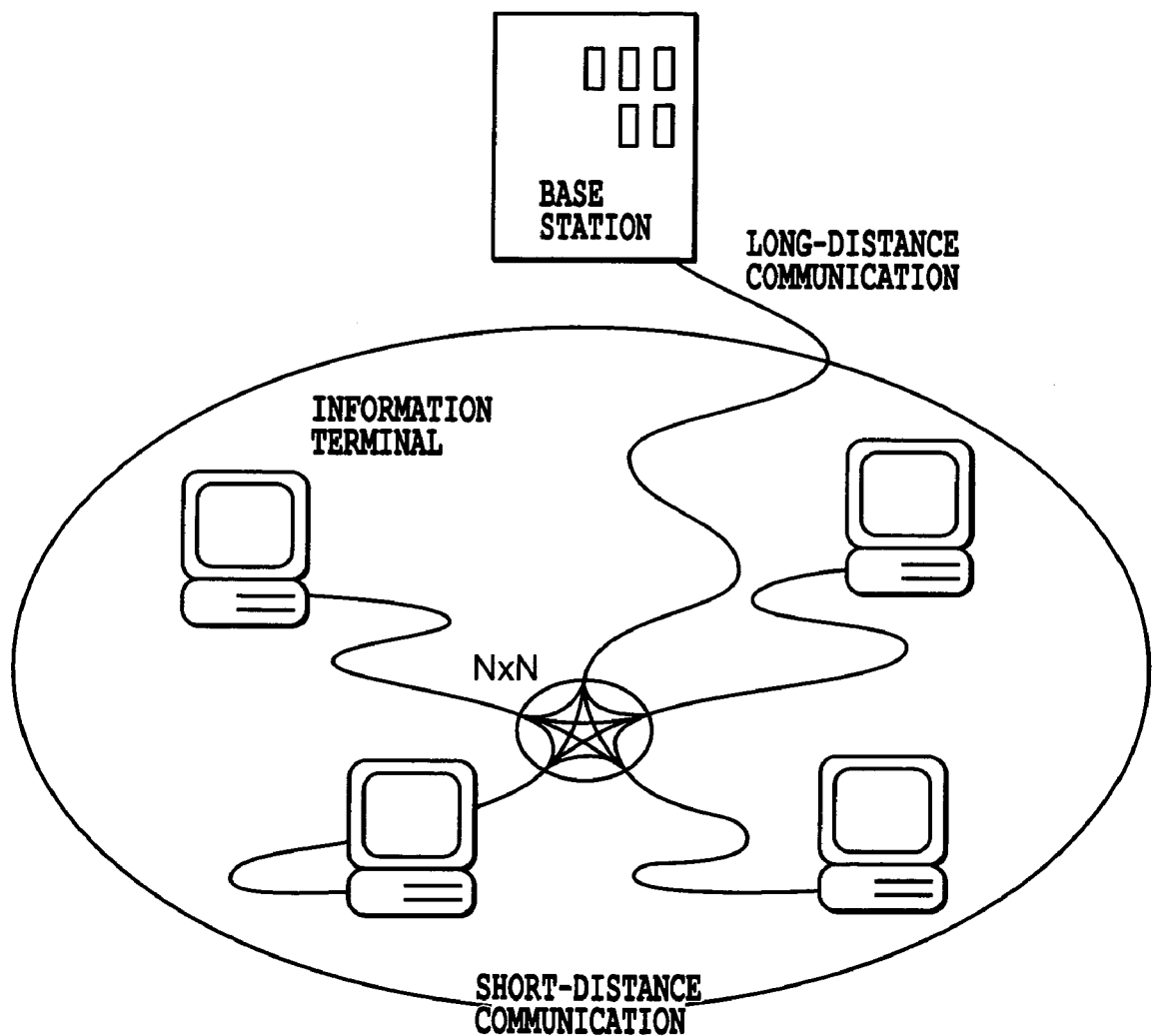
FIG. 58 is a conceptual diagram of a communication network using an unequal distribution circuit.

Then, as the unequal distribution circuit shown in FIG. 58, it is possible to compensate for a loss involved in the transmission distance by unequally distributing (branching) light, reduce the loss by selecting an appropriate phase and realize a low cost optical communication system without using an optical amplifier, etc. In FIG. 58, broadcast transmission/reception is carried out from the base station and at the same time communications are also carried out among terminals.

EMBODIMENT 26

This embodiment is an optical circuit having a configuration similar to that of Embodiment 25, and is a configuration example of an optical circuit to minimize overlapping of output signals when no orthogonal state exists. Here, a case of a three-port optical circuit will be considered. In this case, there are only three ports and therefore it is not possible to realize any orthogonal state. However, it is possible to realize a configuration with a minimum loss by selecting a state as close as possible to an orthogonal state.

As in the case of Embodiment 25, suppose the outputs of the ports are:

$$\frac{1}{3}(-1, 2, 2), \frac{1}{3}(2-1, 2), \frac{1}{3}(2, 2, -1).$$

Here, each circuit has its own output, but this can be handled as reflected returned light.

This allows a necessary port to obtain light of 4/9=3.5 dB. This is a loss 2.5 dB smaller than the case where two conventional 3 dB couplers are combined.

Figure 59:
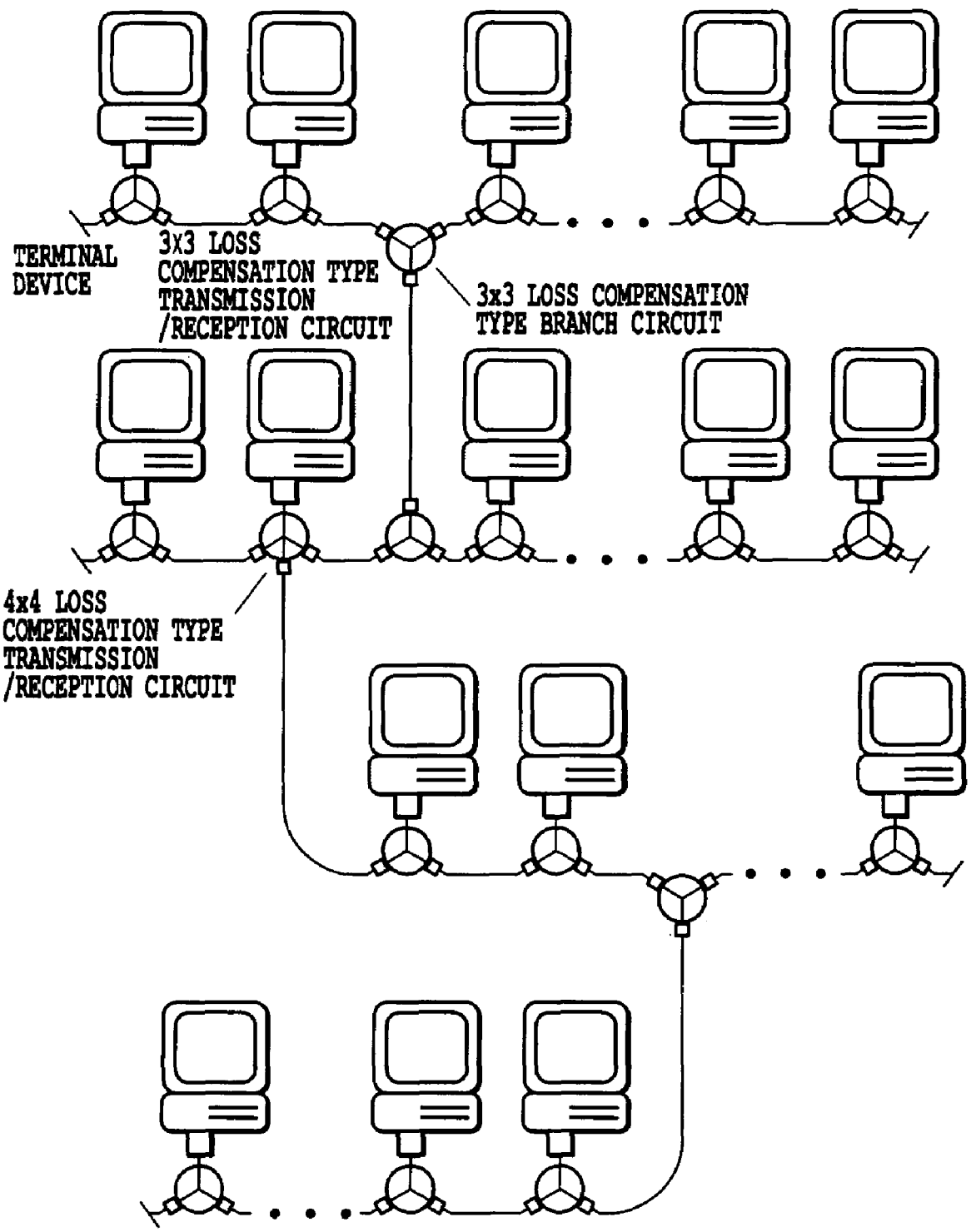
FIG. 59 is an applied conceptual diagram of the unequal distribution circuit.

FIG. 59 is an applied conceptual diagram of such an unequal distribution circuit. As shown in this figure, lining up three-port optical circuits side by side can realize a tap circuit. Here, an Er element is doped into an inorganic glass material which makes up an optical circuit and an amplification function in a 1.5 μm wavelength band is provided. Since the circuit loss is sufficiently lower than that of a conventional one, and amplification is possible with small power consumption and a small distance and therefore it is possible to construct a small tap circuit with low consumption power. In the figure, this is shown as a loss compensation type circuit.

EMBODIMENT 27

Figures 60A, 60B:
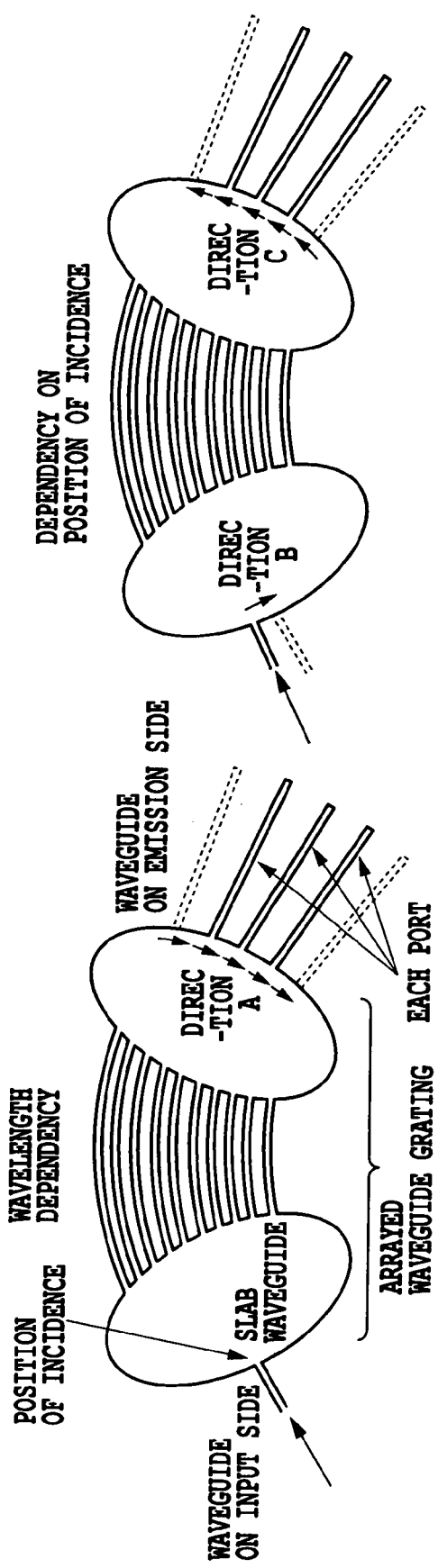
FIG. 60A and FIG. 60B illustrate the nature of an arrayed waveguide diffraction grating.

As shown in FIG. 60A and FIG. 60B, in the case of a waveguide diffraction grating, when the position of an incident waveguide at the incident side slab is fixed, the output position is shifted in a direction A according to the variation of the wavelength (FIG. 60A). Furthermore, when position B of the incident waveguide is shifted for signal lights having same wavelength, the output position is shifted in a direction C (FIG. 60B). Taking advantage of this nature, shifting the center position of the field on the incident waveguide is side in the direction B according to the wavelength causes the movement in the direction A and movement in the direction C to cancel out each other, preventing the field from moving.

Figure 61:
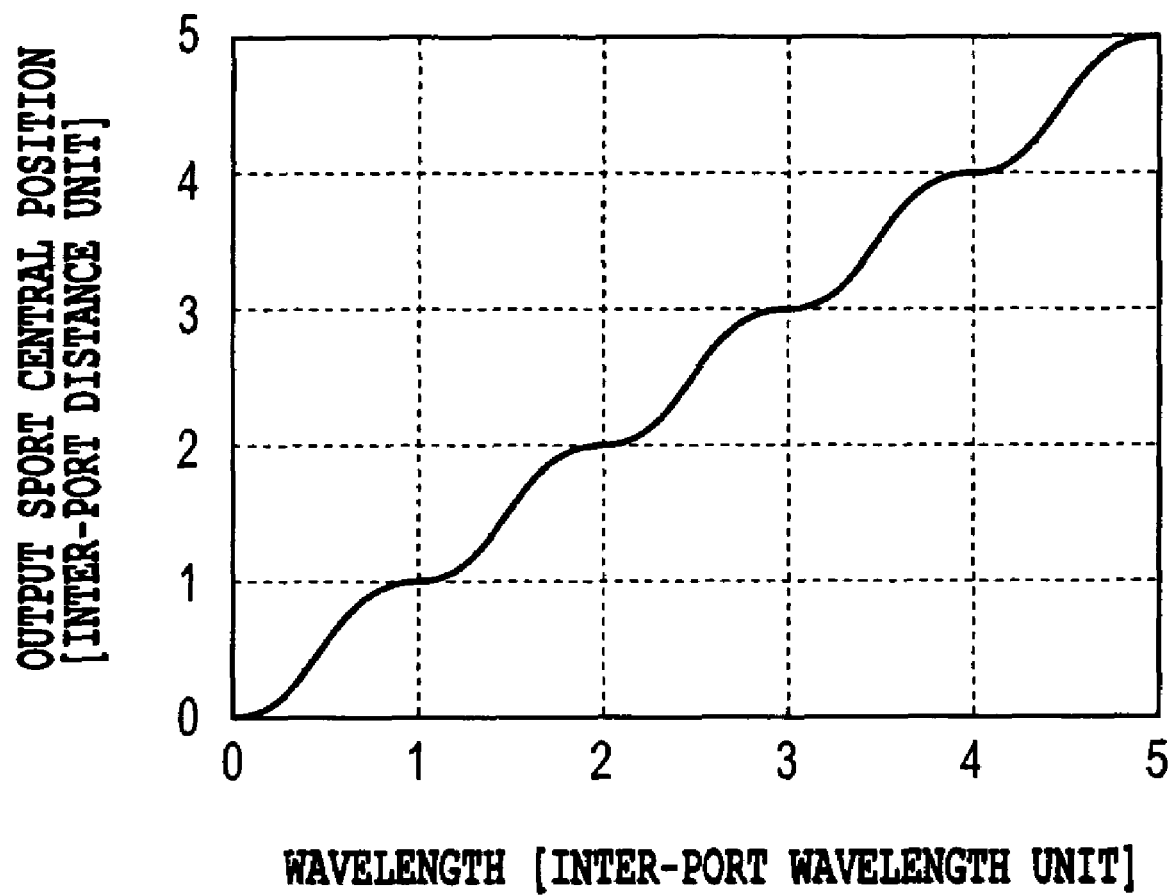
FIG. 61 illustrates a relationship between the center position of an output spot and wavelength.

When the center position of the field on the incident waveguide side is cyclically changed at wavelength intervals between the output ports in the case where the center position of the field on the incident waveguide side is not moved, plateaus as shown in FIG. 61 are formed. When the light waveguide of the emission port is placed at this plateau, a square-shaped wavelength filter characteristic is obtained.

To realize this, there is a proposal of a system with a directional coupler provided at the incident waveguide part and a branch delay circuit provided in front thereof. Since the width of deflection of the center position of the field needs to be equivalent to the field radius, the width of the core of the directional coupler cannot be reduced. This results in a structure where the field is wider than the necessary spot diameter and the field shape is distorted. This causes distortion of an optical output image on the emission side which is a conjugate image thereof and results in a problem that optical coupling deteriorates.

Thus, this embodiment uses a wave transmission medium of the present invention, shapes and outputs light from a plurality of incident ports, combines those waves to obtain an optimum incident field shape and adjusts phases among incident ports to thereby adjust the center position of the field. In this embodiment, two incident ports will be used.

Here, suppose x is a coordinate, $f_0(x)$ and $f_1(x)$ are images of the incident ports and $\phi$ is a phase difference between the ports. At this time, a combined image $f(x, \phi)$ is:

$$f(x;\phi)=f_0(x)+h(x)e^{i\phi}=f_0(x)+f_1(x)+i\phi f_1(x)+ \quad (38)$$

Suppose the shape of a desired field is given by a function:

$$F(x-x_c(\phi))e^{i\theta(\phi)} = F(x) + \left(-\frac{\partial F}{\partial x}(x) \cdot \frac{\partial x_c}{\partial \phi}(0) + iF(x) \cdot \frac{\partial \theta}{\partial \phi}(0)\right)\phi + \dots \quad (39)$$

where a function $x_c(\phi)$ of a phase difference $\phi$ is the center position and $\theta(\phi)$ is the phase. Here, for simplicity, suppose $x_c(0)=0$, $\theta(0)=0$. At this time, when a primary coefficient with respect to $\phi$ is compared:

$$f_0(x) + f_1(x) = F(x) \quad (40)$$

$$if_1(x) = -\frac{\partial F}{\partial x}(x) \cdot \frac{\partial x_c}{\partial \phi}(0) + iF(x) \cdot \frac{\partial \theta}{\partial \phi}(0)$$

These are the expressions that the functions g(x) and h(x) must satisfy. As will be described later, since $\phi$ is an amount corresponding to a wavelength difference, $$\frac{\partial x_c}{\partial \phi}(0)$$

corresponds to the speed at which the center position should move and is therefore an amount determined by the design condition.

From the orthogonal condition and normalization condition of $f_0(x)$, $f_1(x)$, $$f_0(x)=(1-s)F(x)-i\sqrt{s-s^2}G(x)$$

$$f_1(x)=sF(x)+i\sqrt{s-s^2}G(x) \quad (41)$$

where G is a function that normalizes $$\delta F/\delta x$$

and s is an amount not exceeding 1 and is an amount determined by:

$$\frac{\partial x_c}{\partial \phi}(0) = \frac{\sqrt{s-s^2}}{|\partial F/\partial x|} \quad (42)$$

$$|\partial F/\partial x|$$

is a normed square root.

Figure 62:
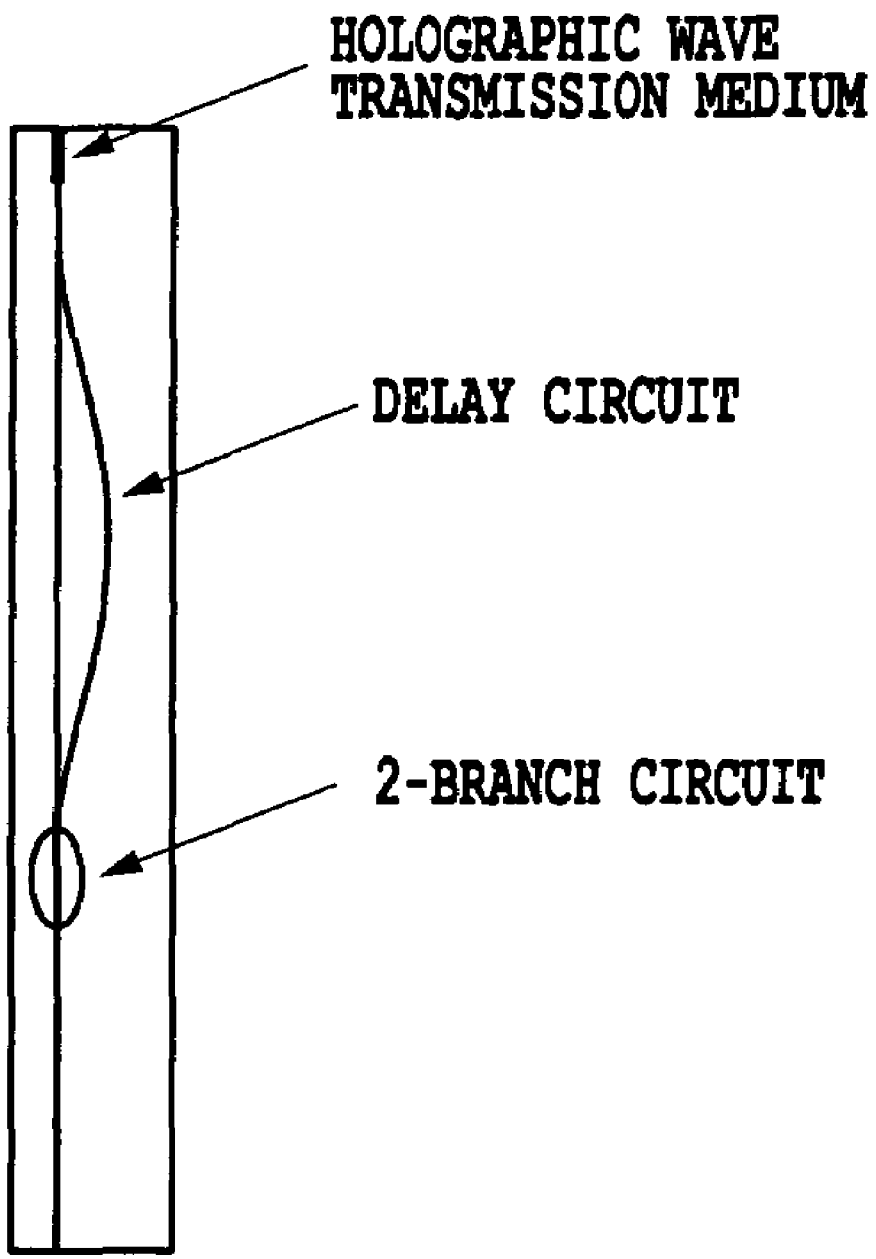
FIG. 62 illustrates a configuration of an optical circuit according to Embodiment 27.

The wave transmission medium used in the present invention can arbitrarily set field shapes including their phases if they are fields orthogonal to each other, and therefore it is possible to use such a wave transmission medium to set these output fields for their respective input ports. Now, the phase difference in the prior stage is given with a delay of the waveguide circuit as shown in FIG. 62 (which illustrates only the incident section except arrayed waveguide gratings) and if the iteration cycle of the output with respect to the wavelength of the delay circuit and the distance of output wavelength between waveguides on the output side are equalized, a relational expression:

$$\frac{\partial x_c}{\partial \phi}(0) = \frac{D}{2\pi} \quad (43)$$

is obtained where D is the distance between output ports of the waveguide and all parameters are determined if only a desired field F is determined.

For example, assuming that F is a Gaussian function and w is the field radius, then $$|\delta F/\delta x| = 1/w$$

Figure 63:
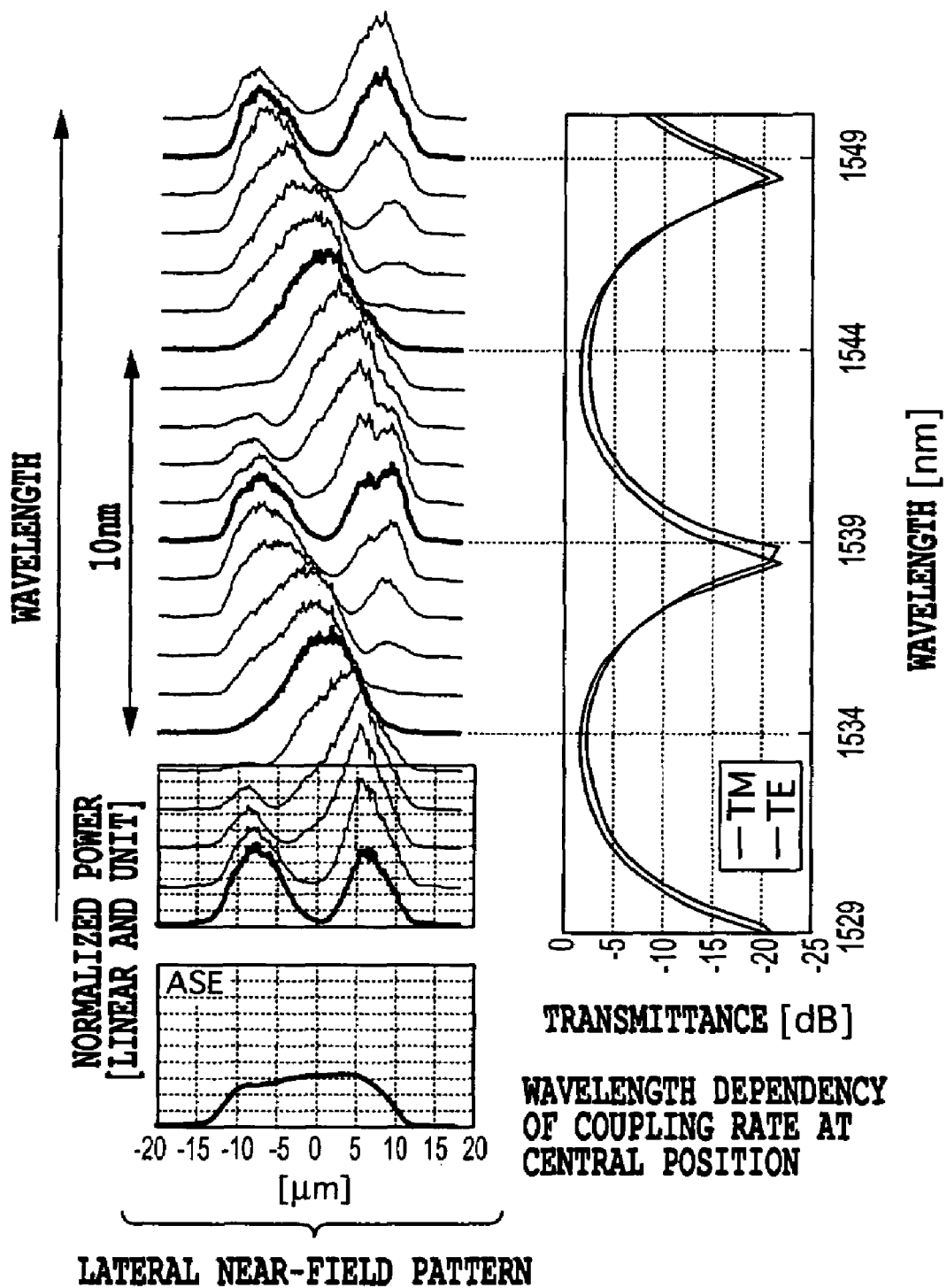
FIG. 63 illustrates how the center position moves when a field shape is assumed to be a Gaussian function.

FIG. 63 is an example showing movement of the center position when the field shape is assumed to be a Gaussian function. This is a near-field pattern of the field shape of the part before entering the arrayed waveguide gratings so that the movement of the field can be understood clearly. This is a configuration including the delay circuit shown in FIG. 62 and it is observed that the center position of the field changes cyclically at intervals of approximately 10 nm. However, the transition area is deviated from the approximation and there are two peaks, but this area corresponds to the area of transition from one output port to the neighboring output port, and therefore this has nothing to do with coupling. The portion of the delay circuit can be freely set according to the length of the waveguide and the branch rate of a two-branch circuit can also be set freely, and therefore if it is adjusted using the above described method according to the arrayed waveguide gratings, it is possible to obtain a flat wavelength branch characteristic.

In the above described embodiment, two input waveguides are provided on the input side, but the number of waveguides on the input side can be increased to further improve the accuracy. A general theory for this will be shown below.

With respect to a desired function $F(x;\eta)$ having $\eta$ as a parameter, up to a primary approximation is calculated using the same method as that described above and expansion up to the secondary is:

$$F(x;\eta) = F(x;0) + \eta\underbrace{\left(\frac{\partial F}{\partial \eta}(x;0) + \frac{1}{2}\frac{\partial F}{\partial \eta}(x;0)\eta\right)}_{\text{same as a primary approximation}} + \ldots \quad (44)$$

Therefore, if $$f(x;\phi(\eta)) = f_0(x) + f_1(x)e^{i\phi(\eta)} \quad (45)$$

is modified to:

$$f(x;\eta) = f_0(x) + f_1(x;\eta)\exp[i\phi_1(\eta)]$$

$$f_1(x;\eta) = f_1(x) + f_2(x)\exp[i\phi_2(\eta)] \quad (46)$$

then, $$f_1(x;\eta)$$

can also be determined in an appropriate form as in the case of the above embodiment. Here, $\phi$ is used as a parameter in the case of the above described embodiment for clarity, but the conditional expression is described with parameter $\eta$ of a desired field. Furthermore, $$f_2(x)$$

is set to be a field orthogonal to:

$$f_0(x), f_1(x)$$

Furthermore, the phase term to be added to the third waveguide is:

$$\exp[i(\phi_1(\eta)+\phi_2(\eta))]$$

As shown above, it is possible to sequentially raise the level of approximation by Taylor-expansion of a desired function, integrating it with the term of the previous order, apparently providing the coefficient of a term one order lower with parameter dependency and applying a primary approximation to the term. Furthermore, when there are a plurality of parameters, it is likewise possible to perform approximations sequentially by setting a coefficient to match one parameter and then setting it to match another parameter.

EMBODIMENT 28

Since the field radius of a silica-based light waveguide is different from that of the semiconductor light waveguide, optical coupling loss of an optical fiber and optical semiconductor laser, etc., is generally reduced through lenses. However, the use of lenses requires a sufficient distance to be provided between the light waveguide structure and lenses, which does not fit for miniaturization and integration. Therefore, attempts have been made to optically couple the light waveguide and optical semiconductor element without lenses. However, as shown in FIG. 64A, the light waveguide includes a plane-wave-like iso-phase wavefront inside the circuit, and therefore with emission from the opening, light diffracts and produces optical coupling loss. Furthermore, a difference in the field radius causes optical coupling loss and therefore, for example, in an optical coupling system of a silica-based light waveguide and semiconductor light waveguide, it is necessary to reduce the field radius of the silica-based light waveguide.

This embodiment improves optical coupling by controlling the above described wavefront and field shape simultaneously using the wave transmission medium of the present invention. The wave transmission medium of the present invention uses multiple scattering of light and can control light having a high wave number in lateral direction which becomes normal emission light unlike the light waveguide, and can thereby reduce the field radius below a value that can be reduced by the waveguide structure. Furthermore, the wave transmission medium of the present invention can control the phase distribution of a field, and therefore the iso-phase wavefront can be concave-shaped as shown in FIG. 64B.

Figure 65:
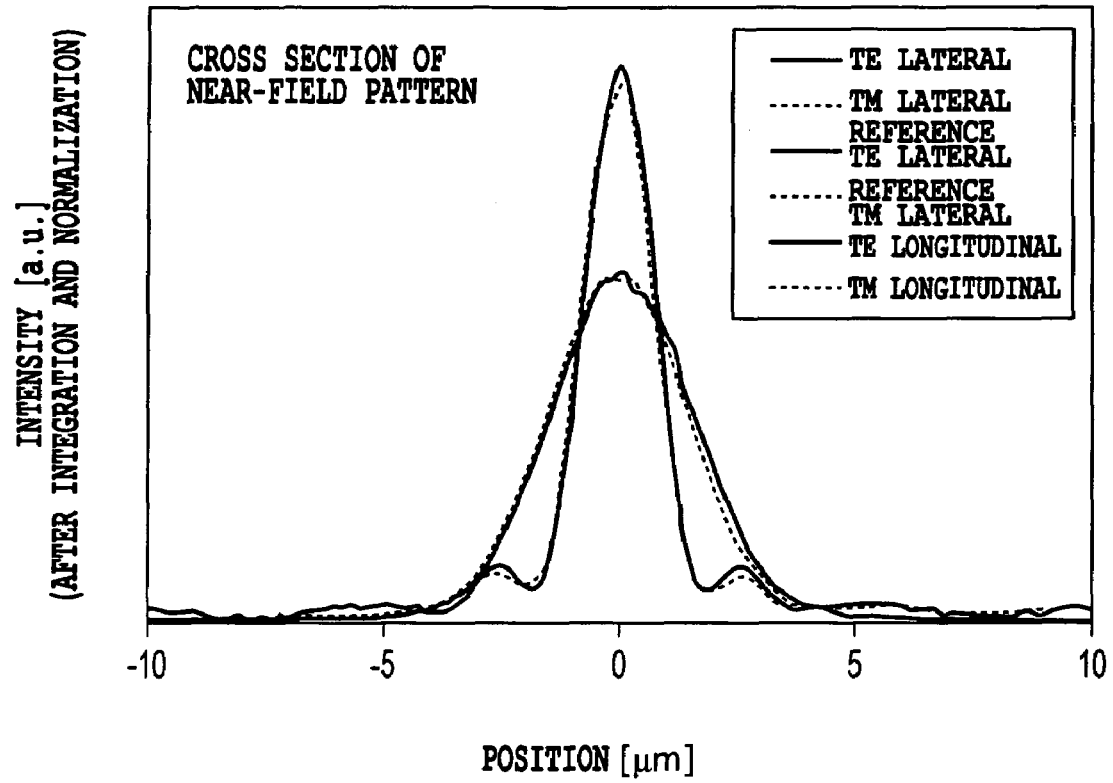
FIG. 65 is a cross-sectional view of a near-field pattern in the direction perpendicular to the substrate whose spot diameter is shaped only in the horizontal direction of the substrate by a holographic wave transmission medium manufactured using a silica-based planar lightwave circuit technology having a refractive index difference of 1.5%.

FIG. 65 is a cross-sectional view of a near-field pattern in the direction perpendicular to the substrate whose spot diameter is shaped only in the horizontal direction of the substrate by a wave transmission medium manufactured using a silica-based planar lightwave circuit technology having a refractive index difference of 1.5%. The wave transmission medium is designed to have a beam waist approximately 5 μm ahead of the end of outgoing radiation and a minimum field radius was also realized at approximately 5 μm from the end of outgoing radiation in the near-field pattern. The reference is a field according to the light waveguide and it is appreciated that it matches longitudinal broadening of the field of the wave transmission medium. On the contrary, the field in the horizontal direction to the substrate has a field radius of approximately 3 μm and it was possible to realize a field radius smaller than the light waveguide structure. This made it possible to improve the coupling loss with respect to the semiconductor laser which was conventionally approximately 8 dB to 4 dB.

EMBODIMENT 29

The arrayed waveguide type light multi/demultiplexer circuit which will be explained below arranges scattering points based on a spatial refractive index distribution in the area of connection between the input waveguide and the first slab waveguide to thereby control the phase and intensity of propagating light simultaneously based on the above described principle and the principal advantages acquired by this are as follows.

Figure 2A:
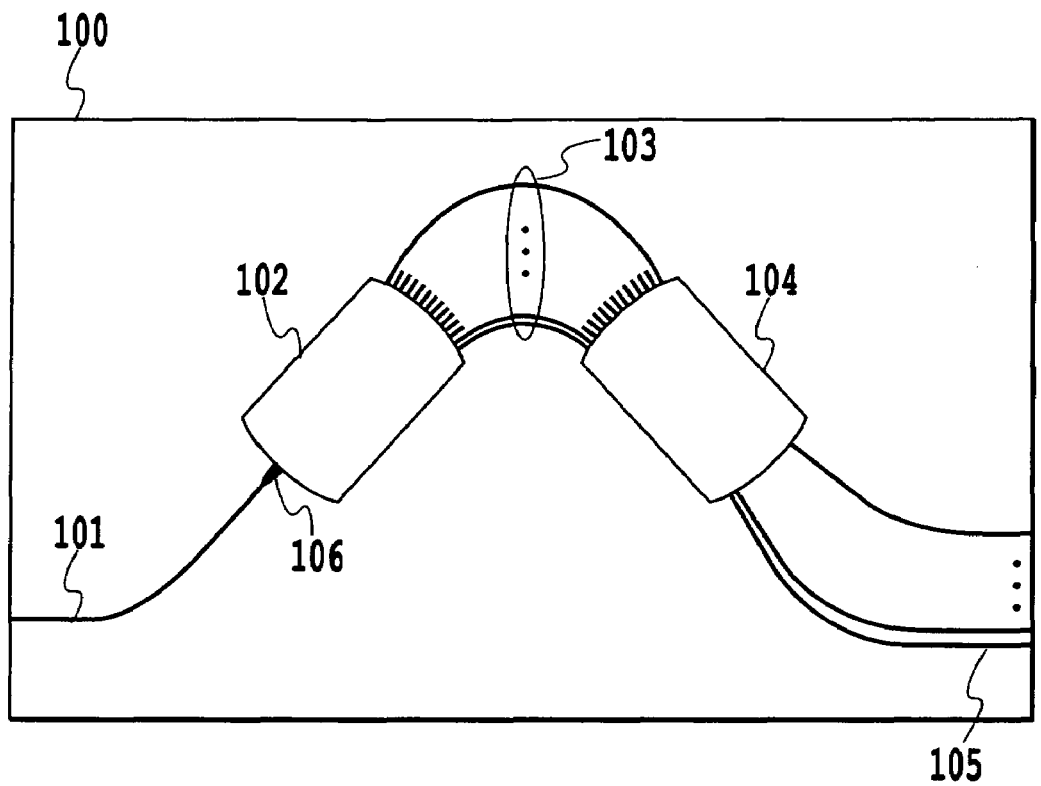
FIGS. 2A and 2B are diagrams illustrating a configuration of a conventionally proposed extended-passband arrayed waveguide grating type optical multi/demultiplexing circuit.
Figure 2B:
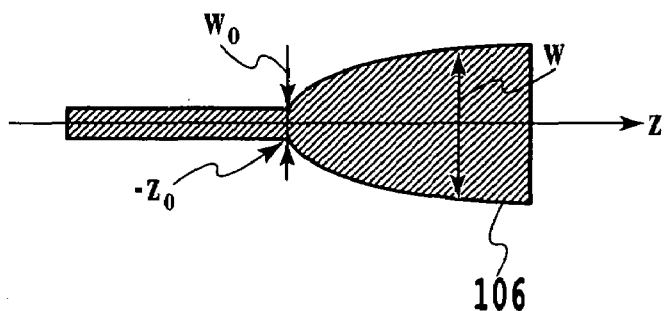
Figure 3A:
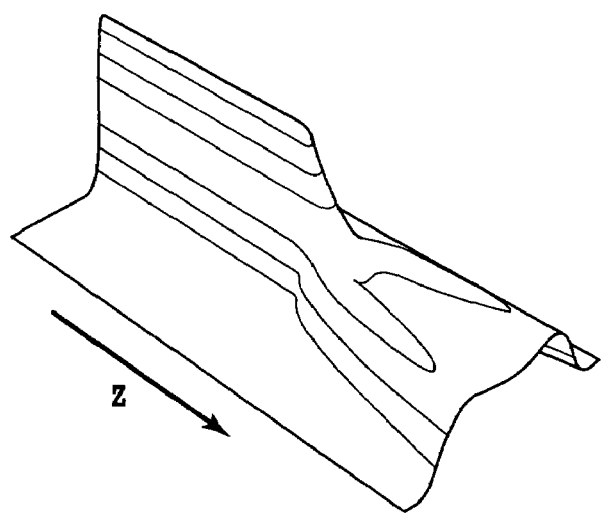
FIGS. 3A and 3B are diagrams illustrating optical field distribution at the interface between the parabolic waveguide and slab waveguide in the circuit configuration of FIG. 2A.
Figure 3B:
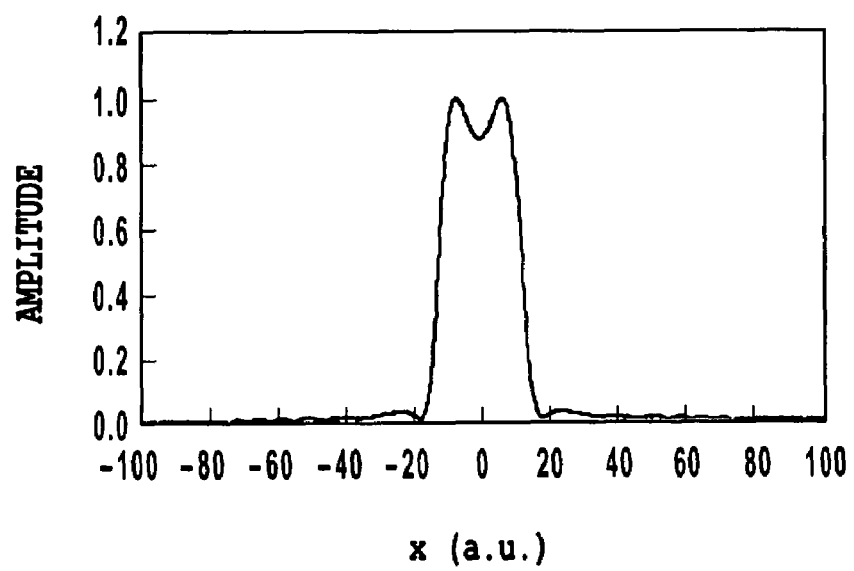
Figure 66:
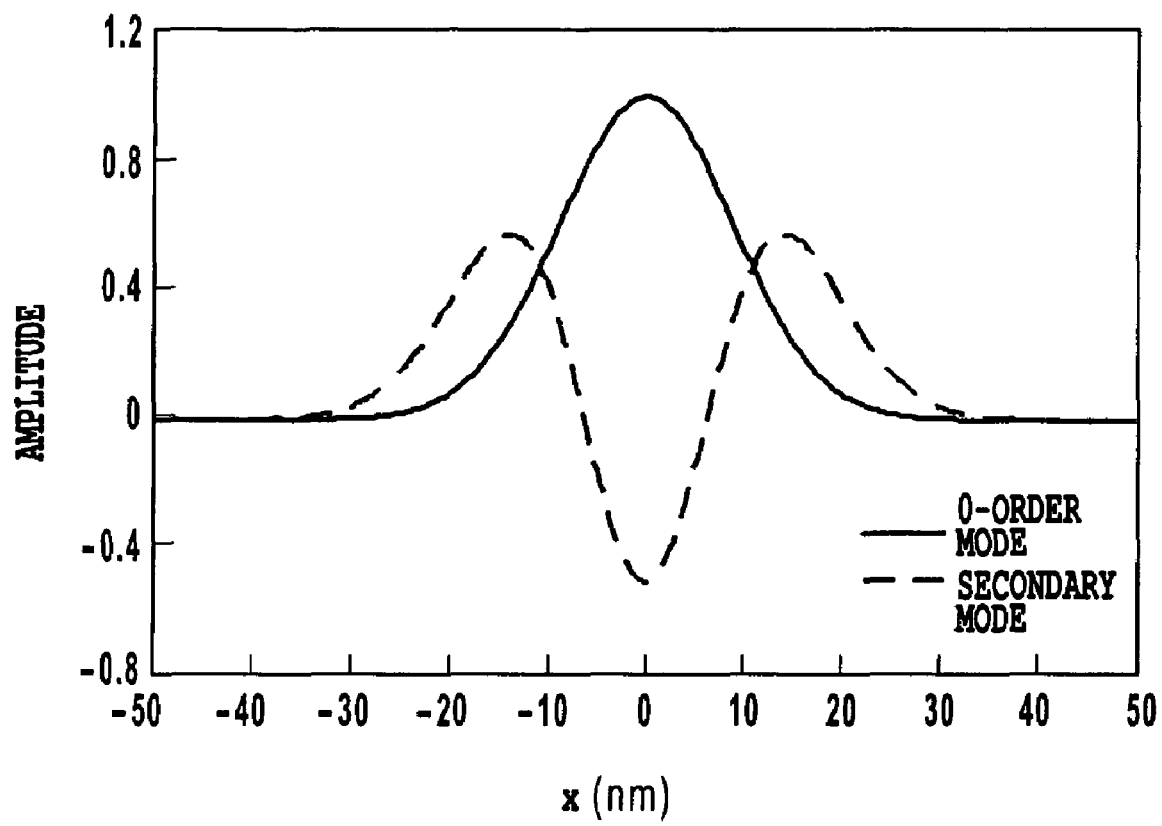
FIG. 66 illustrates a double-peak field distribution within a parabolic waveguide provided in the circuit in the conventional configuration shown in FIG. 2A.

FIG. 66 illustrates a double-peak optical field distribution within a parabolic lightwave circuit 106 provided in the circuit in the conventional configuration shown in FIG. 2A. The double-peak field distribution within the parabolic lightwave circuit 106 provided in the circuit in the conventional configuration shown in FIG. 2A is produced by superimposing of the 0-order mode and secondary mode and the field distribution $\Phi(x)$ can be expressed by the following expression:

$$\Phi(x) = a_0\varphi_0(x)\exp(-j\beta_0 z) + a_2\varphi_2(x)\exp(-j\beta_2 z) = \quad (47)$$
$$\exp(-\beta_0 z)\{a_0\varphi_0(x) + a_2\varphi_2(x)\exp(-j\delta\beta z)\}$$

where, $$\delta\beta = \beta_2 - \beta_0$$

and, $$\varphi_m(x)$$

is a field distribution of the m-order mode, $\beta m$ is a propagation constant of the m-order mode, $a_m$ is an expansion coefficient of the m-order mode. That is, the phase distribution which is a factor of wavelength scattering is derived from the phase difference between the 0-order mode and the secondary mode provoked in the parabolic waveguide.

In contrast, the arrayed waveguide grating type light multi/demultiplexer of the present invention is not in a waveguide mode, but a plurality of scattering points locally control the phase and intensity, and can thereby specify the intensity distribution and phase distribution of the outgoing radiation at a higher degree of freedom. Therefore, by optimally arranging the scattering points in the input waveguide (that is, by optimizing a spatial refractive index distribution), it is possible to shape the emission field distribution so as to have double peaks with little phase distortion and realize a low-dispersion arrayed waveguide grating type light multi/demultiplexer. The waveguide structure of the present invention also allows miniaturization and desired band design.

The low-dispersion arrayed waveguide grating type light multi/demultiplexer according to the present invention will be explained with an embodiment below more specifically. In the following embodiment, a silicon substrate will be used as the substrate, a film obtained by adding additives to silica so as to adjust a refractive index is placed on the silicon substrate and an optical circuit is patterned using a fine processing technology used in the semiconductor manufacturing step. Therefore, the optical circuit pattern is two-dimensional and patterned so as to realize the function as the optical circuit in the horizontal direction to the substrate.

Figure 67A:
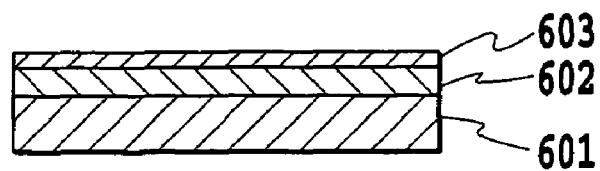
FIGS. 67A to 67E illustrate manufacturing processes of a low-dispersion arrayed waveguide grating type light multi/demultiplexer according to the present invention.
Figure 67B:
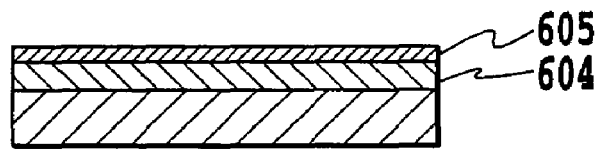
Figure 67C:
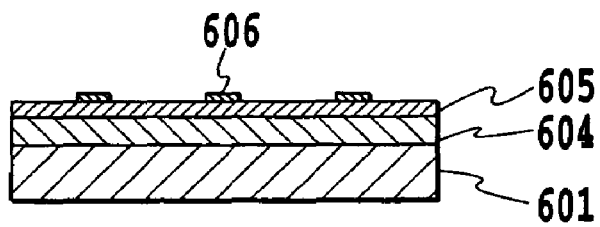

FIGS. 67A to 67E illustrate manufacturing processes of low-dispersion arrayed waveguide grating type light multi/demultiplexer of the present invention. A lower clad glass suit 602 consisting principally of $SiO_2$ and a core glass suit 603 with $GeO_2$ added to $SiO_2$ are placed one atop another on a silicon substrate 601 by flame hydrolysis deposition first (FIG. 67A). Then, heat treatment is applied at a high temperature of 1000° C. or above to realize glass transparency of the lower clad glass suit 602 and core glass suit 603. Through this glass transparency heat treatment, the lower clad glass suit 602 becomes a lower clad glass layer 604 having a thickness of 30 μm and the core glass suit 603 becomes a core glass 605 having a thickness of 7 μm (FIG. 67B).

The thicknesses of the lower clad glass suit 602 and core glass suit 603 placed in FIG. 67A are determined by the glass transparency heat treatment shown in FIG. 67B.

Figure 67D:
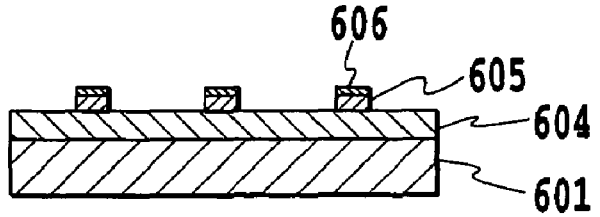

Following this glass transparency heat treatment, an etching mask 606 is formed on the core glass 605 using a photolithography technology (FIG. 67C) and patterning is applied to the core glass 605 by reactive ion etching (FIG. 67D).

Figure 67E:
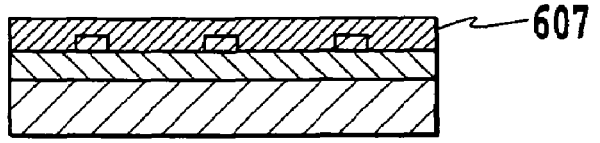

After the etching mask 606 which remains on the patterned core glass 605 is removed, the upper clad glass 607 is formed by flame hydrolysis deposition and the core glass 605 is embedded between the upper clad glass 607 and lower clad glass 604 (FIG. 67E). To reduce the glass transfer temperature of the upper clad glass 607, dorpants such as boron (B) and phosphorus (P) are added to this upper clad glass 607. Reducing the glass transfer temperature allows the upper clad glass 607 to be thoroughly and easily inserted into a narrow gap between the patterned core glasses 605.

The patterned core glass 605 obtained in this way has a higher refractive index than that of the upper clad glass 607 which is inserted between the core glasses 605. Thus, the high-refractive-index area corresponding to the area of existence of the core glass 605 and the low-refractive-index area corresponding to the area of existence of the upper clad glass 607 which is inserted between the core glasses 605 form a two-dimensional spatial refractive index distribution and the core glasses 605 which constitute the high-refractive-index area act as scattering points with respect to waveguide light and optimizing the arrangement of these scattering points (that is, optimizing the spatial refractive index distribution) makes it possible to locally control the phase and intensity of the light field.

Figure 68:
FIG. 68 illustrates an example of an input waveguide structure (scattering point arrangement) connected to a slab waveguide of a pass band expanded arrayed waveguide grating type light multi/demultiplexer.

FIG. 68 illustrates an example of the structure designed based on the above described principle (scattering point arrangement) of an input waveguide connected to a slab waveguide of a pass band expansion arrayed waveguide grating type light multi/demultiplexer and the area expressed in black in the figure corresponds to the scattering points (high-refractive-index area). As shown in this figure, the two-dimensional arrangement distribution of the scattering points within the input waveguide is substantially symmetric with respect to the straight line which extends in the light propagation direction.

This structure is designed by optimally arranging the scattering points in the waveguide using the above described steepest descent method and this waveguide has an area having a length of 300 μm and width of 160 μm. This area is divided into 1500×800 pixels (the length of one side of each pixel is 0.2 μm) and scattering points (refractive index difference from low-refractive-index area $\Delta$=0.75%) are optimally arranged in these micro areas to form a spatial refractive index distribution. In order to cause propagation light to effectively scatter, it is preferable to set the length of one side of each scattering point to 0.2 μm or above.

Figure 69:
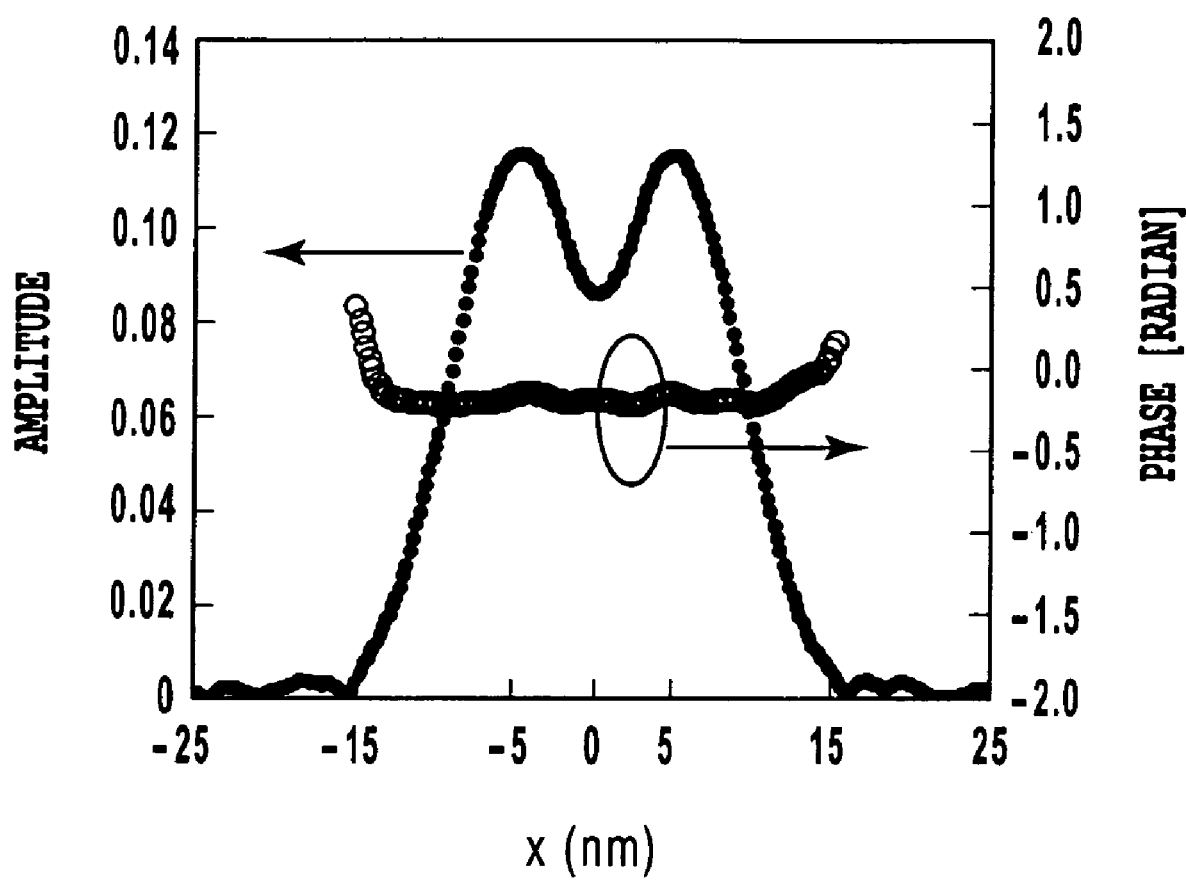
FIG. 69 illustrates a calculation result of a distribution (amplitude and phase) of an optical field emitted from an input waveguide having the scattering point arrangement shown in FIG. 68.

FIG. 69 illustrates a calculation result of a distribution (amplitude and phase) of an optical field emitted from the input waveguide having the scattering point arrangement shown in FIG. 68 and as shown in this figure, an emission field distribution with no distortion on the iso-phase wavefront and having an amplitude with double peaks is obtained.

Figure 70:
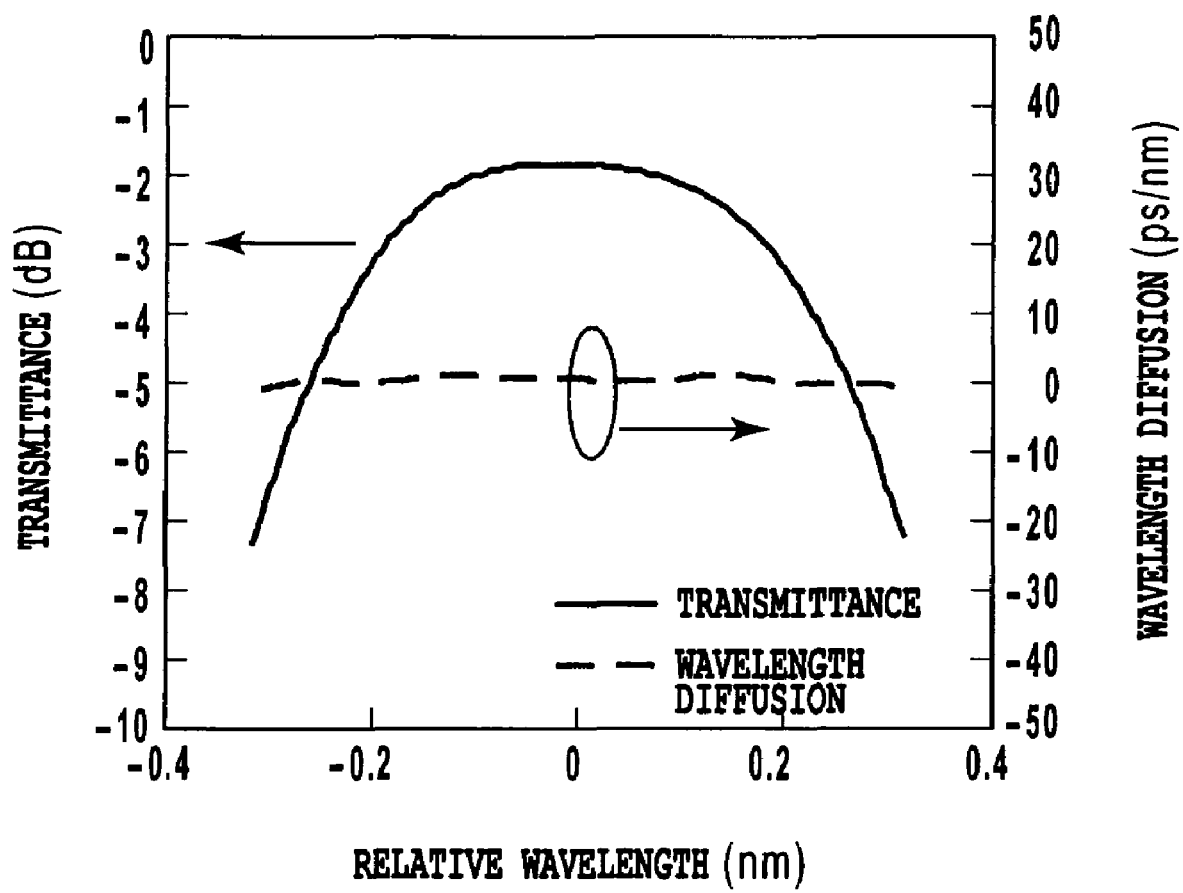
FIG. 70 illustrates verification results of a pass band expansion effect and low-wavelength dispersion effect of an arrayed waveguide grating type light multi/demultiplexer having a channel spacing of 100 GHz constructed using the input waveguide according to the embodiment.

FIG. 70 illustrates a verification result of a pass band expansion effect and low-wavelength dispersion effect of an arrayed waveguide grating type light multi/demultiplexer having a channel spacing of 100 GHz constructed using the input waveguide of this embodiment.

Figure 4:
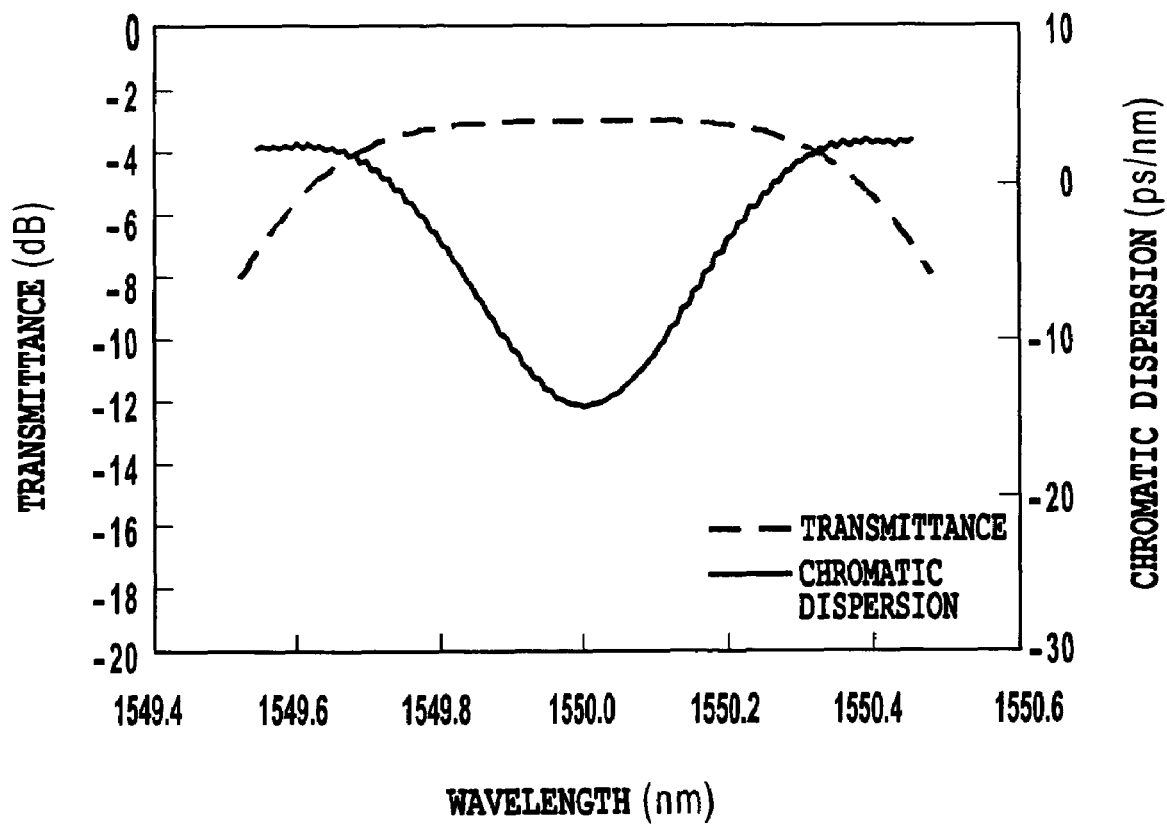
FIG. 4 is a graph illustrating chromatic dispersion values of the conventional extended-passband arrayed waveguide grating type optical multi/demultiplexing circuit.

As is apparent from a comparison with the circuit characteristic in the conventional configuration shown in FIG. 4, the wavelength dispersion of the circuit of the present invention has no relative wavelength dependency, almost no influence on the transmission bandwidth, has marked low dispersion and an improved optical loss characteristic.

In the explanations so far, a scatters with a high refractive index is used as a scattering point, but it is also possible to obtain similar effects even when a scatters with a low refractive index instead of a high refractive index is arranged at the end of the slab waveguide on the input side. Furthermore, an example of an arrayed waveguide gratings type light multi/demultiplexer constructed of a silica-based glass waveguide provided on a silicon substrate has been shown, but the component material of the waveguide is not limited to glass and other material such as polyimide, silicon, semiconductor and $LiNbO_3$ can also be used. It goes without saying that the substrate used is not limited to silicon, either.

The invention claimed is:

1. A wave transmission medium for propagating light from an input port to an output port, the input port being defined as any one of a plurality of ports, the output port being defined as at least one of the rest of the plurality of ports, the light at the input port being defined as input-light, and the light at the output port being defined as output-light, each port being defined as a location of a circuit at which a cross section having desired optical input/output is given, said wave transmission medium comprising:
   a spatial refractive index distribution determined such that the input-light launched into the input port propagates through the wave transmission medium with scattered multiple times and is then outputted from the output port as the output-light;
   wherein the spatial refractive index distribution is designated by each refractive index of pixels defined by a mesh, and
   said each refractive index of the pixels is determined by repeating calculations until a phase difference between a forward propagation of an input field of the input-light and a reverse propagation of an output field of the output-light becomes less than a desired value at each pixel.

2. The wave transmission medium as claimed in claim 1, wherein
   said each refractive index of the pixels is one of a low refractive index $(n_L)$ or a high refractive index $(n_H)$, and
   said spatial refractive index distribution is given by spatially placing pixels with the low refractive index $(n_L)$ and pixels with the high refractive index $(n_H)$.

3. The wave transmission medium as claimed in claim 2, wherein the pixels with the low refractive index $(n_L)$ have an existing probability of equal to or less than 30% in a propagation direction of the input-light in said wave transmission medium.

4. The wave transmission medium as claimed in claim 1, wherein
   said pixels can take a finite number of refractive indices between a lower limit refractive index and an upper limit refractive index, and
   said spatial refractive index distribution is given by spatially placing pixels with the refractive indices selected from among the finite number of refractive indices.

5. The wave transmission medium as claimed in claim 1, wherein said spatial refractive index distribution is determined such that the input-light launched into the input port is split to different output port locations at different output powers.

6. The wave transmission medium as claimed in claim 1, wherein
   the input-light launched into the input port is wavelength division multiplexed light comprising a plurality of wavelengths, and
   said refractive index distribution is determined such that the optical waves are demultiplexed to different output port locations depending on the individual wavelengths of the wavelength division multiplexed light.

7. The wave transmission medium as claimed in claim 1, wherein
   the input-light launched into the input port is wavelength division multiplexed light comprising a plurality of wavelengths, and
   said refractive index distribution is determined such that the wavelength division multiplexed light is demultiplexed and split to different output port locations at different output powers.

8. The wave transmission medium as claimed in claim 1, wherein
   the input-light launched into the input port is polarization multiplexed light with a TE mode and TM mode, and
   said refractive index distribution is determined such that the polarization multiplexed light is demultiplexed to different output port locations depending on individual polarized waves of the polarization multiplexed light.

9. The wave transmission medium as claimed in claim 1, wherein
   the input-light launched into the input port is polarization multiplexed light with a TE mode and TM mode, and
   said refractive index distribution is determined such that individual polarized waves of the polarization multiplexed light are demultiplexed and split to different output port locations at different output powers.

10. The wave transmission medium as claimed in claim 1, wherein said wave transmission medium comprises a dielectric.

11. A waveguide circuit that is configured by two-dimensional placement of a wave transmission medium, said wave transmission medium comprising:
   a spatial refractive index distribution determined such that input-light launched into an input port propagates through the wave transmission medium with scattered multiple times to an output port, the input port being defined as any one of a plurality of ports, the output port being defined as at least one of the rest of the plurality of ports, and the light at the output port being defined as output-light;
   wherein the spatial refractive index distribution is designated by each refractive index of pixels defined by a mesh, and
   said each refractive index of the pixels is determined by repeating calculations until a phase difference between a forward propagation of an input field of the input-light and a reverse propagation of an output field of the output-light becomes less than a desired value at each pixel.

12. A waveguide circuit constituting a multimode interference circuit using the waveguide circuit as defined in claim 11.

13. A waveguide circuit constituting an optical bending circuit using the waveguide circuit as defined in claim 11.

14. An optical circuit configured by using a waveguide circuit that is configured by two-dimensional placement of a wave transmission medium, said wave transmission medium comprising:
- a spatial refractive index distribution determined such that input-light launched into an input port propagates through the wave transmission medium with scattered multiple times to an output port, the input port being defined as any one of a plurality of ports, the output port being defined as at least one of the rest of the plurality of ports, and the light at the output port being defined as output-light;
- wherein the spatial refractive index distribution is designated by each refractive index of pixels defined by a mesh,
- said each refractive index of the pixels is determined by repeating calculations until a phase difference between a forward propagation of an input field of the input-light and a reverse propagation of an output field of the output-light becomes less than a desired value at each pixel, and
- the spatial refractive index distribution is implemented by local refractive index variations of said waveguide circuit based on electrooptic effect.

15. An optical circuit having a waveguide region configured on a substrate, the optical circuit comprising:
- a wave transmission medium having a spatial refractive index distribution, said spatial refractive index distribution being determined such that input-light launched into an input port propagates through the wave transmission medium with scattered multiple times to an output port, the input port being defined as any one of a plurality of ports, the output port being defined as at least one of the rest of the plurality of ports, and the light at the output port being defined as output-light;
- wherein the spatial refractive index distribution is designated by each refractive index of pixels defined by a mesh,
- said each refractive index of the pixels is determined by repeating calculations until a phase difference between a forward propagation of an input field of the input-light and a reverse propagation of an output field of the output-light becomes less than a desired value at each pixel, and
- individual refractive indices of said pixels are determined such that the light is confined in a direction perpendicular to said substrate.

16. The optical circuit as claimed in claim 15, wherein said mesh comprises unit cells that form the waveguide region in periodic repetition.

17. The optical circuit as claimed in claim 16, wherein each of said unit cells has a quasi-periodic structure.

18. The optical circuit as claimed in claim 15, wherein said pixels can take one of two refractive index values of a high refractive index ($n_H$) and a low refractive index ($n_L$).

19. The optical circuit as claimed in claim 18, wherein said pixels with the high refractive index have a size equal to or less than a wavelength of the light propagating through said waveguide region.

20. The optical circuit as claimed in claim 19, wherein a value given by the following expression is equal to or less than 0.1, $$\frac{\lambda q}{\pi n a}$$

where
- $\lambda$ is the wavelength of the propagation light,
- n is the refractive index ($n_H$) of the pixels with the high refractive index,
- a is the height of the pixels with the high refractive index, and
- q is a coefficient given by q =(z/a) where z is an average distance of gaps between high refractive index areas of the field distribution of the propagation light.

21. The optical circuit as claimed in claim 18,
- wherein said pixels with the high refractive index form a shape of a polygon with n sides, where n is an integer equal to or greater than three, and
- wherein said pixels are placed such that the sides each have an inclination with respect to the propagation direction of the light propagating through the waveguide region.

22. The optical circuit as claimed in claim 21, wherein said shape of a polygon is a square, and an angle of the inclination is 45 degrees.

23. The optical circuit as claimed in claim 18, wherein
- said pixels with the high refractive index ($n_H$) comprises a waveguiding section including a first high refractive index layer and a second high refractive index layer which are stacked sequentially, said second high refractive index layer having a refractive index lower than the first high refractive index layer; and
- said pixels with the low refractive index ($n_L$) comprises a waveguiding section comprising said second high refractive index layer, and
- wherein a center of a diameter of the optical field propagating through the waveguiding section of the pixels with the high refractive index (nH) and a center of a diameter of the optical field propagating through the waveguiding section of the pixels with the low refractive index ($n_L$) are both placed on a same plane parallel to a surface of the substrate.

24. The optical circuit as claimed in claim 15, wherein said pixels each have a desired size equal to or greater than a region defined by the mesh, and some of said pixels are placed at locations deviated from lattice locations defined by the mesh.

25. The optical circuit as claimed in claim 15, wherein said waveguide region comprises a dielectric material that has an optical loss function or optical amplification function.

26. The optical circuit as claimed in claim 25, wherein said dielectric material has a complex refractive index depending on the wavelength of light.

27. The optical circuit as claimed in claim 15, wherein said waveguide region has a structure comprising
- a first low refractive index layer, a high refractive index layer constituting the waveguide section and a second low refractive index layer, which are stacked sequentially, and
- wherein the light is confined in said high refractive index layer by the first and second low refractive index layers.

28. The optical circuit as claimed in claim 27, wherein
- said high refractive index layer comprises two surfaces, and has, on at least one of the surfaces, relief-like patterning formed by concave portions, and wherein
- said spatial refractive index distribution is implemented by employing the concave portions as the low refractive index layer, and regions other than the concave portions as the high refractive index layer.

29. The optical circuit as claimed in claim 28, wherein said relief-like patterning is formed on both surfaces of said high refractive index layer.

30. The optical circuit as claimed in claim 29, wherein the relief-like patterning formed on both sides of said high refractive index layer have patterns different from each other.

31. The optical circuit as claimed in claim 29, wherein said concave portions of the relief-like patterning formed on both sides of said high refractive index layer have a same depth.

32. The optical circuit as claimed in claim 27, wherein at least one of said first and second low refractive index layers is formed by stacking a plurality of layers with different refractive indices.

33. The optical circuit as claimed in claim 15, wherein
said pixels are each divided into a plurality of sub-pixels having one of the high refractive index ($n_H$) and the low refractive index ($n_L$), and
said refractive index distribution of the pixels is implemented by arrangement of the sub-pixels with the two refractive indices.

34. The optical circuit as claimed in claim 33, wherein in said pixels, a refractive index difference is varied over a distance equal to or greater than one wavelength as a rate of change of the refractive index difference, as a rate of spatial change of a propagation constant in the proceeding direction of a wavefront of the propagation light.

35. The optical circuit as claimed in claim 34, wherein said pixels or said sub-pixels each have a circular cross section in a direction parallel to said substrate.

36. The optical circuit as claimed in claim 34, wherein said pixels or said sub-pixels each have a cross section with a shape of smoothly varying curve in a direction perpendicular to said substrate.

37. The optical circuit as claimed in claim 15,
wherein said optical circuit consists of an optical circuit with a mutual broadcast delivery/broadcast reception configuration having at least three input/output ports, and
wherein said spatial refractive index distribution is established such that phases of signals output from said input/output ports are at 90 degrees to each other.

38. The optical circuit as claimed in claim 37, wherein a branching ratio of said optical circuit is asymmetric.

39. The optical circuit as claimed in claim 37, wherein the foregoing optical circuit comprises an amplification function.

40. The optical circuit as claimed in claim 15,
wherein said optical circuit consists of an optical circuit with a mutual broadcast delivery/broadcast reception configuration having at least three input/output ports, and
wherein said spatial refractive index distribution is established such that when phases of signals output from said input/output ports are not at 90 degrees to each other, overlaps of the output signals become minimum.

41. The optical circuit as claimed in claim 40, wherein a branching ratio of said optical circuit is asymmetric.

42. The optical circuit as claimed in claim 40, wherein the foregoing optical circuit comprises an amplification function.

43. The optical circuit as claimed in claim 15, wherein
said optical circuit includes a plurality of input ports, and is configured such that input optical signals launched into the plurality of input ports are output from a same emitting plane, and wherein
said spatial refractive index distribution is established such that the individual optical signals output from the plurality of input ports have their phases adjusted to be equal to each other, in order to shape a profile of the output optical field.

44. An optical circuit having the optical circuit as defined in claim 42 placed at an input side slab of an arrayed waveguide grating circuit, wherein
mutual phase differences between the plurality of input ports are given by circuit lengths of the optical waveguides of said optical circuit; and
a repetition period of the phase differences given by the circuit lengths of said optical waveguides agrees with a wavelength spacing of outputs of said arrayed waveguide grating circuit, and centers of fields of the outputs of said optical circuit vary periodically to cancel out chromatic dispersion characteristics of said arrayed waveguide grating circuit periodically at the wavelength spacing of the outputs.

45. The optical circuit as claimed in claim 15, wherein said spatial refractive index distribution is established so as to implement a field profile and phase distribution that enable spot size conversion of the output-light.

46. An arrayed waveguide grating type optical multi/demultiplexer configured by using a waveguide circuit that is configured by two-dimensional placement of a wave transmission medium, said wave transmission medium comprising:
a spatial refractive index distribution determined such that incident light launched into an input port propagates through the wave transmission medium with scattered multiple times;
wherein local positions in the wave transmission medium are designated by virtual pixels defined by a virtual mesh,
the spatial refractive index distribution of the wave transmission medium is formed by refractive indices of the individual pixels, and
said arrayed waveguide grating type optical multi/demultiplexer comprises
an input waveguide, a first slab waveguide, arrayed waveguides, a second slab waveguide and output waveguides, which are connected sequentially on a planar substrate; and
a plurality of scattering points with a refractive index higher than a refractive index of said input waveguide, said scattering points being placed in a connecting region between said input waveguide and said first slab waveguide.

47. The arrayed waveguide grating type optical multi/demultiplexer as claimed in claim 46, wherein said scattering points are disposed such that an optical field distribution formed at an output end of said input waveguide has an iso-phase wavefront without distortion, and an amplitude with double peaks.

48. The arrayed waveguide grating type optical multi/demultiplexer as claimed in claim 46, wherein said scattering points have in said input waveguide a two-dimensional configuration that has nearly line symmetry with respect to a line extending to the propagation direction of light.

49. The arrayed waveguide grating type optical multi/demultiplexer as claimed in claim 46, where said scattering points each have a side equal to or greater than 0.2 μm.

50. The arrayed waveguide grating type optical multi/demultiplexer as claimed in claim 46, wherein
said planar substrate comprises a silicon substrate, and
said optical waveguides comprise silica-based glass optical waveguides.

51. An arrayed waveguide grating type optical multi/de-multiplexer comprising:

an input waveguide, a first slab waveguide, arrayed waveguides, a second slab waveguide, and output waveguides connected sequentially on a planar substrate, and a wave transmission medium having a spatial refractive index distribution, said wave transmission medium being placed in a connecting region between said input waveguide and said first slab waveguide, said spatial refractive index distribution being determined such that input-light launched into the input waveguide propagates through the wave transmission medium with scattered multiple times to the first slab waveguide as output-light;

wherein the spatial refractive index distribution is designated by each refractive index of pixels defined by a mesh, and said each refractive index of the pixels is determined by repeating calculations until a phase difference between a forward propagation of an input field of the input-light and a reverse propagation of an output field of the output-light becomes less than a desired value at each pixel.

52. The arrayed waveguide grating type optical multi/de-multiplexer as claimed in claim 51, wherein an output field of the output-light is disposed such that an optical field distribution has an iso-phase wavefront without distortion, and an amplitude with double peaks.

53. The arrayed waveguide grating type optical multi/de-multiplexer as claimed in claim 51, wherein a pattern of the pixels in the wave transmission medium has nearly line symmetry with respect to a line extending to the propagation direction of light of the input waveguide.

54. The arrayed waveguide grating type optical multi/de-multiplexer as claimed in claim 51, where the length of each pixel is equal to or greater than 0.2 µm.

55. The arrayed waveguide grating type optical multi/de-multiplexer as claimed in claim 51, wherein
said planar substrate comprises a silicon substrate, and
said optical waveguides comprise silica-based glass optical waveguides.

* * * * *